United States Patent [19]
Venkatakrishnan

[11] Patent Number: 5,757,890
[45] Date of Patent: May 26, 1998

[54] DATA LINK FOR MULTI-PLAYER GAME SYSTEM USING TELEPHONE LINES

[75] Inventor: Ganesan Venkatakrishnan, Fremont, Calif.

[73] Assignee: Phylon Communications, Inc., Fremont, Calif.

[21] Appl. No.: 566,988

[22] Filed: Dec. 4, 1995

[51] Int. Cl.$^6$ ................................................. H04M 11/00
[52] U.S. Cl. ............................... 379/93.13; 379/93.31; 379/93.09; 379/493
[58] Field of Search ...................... 379/90.01, 93.01, 379/93.08, 93.09, 93.13, 93.31; 463/41; 455/6.3; 348/17; 370/442, 493, 498, 528; 375/222

[56] References Cited

U.S. PATENT DOCUMENTS

| | | | |
|---|---|---|---|
| 4,570,930 | 2/1986 | Matheson | 379/93.13 |
| 5,463,616 | 10/1995 | Kruse et al. | 379/93.08 |
| 5,502,727 | 3/1996 | Catazaro | 379/93.08 |

Primary Examiner—Curtis Kuntz
Assistant Examiner—Stephen W. Palan
Attorney, Agent, or Firm—Philip H. Albert; Townsend and Townsend and Crew

[57] ABSTRACT

An improved data transfer system is provided to transfer game data over a telephone line with low delay even while a voice conversation is being transferred over the same telephone line. Voice data and game data are framed, in a modified HDLC framing scheme, with game data inserted, if necessary, into a frame which contains voice, so that the time needed to complete the frame is not added to the delay of the game data. The inserted game data need not be of a fixed length, as it is delimited within the voice data by an escape sequence not found in the voice data. The available bandwidth is efficiently used since frames of voice data are not necessarily sent during periods of silence and frames of game data or other data can be sent using the entire telephone line bandwidth. The data is framed at a point beyond the output of pre-existing games and data transfer programs, to allow for transparent insertion of voice into the frame stream.

11 Claims, 6 Drawing Sheets

PlayLink™ Frame (2nd mode, variation 2)

| Data Source | Voice | Video | Sound | Image | Real-Time Data Blocks | Control | Graphics | Text |
|---|---|---|---|---|---|---|---|---|
| | | Real-Time | | | | Non-Real-Time | | |
| Application Layer Examples | Telephone | Video Window | Speakers | Display, Desktop Publishing | Storage | Program | Display | File Transfer |
| Interface Layer | | | | | | | | |
| Compression Examples | ADPCM | MPEG | MIDI | JPEG | Various | --- | T.4, Huffman | V.42bis |
| Error Correction | FEC | | | | V.42 | | | |
| Link Layer Examples (Address) | 32 | 31 | 35 | 33 | 37 | 34 | 38 | 36 |
| Link Protocol | HDLC | | | | | | | |
| Physical Layer: | V.32bis / V.32ter / V.34 / B-channel | | | | | | | |

Fig. 3

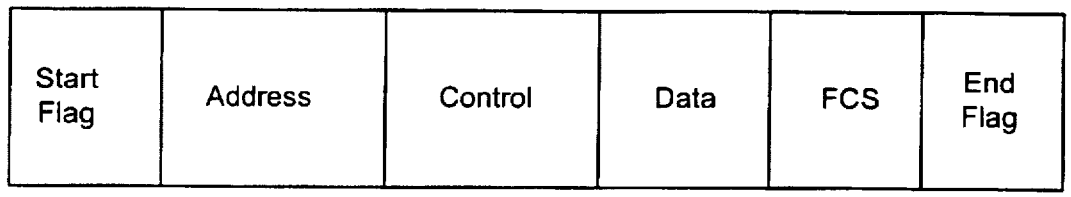
Fig. 4 HDLC Frame (1st Mode)
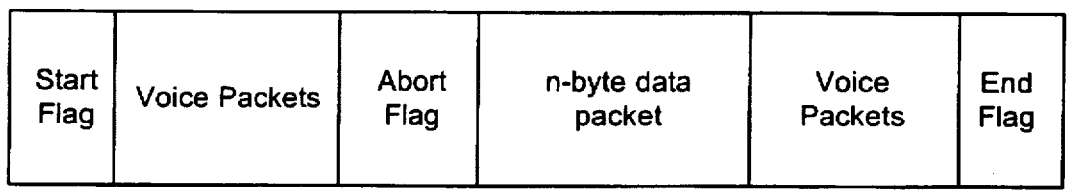
Fig. 5 Modified HDLC Frame (2nd Mode, variation 1)
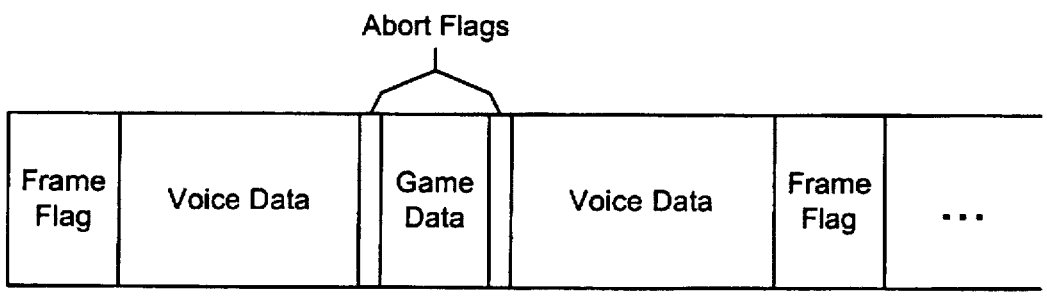
Fig. 6 PlayLink™ Frame (2nd mode, variation 2)

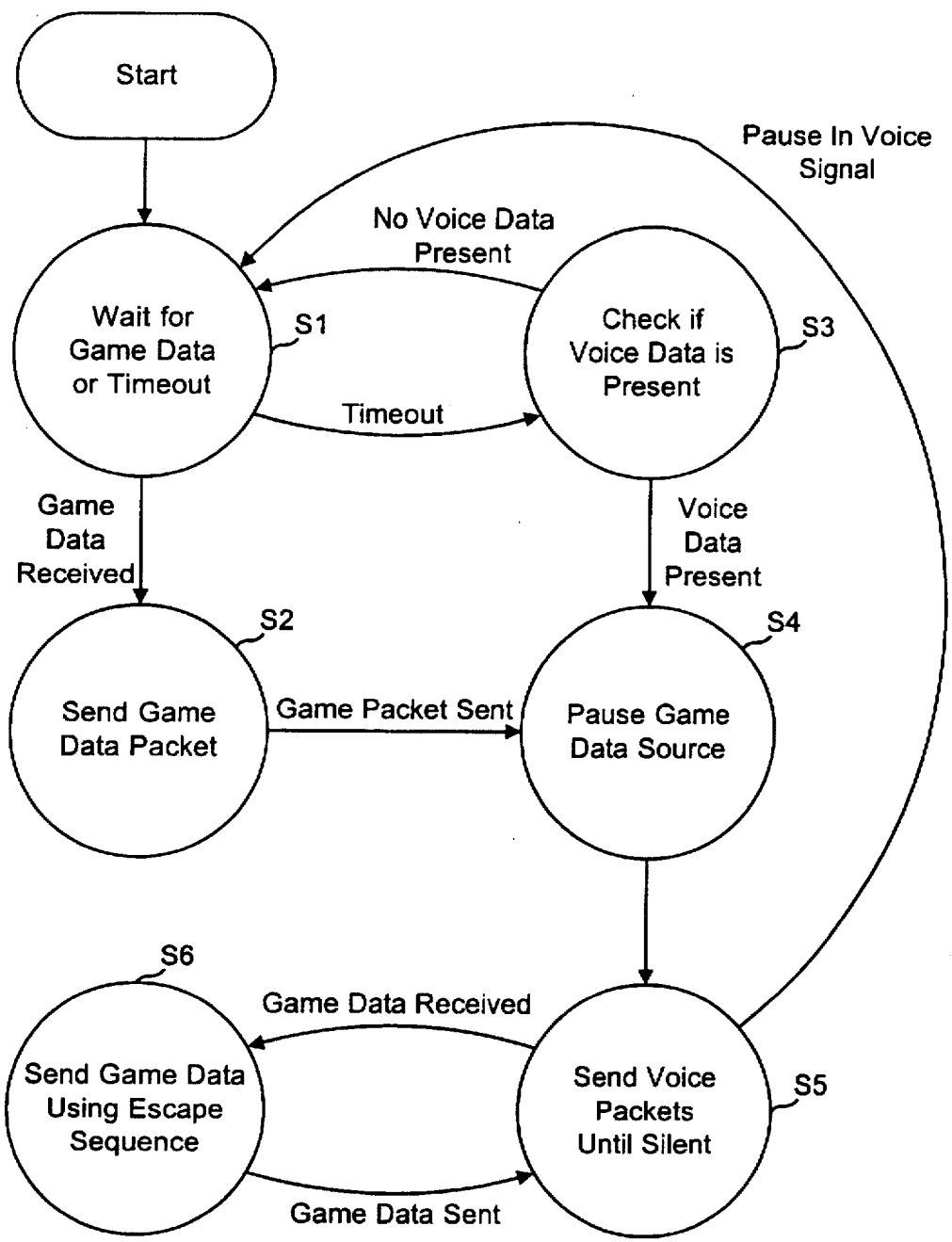
Fig. 7 (3rd Mode)

ism, and more specifically, to a data link for communicating game data between two or more players over telephone lines.

5,757,890

DATA LINK FOR MULTI-PLAYER GAME SYSTEM USING TELEPHONE LINES

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of communications, and more specifically, to a data link for communicating game data between two or more players over telephone lines.

A video game or computer game is a multi-player game when the progress of the game is determined by more than one player. The simplest implementation of such a game is to have a single computer system and inputs for the multiple players. The drawback of this system is that all the players must be physically nearby. Alternatively, a high-speed link between the players might by used to bring the various player inputs together. This, however, requires hardware which is not ordinarily available to the casual game player.

U.S. application Ser. No. 08/309,327, filed Sep. 19, 1994 and assigned to the assignee of the present application entitled "REAL-TIME AND NON-REAL-TIME DATA MULTIPLEXING OVER TELEPHONE LINES" discloses a data link wherein voice data and video game control data are sent over a single telephone line. In a two-player embodiment of the system disclosed therein, the video game data comprises two unidirectional data streams which allow two game players to play a video game which responds to inputs from both players. The disclosure of that patent application is included herein by reference for all purposes.

The typical operation of a multi-game system uses one game console per player. Each game console is a special-purpose game device, a personal computer running a game program or a combination of each. The multi-player aspect of the game is handled by having each game console accept inputs directly from its local player and accept inputs remotely for the other players. For efficiency, the remote data is often summarized and/or compressed so that the remote data can be timely transmitted over telephone lines. For example, while local input might include each key press or input device movement of the local player, the remote data sent out from the local game is often limited to control information which affects the play of the game from the perspective of the remote players.

This remote data needs to be communicated quickly, so as not to confuse the remote players. For example, if the game character of the local player moves, the remote game console needs to be notified of the movement quickly so that the remote player is not reacting to the old location of the local game character.

One prior art method of transmitting game data over telephone lines is to transmit data packets between a local modem and a remote modem using the V.42 packet transfer protocol. Typically, the minimum delay between a game action being taken at a remote game console and that action being communicated to the local game console is 28 to 150 milliseconds. For some game information, this is acceptable. But for fast action scenes, such as where the game characters are each in separate racing vehicles, the game consoles must be quickly updated with the remote position data so that each layer is aware of the other's position.

SUMMARY OF THE INVENTION

An improved data link for game data is provided by virtue of the present invention, which allows game data to be transmitted over telephone lines with low delay, even while simultaneously transmitting voice over the telephone line. The simultaneous transmission is useful where the players which to communicate by voice with the other players and still use only one telephone line.

In one embodiment of the present invention, a local data plus voice (D+V) modem accepts digital data at a data port, accepts analog voice signals at a voice port, digitizes the voice signals, compresses them, packages the digital voice data into frames and inserts the game data into voice data frames as the game data arrives at the D+V modem. An escape sequence delimits game data from the voice data so that a remote D+V modem can extract the game data from the voice data.

More generally, the game data stream can be any non-game data which is of a low data rate relative to the voice data and which needs to be transmitted with low delay.

One advantage to the present invention is full use of the available bandwidth through the use of data framing without the delays which would occur if data of one type arrives at the D+V modem while a frame of a different type of data is being transmitted.

Herein, the term "modem" refers to conventional analog modems as well as ISDN serial interface devices which link to ISDN lines. Strictly speaking, an ISDN device is not a modem, since "modem" is short for modulator/demodulator used with analog lines, however "modem" has taken on a general meaning of a device which couples a computer communication line to a telephone line.

A further understanding of the nature and advantages of the inventions herein may be realized by reference to the remaining portions of the specification and the attached drawings.

BRIEF DESCRIPTION OF THE DRAWINGS

FIG. 3 is a chart showing examples of the data transmittable over the D+V communications system and the protocols used at several network levels for these types of data;

FIG. 4 is a schematic diagram of an HDLC (High-level Data Link Control) frame, as used with the present invention;

FIG. 5 is a schematic diagram of a modified HDLC frame used to transmit video game control data or other low delay-tolerant data and voice data at the same time; and FIG. 6 is a schematic diagram of a PlayLink™ frame used for variable-length low delay data transmission over voice data.

FIG. 7 is a state diagram of a process for sending voice and game data over a single telephone line.

DESCRIPTION OF THE PREFERRED EMBODIMENTS

Figure 1:
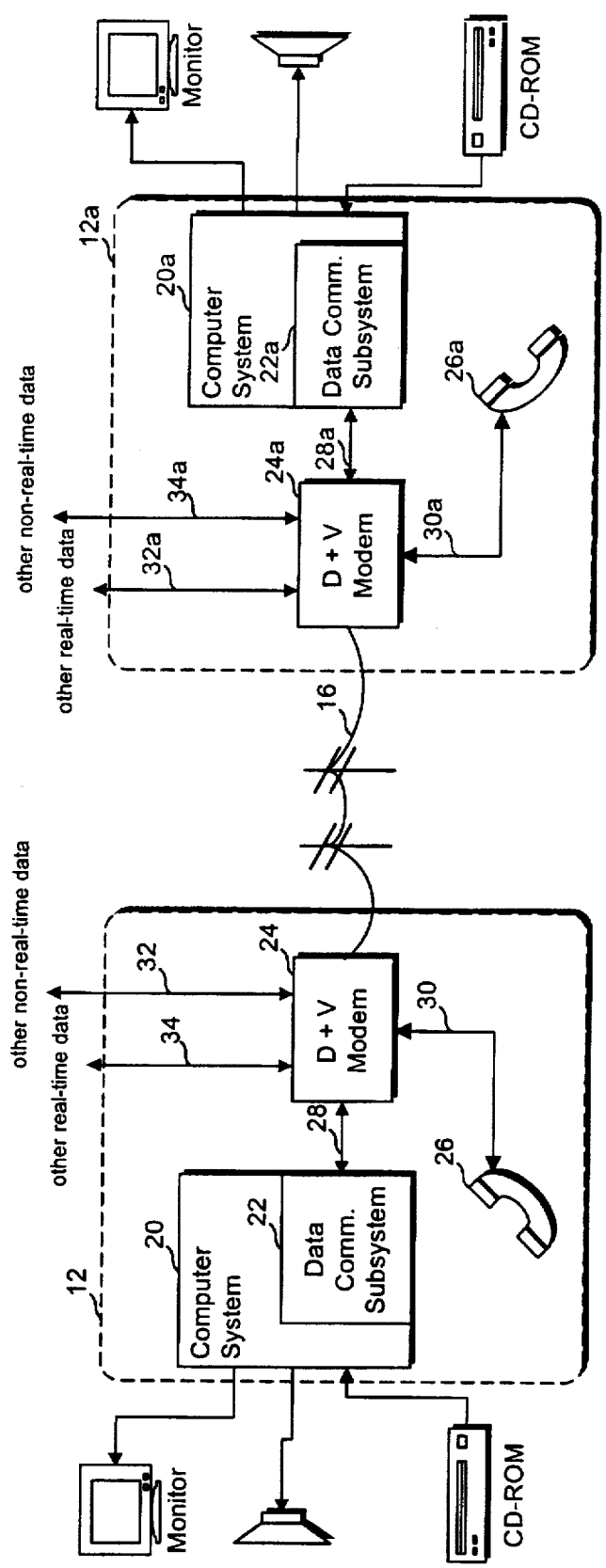
FIG. 1 is a high-level block diagram of a communication system which allows voice signals and data to be communicated between two stations.

FIG. 1 shows a communication system 10 according to the present invention. Communication system 10 allows for the transfer of data from one site 12 to another site 12a through a public switched telephone line 16. Site 12, which is essentially similar to site 12a, is shown with a computer system 20, a data communication subsystem 22, a D+V (data+voice) modem 24 and a telephone handset 26. D+V modem 24 is coupled to subsystem 22 via a communications cable 28, and to handset 26 via a twisted pair 30. D+V modem 24 is also connected to line 16. Station 12a includes a computer system 20a, a data communications subsystem 22a, a D+V modem 24a, and a handset 26a.

It should be apparent that other variations are possible. For example, D+V modem 24 can be integral to subsystem 22 and/or system 20, as would be the case if system 20 is a lap-top computer and D+V modem 24 is an internal telephone/modem. Also, handset 26 need not be as depicted, but could be a headset or other microphone and/or earphone combination. For high performance game systems, a hands-free headset with earphones for stereo game sound combined with the remote player's voice and an attached microphone is typically used. For other applications, handset 26 is interchangeable with other devices which communicate real-time data. If D+V modem 24 is internal to subsystem 22, then cable 28 might be replaced by an internal bus with similar functionality.

In operation, computer system 20 transfers data between itself and system 20a over line 16, while voice communication occurs between handset 26 and handset 26a, all using only line 16. In many applications, computer systems 20, 20a and subsystems 22, 22a cannot be easily modified. With the D+V modem, such systems do not need to be modified, because the interface over cable 28 is transparent to voice traffic. This is possible since most modern communications subsystems are configured for handshaking with a modem which allows a modem to slow down the passage of data from the communications subsystem to the modem when the modem has difficulty keeping up. The effect of voice transmission on data transmission at cable 28 is only to create an apparent slowdown in the D+V modem's data transmission rate, and only when voice data is being transferred. Of course, in some embodiments, D+V modem 24 accepts configuration commands over cable 28 which are not found in a standard data communications interface.

As shown in FIG. 1, D+V modem 24 also accepts other data sources, which carry either non-real-time data 32 or real-time data 34. Each of these sources of data is multiplexed onto line 16 as explained below in connection with FIG. 3.

Figure 2:
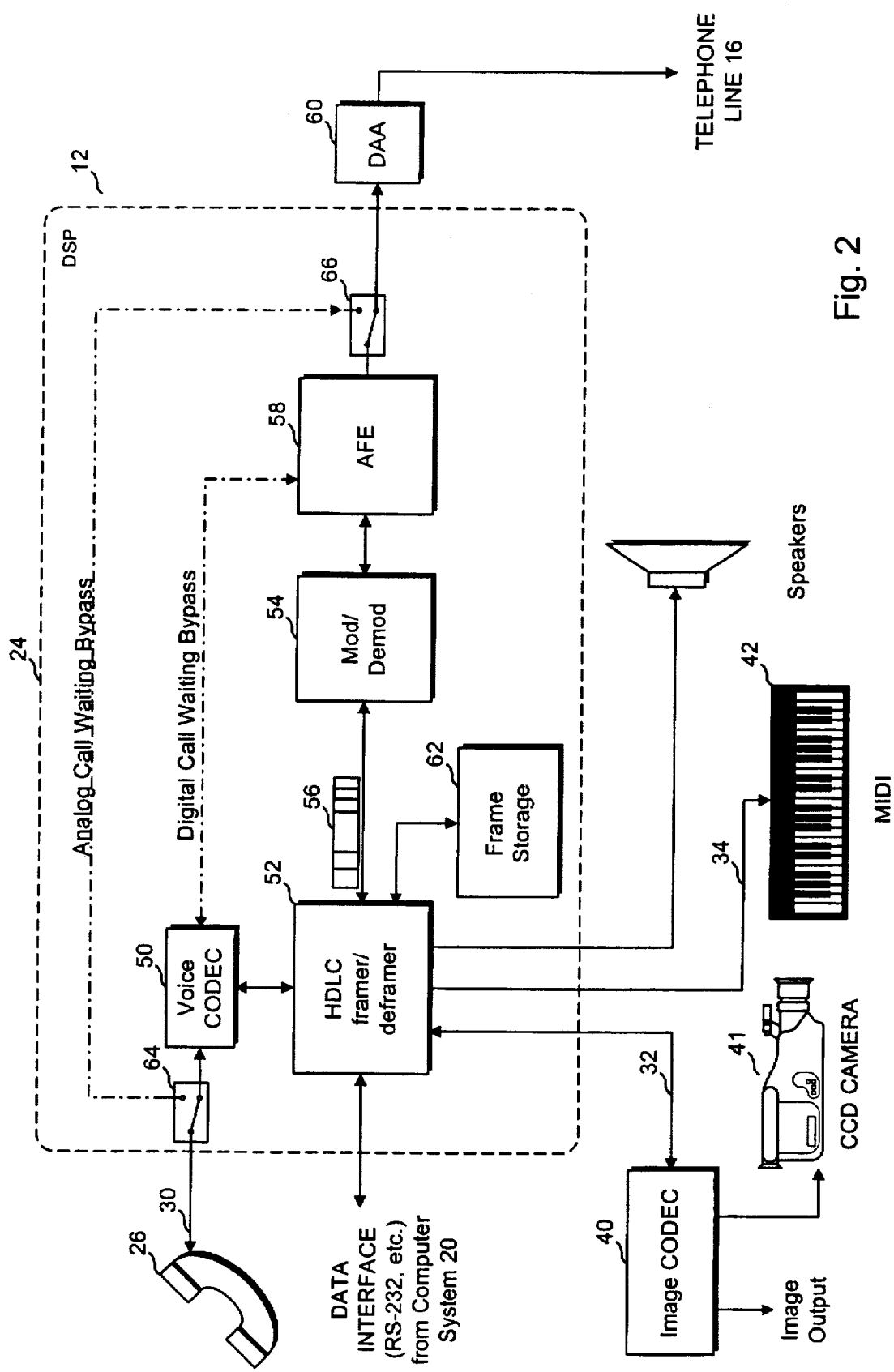
FIG. 2 is a more detailed block diagram of one station in the communication system of FIG. 1.

FIG. 2 is a more detailed block diagram of one site, 12, of communication system 10. Site 12 is shown with D+V modem 24 in greater detail, an image CODEC (analog coder/decoder) 40 and a CCD camera 41 as a typical source and destination of non-real-time data, and a MIDI instrument 42 as a typical source and destination of real-time data. D+V modem 24 is shown including a voice CODEC 50 which codes/decodes voice signals including compression/ decompression, an HDLC (High-Level Data Link Control) framer/deframer 52 (HDLC controller, for short), which communicates with a modem module 54 using HDLC frames such as frame 56, and an analog front end (AFE) 58, which is coupled to modem module 54. An output of AFE 58 is coupled to a data access arrangement (DAA) 60, which is in turn coupled to line 16. Frame storage 62 is also provided for buffering frames where data is framed faster than the capacity of telephone line 16.

Except where noted otherwise, HDLC controller 52 operates per the HDLC protocol as defined in the ISO document numbered ISO-3309, "Data Communication—High-Level Data Link Control Procedure—Frame Structure".

Voice CODEC 50 is coupled to handset 26 via twisted pair 30, and is also coupled to HDLC controller 52 to provide digitized compressed voice data to HDLC controller 52. A data port of HDLC controller 52 is coupled to subsystem 22 (see FIG. 2) to receive data from computer system 20. This coupling, in one embodiment, is a standard RS-232 connection, while in another embodiment, it is a parallel data bus. HDLC controller 52 is also shown coupled to image CODEC 40 and MIDI instrument 42 using those devices' standard interfaces. In a video game application, voice might be obtained from a headset/microphone or a speakerphone.

HDLC controller 52 frames each of the data streams input thereto into frames, while multiplexing the frames at its output to modem module 54. HDLC controller 52 also de-packetizes received frames and directs them to the proper outputs. Because frames are only sent when data is presented to HDLC controller 52, the channel bandwidth provided by line 16 is used efficiently.

When a call waiting signal is received at a local site 12, for example, D+V modem 24 switches to an analog or digital voice-only mode. Typically, a call waiting signal is seen as a disturbance on the line. When D+V modem 24 detects the disturbance, it switches to a voice-only mode. D+V modem 24a at the remote site should also detect the disturbance and go into voice-only mode. At that point, the players can communicate by voice and the local player can proceed in a conventional manner to handle the waiting call, i.e., inform the remote player that the local player will be taking the call, "flash" the hook to switch to the waiting call, and then return to the first call when finished with the waiting call.

While the call waiting is being handled in voice-only mode, the modem modules 54 at the local and remote sites are not transmitting. To allow each player to control their D+V modem, a pop-up program is provided at computer system 20 and computer system 20a. Where the computer systems 20, 20a are DOS-based personal computers, the pop-up program is a terminate-and-stay resident (TSR) program. The TSR gives a player the option to pause the game or hang up the line and gives the local player the option to flash the hook to take the waiting call. If both players choose to pause the game, they can pick up the game where it left off.

Once the local player is finished with the waiting call, he or she can signal, via the TSR, that the waiting call should be dropped and D+V modem 24 should flash the hook to return to the original call. Then both players signal, via the TSR, that the two D+V modems should go into D+V mode and resync the modems. Since the TSR pauses the game, the game can continue where it left off. The TSR can also include the capability to pause a game, have the phone line dropped entirely, and then pick up where it left off by redialing to re-establish the connection, resync the modems and then unpause the game.

The analog call waiting bypass and digital call waiting bypass are illustrated in FIG. 2. Each call waiting bypass is a voice-only mode, since modem module 54 is bypassed. In the case of a digital bypass, AFE 58 reroutes all incoming data directly to voice CODEC 50 and the data is interpreted as voice data. In the case of an analog bypass, relays 64 and 66 switch the telephone line 16 directly to twisted pair 30. In either case, the voice communications have the use of the entire bandwidth of the telephone line.

If the local player chose to permanently switch to the waiting call, the local D+V modem drops the current (original) call and switches to the waiting call as described above. Once the call is over, the local modem hangs up the line altogether. This latter option is typically not needed for point-to-point connections, but is used in cases where the remote modem is part of a modem pool and the remote modem or computer system is programmed to drop a line after a set period of inactivity. In some embodiments, the TSR or pop-up will stay active (on-screen) for the duration of the waiting call and then give the user an opportunity to re-establish the connection to the remote D+V modem before handing control back to the communicating process. This is very useful if the user wants to restart a game with the same state as when the game was interrupted by the call waiting signal.

FIG. 3 is a chart showing several sources of data which are transferrable over a telephone line. For each of the data types, an exemplary application is shown, although other applications are possible. As indicated, all the various data types use the HDLC protocol at the link network layer (of the standardized seven layer network model).

As FIG. 3 illustrates, different error correcting schemes are used for real-time data and non-real-time data. Real-time data may be error-corrected using forward error correction (FEC), while non-real-time data may be corrected using the V.42 standard's protocols, wherein a block received in error results in the receiving modem requesting re-transmission. Although voice may use FEC, some voice frames might have too many errors and thus be unrecoverable. If the error is not recoverable, then the receiving modem replaces the signal which would have resulted from the frame with silence or the previous voice frame to avoid crackling and pops due to noise. The V.42 standard is defined in CCITT Recommendation V.42, "Error Correcting Procedures for DCEs Using Asynchronous to Synchronous Conversion".

FIG. 4 is a schematic diagram of an HDLC frame, as used with the present invention. An HDLC frame comprises the fields shown in Table 1. The addresses that may be assigned in a typical implementation for several data stream types are shown in Table 2, below. As should be apparent, other assignments of values for data stream addresses are possible so long as the sender and the receiver of a data stream agree on the meaning of the addresses.

TABLE 1

Fields of an HDLC frame.

| Field | Contents |
| --- | --- |
| Start Flag | 01111110 |
| Address | Identifies the data stream type (see Table 2). |
| Control | The V.42 specification specifies the use of this field for data. For voice, this field is optional. |
| Data | A portion of the data stream which has been framed |
| FCS | Frame Check Sum (calculated per the HDLC standard) |
| End Flag | 01111110 (Could be combined with Start Flag of next frame) |

TABLE 2

| Data Stream Type | Address |
| --- | --- |
| Voice | 32 |
| Video | 31 |
| Sound | 35 |
| Image | 33 |
| Data Blocks | 37 |
| Control | 34 |

TABLE 2-continued

| Data Stream Type | Address |
| --- | --- |
| Graphics | 38 |
| Text | 36 |

The Control field contains one or two bytes, per the V.42 specification. The FCS field is calculated by performing a check sum on the address, control and data fields.

Since each HDLC frame contains an address indicating its data stream type, and each frame contains only data from one type of data stream, HDLC controller 52 can easily separate received frames for each data stream multiplexed onto line 16. And since frames for the various data types can be freely intermixed, the full bandwidth of the channel is dynamically allocated to the various data streams.

If data from all data streams is presented to HDLC controller 52 faster than the channel can carry the data, some of the data is framed and buffered into frame storage 62. Alternately, where provided, HDLC controller 52 will send control signals back to the source of a non-real-time data stream to indicate that modem 24 is temporarily busy (e.g., sending an XOFF byte or a CTS off signal back to subsystem 22 over an RS-232 line which uses software handshaking to hold up data at the sending end). When real-time data arrives fast enough to occupy the entire channel, the non-real-time data streams are held up or buffered, so that the real-time data arrives at the remote site in real time.

The D+V modem at the remote site can be configured to ignore any unrecoverable packets which contain voice data and replace the voice data with voice data which would translate to silence or average the erred gap. This way, a listener is not subjected to noises and pops which might occur if errors in the voice frames were present in the voice signal presented to the listener.

Remote video game data is real-time data which presents particular problems, as remote video game data is extremely time-sensitive and once presented to a local modem such as modem 24 shown in FIG. 1, it must be quickly transported to the remote modem 240 and to the remote game system 20a. Fortunately, the bandwidth required for this data is relatively low. Game communication generally falls into one of two types: 1) input update and 2) state update. In an input update system, a remote machine sends a local machine data indicating the inputs (keyboard, joystick, mouse, etc.) the remote machine received and both the remote and local game machines calculate what the effect of those inputs is, be it character movement, scoring, option selection, or the like. In a state update system, the remote machine acts on the inputs to change the state of the game and the remote machine communicates the new state of the game. The advantage to an input update system is that very little data need be communicated in a given time period, but the advantage of state update systems is that each computer need only perform the input calculation for its local inputs. Typically, input update is used for fast action games and state update is used for real time games such as chess.

FIG. 5 is a schematic diagram of a modified HDLC frame used to transmit video game control data or other low delay data. The video game control data packets are of a pre-agreed size, such as N bytes, where each modem agrees on the value of N, so that no bandwidth need be used to signal the end of a video game control data packet. If regular HDLC frames were used, either the remote video game data would need to be accumulated into a frame, which causes an unacceptable delay, or each N-byte packet would be transmitted as a separate packet, which would also cause a delay, since the transmission of the data must wait at least until any packet transmission in progress when the video game data is presented to the modem has completed. The use of an entire frame for each N-byte packet is also very wasteful of bandwidth for low values of N, such as N=4 or N=5, since the other fields of the frame might be larger than the data field.

As shown in FIG. 5, the modified HDLC frame contains the same fields as an HDLC frame, except that the Address, Control, and FCS fields are optionally removed. The N-byte packet is simply placed between voice packets with an escape code. The escape code is known as an "Abort Flag", and is inserted in between the voice packet being transmitted by the local modem when the video game data is received by the local modem. That way, the remote video game data need not be delayed until the end of the frame. The Address and Control fields are not needed in this application, since all frames are addresses as voice packets. The FCS flag is eliminated, because otherwise the insertion of the N-byte data packet would cause a check sum error. The elimination of these various fields leads to more efficient use of bandwidth.

The insertion of the N-byte packet is detectable at the remote modem, since the Abort Flag is not a bit sequence which would occur within a voice packet. In one embodiment, the Abort Flag is the bit sequence "1111111." The end of the frame is still detectable because the End Flag is also a bit sequence which would not occur in a voice packet. If the value of N is fixed ahead of time, then the bytes in the N-byte packet can take on any possible bit sequence without ambiguity.

Where regularly spaced, fixed length packet transmissions are not suitable or appropriate for a pre-configured game, the PlayLink™ framing protocol can be used. An example of a PlayLink™ frame is shown in FIG. 6. In this protocol, the remote D+V modem and the local D+V modem perform a handshake after which it is agreed that all packets will be voice packets and that voice data and game data will not contain the bit sequences associated with the Abort Flag. Voice data is then sent delimited by frame flags and game data is sent by interrupting a voice frame, inserting an Abort Flag in the transmitting data stream, followed by game data and a second Abort Flag. If any voice data remains for the current frame, it is transmitted followed by the next frame flag. With this protocol, data delay can be as low as 17 msec.

In a first mode of operation described above with reference to FIG. 4, voice packets have priority and are sent if present and data is sent if no voice is present. The maximum size of a packet is 20-30 bytes and the modem checks for pending voice data between each packet.

In a second mode of operation, voice packets are sent until data is pending. Typically, the modem sends voice until at least 1 to 10 bytes of data are pending. Once data is ready to be sent, the data is inserted in the voice packet being sent at the time. In one variation, the data is sent in fixed length sub-packets preceded by an abort flag.

FIG. 7 is a state diagram of a third mode of operation for sending voice and game data over a single telephone line. One problem with using a single line is that both voice and game data have a high priority. Voice data has a high priority so that the voice data is not received with annoying gaps at the other end. Game data is high priority so that even fast action games can be played with the local and remote machine being substantially in sync. This state diagram describes the states of a state machine implemented in a D+V modem such as D+V modem 24.

In the first state (S1), the D+V modem is waiting for game data. If game data is sent to the D+V modem before a waiting period is over, the state machine transitions to state S2 and a game data packet is sent. If not, the state machine transitions to state S3, where the D+V modem checks for the presence of voice data. If no voice data is present, the state machine returns to state S1, but if voice data is present, the state machine transitions to state S4. Once a game packet has been sent at state S2, the state machine also transitions to state S4.

In state S4, the D+V modem pauses the game data source so no game data is lost. If the game data source is a game which expects to send data via a UART (universal asynchronous receiver-transmitter) port, which the D+V modem implements or emulates, then to pause the source the D+V modem simple sends a signal to indicate that the UART is busy sending a signal. This is especially useful for games which were not written to take into account the possibility of having a voice and data modem. The state machine then transitions to state S5, where the D+V modem sends voice packets over the line until silence is encountered.

While in state S5, if game data is received, the state machine transitions to state S6, where the game data is inserted into a voice packet using the escape sequence (abort flag) as shown in FIG. 6 and the state machine returns to state S5. If silence is encountered, the state machine returns to state S1. The game data is typically sent sixty times per second, to match the screen refresh rate. If four bytes of game data were send each time, the channel width between the two machines would be 1920 bits/second (4 bytes/period×60 periods/second×8 bits/byte).

Figure 8:
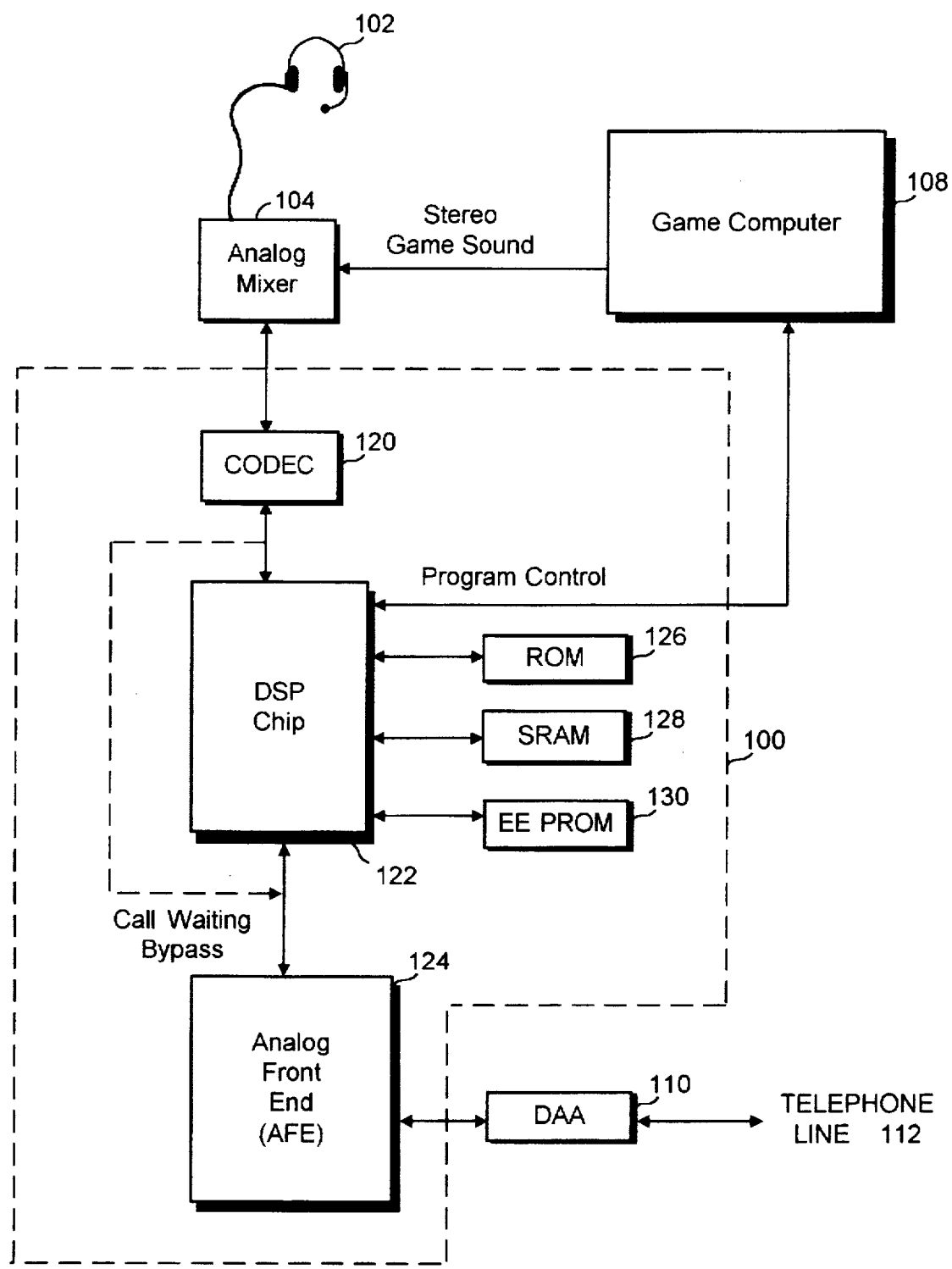
FIG. 8 is a block diagram of a specific embodiment of the present invention.

FIG. 8 is a block diagram of one specific embodiment of a modem card 100 according to the present invention. Modem card 100 is shown combined with a headset 102, an analog mixer 104, a game computer 108, a DAA 110, which is in turn coupled to a telephone line 112. If game computer 108 is a general-purpose personal computer, modem card 100 could be a card designed to be inserted into the personal computer's add-on card slots.

Headset 102 provides a game player with the game's sound as well as the remote player's voice and headset 102 also receives the local player's voice for transmission to the remote player's D+V modem. Analog mixer 104 combines the voice from modem card 100 and the game sound from game computer 108. Analog mixer 104 might be included on modem card 100 or might be included as part of a sound card used with game computer 108.

Modem card 100 is shown comprising a coder-decoder (CODEC) 120 for converting digital compressed voice data into an analog voice signal, a digital signal processing (DSP) chip 122 which acts at the processor to control modem card 100 and perform the necessary computations, an AFE 124 to translate the digital signals coming from DSP chip 122 to analog signals suitable for transmission over telephone line 112 and to digitize incoming analog signals to digital signals which are provided to DSP chip 122. DSP chip 122 has interfaces to CODEC 120 and game computer 108, as well as to a ROM (readonly memory) 126, an SRAM (static random access memory) 128 and an EEPROM (electrically-erasable programmable ROM) 130. ROM 126 and EEPROM 130 together contain the instructions which tell DSP chip 122 how to combine the voice signal from CODEC 120 and the game data from game computer 108 and send it out as well as telling DSP chip 122 how to separate incoming game data from voice packets and convert the voice packets into a voice signal. The bulk of the program is found in EEPROM 130, which in one particular implementation is a 128K by 8 EEPROM. This allows the program used by DSP chip 122 to be updated over telephone line 112 by downloading new versions of the DSP software. ROM 126 need only contain the routines for handling the downloading process. SRAM 128, in the particular implementation, comprises three 3K by 8 RAM chips.

Variations of modem card 100 are possible to take advantage of the environment of modem card 100. For example, where most of the functions of modem card are implemented on an application-specific integrated circuit (ASIC), analog mixer 104 and CODEC 120 might be combined into a mixer/CODEC on a chip. Another environmental advantage is where the modem card 100 will be used with a personal computer of a known design and capacity. In such cases, ROM 126 and SRAM 128 need not actually be present on modem card 100. Instead, their functionality can be handled by the personal computer.

A detailed description of this particular implementation is set forth in the accompanying Appendix.

The operation of modem card 100 typically begins with a game player (referred to here as the "local" player) powering up the local game computer 108, putting on headset 102 and dialing the telephone number of the remote player. Dialing can be provided by either game computer 108 or an interface to DSP chip 122. The remote player will usually respond by answering the telephone manually. At this point, no game data is being transferred and modem card 100 is operating essentially as a conventional telephone, using headset 102 in place of the conventional handset.

If the remote player is agreeable, the remote player powers up the remote game computer and remote headset. Each player then initiates a handshake process in which both the local modem card and the remote modem card confirm that they both have the D+V capability. If the handshake is successful, the modem cards indicate to their respective game computers that transmission of game data is possible.

Game computer 108 could be configured to handle call-waiting. One way to implement this is to have a special purpose program running in the background with which modem card 100 can communicate. When one player (using the local players as an example) gets call a call waiting signal, the local DSP chip detects the signal and sends a message to the special purpose signaling program, which interrupts the game with a message to the screen that a call is waiting. The signaling program gives the local player the option of what to do about the waiting call. If the local player chooses to ignore the waiting call, the local DSP chip does nothing and the signaling program returns to the background. If the local player chooses to take the waiting call, the local player will inform the remote player that the remote player should indicate to the remote computer 20a that the game should be temporarily paused. Once the waiting call is complete, the local player tells to the remote player that game play should resume, and each player signals their respective TSR or pop-up that the data link should resume.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The attached Appendix A is a Design Reference Document entitled "Phylon PHY2000 PC Adapter Card Reference Design" which describes a specific embodiment of a modem programmed to perform dynamic voice and data (or other non-real-time and real-time data streams) multiplexing over telephone lines sold as a PC-compatible add-in card.

Appendix B is "Phylon PlayLink Talk 'n' Play Interactive Games."

Appendix C is a Technical Data Manual for the PHY1412 Safari Chip-Set for Remote Gaming.

Appendix D is a Hardware & Software Installation Manual for PHY2000 PC.

Appendix E is a "Phylon PHY2000 MessageLink Software User's Manual."

Appendix F is a "Phylon PHY2000 PC PhyLink Software User's Manual."

APPENDIX A

18
PHYLØN
PHY2000
PC Adapter Card
Reference Design

19

PHY2000
PC Adapter Card Reference Design

Phylon's PHY2000 PC Adapter Card is a high performance simultaneous voice and data, and high speed fax and data internal modem. The adapter card utilizes Phylon's PHY2000 communications chip-set which consists of two CMOS VLSI chips: the high performance PHY118 DSP and the PHY212 analog front-end (AFE). This solution provides very high level integration and leads to a cost-effective, reliable and highly manufacturable product.

The PHY2000 features a true SoftCom™ architecture optimized for the PC environment. Communications DSP code is booted from system disk to the PHY2000 for execution upon system power-up. Modem configuration, function, and operation can be changed dynamically. This permits the PHY2000 to instantly respond to any application program's performance demands. Easy installation and setup is insured because the COM port and IRQ are automatically selected; the selections can also be modified in software.

The PHY2000 supports BizLink, digital simultaneous voice and data (DSVD) operation on a single telephone line for collaborative computing applications. DSVD operation is enhanced with adaptive channel bandwidth allocation which optimizes voice and data rates and permits full modem speed for data during voice silences.

The PHY2000 also supports PlayLink™, an implementation of DSVD optimized to realize maximum real-time performance in interactive remote gaming applications. When executed, PLAYLINK.EXE's user-friendly graphical user interface (GUI) operation also greatly reduces and simplifies modem setup, dial-up and connection, and game initialization procedures.

This book dicusses and illustrates a complete PC adapter card modem reference design based on the PHY2000 chip-set The design is offered as an example for on which to base subsequent proprietary designs, or to utilize it as is after completion of appropriate agreements and acknowledgments.

| FEATURES | |
|---|---|
| PlayLink Talk 'N' Play Interactive Games | Modem Features / Capabilities |
| • Compatibility with all existing modem games<br>• Simultaneous voice and real-time game data<br>• Game synchronization<br>• Very low data delay (17 ms)<br>• Supports Call Waiting during game play<br>• Friendly DOS and Windows-based GUIs | • DSVD for collaborative computing (to be software upgraded to V.62 upon approval of standards)<br>• ITU-T V.34, V.32bis, V.32, V.23, V.22bis, V.22, V.21, Bell 212 and 103 at data rates of 28800, 26400, 24000, 21600, 19200, 16800, 14400, 12000, 9600, 7200, 4800, 2400, 1200 and 300 bit/s |
| BizLink Collaborative Computing | • V.42/V.42bis drivers<br>• Software upgradeable |
| • Compatible with whiteboard shared Windows Applications<br>• Call Waiting support<br>• Friendly Windows-based GUI | • Group 3 FAX: V.17, V.29, V.27ter and V.21 Channel 2 with V.21 carrier detection concurrent with high-speed image data reception |
| Telephony | • Modem AT Commands<br>• Fax Class 1 AT Commands |
| • Full-duplex speakerphone, Dialer GUIs<br>• Answering machine recording and playback with concurrent DTMF detection<br>• Fax/Voice Mail switching | • Interface:<br>  - Parallel UART with 1K byte internal buffers at 1 Mbit/s transfer rate and 3 seconds of buffering under Windows™ |

 PHYLØN        PHY200    C Adapter Card

Introduction

Included herein are descriptions of the PHY2000 PC Adapter Card hardware features — schematics, pcb layout, bill of materials, and supporting software features including a list of supported AT commands. You may, with completion of appropriate agreements and acknowledgments:

(1) use the Phylon design as a model/example on which to base your own proprietary modem design.

(2) modify the Phylon design to meet your own unique requirements, or (3) after appropriate qualification utilize the Phylon design as is.

Phylon can provide the associated schematic and library files on diskette in OrCAD Release IV (16-bit) or OrCAD SDT.386, version 1.21 (32-bit) formats. They may also be downloaded in compressed format (PHY2000.ZIP) from the Phylon BBS; that phone number is (510) 656-0916. They may also be obtained from Phylon's Internet website (http://www.phylon.com/).

PCB layout files (gerber files, netlist, etc.) as well as supporting software will be provided under license or appropriate agreements.

 PHY2( PC Adapter Card
21
Hardware Design
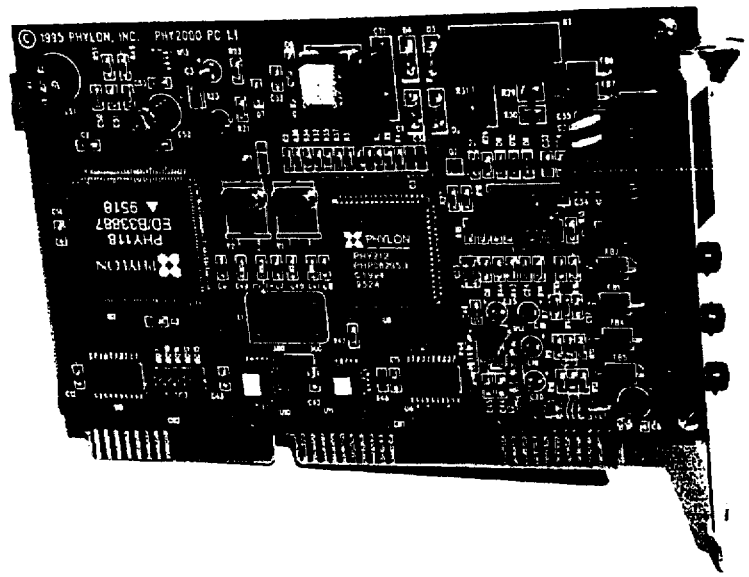

 PHYLØN PHY2000 C Adapter Card
Block Diagram and Interface Signals
A functional diagram and the related interface signals are shown in Figure 1. Signal description and characteristics are summarized in adjacent tables.
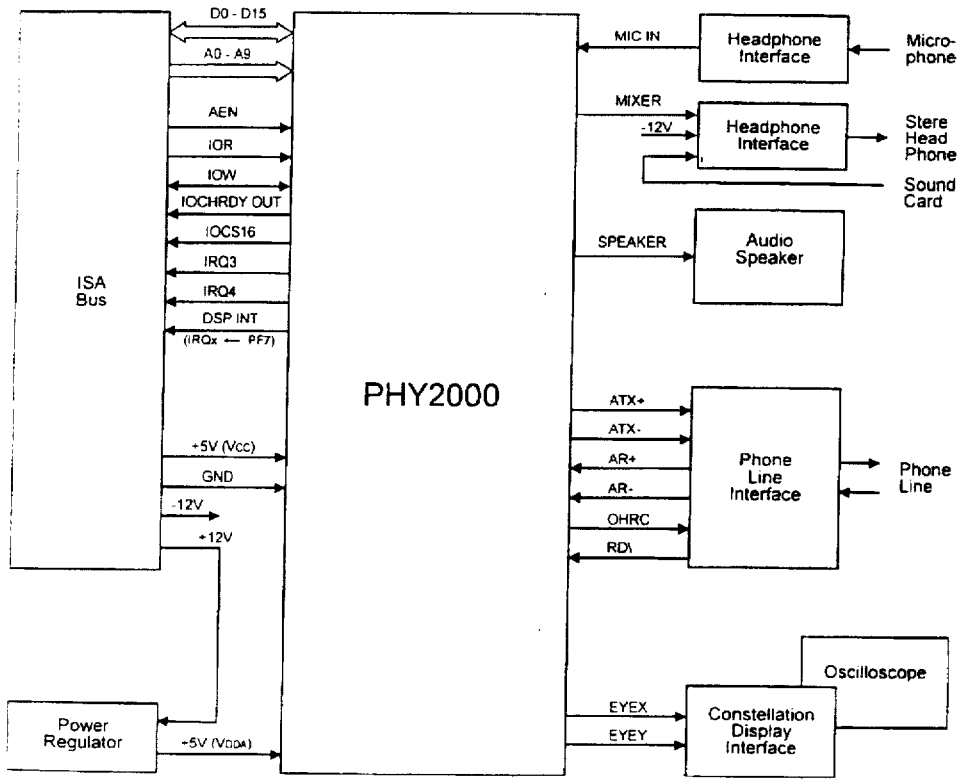
Figure 1. PHY2000 PC Adapter Card Functional Block Diagram and Interface Signals

 PHYLØN  PHY2000 PC Adapter Card

PHY2000 Interface Signals

| NAME | TYPE | DESCRIPTION | NAME | TYPE | DESCRIPTION |
|---|---|---|---|---|---|
| D15-D0 | Bidir. | 16-bit Data Bus | AGND | Ground | Analog Ground |
|  |  |  | GND | Ground | Digital Ground |
| A9-A0 | Output | 10-bit ISA Address Bus | +5V | Power | +5V Supply |
|  |  |  | -12V | Power | -12V Supply to Mixer Circuit |
| AEN | Input | Address Enable | +12V | Power | +12V Supply to Mixer Circuit |
|  |  |  | MIC IN | Input | Microphone Input |
| IOR\ | Input | Read Enable | MIXER | Output | Voice Output to Mixer |
| IOW\ | Input | Write Enable |  |  |  |
| IOCS16\ | Output | 16-bit I/O Chip Select | SPEAKER | Output | Audio Output |
| IOCHRDY | Output | I/O Channel Ready | ATX+,ATX- | Output | Transmitter Analog Output |
|  |  |  | AR+, AR- | Input | Receiver Analog Input |
| IRQ3 | Output | COM Port Interrupts | OHRC | Output | Off-Hook Relay Control |
| IRQ4 | Output |  | RD\ | Input | Ring Detect |
| IRQx | Output | DSP Interrupt to ISA Bus (PF7 → IRQx, x=7,10,11,12, or 15) | EYEX | Output | Constellation Output - X Axis |
|  |  |  | EYEY | Output | Constellation Output - Y Axis |

PHY2000 Recommended Operating Conditions

| Symbol | Parameter | Min | Max | Unit |
|---|---|---|---|---|
| $V_{DD}$ | Supply Voltage | 4.50 | 5.50 | V |
| $T_{AMB}$ | Ambient Operating Temperature | 0 | +70 | °C |

 PHY2000  Adapter Card
PHY2000 Reference Design PC Adapter Card Schematics
The PHY2000 pinout diagram is shown in Figure 2. Reference design PC adapter card schematics are shown in Figures 3 through 7. A recommended Bill of Materials follows the associated schematics.
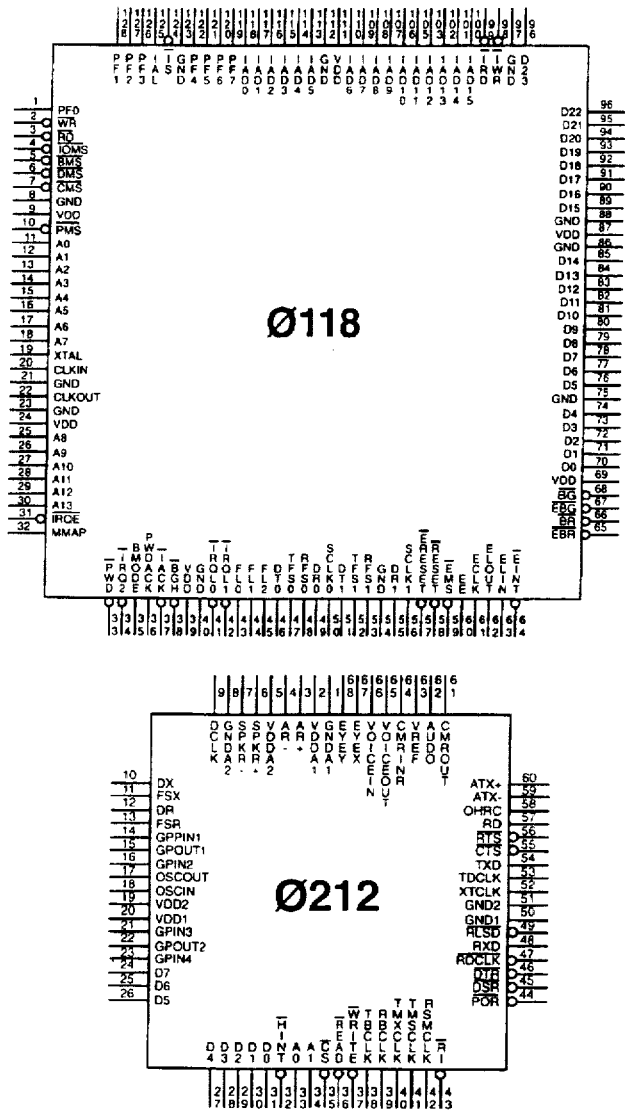
Figure 2. PHY2000 Pinout Diagrams

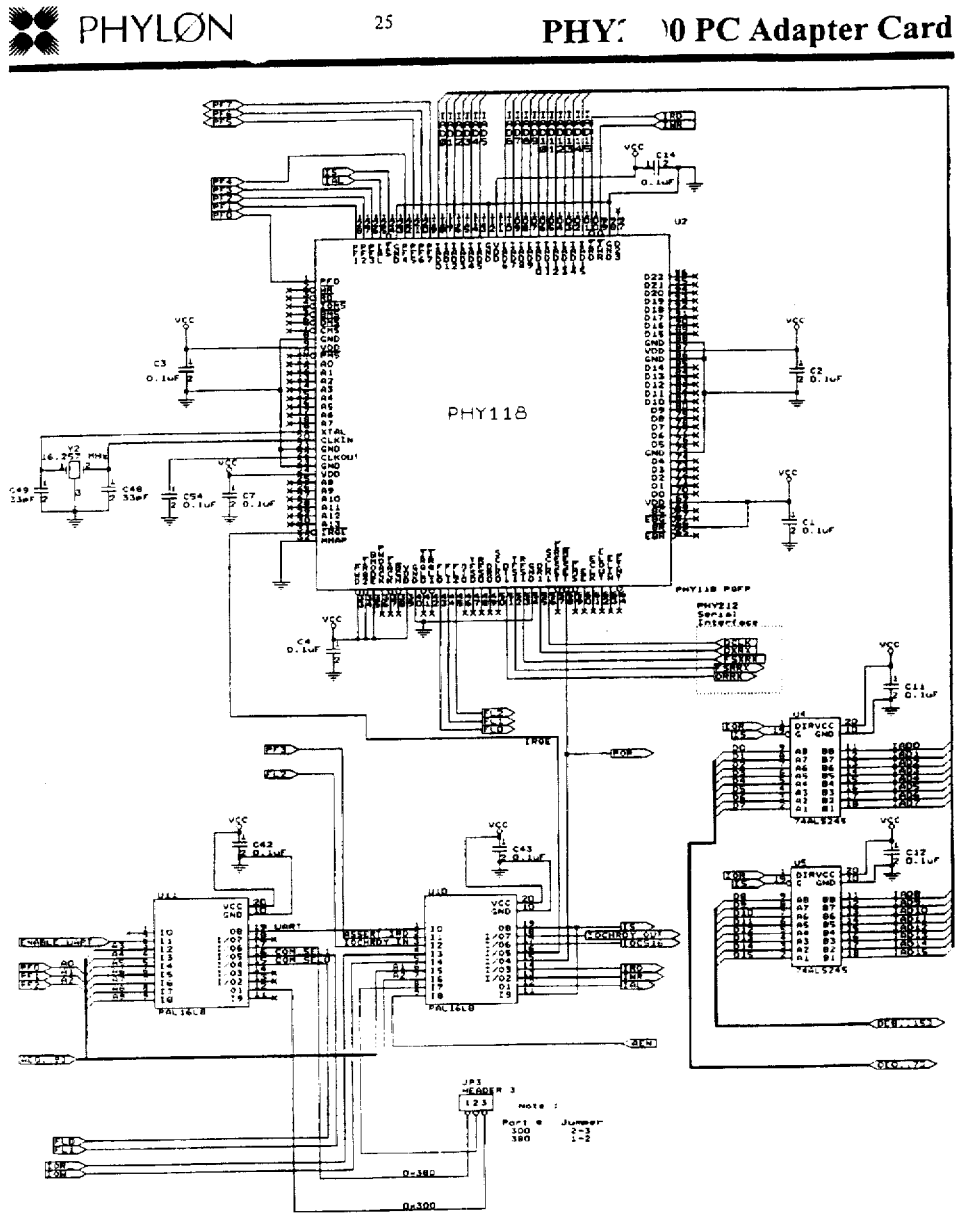
Figure 3. PHY118 DSP Interface

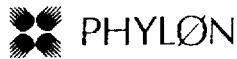 PHY200/ C Adapter Card
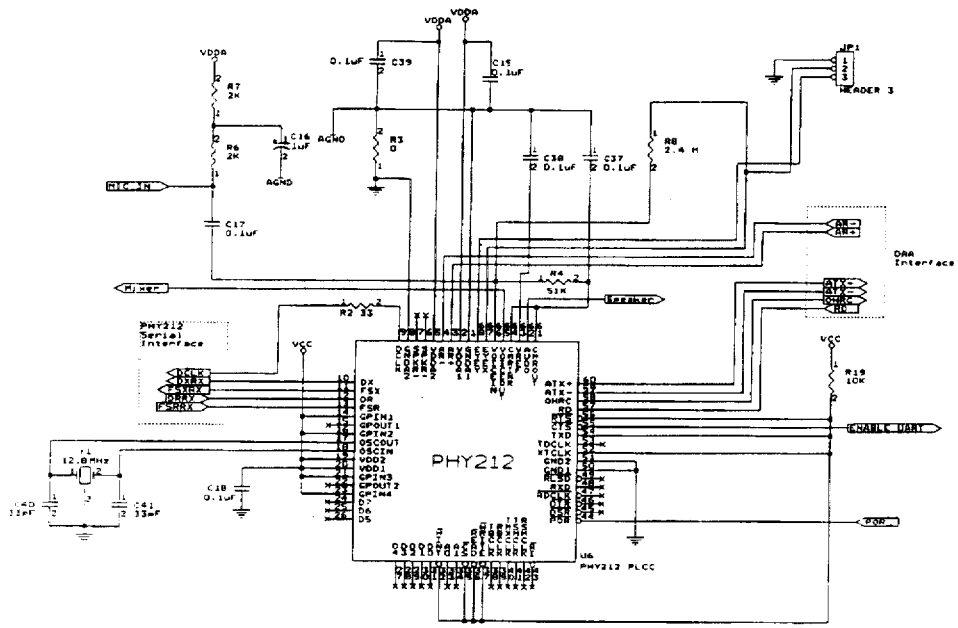
Figure 4. PHY212 AFE Interface

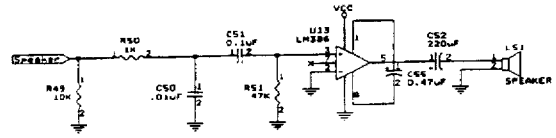
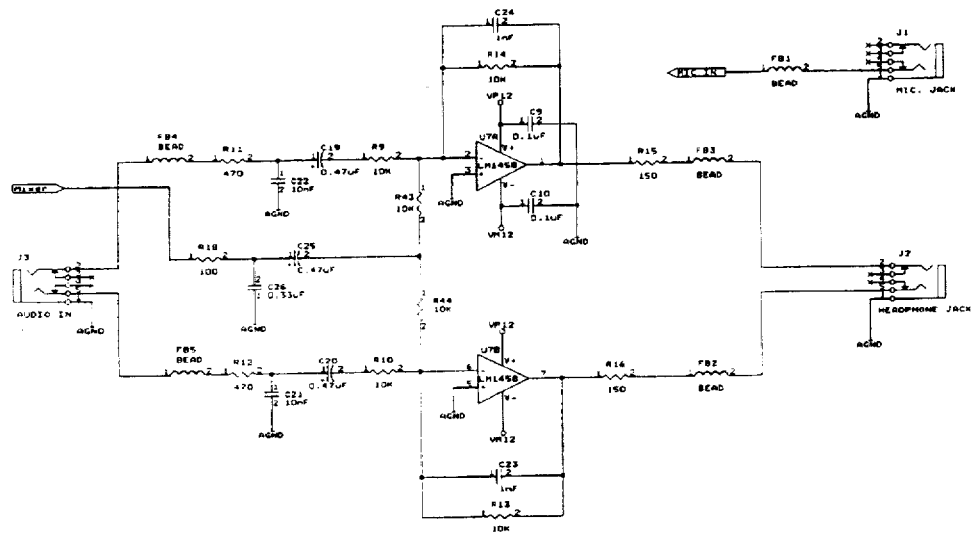
Figure 5. Audio/Headphone/Mixer, Microphone Interfaces

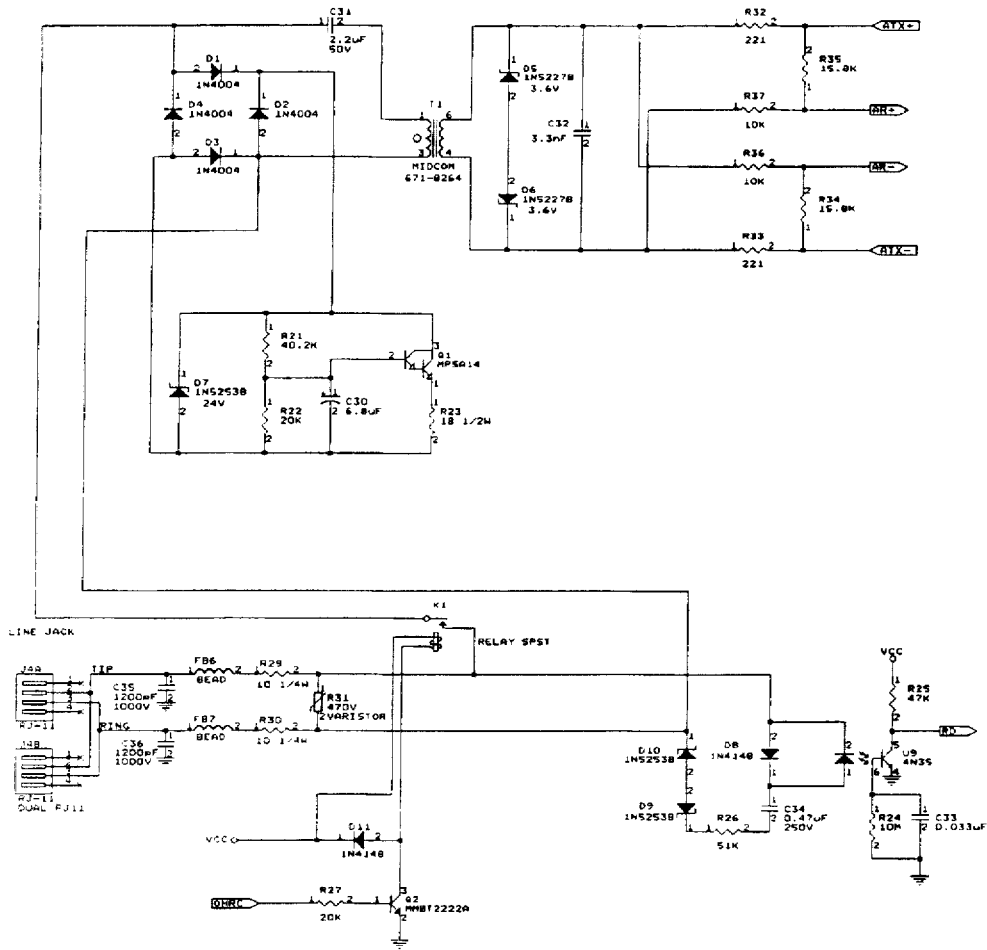
Figure 6. DAA / Phone Line Interfaces

 PHY2( ) PC Adapter Card
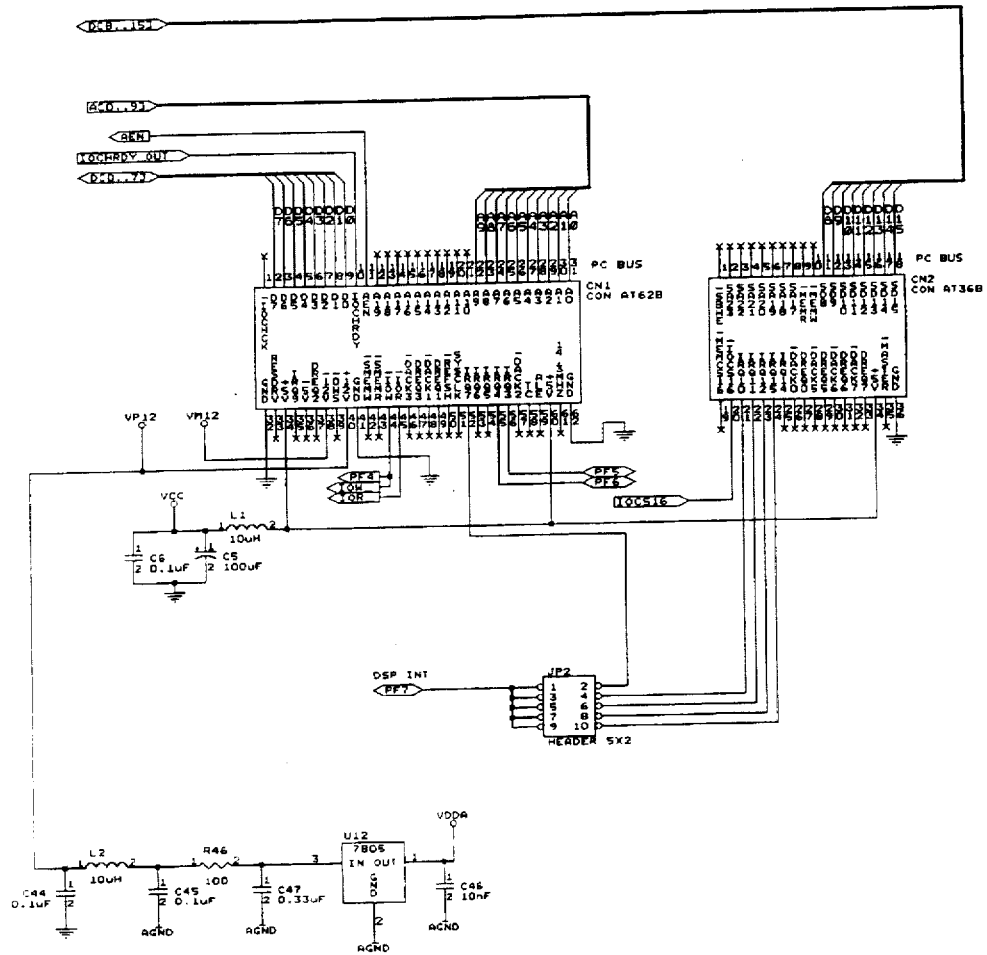
Figure 7. ISA Bus / Power Interface

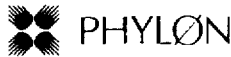 PHY2000 C Adapter Card

PAL Equations

```
Name        U10;
Partno      P16L8;
Date        04/19/95;
Revision    3.27B;
Company     PHYLON COMMUNICATIONS, INC;
Assembly    PHY2000PC;
Location    U10;

/*****************************************************************/
/*  Allowable Target Device Types:PAL16L8           */
/*****************************************************************/
/** Inputs **/
Pin    1   =   _UART;
Pin    2   =   ASSERT_IRD;
Pin    3   =   IOCHRDY_IN;
Pin    4   =   IOR;
Pin    5   =   IOW;
Pin    6   =   A1;
pin    7   =   A2;
Pin    8   =   BASE;
Pin    9   =   AEN;
pin   11   =   IS_IN;

/** Outputs **/
Pin   12   =   IAL;
pin   13   =   IWR;
pin   14   =   IRD;
pin   15   =   _RESET;
pin   16   =   IRQE;
Pin   17   =   IOCS16;
Pin   18   =   IOCHRDY_OUT;
pin   19   =   IS;

/** Declarations and Intermediate Variable Definitions **/
/** BASE=0X0300        **/
/** 5432109876543210   **/
/** 0000001100000000   **/

UART    =   !_UART & !AEN;
IDMA    =   BASE & !AEN & !A2.
BASE0   =   BASE & !AEN;

IS      =   !( (BASE0 # UART) & (!IOW # (!IOR) ) );

IRD     =   !( ((IDMA & !A1) # (UART & ASSERT_IRD)) & !IOR);
IWR     =   !( ((IDMA & !A1) # UART) & !IOW);
IAL     =   (IDMA & A1 & !IOW);
```

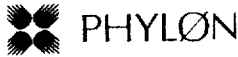 PHY2 ) PC Adapter Card

```
/*      NOTES on IOCS16 and IOCHRDY:       */
/*      Do not provide 16bitI/O for 304    */
/*      SLOW DOWN the bus if it is UART I/O */

ENABLE_IOCHRDY = UART & !IS_IN;

IOCS16 = 'b'0';
IOCS16.OE = IDMA;

IOCHRDY_OUT = IOCHRDY_IN;
IOCHRDY_OUT.OE = ENABLE_IOCHRDY;

_RESET = !((BASE & !AEN) & A2 & !A1 & !IOW);

IRQE = !(UART & (!IOW # !IOR) );

/*===================================================================*/
/*                        Chip Diagram                               */
/*===================================================================*/
/*                         PAL16L8                                   */
/*                                                                   */
/*                   _____                                  */
/*                  |     U10      |                                 */
/*          _UART x---|1          20|---x VCC                        */
/*     ASSERT_IRD x---|2          19|---x IS                         */
/*      IOCHRDY_IN x---|3          18|---x IOCHRDY_OUT               */
/*             IOR x---|4          17|---x IOCS16                    */
/*             IOW x---|5          16|---x IRQE                      */
/*              A1 x---|6          15|---x _RESET                    */
/*              A2 x---|7          14|---x IRD                       */
/*            BASE x---|8          13|---x IWR                       */
/*             AEN x---|9          12|---x IAL                       */
/*             GND x---|10         11|---x IS_IN                     */
/*                  |_____|                                 */
/*                                                                   */
/*===================================================================*/
```

 PHY2000  Adapter Card
```
Name        U11;
Partno      P16L8;
Date        04/28/95;
Revision    3.26A;
Company     PHYLON COMMUNICATIONS, INC;
Assembly    PHY2000PC;
Location    U11;
/*****************************************************************/
/*   Allowable Target Device Types:PAL16L8                       */
/*****************************************************************/
/**  Inputs  **/
pin      2   =   ENABLE_UART;
pin      3   =   A3;
pin      4   =   A4;
pin      5   =   A5;
pin      6   =   A6;
pin      7   =   A7;
pin      8   =   A8;
pin      9   =   A9;
pin     15   =   COM_SEL0;
pin     16   =   COM_SEL1;
/**  Outputs  **/
pin     12   =   BASE0;
pin     17   =   BASE8;
pin     19   =   _UART;
```

 PHY2 ) PC Adapter Card

```
/** Declarations and Intermediate Variable Definitions    **/
/** BASE = 0X0300                                         **/
/** 5432109876543210                                      **/
/** 0000001100000000                                      **/

BASE0  =   A9 & A8 & !A7 & !A6 & !A5 & !A4 & !A3;
BASE8  =   A9 & A8 &  A7 & !A6 & !A5 & !A4 & !A3;

/*---A8(FL1)---------A4(FL0)-----------------------------*/
/*__COM_SEL1__COM_SEL0__COM_PORT__ADDRESS                */
/*       1           1         COM1       3F8           */
/*       0           1         COM2       2F8           */
/*       1           0         COM3       3E8           */
/*       0           0         COM4       2E8           */
/*------------------------------------------------------*/

CH_A8 = (A8 # !COM_SEL1) & (!A8 # COM_SEL1);
CH_A4 = (A4 # !COM_SEL0) & (!A4 # COM_SEL0);

/** Logic Equation **/

_UART = !(A9 & CH_A8 & A7 & A6 & A5 & CH_A4 & A3 & !ENABLE_UART)
```

```
/*================================================================*/
/*                        Chip Diagram                            */
/*================================================================*/
/*                         PAL16L8                                */
/*                                                                */
/*                     |-----------|                              */
/*                     |    U11    |                              */
/*              x---  |1         20|---x VCC                      */
/*    ENABLE_UART x---  |2         19|---x UART                    */
/*             A3 x---  |3         18|---x                         */
/*             A4 x---  |4         17|---x BASE8                   */
/*             A5 x---  |5         16|---x COM_SEL1                */
/*             A6 x---  |6         15|---x COM_SEL0                */
/*             A7 x---  |7         14|---x AFE_CLK                 */
/*             A8 x---  |8         13|---x                         */
/*             A9 x---  |9         12|---x BASE0                   */
/*            GND x---  |10        11|---x                         */
/*                     |_____|                              */
/*                                                                */
/*================================================================*/
```

 PHY2000　　Adapter Card

Bill of Materials

| ITEM | QTY. | DESCRIPTION | MFR., PART NO. | SCHEM. REF. |
|---|---|---|---|---|
| 1 | 23 | Cap., 0.1µF, 50V, 10%, 1206 | PAN, ECUV1H104JBW | C1,C2,C3,C4,C6, C7,C9,C10,C11,C12, C14,C15,C17,C18,C37, C38,C39,C42,C43,C44, C45,C51,C54 |
| 2 | 1 | Cap., 100µF elect., 16V, 20%, PTH | PAN, ECEA1CGE101 | C5 |
| 3 | 1 | Cap., 1µF, Tat., 16V, 10%, PTH | PAN, ECSF1CE105K | C16 |
| 4 | 4 | Cap., 10nF, 50V, 10%, 1206 | PAN, ECUV1H103KBM | C21,C22,C46,C50 |
| 5 | 2 | Cap., 1nF, 50V, 10%, 1206 | PAN, ECUV1H102KBM | C23,C24 |
| 6 | 4 | Cap., 0.47µF, 35V, 20%, PTH | PAN, ECSF1VE474 | C19,C20,C25,C55 |
| 7 | 2 | Cap., 0.33µF, 50V, 5%, 1206 | PAN, ECUV1H334JBW | C26,C47 |
| 8 | 1 | Cap., 6.8µF, 25V, 10%, PTH | PAN, ECSF1EE685K | C30 |
| 9 | 1 | Cap., 2.2µF, 50V, NP PTH, Metal, Poly | PAN, ECQE1225KF | C31 |
| 10 | 1 | Cap., 3.3nF, 50V, 10%, 1206 | PAN, ECUV1H332KBM | C32 |
| 11 | 1 | Cap., 0.033µF, 50V, 5%, 1206 | PAN, ECUV1H333JBW | C33 |
| 12 | 1 | Cap., 0.47µF, 250V PTH, Metal Poly | PAN, ECQE2474KF | C34 |
| 13 | 2 | Cap., 1200pF, 50V, 10%, Ceramic Disk | PAN, ECKD3A122KBN | C35,C36 |
| 14 | 4 | Cap., 33pF, 50V, 10%, 1206 | PAN, ECUV1H330JCM | C40,C41,C48,C49 |
| 15 | 1 | Cap., 220µF, 16V, 10%, Alum Elect. | PAN, ECEA1CGE221 | C52 |
| 16 | 4 | Diode, DL4004, DL-41 | Any, (SMT, melf) | D1,D2,D3,D4 |
| 17 | 2 | Diode, Zener, DL5227B, 3.6V, DL35 | Any, (SMT, melf) | D5,D6 |
| 18 | 3 | Diode, Zener, DL5253, 25V, DL-35 | Any, (SMT, melf) | D7,D9,D10 |
| 19 | 2 | Diode, DL4148, DL-35 | Any, (SMT, melf) | D8,D11 |
| 20 | 7 | Ferrite Bead, PTH | STE, 28F0195-100 | FB1,FB2,FB3,FB4, FB5,FB6,FB7 |
| 21 | 2 | Header, 1x3, 0.025" square | Any | JP1,JP3 |
| 22 | 1 | Header, 5x2, 0.025" square | Any | JP2 |
| 23 | 2 | Shunt Jumper | Any | |
| 24 | 3 | Audio, Microphone, Speaker Jack | Shiua Chyuan, SCJ-0349A-U | J1,J2,J3 |
| 25 | 2 | Dual Line Telephone Jack, RJ-11 | KYCON, GA-2-6-4-std. RDI, 0626-2PORT-6P/4C AT, MTJG2647H02 | J4A,J4B |
| 26 | 1 | Relay, SPST, PTH | ALEPH, SD1A05AWJ | K1 |
| 27 | 1 | Speaker | RDI, DMT-12 | LS1 |
| 28 | 2 | Inductor, 10µH, PTH | JWM, 9320-30 | L1,L2 |
| 29 | 1 | Transistor, MPSA14, TO-92 | MOT, MPSA14 | Q1 |
| 30 | 1 | Transistor, SOT-23 | MOT, MMBT2222A | Q2 |
| 31 | 1 | Res., 33 Ohms, 5%, 1/8W, 1206 | PAN, ERJ8GEYJ330V | R2 |
| 32 | 1 | Res., 0 Ohms, 5%, 1/8W, 1206 | PAN, ERJ8GEYJR00V | R3 |
| 33 | 1 | Res., 51K Ohms, 5%, 1/8W, 1206 | PAN, ERJ8GEYJ513V | R4,R26 |
| 34 | 2 | Res., 2K Ohms, 5%, 1/8W, 1206 | PAN, ERJ8GEYJ202V | R6,R7 |

 PHYLON     35        PHY2 9 PC Adapter Card

| ITEM | QTY. | DESCRIPTION | MFR., PART NO. | SCHEM. REF. |
|---|---|---|---|---|
| 35 | 1 | Res., 2.4M Ohms, 5%, 1/8W, 1206 | PAN, ERJ8GEYJ245V | R8 |
| 36 | 10 | Res., 10K Ohms, 5%, 1/8W, 1206 | PAN, ERJ8GEYJ103 | R9,R10,R13,R14,R19, R36,R37,R43,R44,R49 |
| 37 | 2 | Res., 470 Ohms, 5%, 1/8W, 1206 | PAN, ERJ8GEYJ471V | R11,R12 |
| 38 | 2 | Res., 152 Ohms, 5%, 1/8W, 1206 | PAN, ERJ8GEYJ151V | R15,R16 |
| 39 | 1 | Res., 100 Ohms, 5%, 1/8W, 1206 | PAN, ERJ8GEYJ101V | R18 |
| 40 | 1 | Res., 40.2K Ohms, 1%, 1/8W, 1206 | PAN, ERJ8ENF4022V | R21 |
| 41 | 1 | Res., 18 Ohms, 5%, 1/2W, PTH 2010 | ROHM, MCR50-PZH-J-180 | R23 |
| 42 | 1 | Res., 10M Ohms, 5%, 1/8W, 1206 | PAN, ERJ8GEYJ106V | R24 |
| 43 | 2 | Res., 47K Ohms, 5%, 1/8W, 1206 | PAN, ERJ8GEYJ473V | R25,R51 |
| 44 | 2 | Res., 20K Ohms, 5%, 1/8W, 1206 | PAN, ERJ8GEYJ203V | R22, R27 |
| 45 | 2 | Res., 10 Ohms, 5%, 1/4W, PTH | ROHM, MCR25-PZH-J-100 | R29,R30 |
| 46 | 1 | Res., 470V, PTH | PAN, ERZV07D471 | R31 |
| 47 | 2 | Res., 221 Ohms, 1%, 1/8W, 1206 | PAN, ERJ8ENF2210V | R32,R33 |
| 48 | 2 | Res., 15.8K Ohms, 1%, 1/8W, 1206 | PAN, ERJ8ENF1582V | R34,R35 |
| 49 | 1 | Res., 1K Ohms, 5%, 1/8W, 1206 | PAN, ERJ8GEYJ102V | R50 |
| 50 | 1 | Res., 100 Ohms, 5%, 1/4W, PTH | ROHM, MCR25-PZH-J-101 | R46 |
| 51 | 1 | Transformer, MIDCOM 671-8264 | ATECH, CET, Mid, 671-8264 | T1 |
| 52 | 1 | IC, PHY118, PQFP, DSP | Phylon, PHY118 | U2 |
| 53 | 2 | IC, 74ALS245 Buffer, SOW | Any, 74ALS245 | U4,U5 |
| 54 | 1 | IC, PHY212, PLCC, AFE | Phylon, PHY212 | U6 |
| 55 | 1 | IC, Dual OP-AMP, DIP8 | NSC, LM1458N MOT, MC1458PI SIG, NE5532N NSC, LM833N TI, TLE2142CP | U7 |
| 56 | 1 | IC, NPN Opto-coupler, DIP6 | Any, 4N35 | U9 |
| 57 | 2 | IC, PAL, 16L8, PLCC | AMD, 16L8CNL | U10,U11 |
| 58 | 1 | IC, +5V Voltage Regulator, TO-92 | NSC, LM78L05ACZ | U12 |
| 59 | 1 | IC, Audio Power Amp., SOIC8 | NSC, LM386M-1 | U13 |
| 60 | 1 | Crystal, 12.80MHz, 50 ppm | MPC, MS49N1C3A-12.80 | Y1 |
| 61 | 1 | Crystal, 16.257MHz, 50 ppm | MPC, MS49N1C3A-16.257 | Y2 |
| 62 | 1 | Bracket, PC Adapter Card | GOMPF, 9054-2223 | |
| 63 | 2 | Bracket Hardware | | |
| 64 | 1 | PCB, PC Adapter Card | | |

| MFR. ABBREVIATIONS | | | |
|---|---|---|---|
| ALEPH | ALEPH | MPC | Monitor Products |
| AT | Adam Tech | MOT | Motorola |
| ATECH | ATECH | NSC | National Semi-Conductor |
| AMD | American Micro-Devices | PAN | Panasonic |
| CET | CET | RDI | RDI Electronics |
| GOMPH | Gompf Brackets | ROHM | ROHM |
| JWM | J.W. Miller | SIG | Signetics |
| KYCON | KYCON | STE | Steward |
| MID | Midcom | TI | Texas Instruments |

PHYLON PHY200 C Adapter Card
Mechanical Dimensions
The mechanical dimensions of the PHY2000 devices are shown in Figures 8 & 9, below.
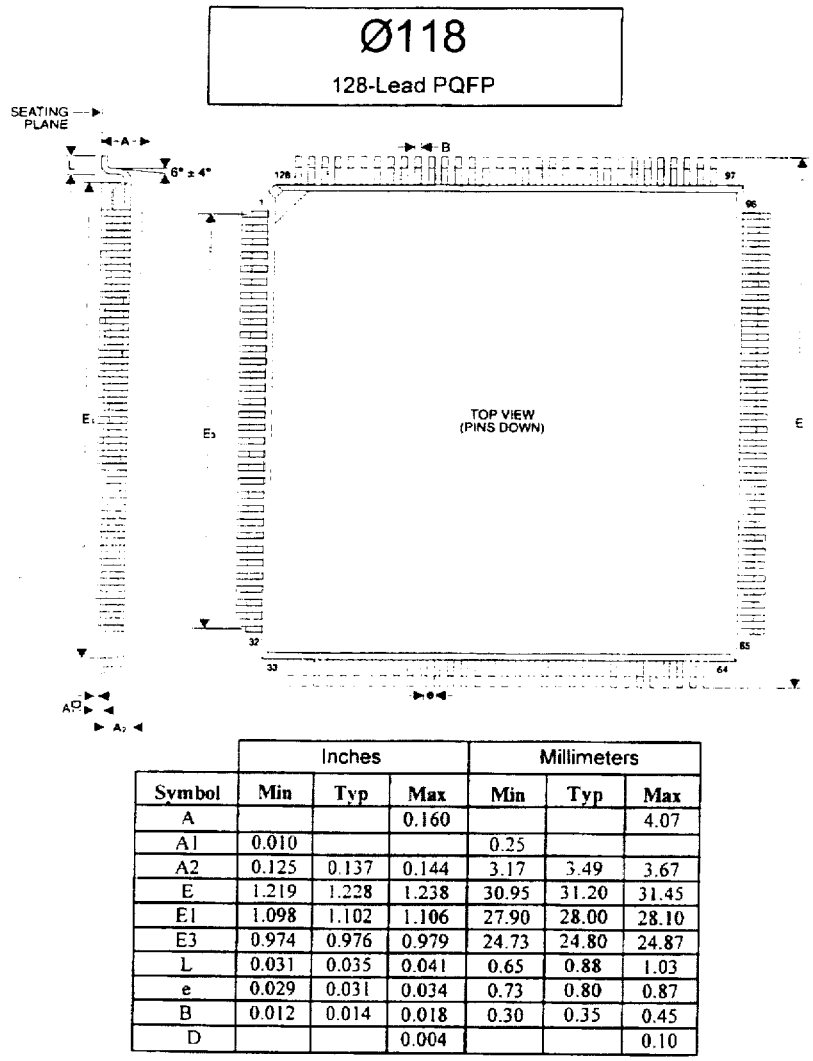
| Symbol | Inches | | | Millimeters | | |
|---|---|---|---|---|---|---|
| | Min | Typ | Max | Min | Typ | Max |
| A | | | 0.160 | | | 4.07 |
| A1 | 0.010 | | | 0.25 | | |
| A2 | 0.125 | 0.137 | 0.144 | 3.17 | 3.49 | 3.67 |
| E | 1.219 | 1.228 | 1.238 | 30.95 | 31.20 | 31.45 |
| E1 | 1.098 | 1.102 | 1.106 | 27.90 | 28.00 | 28.10 |
| E3 | 0.974 | 0.976 | 0.979 | 24.73 | 24.80 | 24.87 |
| L | 0.031 | 0.035 | 0.041 | 0.65 | 0.88 | 1.03 |
| e | 0.029 | 0.031 | 0.034 | 0.73 | 0.80 | 0.87 |
| B | 0.012 | 0.014 | 0.018 | 0.30 | 0.35 | 0.45 |
| D | | | 0.004 | | | 0.10 |
Figure 8. PHY118 Outline Dimensions (PQFP Devices)

 PHY2 0 PC Adapter Card
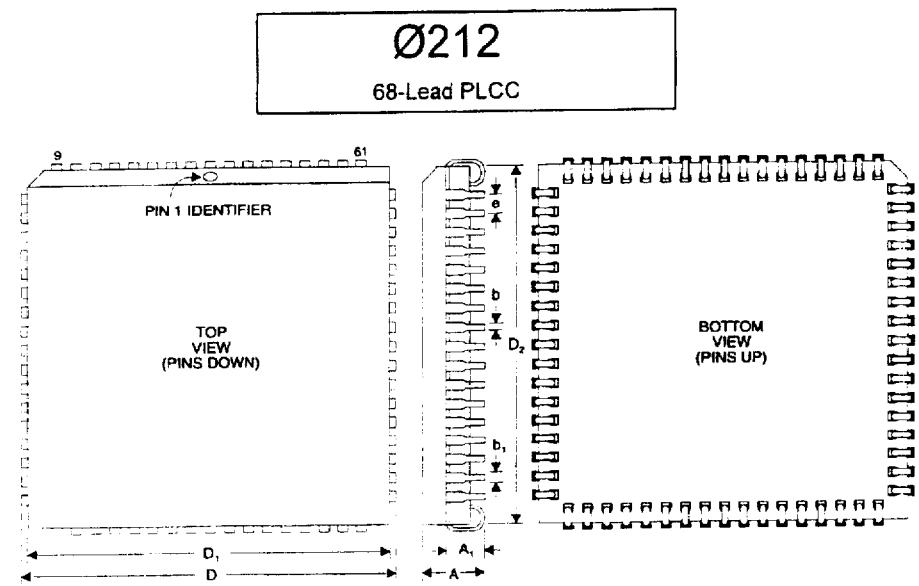
| Symbol | Inches | | Millimeters | |
|---|---|---|---|---|
| | Min | Max | Min | Max |
| A | 0.169 | 0.175 | 4.29 | 4.45 |
| A1 | 0.104 Typ | | 2.64 Typ | |
| b | 0.017 | 0.019 | 0.43 | 0.48 |
| b1 | 0.027 | 0.029 | 0.69 | 0.74 |
| D | 0.985 | 0.995 | 25.02 | 25.27 |
| D1 | 0.950 | 0.954 | 24.13 | 24.23 |
| D2 | 0.895 | 0.925 | 22.73 | 23.50 |
| e | 0.050 Typ | | 1.27 Typ | |
Figure 9. PHY212 Outline Dimensions (PLCC Devices)

 PHY2000  Adapter Card
PC Adapter Card Layout
Figures 10, 11 & 12 illustrate a typical PHY2000 PC Adapter Card reference design assembly and fabrication.
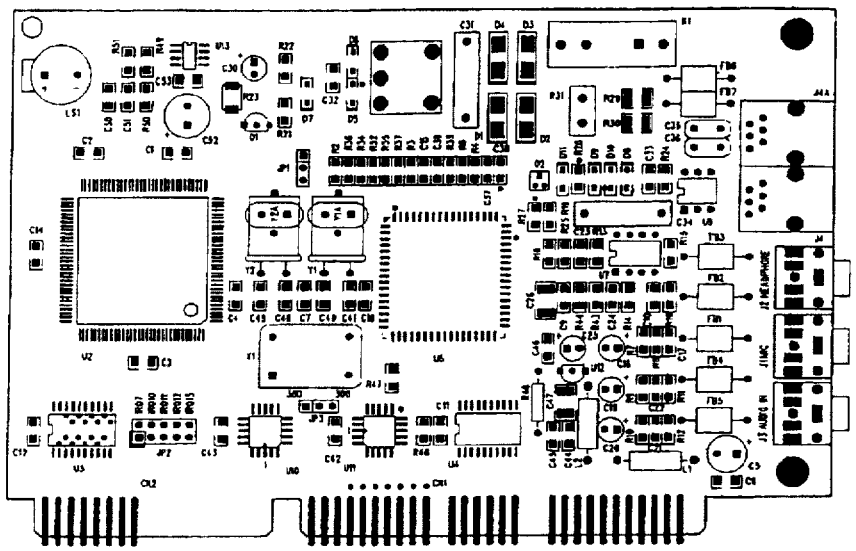
Figure 10. PHY2000 PC Adapter Card assembly

 PHYLØN  PHY2000 PC Adapter Card
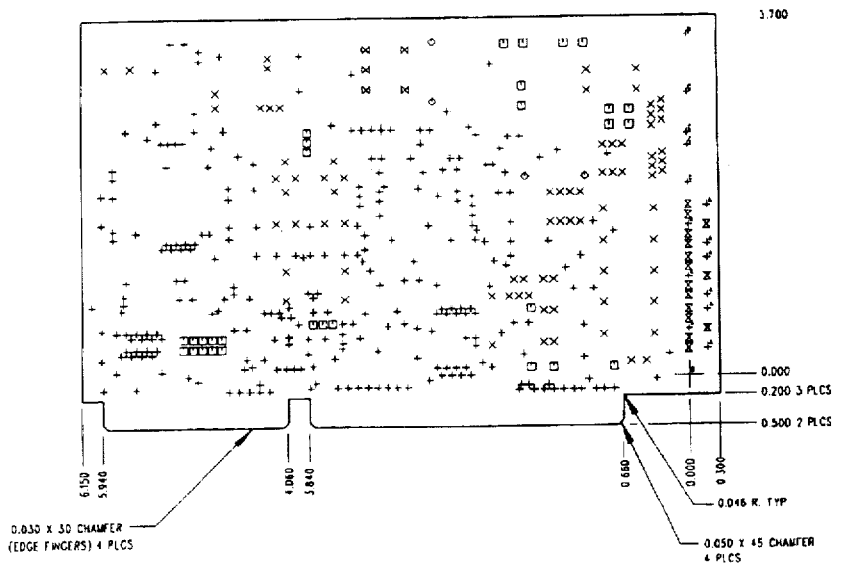
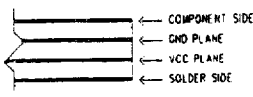
Figure 11. PHY2000 PC Adapter Card fabrication

 PHY2000  Adapter Card
Bracket Specifications
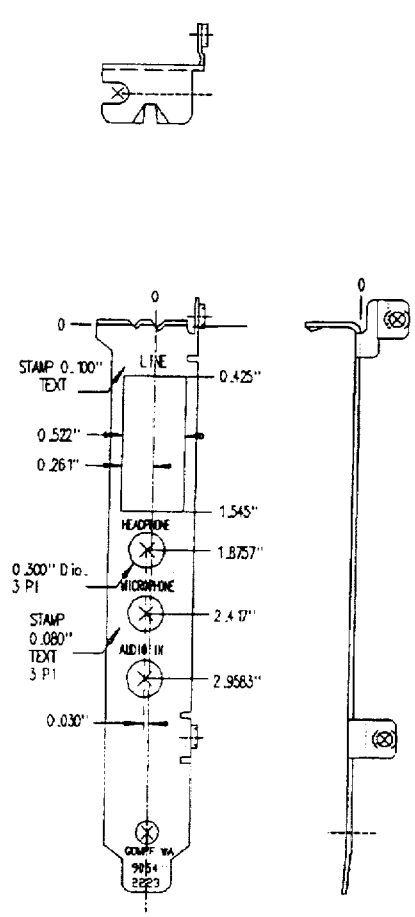
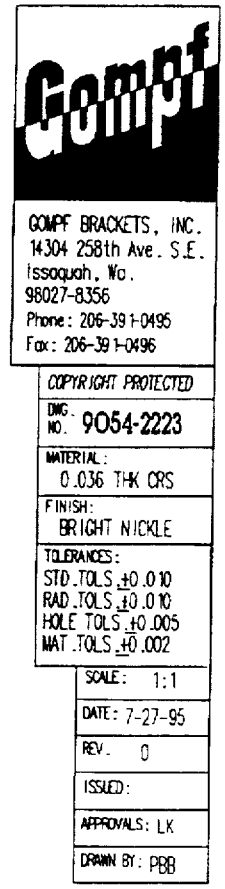
Figure 12. PHY2000 PC Adapter Card bracket specifications

 PHYLØN   41   PHY' 10 PC Adapter Card

Headset Specifications

An acceptable headset for use with the PHY2000 PC is identified below. This headset exhibits the characteristics desired for good quality voice transmission and reception. The headset can be procured from the source listed, or an equivalent headset may be substituted.

Specification: Stereo Headset, P/N MHP-28ZL/C, with (1) Condencer Microphone (-66dB)

(2) 3.5mm Stereo Plug for Speakers, (3) 3.5mm Mono Plug for Microphone (4) Cord Length = 2M Source: Innovation Technology Co., Ltd.
1921 Shing Yip Street
Kwun Tong
Kowloon, Hong Kong Tel: 852-2342-7315
Fax: 852-2343-1066

Contact: Peter Yuen
Samson Wong

PHYLØN PHY200 'C Adapter Card

Software Architecture

Modem Interface

The PHY2000 PC Adapter Card appears as an 8250 UART-based internal modem card to the PC system. However, while an 8250 UART provides no data buffering, and a 16550 UART provides only 16 bytes of buffering, the PHY2000 offers 1K bytes of data buffering. This permits up to 3 seconds of data to be buffered under a Microsoft Windows application.

The PHY2000 also differs from a typical internal modem card in that the DTE interface operates as a parallel UART. Data transfers are not impeded by unnecessary parallel-to-serial and serial-to-parallel conversions. Data transfer rates are equivalent to a DTE speed of up to 1 megabit/second, and are independent of the DTE speed selected within any communications application program.

The PHY2000 PC Adapter Card utilizes Phylon's PHY2000 communications chip-set to implement and control the transfer of fax, modem and voice data over telephone lines. The PHY2000 utilizes the high speed, high performance PHY118 Digital Signal Processor (DSP) to execute Phylon's SoftCom voice-band communications software modules which are contained within the DSP's internal RAM. This DSP executable code is downloaded (booted) into the DSP RAM via a DSP loader. DSP execution commences upon completion of the download.

The loadable nature of the PHY2000 card offers a degree of flexibility not offered in a typical communications adapter. Fax, modem and voice operation can be dynamically optimized to support specific software communication applications, whether they be standard communications, remote gaming, collaborative computing, or telephony. DSP executable code appropriate to each can be booted upon demand. This flexibility also permits easy upgrading of communications DSP code and features — such code can be provided via diskette, bulletin board download, e-mail or Internet.

 PHYLØN    PHY2000 PC Adapter Card

Card & Software Setup and Installation

Installation and setup of the PHY2000 PC Adapter Card is a very simple procedure.

1. Insert and fix the card into any PC/AT (16-bit) expansion slot.

2. Run the installation software (INSTALL.EXE). This software:

a. surveys the system to identify available unassigned COM ports (COM1, COM2, COM3, COM4) and associated interrupts (IRQ3, IRQ4);

b. sets-up the card with a user-selected or default COM port assignment;

d. creates the \PHYLON directory on the user selected hard disk and writes the supporting files into the directory; and then e. installs the C:\PHYLON path and DSP boot code loader call command (BOOTDSP.EXE) in the AUTOEXEC.BAT file. This guarantees that standard data/fax modem functions, including the Modem AT command and Fax Class 1 AT command sets, are available for use anytime the system is booted or powered-on.

3. Install the Windows Graphics User Interfaces (GUIs) by running a:setup.exe from the Program Manager. If Windows 95 is installed, then add the modem via the Add Hardware option in the Control Panel. The setup software:

a. installs the PlayLink, PhoneLink, BizLink and Hardware Setup programs;

b. creates the PhyLink Applications group, and;

c. adds the PlayLink, PhoneLink, BizLink and Hardware Setup icons to the group.

4. The COM port and associated IRQ assignments can be changed by executing the HSETUP.EXE utility in Windows or Windows 95, modifying the setup in the PLAY.EXE or PHONE.EXE DOS GUIs, or by editing the PHY2000.CFG configuration file located in the C:\PHYLON directory.

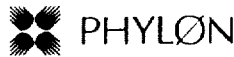 PHY2000 PC Adapter Card
Software Applications
The PHY2000 PC Adapter Card reference design can service a wide variety of applications as shown in Figure 13 below.
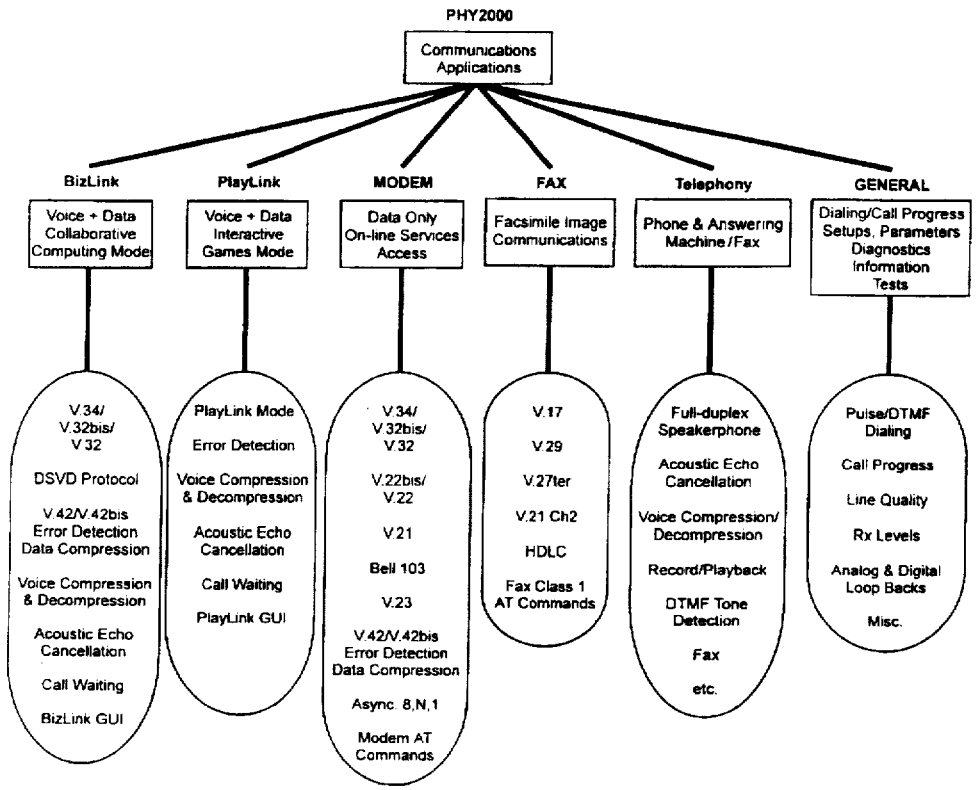
Figure 13. Typical software applications supported PHY2000 PC/AT reference design.

 PHYLØN  45  PHY' 00 PC Adapter Card
Communications Functions
The PHY2000 PC Adapter Card reference design supports user applications by executing the communications functions illustrated and listed in Figure 14.
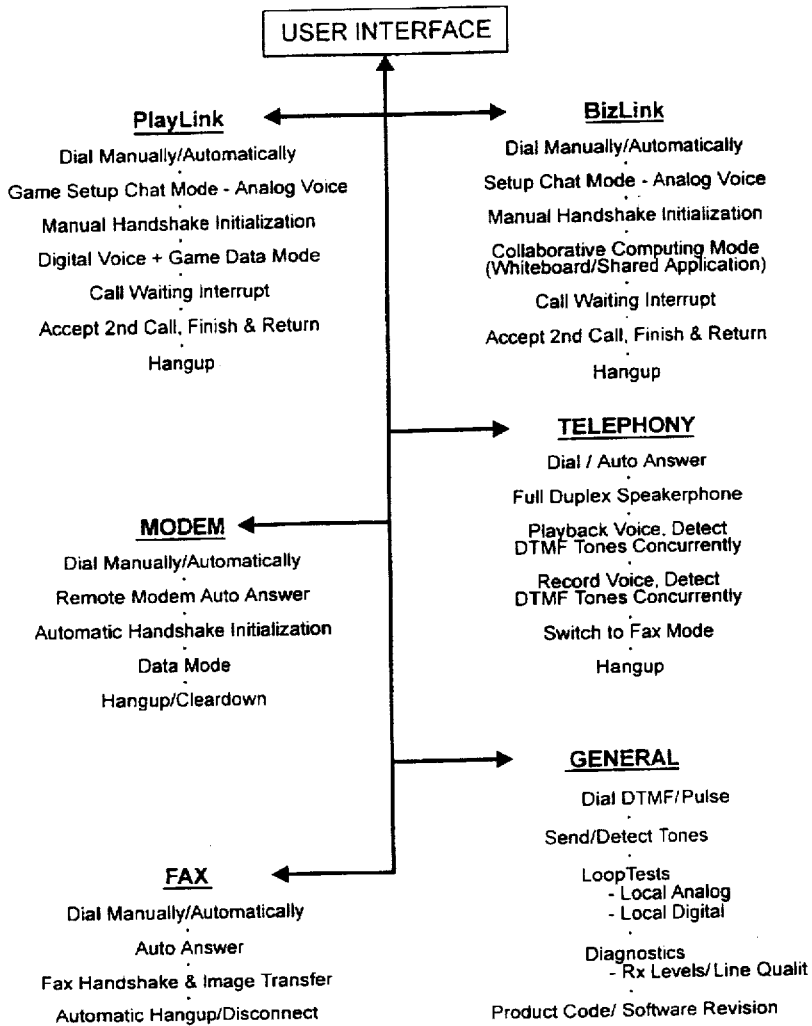
Figure 14. Communications functions by PHY2000 PC/AT reference design.

 PHY200  ′C Adapter Card

PlayLink User Interface

PlayLink is a software module that is specifically designed to offer DSVD operation to remote gaming applications in a multi-media PC environment. Each game player can talk to an opponent and listen to his opponent's voice mixed with game sounds provided by a resident sound card. Game play realism is supported and maintained because PlayLink optimizes the exchange of data between the the local and remote systems — game data is real-time, uncompressed, and can be given higher priority than voice data. New inputs to the game initiated by keystroke, mouse or joystick movements, are transferred with a low data delay of 17 milliseconds. This insures the local input is used to update the remote game within the interval between video frame updates.

PlayLink is compatible with all existing PC games that support remote play. PlayLink also supports the following modes of game synchronization — state vector, temporal, and I/O state.

PLAYLINK.EXE incorporates friendly graphical user interfaces (GUI) for both DOS and Windows to setup, connect and play games. This utility boot loads the PlayLink DSP code to the PHY2000 DSP, then displays a menu screen from which the following actions can be performed:

Dial - used to directly initiate a voice mode connection. This can be done while using the headset/microphone — a handset or telephone set is not required. A speakerphone may also be used.

Answer - used to answer an incoming call; this also can be done while using the headset/ microphone. When the voice mode has been established, the data connection can be added by depressing any key. The data connection is then automatically negotiated.

Relink - used to re-establish the data connection if lost and both modems fall back to voice-only mode. (Only appears on menu after initial connection is made.)

Setup - used to change the COM port and IRQ setup.

Games - used to automatically preset operating parameters and game synchronization mode unique to each game prior to play. The user selects a game from a pre-configured gamelist; this gamelist is maintained in a user-editable text file (GAMES.CFG). The user then exits PlayLink and starts the desired game normally. Game play is also terminated normally, after which a new game can be selected or the connection hungup.

Flash - used to service call waiting during game play. If local incoming call waiting interrupt occurs, the local player informs the remote player that he must answer the incoming call. Depressing any key then causes a suspension of both voice and game play and the incoming call is answered. Upon hanging up the incoming call, he is switched back to the original voice connection. Depressing any key again causes a relink of the data and game play is resumed.

Hangup - to terminate the connection requires running PLAYLINK.EXE again and selecting Hangup.

Exit to DOS - used to exit PlayLink in order to play the game. Connection is unaffected. If connection is terminated (hungup) before exit, the standard data/fax modem code is rebooted to the DSP.

 PHYLØN  PHY: '0 PC Adapter Card

BizLink User Interface

BizLink is a software module that is specifically designed to offer DSVD operation to remote collaborative computing applications in a PC environment. Each local user can talk to and listen to his remote counterpart's voice while interacting (conferencing) within a Windows-based whiteboard application. Interaction is realistic and responsive; BizLink optimizes the exchange of simultaneous voice + data between the the local and remote systems by providing both voice and data compression. Silences are detected during which data is transmitted at full speed.

PlayLink is compatible with all existing PC remote access software such as Stac's REACHOUT, Norton's PC Anywhere, and Intel's ProShare.

BIZLINK.EXE incorporates a friendly graphical user interface (GUI) for Windows to setup, connect and exchange voice and data. This utility loads the BizLink DSP code to the PHY2000 DSP, then displays the user friendly window from which the following actions can be performed:

Dial - used to directly initiate a voice mode connection. This can be done while using the headset/microphone — a handset or telephone set is not required. A speakerphone may also be used. Dialing can be initiated by entering numbers from a graphical keypad, reading them from a user edited phonebook, or clicking on speed dial icons.

Redial - used to redial the last dialed number.

Answer - used can answer an incoming call; this also can be done while using the headset/microphone. The user is in voice mode after answering.

Flash - used to service call waiting during conferencing. If local incoming call waiting interrupt occurs, the local user informs the remote user that he must answer the incoming call. Clicking the Flash button then causes a suspension of both voice and data exchange and the incoming call is answered. Upon hanging up the incoming call, the remote voice+data connection resumes.

Phonebook - used to maintain a list of user-entered/edited phone numbers.

Link - used to establish the data connection (voice+data mode) with the remote user. After the link is established, BizLink may be exited or minimized without affecting the connection. At this time the remote access software can be run in a Direct Connect, null modem mode. When the link is no longer required, Bizlink can be re-entered or maximized to allow the connection to be terminated.

Hangup - used to terminate the connection.

Exit BizLink - used to quit BizLink. The connection is unaffected. If connection is terminated (hungup) before exit, the standard data/fax modem code is rebooted to the DSP.

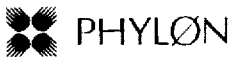 PHY2000 C Adapter Card

Telephony User Interface

Dialer

PhoneLink is a software module that is specifically designed to offer hands-free dialing and full duplex speakerphone in a PC environment. Both acoustic and electric echo cancellation is supported for speakerphone operation. Either a speakerphone or headphones with microphone may be used with the software.

PHONE.EXE incorporates a friendly graphical user interface (GUI) for DOS and Windows to setup, dial, connect and conduct telephone voice conversations. This utility loads the PhoneLink DSP code to the PHY2000 DSP, then displays the user friendly window from which the following actions can be performed:

Dial - used to directly initiate a telephone voice connection. This can be done while using the headset/microphone — a handset or telephone set is not required. A speakerphone may also be used. Dialing can be initiated by entering numbers from a graphical keypad, reading them from a user edited phonebook, or clicking on speed dial icons. Phone numbers entered from the keyboard can be dialed when the entry of the number string is completed, or dialed as each number is entered (instant dialing).

Redial - used to redial the last dialed number.

Answer - used can answer an incoming call; this also can be done while using the headset/microphone. The user is in voice mode after answering.

Flash - used to service call waiting during conferencing. If local incoming call waiting interrupt occurs, the local user informs the remote user that he must answer the incoming call. Clicking the Flash button places the original caller on hold, ans switches to the second caller. Upon hanging up the incoming call, the original caller is reconnected.

Phonebook - used to maintain a list of user-entered/edited phone numbers. (Windows version only)

Hangup - used to terminate the connection.

Exit - used to quit PhoneLink. The connection is terminated (hungup) before exit, and the standard data/fax modem code is rebooted to the DSP.

Answering Machine

The PHY2000 PC supports answering machine functions with record and playback, and fax switching operation.

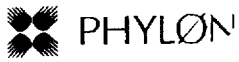 PHY 00 PC Adapter Card

Using Phylon AT Commands

Issuing AT Commands

When the modem is in the command mode, it is ready to accept commands from the terminal or computer. These "AT" commands are in the form of typed command lines, and are compliant with the EIA 602 Industry Standard AT Command Set.

The Command Line

A command line is a string of characters starting with the command prefix (attention code) AT and ending with a special end of line character, <CR>. Only one AT is permitted for each command line. Characters typed before the AT are ignored. Command lines contain at most 40 characters after the AT, not counting spaces.

Multiple commands can be entered on one command line; spaces used to separate commands for clarity are optional and permissible.

Commands can be in upper or lower case, but upper and lower case should not be mixed.

Typing mistakes can be corrected by using the BackSpace character, <BS>, after the initial A and T characters have been entered. The command will not be executed until the Carriage Return character <CR> (enter or return key on the terminal keyboard is pressed.

To echo command line characters use the E1 command.

Command lines may contain several commands, one after another. The Answer (A), Dial (D) and Go On-Line (O) commands usually cause any following commands in the command line to be ignored.

Command Line Execution

The characters in a command line are executed one at a time. Any unexpected characters (except control characters) stop command line execution and return an ERROR result code. Unexpected characters include numbers outside the range of values accepted by the command. All control characters in a command line except special characters such as <CR> and <BS> are ignored.

The numerical argument of a command is assumed to be 0 if it was not provided. For example, the commands ATH<CR> and ATH0<CR> both hang up the telephone line.

When the modem has executed a command line the result code of the last command executed is returned to the terminal.

If the value to be written to a modem register is outside the range of values accepted by the register then its value is not changed and the ERROR result code is returned.

Leading zeros in numeric arguments, including register numbers, are ignored. For example, ATS6=2 and ATS06=2 both set register 6 to a value of 2.

All numeric arguments, including register numbers, are decimal (base 10).

AT  Command Prefix

Each modem command line begins with the letters A and T. The modem uses these characters to determine the speed and parity of data from the terminal.

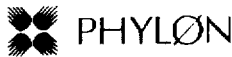 PHY200f C Adapter Card

| A/ | Repeat Last Command |
|---|---|

To repeat the commands in the last command line type the letters A and / instead of A and T.

| <CR> | End of Line Character (ASCII 13) |
|---|---|

This character is typed to end a command line. The modem executes the commands in the command line.

| <BS> | BackSpace Character (ASCII 8) |
|---|---|

This character is typed to erase the last character in a command line.

Result Codes

A result code is a short line of text or a number the modem sends to the terminal to indicate the result of a command's execution.

Some CONNECT result codes indicate the speed of the terminal to modem connection, the speed of the modem line connection, and whether or not error control is in use.

| No. | Text | Result Code Description |
|---|---|---|
| 0 | OK | All commands in a command line executed successfully. |
| 1 | CONNECT | The modem is in the On-Line state, ready to transfer data. (Linespeed is 300, or linespeed not indicated if ATX0.) |
| 2 | RING | The modem has detected a ring signal on the telephone line. |
| 3 | NO CARRIER | No carrier signal was detected when answering or placing a telephone call, or carrier was lost during a call. The modem also returns this result code when the telephone line connection is broken for any reason. |
| 4 | ERROR | An invalid command was issued, or there was an error at any place in the command line. |
| 5 | CONNECT 1200 | The modem is in the On-Line state, ready to transfer data at linespeed of 1200 bit/s. |
| 6 | NO DIALTONE | No dial tone was detected when the modem took the telephone line off hook. |
| 7 | BUSY | The modem detected a busy signal on the telephone line. |
| $n_1n_2$ | CONNECT p | The modem is in the On-Line state, ready to transfer data at linespeed of p bit/s. |

| $n_1n_2$ | p | $n_1n_2$ | p |
|---|---|---|---|
| 10 | 2400 | 13 | 9600 |
| 11 | 4800 | 14 | 12000 |
| 12 | 7200 | 15 | 14400 |

 PHYLØN  PHY' 10 PC Adapter Card

Escaping from the On-Line State to the Command State (+++)

Sometimes you need to issue AT commands when the modem is in the On-Line state (when two modems are exchanging data). To do this, you escape from the On-Line state to the Command state by sending the escape sequence from the terminal to the modem. The escape sequence changes the modem from the On-line state to the Command state without breaking the telephone line connection.

When you finish issuing AT commands you can either use the Return On-Line command (O) to return to the On-Line state to continue exchanging data between modems, or you can use the Hang-Up command (H) to disconnect from the telephone line and return the modem to the Idle state.

The PHY2001 Modem supports switching from the On-Line state to the Command state in the following way:

- The modem switches from the On-Line to the Command state when the modem receives the Time Independent Escape Sequence (TIES) from the terminal.

TIES Sequence:

TIES is a sequence of 3 escape characters (+ characters by default). Once these characters have been recognized, the modem enters the Command state without sending a confirming result code to the terminal and the modem starts a prompt delay timer. Then:

- If one of the recognized AT commands is received before the timer expires the timer is stopped, the command is executed, and its result code is sent to the terminal.

- If any other data is received while the timer is running the timer is stopped, the modem returns to the On-Line state, and the received data is sent to the other modem.

- If the timer expires a confirming result code is sent to the terminal to indicate that the modem is in the Command state.

PHYLON    PHY200    'C Adapter Card

Phylon AT Command Explanations

The Phylon AT Command set can be divided into three categories — Standard commands, FAX commands and Telephony commands. Full command explanations follow; default settings for specific commands are indicated with bold face.

Standard AT Commands

A    Answer

> The A command makes the modem go off hook and enter answer mode.
>
> If the modems successfully complete the answering process they each return a CONNECT result code and enter the On-Line state.
>
> If no transmit carrier signal is received from the calling modem within the time specified in register S7, the modem hangs up, returns the NO CARRIER result code, and enters the Idle state.
>
> Any commands following the answer command on the command line are ignored.
>
> This command is aborted if a key is pressed before the answer process is completed.

D    Dial

> The D command makes the modem dial a telephone call according to the digits and dial modifiers in the dial string that follows the command. Any commands following the dial string on a command line are ignored unless the semicolon dial modifier is the last character in the dial string. In a dial string characters other than digits and dial modifiers are ignored, but are counted as characters in the command line buffer.
>
> | Result Codes | Description |
> |---|---|
> | BUSY | If the other telephone is busy. |
> | NO DIALTONE | If 1 second of dial tone is not detected within 5 seconds. |
> | ERROR | If the dial modifier is invalid. |
> | OK | If the ; dial modifier is processed in the dial string. Also, if dialing is aborted by a character from the terminal during dialing. |

Dial Modifiers

> Dial modifiers perform special functions within a dial command. For example, ATDT9W1552368!#71234;<CR> instructs the modem to use tone dialing (T), to access a number outside a PBX (9), to wait for dial tone (W), to dial the number 1552368, to enter a timed break recall (!), and to issue the PBX transfer code #7 before dialing extension number 1234, then to return to the Command state before initiating the handshake.

**0-9 A B C D # *    Dialing digits and characters**

> The digits and characters 0-9 A B C D # * specify what numbers the modem dials. The characters A B C D # * work only when tone dialing is used. These characters are ignored when pulse dialing is used.

 PHYLØN                              PHY2   ) PC Adapter Card

| P | Pulse dialing |
|---|---|

P selects the pulse method of dialing. P can be issued within a dial command or as a separate command. The default method of dialing is Pulse.

| R | Originate a Call in Answer Mode |
|---|---|

R makes the modem handshake in answer mode so it can originate a call to an originate-only modem. R may only be used at the end of a dial string. R makes the modem to act as if it had been sent an Answer command at that point in the dial string.

| T | Tone dialing |
|---|---|

T selects the tone method of dialing. T can be issued within a dial command or as a separate command. The default method of dialing is Pulse.

| W | Wait for dial tone |
|---|---|

W makes the modem wait for a dial tone before proceeding. If no dial tone is detected the modem hangs up the telephone line and returns the NO DIAL TONE result code.

| , | Delay Processing of Next Character |
|---|---|

Comma (,) makes the modem pause for the length of time in register S8 before processing the next character in a dial string.

| ! | Timed Break Recall (Hookflash) |
|---|---|

! makes the modem hang up the telephone line for 500 milliseconds, then take the telephone line off hook again. This is frequently used to access a PBX's call transfer function.

| ; | Return to Command State |
|---|---|

The semicolon (;) makes the modem return to Command state after dialing without breaking the telephone line connection. The semicolon may only be used at the end of a dial string. The semicolon is useful when calling a voice mail system that permits you to use tones to transmit numbers once a connection has been established.

| *E* | *Command State Character Echo Options* |
|---|---|

E tells the modem whether or not to echo characters sent from the terminal when the modem is accepting AT commands.

E0  Does not echo characters sent from the terminal.

E1  Echo characters sent from the terminal. This is the default value.

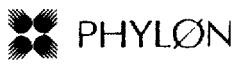 PHYLØN    PHY200  C Adapter Card

| H | *Hook* | |
|---|---|---|
| | H0 | Hang up the telephone line. |
| | H1 | Go off hook without answering a telephone call. |
| | H2 | Clear data buffers an disconnect. |

| I | *Identification* |
|---|---|

The I command asks the modem for information about itself. This information can be used to determine the modem's compatibility with other software and to ensure the modem is operating properly.

| | I0 | Display product code. |
|---|---|---|
| | I1 | Display software revision number. |

| M | *Speaker On/Off Options* | |
|---|---|---|
| | M0 | Speaker always off. |
| | M1 | Speaker on until carrier detected. This is the default value. |
| | M2 | Speaker always on; stays on after carrier is detected. |
| | M3 | Speaker off as digits are dialed, but on during ringback and on until carrier signal is detected. |

| N | *Negotiation of Handshake Options* |
|---|---|

Select whether or not the modem will handshake with another modem when the communications speeds of the two modems are different. This command can limit the handshake to a particular speed or allow the modems to fall back to a lower speed. If the modems cannot agree on a common speed no telephone line connection will be established.

| | N0 | Handshake only at the communication standard specified. |
|---|---|---|
| | N1 | Automode. Begin handshaking at the communication standard specified by automatically determining speed. |

| O | *On-Line* |
|---|---|

| | O0 | Return the modem to the On-Line state from the Command state during a telephone line connection. The modem starts handshaking if there was no telephone line connection but the modem was off hook. |
|---|---|---|
| | O1 | Return the modem to the On-Line state and retrain its adaptive equalizer during a telephone line connection. The modem starts handshaking if there was no telephone line connection but the modem was off hook. |

 PHYLØN                    PHY. ,0 PC Adapter Card

| | | |
|---|---|---|
| | O3 | Return the modem to the On-Line state and initiate CCITT V.32bis rate renegotiation sequence during a telephone line connection. The modem starts handshaking if there was no telephone line connection but the modem was off hook.<br><br>If handshaking is started, the modem uses Originate or Answer mode handshaking depending upon whether the modem originated or answered the telephone call. |
| P | Pulse Dial | |
| | | Selects the pulse method of dialing. |
| Q | Result Code Display Options | |
| | Q0 | Result codes will be displayed. This is the default value. |
| | Q1 | Result codes will not be displayed. |
| Sr | Address Register "r" | |
| | | Sr addresses a particular register number so subsequent ? will read the specified register and a subsequent =n will write the value n into the specified register. Modem reset, the &F, and Z commands select S0 as the default register. |
| T | Tone Dialing Method Options | |
| | | Selects the tone method of dialing. |
| V | Result Code Format Options | |
| | V0 | All result codes will be displayed as numbers. |
| | V1 | All result codes will be displayed as words (verbose form). This is the default value. |
| X | Call Progress Options | |
| | | The X command controls whether or not a busy signal or dial tone should be detected when dialing. The X command also limits the result codes the modem may return when dialing, making it useful when using a communication program that can only accept the CONNECT result code without terminal speed, line speed or error control usage reporting. |
| | X0 | Neither busy signal nor dial tone are detected. When a telephone line connection is made the result code does not indicate either the speed of the connection. |
| | X1 | Neither busy signal nor dial tone are detected. When a telephone line connection is made the result code indicates the speed of the connection. |
| | X2 | Busy signal is not detected. Dial tone is detected. When a telephone line connection is made the result code indicates the speed of the connection. |
| | X3 | Busy signal is detected. Dial tone is not detected. When a telephone line connection is made the result code indicates the speed of the connection. |

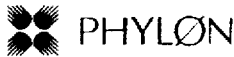

PHY200 'C Adapter Card

X4 Both busy signal and dial tone are detected. When a telephone line connection is made the result code indicates the speed of the connection. (This is the default value.)

The W dial modifiers is not affected by the X command! The W dial modifier may return the result codes 6 (NO DIALTONE) or 7 (BUSY) each time it appears in the dial string.

Z   Soft Reset

This hangs up the telephone line and the modem.

,   Pause

The comma (,) makes the modem pause for the length of time in register S8 before processing the next character in the command line.

&D   Data Terminal Ready Options

&D determines how the modem responds to the DTR signal from the terminal. The response to changes in DTR also depends on the &Q and &D commands. The &T command test modes are only affected by DTR changes when &D3 is in effect. This table defines what happens when DTR goes off for all possible combinations of the &D and &Q commands. To see what happens when DTR goes on, refer to the &Q command. The default value is &D0:

|     | &D0  | &D1 | &D2 | &D3 |
|-----|------|-----|-----|-----|
| &Q0 | None | A   | B   | C   |

A   If in the On-line state, the modem goes into the Command state and issues an OK result code.

B   The modem hangs up the telephone line and issues an OK result code. Auto-Answer is disabled as long as DTR stays off.

C   The modem does a soft reset.

&K   Flow Control Options

Flow control prevents data from being lost by stopping the terminal from sending data to the modem too quickly. The modem issues flow control to the terminal by signalling the terminal to stop sending data. The modem releases flow control when it is able to receive more data by "telling" the terminal to resume sending data.

Similarly, the terminal can use flow control to prevent data loss caused by the modem sending data too quickly to the terminal.

Flow control does not work unless both the terminal and the modem agree on the type of flow control to be used.

Flow control is crucial whenever error control is used and whenever the modem communicates at different speeds with its terminal and another modem. Otherwise, differences in rates of transmission can cause data loss even if error control is used.

 PHYLØN    PHY2  PC Adapter Card

| &K0 | Disable flow control. |
| --- | --- |
| &K3 | Enable hardware (RTS/CTS) flow control. |
| &K4 | Enable XON/XOFF flow control. |
| &K6 | Enable both RTS/CTS and XON/XOFF flow control. |

&P    Make/Break Ratio Options

| &P0 | 39%/61% make/break ratio when pulse dialing. This is the default value at 10 pulses/second. |
| --- | --- |
| &P1 | 33%/67% make/break ratio when pulse dialing, 10 pps. |
| &P2 | 39%/61% make/break ratio when pulse dialing, 20 pps. |
| &P3 | 33%/67% make/break ratio when pulse dialing, 20 pps. |

&Q    Communications Mode Options  *

The &Q command selects the terminal communication mode and when telephone calls will be started and stopped.

&Q0    Asynchronous. This is the default value.

%E    Automatic Retrain / Rate-Renegotiate Options

| %E0 | Automatically retrain or rate-renegotiate if the modem determines the quality of the connection has changed since the original handshake. |
| --- | --- |
| %E1 | Do not automatically retrain or rate-renegotiate during the line connection. |

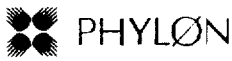

PHY200 'C Adapter Card

FAX AT Commands

The Reference Design Modem supports FAX Class 1 operation under the control of a suitable communication program. The communication program issues special AT commands to the modem to complete a FAX transmission or reception.

After the modem executes a FAX command it returns a result code. The result code is OK if the command executed properly and ERROR if the command did not execute properly. The special +FCERROR result code is returned if the modem receives an unexpected FAX carrier from the other modem. For example if the modem is issued a +FRM=96 command telling it to expect a 9600 bps carrier and then the modem actually receives a 4800 bps carrier.

FAX Class 1 AT+F Commands

| +FCLASS= | Set Modem in Data, FAX or Voice Mode |
|---|---|

+FCLASS=0   Data mode. This is the default mode.

+FCLASS=1   FAX Class 1 mode.

| +FCLASS=? | Query Modem Capability |
|---|---|

The execution of this command returns one or more numbers that describe the capabilities of the modem.

0   =   Data mode.

1   =   FAX Class 1 mode.

| +FTS=<n> | Transmit Silence for n*10 milliseconds |
|---|---|

This causes the modem to stop transmission for n times 10 milliseconds, then return to the command mode with message "OK".

| +FRS=<n> | Receive Silence for n*10 milliseconds |
|---|---|

This causes the modem to wait until a silence period of n times 10 milliseconds occurs on the line, then return to the command mode with message "OK".

| +FTM=<MOD> | Transmit Page Data Using <MOD> Carrier |
|---|---|

This command switches the carrier ON and sends page data with the modem in normal mode. Mode options are returned when a ? is used. Use Table 4-1 to determine the appropriate value for <MOD>.

| +FRM=<MOD> | Receive Page Data Using <MOD> Carrier |
|---|---|

This command activates the receiver and receives data with the modem in normal mode. The return message is CONNECT or +FCERROR. Mode options are returned when a ? is used. Use Table 4-1 to determine other appropriate value for <MOD>.

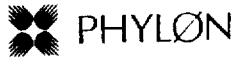 PHYLØN  PHY: 0 PC Adapter Card

| +FTH=<MOD> | Transmit HDLC Data Using <MOD> Carrier |
|---|---|

This command switches the carrier ON and sends data with the modem in HDLC mode. The return message is CONNECT or +FCERROR. Mode options are returned when a ? is used. Use Table 4-1 to determine other appropriate value for <MOD>.

| +FRH=<MOD> | Receive HDLC Data Using <MOD> Carrier |
|---|---|

This command activates the receiver and receives data with the modem in HDLC mode. The return message is CONNECT or +FCERROR. Mode options are returned when a ? is used. Use Table 4-1 to determine other appropriate value for <MOD>. Note that for receive purposes, there is no difference between log train V.17 modes and resynchronization or short train.

| <MOD> | Modem Mode | Data Rate |
|---|---|---|
| 3 | V.21 ch.2 | 300 bit/s |
| 24 | V.27 ter | 2400 bit/s |
| 48 | V.27 ter | 4800 bit/s |
| 72 | V.29 | 7200 bit/s |
| 73 | V.17 | 7200 bit/s |
| 74 | V.17 w/st | 7200 bit/s |
| 96 | V.29 | 9600 bit/s |
| 97 | V.17 | 9600 bit/s |
| 98 | V.17 s/st | 9600 bit/s |
| 121 | V.17 | 12000 bit/s |
| 122 | V.17 w/st | 12000 bit/s |
| 145 | V.17 | 14400 bit/s |
| 146 | V.17 w/st | 14400 bit/s |

Table 4-1. <MOD> Mode Selection Values

Notes:

(1) "st" means V.17 short training or resynchronization. All these commands return an ERROR result code if issued when the modem is on-hook.

(2) All commands using the <MOD> value can be queried for range of values supported by the modem. This is accomplished by setting <MOD> to "?". The modem will respond with all the possible values. For example:

+FTM=? would invoke the following response:

"3,24,48,72,73,74,96,97,98,121,122,145,146"

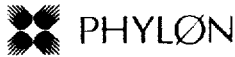

PHY200    'C Adapter Card

Registers (S-Registers)

Modem registers, also known as S-Registers, contain the values of special purpose ASCII characters, timing parameters and other modem parameters.

| | |
|---|---|
| S0 | Ring to Auto-Answer |
| | *Default: 0 (auto-answer disabled)* |

The modem automatically answers the telephone when it rings S0 times. If register S0=0, then the modem will not automatically answer the telephone. Any value from 0 to 255 is valid.

| | |
|---|---|
| S7 | Wait for Carrier after Dialing |
| | *Default: 50 seconds* |

Register S7 is the maximum time the modem may use to complete the connection between the modems after dialing. Any value from 1 to 255 is valid. The modem hangs up and returns the NO CARRIER result code if the modem has not entered the On-Line state within this time.

| | |
|---|---|
| S10 | Delay Between Lost Carrier and Hang Up |
| | *Default: 14 tenths of a second* |

Register S10 is the time between loss of the carrier signal from the other modem and hang up by the modem. The carrier signal may disappear for periods up to S10 without causing the modem to hang up. Any value from 1 to 255 is valid. Setting register S10 to 255 makes the modem never hang up the telephone line because of loss of carrier.

The modem only recognizes a carrier signal after the time specified in register S9. Register S10 should always be greater than register S9 so a carrier signal can be recognized before the telephone line is hung up.37

| | |
|---|---|
| S91 | Transmit Level |
| | *Default: 10* |

Register S91 sets the transmit level in -dBm from 10 to 25. Any value from 10 to 25 is valid. These levels assume that the proper transmit gain in the DAA is applied to convert the maximum transmit signal of 0.33 VRMS to -10 dBm and the line.

61

4027 Clipper Court
Fremont, California 94538-6540

Telephone: (510) 656-2606
Facsimile: (510) 656-0902
BBS: (510) 656-0916
Email: phylon@ix.netcom.com
Website: http://www.phylon.com/

Information furnished by Phylon is believed to be accurate and reliable. However, no responsibility is assumed by Phylon for its use; nor for any infringements of patents or other rights of third parties which may result from its use. No license is granted by implication or otherwise under any patent or patent rights of Phylon other than circuitry embodied in Phylon products. Phylon reserves the right to change circuitry at any time without notice. This document is subject to change without notice.

Printed in USA
Doc.# M10060, Rev.1.4 110295        P/N 99-0005-0        ©Phylon 1995

APPENDIX B

63
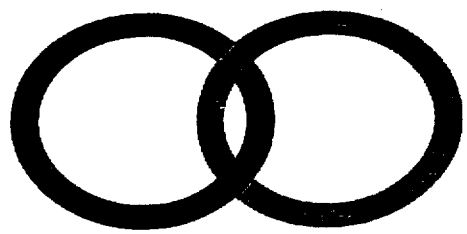

64

Phylon PlayLink™
Talk 'N' Play Interactive Gaming

Phylon PlayLink™ technology allows players to play games over standard telephone lines, simultaneous with voice communication. It is compatible with all existing PC modem games. New games can be developed to take advantage of the unique features that this technology offers.

Phylon

Phylon was formed in late 1987 with the charter to develop software oriented data communication technology.

The company's industry first accomplishments include:

- Upgradeable Soft-modem Data Pump - 1988
- V.32bis Chipset - 1990
- Integrated V.32bis+V.42bis Single DSP Chipset - 1992
- V.32ter Chipset - 1993
- Simultaneous Voice + Data Single DSP Chipset - 1994
- Demonstration of Host Signal Processing (HSP) - 1995

Phylon has demonstrated DSVD at the 1993 Comdex show. Through collaboration with video game console partners, this technology evolved into PlayLink, a specialized form suitable for remote gaming. This proprietary technology has been patented by Phylon.

What is PlayLink?

PlayLink is a comprehensive set of technology offerings including:

- PlayLink reference design that includes two VLSI chips and associated DSP and PC driver software. This is of particular interest to potential hardware developers.

- PlayLink sample hardware and high level Play-API. This is of particular interest to the software developer.

- PlayLink adapter card with the associated software and accessories. This will be of particular importance to the end user.

- A PlayLink website is located on the Internet's World Wide Web. This will be of particular interest to both PlayLink users and game developers. PlayLink on the Internet will provide users of PlayLink the opportunity to find other people to play games against, obtain software upgrades, receive technical support, and much more. Game developers will be able to receive new Play-API updates and technical support, along with technical documents.

PlayLink for the User

PlayLink brings interactive gaming to a new level of realism. Imagine finally being able to not only play games with other people over the phone, but also be able to speak or even yell at them! It is no longer a pipe dream locked up in some secret government laboratory somewhere—it is a reality!! Now you can play against a real person, rather than feeling as if you're competing with a "cold hearted" machine. Applications for PlayLink technology include:

- Flight Simulations
- Role-playing games
- Racing Simulations
- Sports Games
- New types of games Current hot titles compatible with PlayLink include:

> Doom, Heretic, Descent, Falcon, Mechwarrior, Battledrome, Rise of the Triad, Indy Car, Nascar, Terminal Velocity, One Must Fall, Wacky Wheels, VR Pool, and many, many others.

Why Bother With Ancient Technology?

Phylon's PlayLink offers today's game player exactly what they need, the ultimate way to play interactive games, from anywhere, to anyone, over an ordinary telephone line! Until now, remote games have been limited by communications hardware that is primitive. PlayLink tears down the barriers and even brings new features that have never previously been used for games. Chat windows are a hassle and making prerecorded voice samples to play at appropriate moments during a game just don't cut it anymore! Now not only can you talk to someone while playing a game, you can also answer incoming phone calls with the click of a button, without disconnecting your game, with the call waiting feature.

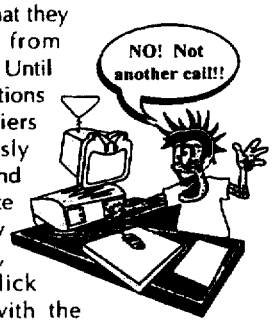

PlayLink User Interface

PlayLink was developed for average game players, not rocket scientists! Without getting into buzz words that will make your head spin, PlayLink can easily be summed up in two words. Pure fun!!! Unless you really enjoy spending countless, stress filled hours trying to figure out how to connect with your friends' PC and play a game, why bother? Wouldn't it be nice to be without complicated command sets, complicated terminology, and hassles? With PlayLink , if you know your friends' phone numbers, you're all set! Home-to-home game play just doesn't get any easier than this.

The User Package

The user package currently is offered in the form of a PC internal card. A user manual, free shareware games, and free access to the PlayLink club on the Internet World Wide Web are all included with it. Accessories include a headset with speakers and microphone, a telephone line cable that connects to the line, and a phone cable that connects to the telephone or an answering machine at home.

PlayLink can potentially be integrated into many other forms, such as external box, plug-in cartridge, or chips integrated within the game platform. The mentioned accessories will vary, depending on the format of the hardware.

Interface

PlayLink provides the user with a very friendly user interface, from which to begin games. This menu is called up by the user with the standard keyboard. When implemented into console systems, a PlayLink menu screen would appear on a monitor or television after power-up.

Connecting With Others

The user wears the headset, turns on the monitor, and calls up the PlayLink menu. He or she can then choose to dial a friend's telephone number from the menu, simply by entering the number and clicking the dial button. The dialing, ringing or busy signals can all be heard through the headset. The user may talk to the other person through the headset, for instance, the friend's mother, who picked up the kitchen phone. Then the playmate sets up his system in his game room, wears his headset, goes off-hook from his menu and hangs-up the kitchen phone. The players can then chat over the headset before playing their game.

67

When the players wish to start the game, at the click of a button a link is established within a few seconds. The menu prompts the user to start playing the game. Other game information may be entered after the link is established. The players may talk over the headset and play the game interactively.

In the middle of a game, if one person receives a call waiting beep, the players can pause the game, click to answer the other call and return to the game after finishing the call.

PlayLink Club!

A World Wide Web site has been created so that people can be a part of the PlayLink experience. This area is dedicated to supporting PlayLink and providing a forum for remote game players anywhere.

Players can find opponents to play through the user list and messages. Players can download software upgrades to the PlayLink hardware for new features as they arrive. Players can help each other and discuss their experiences with a whole variety of games.

Through the PlayLink website, game players will also be able to download the hottest shareware and commercial demos with only a click of a button.

PlayLink For The Hardware Developer

Architecture

PlayLink technology is based on the chipset PHY2000, which consists of the Ø118 DSP (digital signal processing) and Ø212 AFE (analog front end). The DSP is a 33 MIPS processor which is capable of executing all the communications functions without external RAM. The AFE consists of all the analog functions necessary to interface to the telephone line and also includes the codec (coder/decoder) for interfacing to the headset. This high level of integration provides a very cost effective solution with low power consumption and high reliability.

 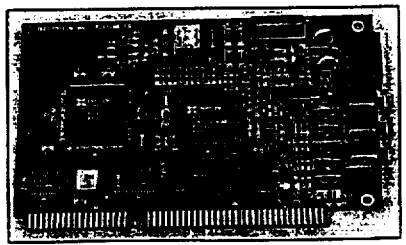

68

Interfaces

In the PC game platform, the hardware may be an internal plug-in card or an external box. In some game machines, PlayLink hardware may be sandwiched between the game and the cartridge. In other cases, the hardware may be an external box. The game system, console or PC based, can be interfaced to PlayLink hardware in two possible ways. The hardware interface may be an 8-bit parallel or 2-wire serial asynchronous link.

The software interface for PlayLink is a standard UART in the PC adapter case. In the case of serial hardware, asynchronous 8,N,1 format is provided. The PlayLink 'C' drivers, offered as part of the Play-API provide a hardware independent interface to the games software for dialing, link establishment, and game data communication.

Backward Compatibility

PlayLink has been developed in such a way as to maintain compatibility with existing modem based games, while allowing future developments to take advantage of newer features through the Play-API. The backward compatibility is provided only to offer use with the older games developed before PlayLink. (See the list on page 7.)

Communications Software

The hardware comes with standard fax and modem features in addition to the unique advanced features of PlayLink. The architecture is fully software upgradeable from a PC hard disk by just downloading or copying a new file. In a console system, this would be done from the system ROM. Future upgrades possible for the PC version include 28,800 bps true V.34 modem, Voice over the Internet (InterLink™), and much more.

PlayLink For The Software Developer

Developing New PlayLink Games

PlayLink's unique features can be incorporated in new games with the free Play-API and reference PC adapter cards. Features such as dialing, call establishment, games synchronization, resynchronization on errors and call waiting, and switching lines instantly during call waiting can be easily integrated with the simple functions that are part of the Play-API. Developers will also have access to a private section on the PlayLink website. They will be able to download new driver revisions, obtain development support, and access technical documents. Upon being confirmed as a PlayLink developer, a developer will be given a user name and password to access this section of the website.

2-player Mode

The game states are:

Initialization
        Reset hardware
        Setup parameters
    Dialing & Answering
        Dial telephone number
        Answer the call
    Link establishment
        Handshake
        Game Setup
    Game play
        Synchronization - State Vector, I/O State and Temporal
        Resynchronization - due to errors caused by call waiting or bad lines
        Dynamic bandwidth allocation
    Interruptions
        Call waiting interrupt - pause, accept other call, resume game
        Sore loser unplugging the phone line - call him a coward
    Hang-up
        Exit the game and hang-up

Games Simultaneous Voice and Data Protocol

The communications protocol allows simultaneous voice and real-time data communications. Voice communication is digital and is totally transparent to the game software. The game packet data transmission may be synchronized to the game loop or vertical blank pulse. Data byte packets may be provided at any interval of time, asynchronously. The data byte packets will arrive at the receive end, after a constant delay of about 17 ms plus any line delay. The data delay remains a constant with or without voice being communicated full-duplex. The game data packet communication is synchronous. The two ends of the game may be synchronized from the data. Information such as control input from keypad, game state and any random event can be communicated with minimum delay. Games re-sync function is included as part of the Play-API.

The communications hardware supports other standard communication features such as 14,400 bps modem and fax.

70

Sample PlayLink Functions

```
/***** Player 1 *****/
playlink_call( );

/***** Player 2 *****/
playlink_ans( );

/***** Link *****/
playlink_handshake( );

/***** Game Play *****/
do {   playlink_data_tx( );
       gameloop();
       playlink_data_rx( );
       } while(!playlink_interrupt( ));

/***** Game Play End *****/
playlink_hangup( );
```

PlayLink Game Backward Compatibility list

| Name | Publisher |
| --- | --- |
| Doom | ID Software |
| Doom II | ID Software |
| Heretic | ID Software |
| Rise of the Triad | Apogee Software |
| Wacky Wheels | Apogee Software |
| Terminal Velocity | Apogee Software / 3D Realms |
| Dark Legions | Strategic Simulations (S.S.I) |
| Descent | Interplay |
| VR Pool | Interplay |
| Spectre VR | Velocity |
| Wing Commander Armada | Origin |
| Battledrome | Dynamix |
| One Must Fall | Epic Megagames |
| Machiavelli the Prince | MicroProse |
| Indycar | Papyrus |
| Nascar | Papyrus |
| Hardball IV | Accolade |
| Metal Marines | Mindscape |
| Power - The Game | Power Games |

71

PlayLink is a Trademark of Phylon, Inc. Windows is a registered trademark of Microsoft. The games mentioned are trademarks of their respective companies.

Phylon, Inc., privately held, develops technology and solutions for voice-band communications. Phylon communications technology is embedded in personal computer products, personal communications and consumer products and network systems worldwide. For more information, contact Phylon at 4027 Clipper Court, Fremont, CA 94538. Phone: (510) 656-2606. Fax: (510) 656-0902.

APPENDIX C

73
PHYLØN
*Safari* Chip-set
for Remote Gaming
| *Confidential* |
This document is proprietary to Phylon. As such, it is not to be copied, disclosed or delivered to any person other than the intended and designated receiver.

PHY1412 *Safari* Technical Data

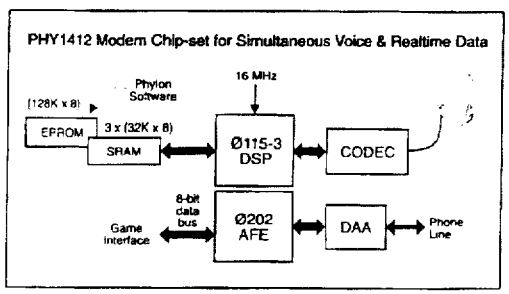

PHY1412 *Safari* Overview

The PHY1412 *Safari* chip-set provides simultaneous voice and realtime data communications on a single dial-up voice-band channel. It is particularly well suited for remote gaming applications.

The *Safari* incorporates Phylon's TruSpeed™ architecture that integrates industry standard modem functionality which includes defacto standard V.32terbo, ITU-T V.32bis and lower speeds for data, V.17 downward fax compatibility, and ADPCM voice compression/decompression at 14,400 bit/s.

The chip-set consists of the Ø115-3 DSP (Digital Signal Processor) and the Ø202 AFE (Analog Front End).

Each chip-set is available in both PLCC and TQFP packaging.

Features

- Simultaneous Voice & Realtime Data
- Remote gaming applications support:
  - Forward Error Detection
  - Smart connect automatic speed selection
  - Low data delay (critical for remote gaming)
  - Adjustable voice and data rates
  - Single button handshaking
  - Call waiting indications, local and remote
  - Dial & Talk through headset mode
- Programmable channel allocation for voice and data
- Modem standards: V.32terbo, ITU-T V.32bis, V.32, V.23, V.22bis, V.22, V.21, Bell 212A and 103 at data rates of 19200, 14400, 12000, 9600, 7200, 4800, 2400, 1200, and 0-300 bits/s in full duplex asynchronous operation.
- Automode interworking from V.32terbo or V.32bis to V.21/Bell 103 with auto-rate selection for V.32terbo/V.32bis/V.32
- Auto-retrain, auto-rate renegotiation and auto-rate selection for V.32terbo/V.32bis/V.32
- Universal Automatic call progress detection
- Group 3 FAX standards: V.33, V.17, V.29, V.27ter and V.21 Channel 2 with V.21 carrier detector concurrent with high-speed image data reception
- Adaptive Receive Line Signal Detectors
- Bell 202 caller identification (CID) receiver
- Calling tone detection for fax (1100 Hz), data (1300 Hz) and voice detection
- Voice compression & decompression with simultaneous DTMF detection
- Received signal quality and signal level monitors
  - Self-test
- Interfaces:
  - Parallel transmit and receive byte-based data interface
  - Constellation pattern analog interface
- Low power consumption (typical):
  - 900mW in active mode with external memory 80mW in sleep mode
- Temperature Range: Operating: 0°C to 70°C
  Storage: -65°C to 150°C

PHY1412 *Safari*

Supported Physical Layer Modes

The selectable physical layer configurations, along with the corresponding data rates, are listed below:

| CONFIGURATION | DATA RATE (bit/s) |
|---|---|
| V.32terbo | 19200, 16800 |
| V.32bis | 14400, 12000, 9600, 7200, 4800 |
| V.32 | 9600, 4800 |
| V.22bis | 2400 |
| V.22 | 1200 |
| V.23 | 75/1200, 1200/75 |
| V.21 | 0-300 |
| Bell 212A | 1200 |
| Bell 103 | 0-300 |
| V.33 | 14400, 12000 |
| V.17 | 14400, 12000, 9600, 7200 |
| V.29 | 9600, 7200, 4800 |
| V.27ter | 4800, 2400 |
| V.21 Channel 2 | 300 |
| Bell 202 Receiver | 1200 |
| Voice | 14400 |

NOTE: "V.32terbo" is a simple upgrade to ITU-T V.32bis to include 19200 and 16800 bit/s. All reference in this booklet to V.32bis is directly applicable to "V.32terbo".

Remote Gaming Mode

In this mode, voice is compressed and decompressed using ADPCM and communicated with realtime game data. Game data packets can be synchronous with a 60 Hz game frame rate. Forward error detection is provided for error free gaming. Realtime data is communicated with a very low data delay of 18ms end to end. The data packet sizes and voice sampling frequencies are programmable up to line speeds of 19200 bit/s. Call waiting detection and switching to Voice-only modes are provided in games Voice+data mode.

Data Encoding

The data encoding conforms to the V.32terbo and ITU-T recommendations V.32bis, V.32, V.22bis, V.22, V.23, V.21, Bell 212A, Bell 103, V.33, V.17, V.29, V.27ter, and V.21 Channel 2.

Transmitted Data Spectrum

When the compromise equalizer is disabled, the transmitter spectrum is shaped to satisfy the applicable ITU-T and Bell recommendations. Several selectable options are available for both amplitude and group delay transmit equalization.

Transmit Level

The output level can be attenuated in steps of 1 dB up to a maximum of 15 dB. With 0 dB attenuation selected, the differential transmit output level across the ATX+ and ATX- pins, for all modem configurations and the generation of tones, is 0.33 Vrms. Also with 0 dB attenuation selected and when generating DTMF signal pairs, the output level is 0.42 Vrms.

Transmitter Timing

Transmitter timing is selectable between internal (local or free running), external (locked to DTE clock XTCLK) or slave (locked to the receiver recovered clock RDCLK).

Scrambler/Descrambler

The chip-sets incorporate a self-synchronizing scrambler/descrambler in accordance with the applicable ITU-T or Bell standard and selected modem configuration.

Receiver Dynamic Range

The receiver satisfies performance requirements for a received line signal dynamic range of 34 dB. With the appropriate gain in the receiver path from the line, this dynamic range could be translated from -9 dBm to -43 dBm.

Receiver Baud Timing

The timing recovery circuit can track a ± 0.01% frequency error in the remote transmit timing source. For V.22bis, the timing recovery is capable of tracking ± 0.03% of frequency error.

Carrier Recovery

The carrier recovery circuit can track a ± 7 Hz frequency offset in the received carrier with negligible degradation in bit error rate (BER).

Forward Error Detection

Forward error detection for realtime game data is provided in Voice+data mode.

Auto-Mode Interworking

Auto-mode interworking, that conforms to both the ITU-T V.32bis Annex A recommendation and the EIA/TIA PN-2330 draft recommendation, is implemented to match line mode from V.32terbo to V.22bis/V.22 to V.23, V.21 or Bell 103.

Auto-Rate Selection

PHY1412 allows the controller to set a desired maximum bit error rate of $10^{-6}$, $10^{-5}$, or $10^{-4}$. During the handshake, retrain or rate renegotiation, the chipset will automatically select the highest available rate to satisfy the desired maximum bit error rate. This

PHY1412 *Safari* feature is only available in V.32terbo/V.32bis/V.32 mode. Optimum bit error rate selection is available in Remote Gaming mode.

Rate Negotiation and Rate Renegotiation
Implementation of rate negotiation and rate renegotiation complies with V.32terbo/V.32bis/V.32 recommendations. The controller can select the permissible line rates either before a rate negotiation is executed at the initial handshake, or later before a rate renegotiation is executed.

Retrain and Auto-Retrain/Auto-Rate Renegotiation
Retrain is implemented according to V.32terbo/V.32bis/V.32 and V.22bis recommendations. The PHY1412 also provides auto-retrain/auto-rate renegotiation functions, based on dynamically calculated thresholds. This, combined with auto-rate selection, ensures that the modem is operating near the optimum rate permitted by the line condition.

V.32 Self-Train Detection
V.32/V.32bis/V.32terbo modems can train on their own transmit signals if the remote modem unexpectedly goes on-hook. The PHY1412 drops RLSD when this condition is detected.

Performance Enhancements
Phase Jitter Canceller: In V.32terbo/V.32bis/V.32 modes, a phase jitter canceller is provided to track and cancel sinusoidal phase jitter of 10-120 Hz up to 20° peak-to-peak.

Phase Hit Compensator: A phase hit detector is provided in V.32terbo/V.32bis/V.32 modes to recover from phase hits that occur over poor phone lines.

Automatic Gain Control: Automatic gain control is provided in all modes to compensate for receive signal level fluctuations.

Equalizers: Equalization functions are provided to improve performance while operating over low quality lines. The transmit compromise equalizer is amplitude and delay selectable. An automatic adaptive equalizer is provided in the receiver.

Echo Canceller: A data echo canceller with near-end and far-end echo cancellation is included for 2-wire full duplex V.32 and V.32bis operation. The combined echo span of near and far cancellers is 47 ms. The bulk delay between near-end and far-end echoes can be up to 1.2 seconds. The canceller can compensate for ± 7 Hz frequency offset in the far-end echo.

Facsimile Modes

V.21 Channel 2 Detection: During operation in high speed FAX mode, V.21 Channel 2 carrier detection is provided to permit the robust tracking of the remote transmitter mode switching.

Echo Protection Tones: If enabled, unmodulated carrier tones of either 1700 Hz or 1800 Hz are automatically transmitted for 200 ms to disable network echo suppressors for V.33, V.17, V.29 and V.27ter half-duplex FAX modes.

Short Training: Short training is provided for V.27ter V.17 resynchronization is also provided. Both are automatically detected in the receiver.

ADPCM Voice Compression/Decompression
The ADPCM encoder samples the incoming speech on the receiver analog pin through the 12-bit A/D converter, at 7200 Hz. The voice signal is compressed to two bits per sample. Six flags (8-bit frames = 33 hex) are sent out to synchronize the start of the encoder. A silence detection flag is provided in the status register. Both the silence detection period and the threshold are programmable. The ADPCM decoder plays back the recorded compressed data at the same rate of 7200 Hz through the D/A converter; it appears on the transmit analog output pins.

Auto-Dialing/Auto-Answering/Call Progress
DTMF and pulse dialing, CID receiver, off hook relay control, ring detection, and call progress and tone detectors allow the controller to easily perform auto-dialing and auto-answering.

Tone Generation and Tone Detection: The chip-sets can generate voice-band tones from 0 to 3600 Hz with a resolution of 1.76 Hz. Tones over 3000 Hz are attenuated. Tone detection is supported through sixteen programmable detectors. A total of 16 narrow-band and wide-band tone detectors may be configured. The tone detectors are available for use when off line and during the initial part of the handshake.

DTMF Tone Generator and Detector: DTMF tone generation allows the PHY1412 to operate as a programmable DTMF dialer. DTMF tone-pairs are transmitted with a twist of 2.5 dB and a level of 2 dB above the programmed transmit output level. The chip-sets provide a DTMF tone detector which returns a tone-pair code to the controller. The coding supports 0-9, A-D, * and # digits.

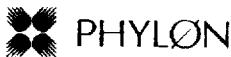 PHY1412 *Safari*

Caller Identification Receiver (CID): When in the CID receiver mode, the decoded Bell 202 (1200 bit/s) data is available via the parallel data interface.

Command/Response and Data Interface

The PHY1412 provides a byte wide interface for passing commands from and responses to the controller. The commands and responses are 16-bits wide and passed as two consecutive bytes.

Parallel Data Modes

Transmit and receive data is passed through the host interface port. This is referred to as "parallel data mode". Data bytes are passed in a format similar to commands and responses. Buffering up to 1K bytes is provided inside the chip-set. (Note: This buffering is distinct from the single word hardware buffers that form the byte-wide host interface port.) Commands can be used to solicit the status of the chip-set transmit buffer, or the status can be delivered automatically (unsolicited) when changes occur. Receive data status conditions are delivered in order with receive data bytes.

Bytes passed in parallel data mode can be handled in three distinct modes:

Parallel Synchronous: In this mode, transmit data bytes are passed directly to the modulator, and receive data bits are grouped into bytes and passed to the host. If no transmit data is available then the last data byte delivered to the chip-set is repeated.

Parallel Asynchronous: In this mode, start and stop bits are added to the data byte to be transmitted and deleted from the received character. No parity checking is done, and the character length is 10 bits. Upon transmit data underrun, binary 1's are automatically transmitted. Provisions are made to send and detect break patterns at any time.

Parallel Synchronous HDLC: Full-duplex high-level data link control (HDLC) protocol is supported in a parallel synchronous mode. In the transmitter, zero insertion is performed between flags. A 16-bit cyclic redundancy check (CRC) is computed with the polynomial $x^{16}+x^{12}+x^5+1$ and sent before end-of-frame (EOF). The frame is ended when the controller requests or, automatically upon underrun. Flags without zero-sharing are transmitted between frames if no transmit data is available. The Abort/Idle pattern may be transmitted at any time.

In the receiver, zero deletion is performed between flags. 16-bit CRC is computed and CRC remainder is checked at EOF. EOF and CRC status is indicated to the controller. Abort/Idle is detected and indicated to the controller.

Analog and Digital Loopback

The PHY1412 supports Analog Loopback (V.54 Loop 3), as well as both Local and Remote Digital Loopback (V.54 Loop 2). The implementation of these test modes are complete and do not require the controller to be involved in the different phases of V.54. For V.22bis, V.22 and Bell 212, Remote Digital Loopback follows V.22bis recommendations.

Hardware Interface Introduction

The PHY1412 comes in two package configurations:

- Two 68-Lead PLCC packages.

- Two TQFP plastic packages. one 80-Lead and one 64-Lead.

In the following section, the interface signals for the available configurations are described.

Interface Signals

A functional diagram and the related interface signals are shown in Figure 1. The interface signal description and characteristics are summarized in Tables 1, 2, 3, 4 and 5 below.

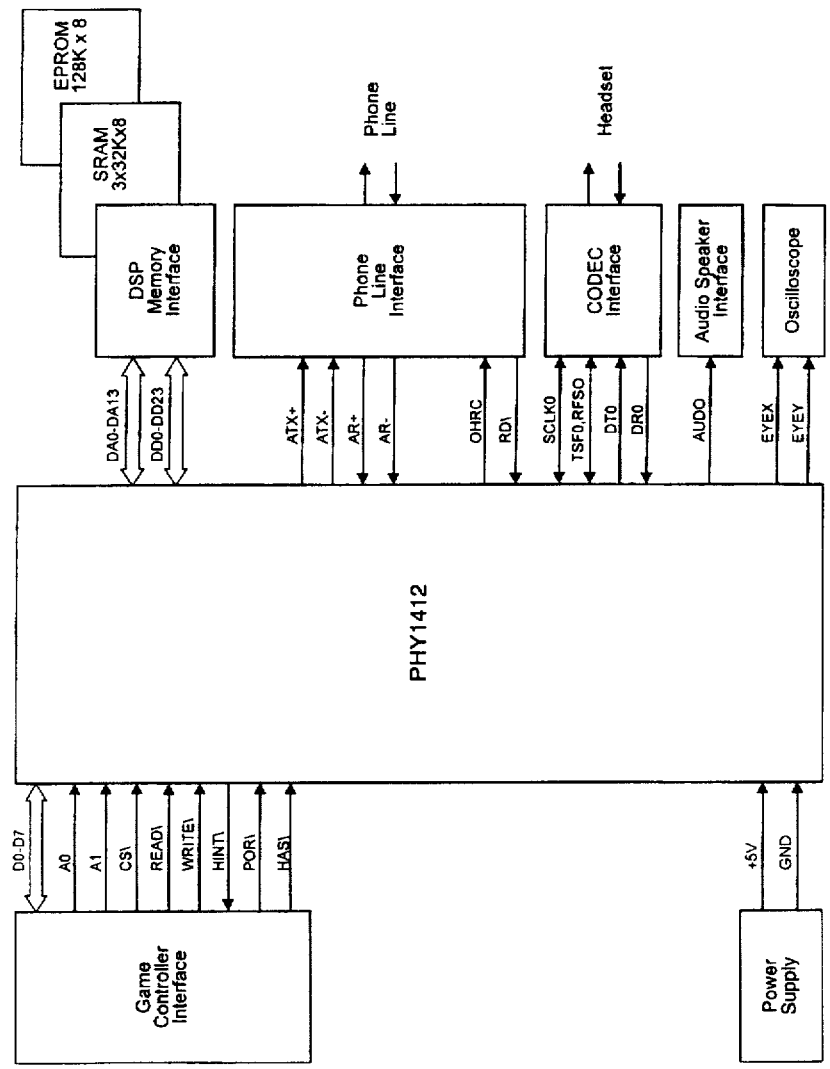
Figure 1. *Safari* Functional Block Diagram and Interface Signals

79

 PHYLØN                                              PHY1412 *Safari*

| NAME | TYPE | DESCRIPTION | NAME | TYPE | DESCRIPTION |
|---|---|---|---|---|---|
| Ground (A) | AGND | Analog Ground | ATX+,ATX- | AOB | Transmitter Analog Output |
| Ground (D) | DGND | Digital Ground | AR+, AR | AIB | Receiver Analog Input |
| +5V | PWR | +5V Supply | OHRC | OD | Off-Hook Relay Control |
|  |  |  | RD\ | IAAOB | Ring Detect |
| POR\ | IA | Power On Reset |  |  |  |
|  |  |  | EYEX | AOC | Constellation Output - X Axis |
| D7 | IA/OB |  | EYEY | AOC | Constellation Output - Y Axis |
| D6 | IA/OB |  |  |  |  |
| D5 | IA/OB | 8-bit | AUDO | AOB | Audio Output |
| D4 | IA/OB | Bidirectional |  |  |  |
| D3 | IA/OB | Bus |  |  |  |
| D2 | IA/OB |  |  |  |  |
| D1 | IA/OB |  |  |  |  |
| D0 | IA/OB |  |  |  |  |
| A0 | IA | Configuration Address 0 |  |  |  |
| A1 | IA | Configuration Address 1 |  |  |  |
| CS\ | IA | Chip Select |  |  |  |
| READ\ | IA | Read Enable |  |  |  |
| WRITE\ | IA | Write Enable |  |  |  |
| HINT\ | OC | Host Interrupt Request |  |  |  |
| HAS\ | IA | Host Acknowledge Strobe |  |  |  |

Table 1. PHY1412 Interface Signal Characteristics

| Symbol | Parameter | Units | Input/Output Type | | | | |
|---|---|---|---|---|---|---|---|
|  |  |  | IA | OA | OB | OC | OD |
| V(IH) | Input Voltage, High | V | 2.0 Min. |  |  |  |  |
| V(IL) | Input Voltage, Low | V | 0.8 Max. |  |  |  |  |
| V(OH) | Output Voltage, High | V |  | 3.5 Min.(1) | 3.5 Min.(1) | (5) | (5) |
| V(OL) | Output Voltage, Low | V |  | 0.4 Max.(2) | 0.4 Max.(3) | 0.4 Max.(2) | 0.75 Typ 2 |
| I(IN) | Input Current, Leakage | µA | ± 2.5 Max. |  |  |  |  |
| I(OH) | Output Current, High | mA |  | -0.1 Max. | -0.1 Max. |  | 0(4) |
| I(OL) | Output Current, Low | mA |  | 1.6 Max. | 0.8 Max. | 1.6 Max. | 15.0 Max |
| I(L) | Output Current, Leakage | µA |  | ± 10 Max. | ± 10 Max. |  |  |
| C(L) | Capacitive Load | pF | 5 |  |  |  |  |
| C(D) | Capacitive Drive | pF |  | 100 | 100 | 100 |  |
|  | Circuit Type |  | TTL | TTL 3-state | TTL 3-state | Open-Drain | Open-Drain |

Notes: 1. I Load = -100µA  2. I Load = 1.6mA  3. I Load = 0.8mA  4. µA leakage
5. Not greater than the +5V supply Table 2. PHY1412 Digital Signal Characteristcs

| Symbol | Unit | AOA | AOB | AOC | AIA | AIB |
|---|---|---|---|---|---|---|
| R(out) | Ohm | 5 | 5 | 10K |  |  |
| R(input) | Ohm |  |  |  | 50K | 150K |
| V(IH) | V |  |  |  | +2.5 | -3.75 |
| V(IL) | V |  |  |  | -2.5 | -1.25 |
| V(OH) | V | +2.5 | -3.75 | 5 |  |  |
| V(OL) | V | -2.5 | -1.25 | 0 |  |  |

Table 3. PHY1412 Analog Signal Characteristcs

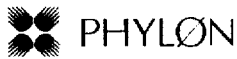 PHYLØN

**PHY1412 *Safari***

| Symbol | Parameter | Min | Max | Unit |
|---|---|---|---|---|
| $V_{DD}$ | Supply Voltage | 4.50 | 5.50 | V |
| $T_{AMB}$ | Ambient Operating Temperature | 0 | +70 | °C |

Table 4. PHY1412 Recommended Operating Conditions

---

ABSOLUTE MAXIMUM RATINGS*

Supply Voltage ................................................................. -0.3 V to +7 V
Input Voltage .................................................................. -0.3 V to $V_{DD}$ +0.3 V
Output Voltage Swing .................................................... -0.3 V to $V_{DD}$ +0.3 V
Operating Temperature Range (Ambient) .................... -55°C to +125°C
Storage Temperature Range ......................................... -65°C to +150°C
Lead Temperature (5 sec) PLCC ................................... +280°C

* Stresses above those listed under "Absolute Maximum Ratings" may cause permanent damage to the device. These are stress ratings only and functional operation of the device at these or any other conditions above those indicated in the operation sections of this manual is not implied. Exposure to absolute maximum rating conditions for extended periods may affect device reliability.

---

Table 5. PHY1412 Absolute Maximum Ratings

Power Dissipation

The PHY1412 typically dissipates less than 900mW. This figure includes the power dissipation of the external SRAM and EPROM. Additionally, the PHY1412 provides a sleep mode to reduce power consumption to 80mW. After the controller issues the sleep mode command, the chipset enters the sleep mode state, halting program execution and preserving all operating parameters. The chipsets can later be awakened by a POR\ reset pulse or a Software reset command.

The typical power dissipation distribution is shown below.

| | ACTIVE | | SLEEP | | |
|---|---|---|---|---|---|
| Description | mA | mW | mA | mW | Part No. |
| O202 | 25 | 125 | 6 | 30 | O202 |
| O115-3 | 55 | 275 | 9 | 45 | O115-3 |
| SRAM | 100 | 500 | 1 | 5 | Alliance P/N AS7C256-25 |
| EPROM | 0 | 0 | 0 | 0 | 27C010, 150ns |
| Total | 180 | 900 | 16 | 80 | |

PHY1412 Interchip Signals and Pinout
The PHY1412 pinout diagram is shown in Figure 2. The associated interconnect diagrams are shown as schematics in Figures 3 through 5. A recommended Bill of Materials follows the associated schematics.
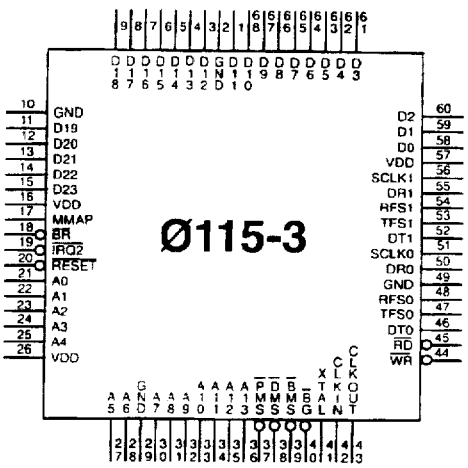
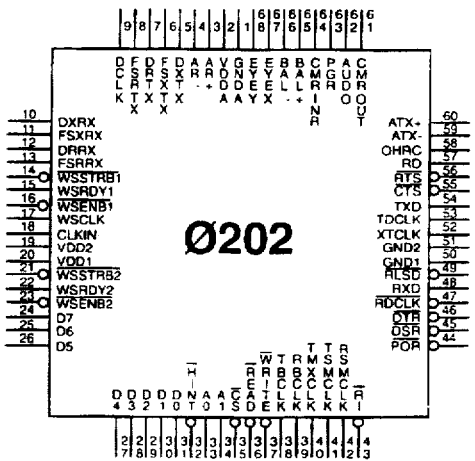
Figure 2. PHY1412 Pinout Diagrams
(PLCC Devices)

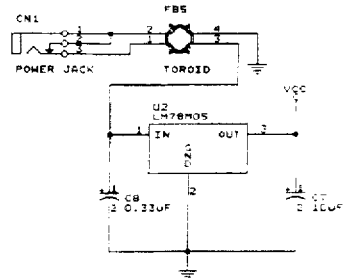
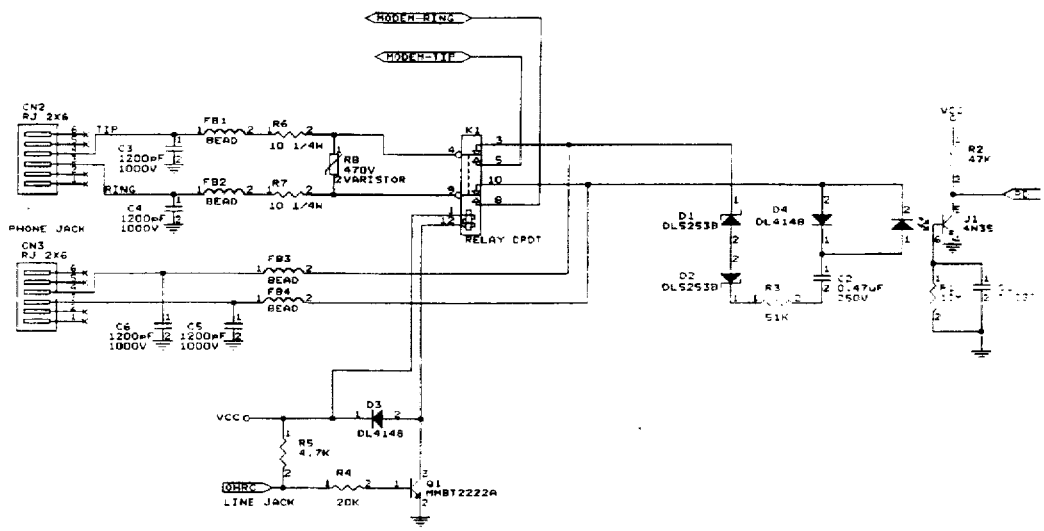
Figure 3. Power, Line Ciruits

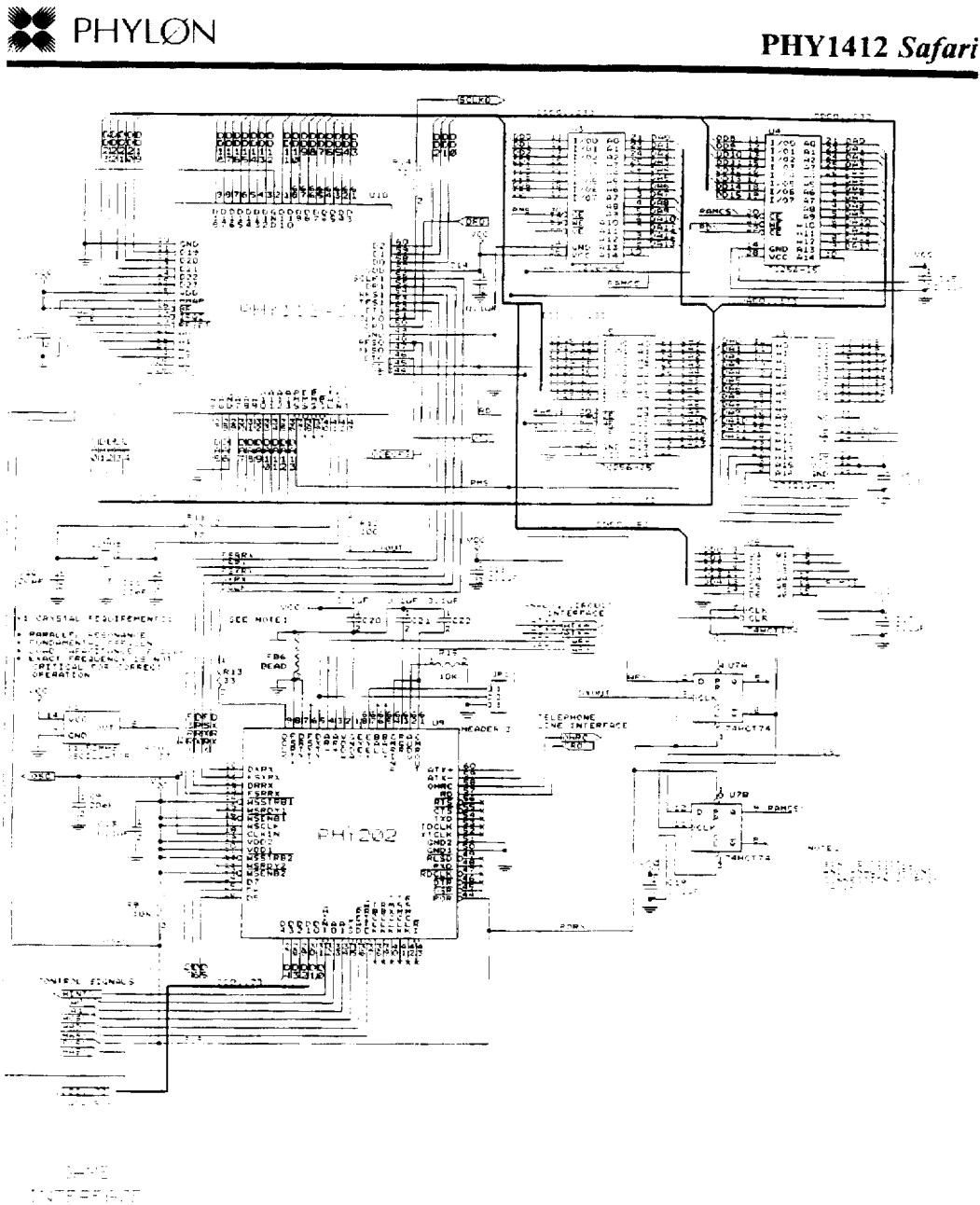
Figure 4. Chip-set Circuit

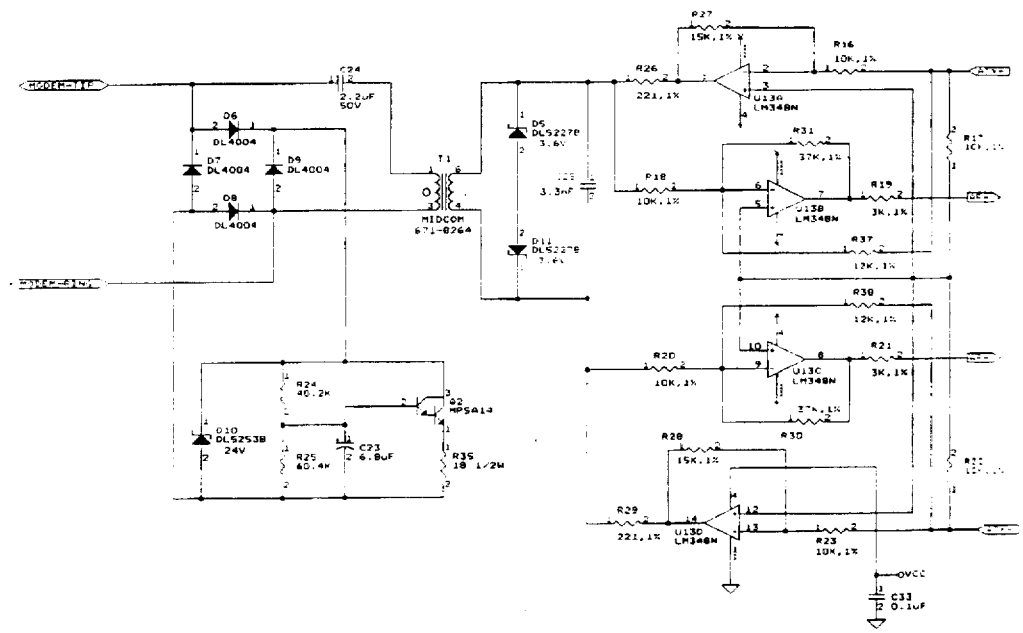
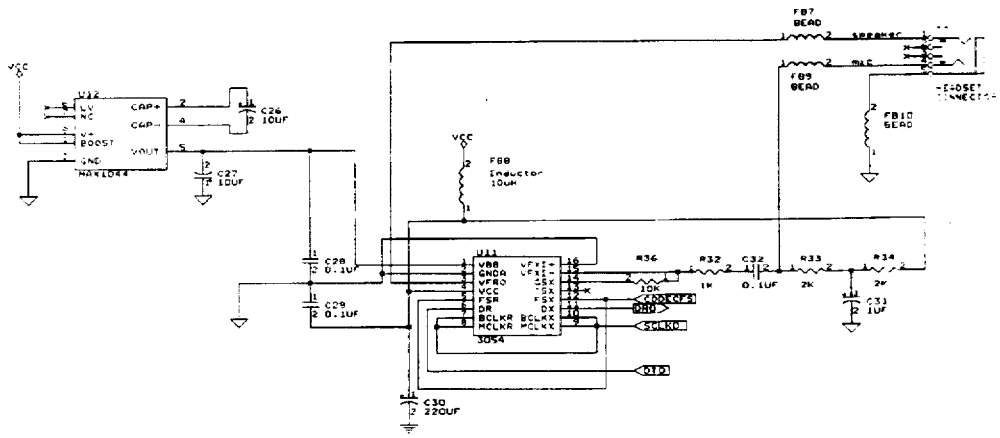
Figure 5. DAA, Voice Circuits

85

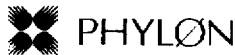 PHYLØN

PHY1412 *Safari*

1412 Bill of Materials, September 19, 1994

| QTY. | DESCRIPTION | MFR., PART NO. | SCHEM. REF. |
|---|---|---|---|
| 1 | Printed Circuit Board | -TBD- | - N/A - |
| 1 | Power Jack | CUI, PJ-002A | CN1 |
| 2 | Telephone Jack, 6 Contact, 4 Loaded | KYCON GL-N-64/RDIE 623PM-8 | CN2, CN3 |
| 1 | Stereo Head Phone Jack | SWT. 14B | J1 |
| 15 | Capacitor, 0.1µF, 50V, 5%, 1206 | PAN. ECUV1H104JBW | C12, C13, C14, C15, C16, C17, C18, C19, C20, C21, C22, C28, C29, C33, C33 |
| 4 | Capacitor, 1200pF, 1000V PTH | PAN. ECKD3A122KBN | C3, C4, C5, C6 |
| 3 | Capacitor, 10µF, 25V, 10%, PTH | PAN. ECSF1EE106K | C7, C26, C27 |
| 1 | Capacitor, 1.0µF, 25V,X SIZE | PAN. ECSH1VX105R | C31 |
| 3 | Capacitor, 20pF, 50V, 5%, 1206 | PAN. ECUV1H200JCM | C9, C10, C11 |
| 1 | Capacitor, 6.8µF, 25V, 10%, PTH | PAN. ECSF1EE685K | C23 |
| 1 | Capacitor, 2.2µF, 50V, NP PTH | PAN. ECQE1225KF | C24 |
| 1 | Capacitor, 0.33µF, 25V, 1812 | JOH. 250S43W334KV4E | C8 |
| 1 | Capacitor, 3300pF, 50V, 5%, 1206 | PAN. ECUV1H332KBM | C25 |
| 1 | Capacitor, 0.033µF, 50V, 5%, 1206 | PAN. ECUV1H333JBW | C1 |
| 1 | Capacitor, 0.47µF, 250V PTH | PAN. ECQE2474KF | C2 |
| 1 | Capacitor, 220µF, 16V PTH | PAN. ECEA1CGE221 | C30 |
| 2 | Diode, DL4148, DL-35 | DIO. DL4148 | D3, D4 |
| 4 | Diode, DL4004, DL-41 | DIO. DL4004 | D6, D7, D8, D9 |
| 3 | Zener Diode, DL5253, 25V, DL-35 | DIO. DL5253B | D1, D2, D10 |
| 2 | Zener Diode, DL5227B, 3.6V, DL-35 | DIO. DL5227B | D5, D11 |
| 8 | Ferrite Bead | STE. 28C0236-OEW | FB1, FB2, FB3, FB4, FB6, FB7, FB9, FB10 |
| 1 | INDUCTOR, 10µH, PTH | JWM. 9320-30 | FB8 |
| 1 | Toroid | ACT. 30037 | FB5 |
| 1 | Header, Male, .1", 3-Pin, Straight | MLX. 22-58-1503 | JP1 |

 PHYLØN  PHY1412 *Safari*

| QTY. | DESCRIPTION | MFR., PART NO. | SCHEM. REF. |
|---|---|---|---|
| 1 | Relay, DPDT | OMR, G6N-2N-DC5 | K1 |
| 1 | Transistor, MMBT2222A, SOT-23 | MOT, MMBT2222A | Q1 |
| 1 | Transistor, MPSA14, TO-226AA (TO-92) | MOT, MPSA14 | Q2 |
| 1 | Resistor, 100 ohm, 5%, 1/8W, 1206 | PAN, ERJ8GEYJ101V | R12 |
| 4 | Resistor, 33 ohm, 5%, 1/8W 1206 | PAN, ERJ8GEYJ330V | R10, R11, R13, R14 |
| 3 | Resistor, 10K-ohm, 5%, 1/8W 1206 | PAN, ERJ8GEYJ103V | R9, R15, R36 |
| 1 | MOV Resistor, 470V, PTH | PAN, ERZV07D471 | R8 |
| 1 | Resistor, 10M-ohm, 5%, 1/8W 1206 | PAN, ERJ8GEYJ106V | R1 |
| 1 | Resistor, 60.4K-ohm, 1%, 1/8W 1206 | PAN, ERJ8ENF6042V | R25 |
| 1 | Resistor, 40.2K-ohm, 1%, 1/8W 1206 | PAN, ERJ8ENF4022V | R24 |
| 2 | Resistor, 10-ohm, 5%, 1/4W, 1210 | ROHM, MCR25-PZH-J-100 | R6, R7 |
| 1 | Resistor, 18-ohm, 1/2watt, 5%, 2010 | ROHM, MCR50-PZH-J-180 | R35 |
| 1 | Resistor, 47K-ohm, 5%, 1/8W 1206 | PAN, ERJ8GEYJ473V | R2 |
| 1 | Resistor, 51K-ohm, 5%, 1/8W 1206 | PAN, ERJ8GEYJ513V | R3 |
| 1 | Resistor, 20K-ohm, 5%, 1/8W 1206 | PAN, ERJ8GEYJ203V | R4 |
| 1 | Resistor, 4.7K-ohm, 5%, 1/8W 1206 | PAN, ERJ8GEYJ472V | R5 |
| 2 | Resistor, 2K-ohm, 5%, 1/8W 1206 | PAN, ERJ8GEYJ202V | R33, R34 |
| 1 | Resistor, 1K-ohm, 5%, 1/8W 1206 | PAN, ERJ8GEYJ102V | R32 |
| 2 | Resistor, 221-ohm, 1%, 1/8W 1206 | PAN, ERJ8ENF2210V | R26, R29 |
| 6 | Resistor, 10K-ohm, 1%, 1/8W 1206 | PAN, ERJ8ENF1002V | R16, R17, R18, R20, R22, R23 |
| 2 | Resistor, 3K-ohm, 1%, 1/8W 1206 | PAN, ERJ8ENF3001V | R19, R21 |
| 2 | Resistor, 37.4K-ohm, 1%, 1/8W 1206 | PAN, ERJ8ENF3742V | R30, R31 |
| 2 | Resistor, 15K-ohm, 1%, 1/8 W 1206 | PAN, ERJ8ENF1502V | R27, R28 |
| 2 | Resistor, 12K-ohm, 1%, 1/8W 1206 | PAN, ERJ8ENF1202V | R37, R38 |
| 1 | Transformer | MID, 671-8264 | T1 |
| 1 | NPN Opto-Coupler, DIP6 | MOT, 4N35 | U1 |

87

 PHYLØN                                    PHY1412 *Safari*

| QTY. | DESCRIPTION | MFR., PART NO. | SCHEM. REF. |
|---|---|---|---|
| 1 | LM78M05 Voltage Regulator PTH | MOT. MC78M05CT | U2 |
| 3 | Static RAM 32Kx8, 25ns, SOJ28 | ALL. AS7C256-25JC | U3, U4, U5 |
| 1 | HEX D Flip-Flop, SOIC16 | NSC. 74HCT174SCQR | U6 |
| 1 | Dual D Flip-Flop, SOIC14 | NSC. 74HCT74SCQR | U7 |
| 1 | EPROM 128Kx8, 150ns, PLCC32 | ATM. AT27C010L-15JC | U8 |
| 1 | PHYLØN 202 Datapump, PLCC68 | PHY. PHY202P | U9 |
| 1 | PHYLØN 115-3 Datapump, PLCC68 | PHY. PHY115P-3 | U10 |
| 1 | CMOS CODEC, 3054, SOIC16 | NSC. TP3054WM | U11 |
| 1 | +5V to -5V, Voltage Converter, SOIC8 | MAX. MAX1044CSA | U12 |
| 1 | Quad 741 Op-Amp, DIP14 | NSC. LM348N | U13 |
| 1 | Oscillator, 11.52 MHz | MPS. 970H2C2A-11.52 | X1 |
| 1 | Crystal, 16 MHz | MPS. MS49N1C3A-16 | Y1 |
| 1 | SOCKET, PLCC32 | AMP. 821977-1 | U8 |

| MANUFACTURER ABREVIATIONS | | |
|---|---|---|
| ACT | = | Associated Components Technology |
| ALL | = | Alliance |
| AMP | = | AMP |
| ATM | = | Atmel |
| CUI | = | CUI STACK |
| DIO | = | Diode |
| JOH | = | Johnson Dielectric |
| JWM | = | J.W. Miller, Bell Industries |
| KYCON | = | KYCON |
| MAX | = | Maxim |
| MID | = | Midcom |
| MLX | = | Molex |
| MOT | = | Motorola |
| MPS | = | Monitor Products |
| NSC | = | National Semiconductor |
| OMR | = | OMRON |
| PAN | = | Panasonic |
| PHY | = | Phylon |
| ROHM | = | ROHM |
| STE | = | STEWARD |
| SWT | = | SWITCHCRAFT |

PHY1412 *Safari*
Mechanical Dimensions
The mechanical dimensions of the PHY1412 (PLCC) is shown in Figure 6, below.
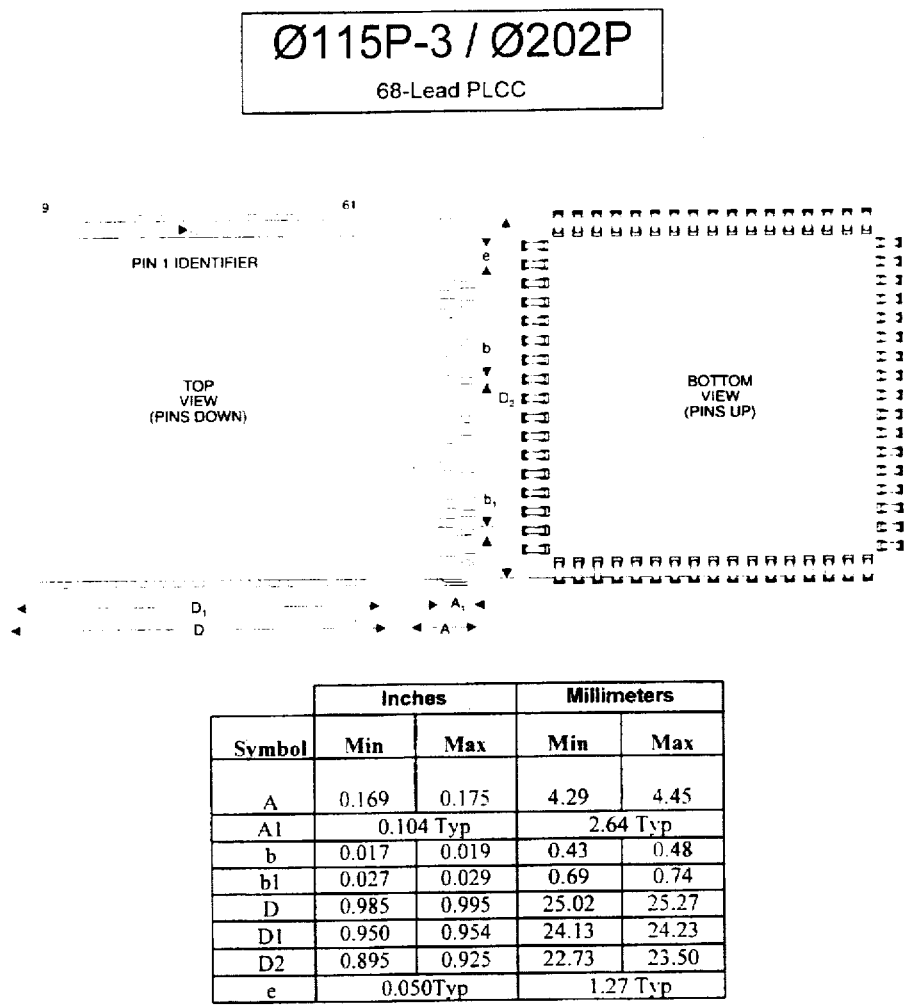
| Symbol | Inches | | Millimeters | |
|---|---|---|---|---|
| | Min | Max | Min | Max |
| A | 0.169 | 0.175 | 4.29 | 4.45 |
| A1 | 0.104 Typ | | 2.64 Typ | |
| b | 0.017 | 0.019 | 0.43 | 0.48 |
| b1 | 0.027 | 0.029 | 0.69 | 0.74 |
| D | 0.985 | 0.995 | 25.02 | 25.27 |
| D1 | 0.950 | 0.954 | 24.13 | 24.23 |
| D2 | 0.895 | 0.925 | 22.73 | 23.50 |
| e | 0.050 Typ | | 1.27 Typ | |
Figure 6. PHY1412 Outline Dimensions (PLCC Devices)

89

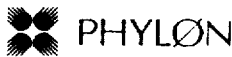
PHY1412 *Safari*

Command Summary

The software interface between the controller and the *Safari* DSP has a command-response format. These commands are used to setup the operating parameters and the activation of functions such as generation of DTMF tones for dialing, detection of tones for call progress detection, modem parameters, start and stop of modem handshake, request modem status, reset, etc. A listing of the applicable commands and execution codes is as follows:

| Command/Response | Code | Command/Response | Code |
|---|---|---|---|
| Set-up/Configuration | | Modem Handshake | |
| Set Configuration Word 1 | 2NNN | Initiate Handshake | 8000 |
| Set Configuration Word 2 | 3NNN | Report Handshake Status | 8100 |
| Set Audio Level | 0N02 | Abort Handshake/Cleardown | 9000 |
| Set Lower/Upper Ring Detect Freq. | ACNN/ AFNN | Report V.24 / V.21 Ch. 2 Status | A0C0 |
| Set Off Hook Relay Control | A040/ A060 | Half-Duplex | |
| | | Enable Transmitter Long | 9200 |
| Set V.24/V.21 Ch2 Status Interrupt Mask | A3NN | Enable Transmitter short | 9210 |
| | | Disable Transmitter | 9201 |
| | | Enable Receiver | 9202 |
| Send/Detect Tones | | Disable Receiver | 9203 |
| Transmit Single Tone | 7NNN | | |
| Silence Transmitter | A000 | Fax Handshake | |
| Configure Tone Detector | 4NNN/ 5NNN | Start Sending a Fax | 9300 |
| | | Start Receiving a Fax | 9301 |
| Report TDD Tone Detector Status | 6A0N | Set Pointer to Remote Capabilities | 9410 |
| Configure Tone Detector | 5FFF | Set Pointer to Local Capabilities | 9411 |
| Report TDD Tone Detector Status | 6A1N | Set Pointer to FRID | 9412 |
| Enable-Report DTMF Detector | 6800 | Set Pointer to FLID | 9413 |
| Transmit DTMF Tone Pair | 600N | Read Consecutive Capabilities/ID | 9500 |
| | | Write Consecutive Capabilities/ID | 96NN |
| Dialing/Call Progress | | Transmit Page Flush and Send RTC | 9700 |
| Transmit Call Progress Tone | 8A0N | Receive Page Flush | 9701 |
| Set Dial Mode | 8A1N | Set Multiple Page | 980N |
| Dial Number/Transmit DTMF Tone | 8A2N | Report Multiple Page Status | 9820 |
| Enable-Report Call Progress Detector | 8C00 | Start Page Transmission | 9830 |
| Enable-Report Dial Tone Detector | 8C01 | Retrain | 9831 |
| | | Start Page Reception | 9840 |
| Voice + Data | | Report T.30 Status | 9850 |
| Turn ON Voice+Data Mode/Line to Headset | B000 | | |
| Turn OFF Voice+Data Mode/Line to Headset | B0FF | Voice | |
| Set Voice Sampling Frequency | B30N | Enable Voice Encoder | 6880 |
| Set Voice Block Size | B40N | Disable Voice Encoder | 6881 |
| Set Data Block Size for Realtime Data | B5NN | Enable Voice Decoder | 6882 |
| Select Realtime/non-realtime Data | B60N | Disable Voice Decoder | 6883 |
| Set Volume Control for Voice | BA0N | Set Voice Encoder Gain | 68AN |
| Flash Hook | A0A0 | Set Voice Decoder Attenuation | 0N01 |
| Call Waiting Response* | B1FF | | |
| Line Interrupt Response* | A4NN | | |
| Ready to Transmit Data* | A4NN | | |
| Ready to Receive Data* | A4NN | | |

PHYLØN  PHY1412 *Safar*

| Command/Response | Code | Command/Response | Code |
|---|---|---|---|
| Parallel Data | | Test | |
| Parallel Tx/Rx Data* | F0NN | Initiate Local Analog Loop | E002 |
| Set TX Data Control | F10N | Initiate Remote Digital Loopback | E003 |
| Set Parallel Interrupt Mask | F20N | Initiate Local Digital Loopback | E004 |
| Report Parallel/HDLC Status* | F300 | Transmit Modulated Carrier | E005 |
| Forward Error Check* | F301/ F311 | Terminate test | E000 |
| | | Miscellaneous | |
| Diagnostics | | Enable/Disable Command Echo Back | 0N0F |
| Report Mean Square Error (MSE) | C000 | Initiate-Report Software Reset | D002 |
| Report Receive Signal Level | C005 | Enable Standby Mode | DD00 |
| | | Enable Sleep Mode | DD01 |
| | | Report Software Version | DDD0 |
| * Indicates an unsolicited response that causes an interrupt. | | Report Product Code | DDD1 |
| | | Self Test Response* | B8NN |

91

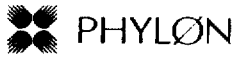 PHYLØN                                                                                    PHY1412 *Safari*

Complete Command and Response Descriptions

Set-Up / Configuration Commands

Set Configuration Word 1                                                                                    2NNN hex function: This command writes 12 bits to the modem Configuration Word 1. The meaning and function of these bits are described below.

response: The command is echoed back within 1.2 ms after it was written.

related commands:   Set Configuration Word 2 default:   2480 hex

| | Bit: | 11 | 10 | 9 | 8 | 7 | 6 | 5 | 4 | 3 | 2 | 1 | 0 |
|---|---|---|---|---|---|---|---|---|---|---|---|---|---|
| Answer/Originate Mode | | 0/1 | | | | | | | | | | | |
| Accept/Reject Remote Loop Request | | | 0/1 | | | | | | | | | | |
| Reserved | | | | 0 | 0 | | | | | | | | |
| Enable/Disable Call Waiting | | | | | | | 1/0 | | | | | | |
| Reserved | | | | | | | | 0 | | | | | |

| Modem Type | Data Rate(bit/s) | Modulation | | | | | | | | | | | |
|---|---|---|---|---|---|---|---|---|---|---|---|---|---|
| | | Bit: | 11 | 10 | 9 | 8 | 7 | 6 | 5 | 4 | 3 | 2 | 1 | 0 |
| Simultaneous Voice+Data/ V.32terbo/ V.32bis/V.32 | 19200 - 4800 | QAM-TCM | | | | | | | 0 | 0 | 0 | 0 | 0 | 0 |
| V.22bis | 2400 | QAM | | | | | | | 0 | 0 | 0 | 0 | 1 | 1 |
| V.22 | 1200 | DPSK | | | | | | | 0 | 0 | 0 | 1 | 0 | 0 |
| Bell 212A | 1200 | DPSK | | | | | | | 0 | 0 | 0 | 1 | 1 | 0 |
| V.21 | 0-300 | FSK | | | | | | | 0 | 0 | 0 | 1 | 1 | 1 |
| Bell 103 | 0-300 | FSK | | | | | | | 0 | 0 | 1 | 0 | 0 | 0 |
| V.23 | Tx:0-75;Rx:0-1200 | FSK | | | | | | | 0 | 0 | 1 | 0 | 0 | 1 |
| V.23 | Tx:0-1200;Rx:0-75 | FSK | | | | | | | 0 | 0 | 1 | 0 | 1 | 0 |
| Bell 202 | 0-1200 | FSK | | | | | | | 0 | 0 | 1 | 0 | 1 | 1 |
| V.33 | 14400 | QAM-TCM | | | | | | | 0 | 1 | 0 | 0 | 0 | 0 |
| V.33 | 12000 | QAM-TCM | | | | | | | 0 | 1 | 0 | 0 | 0 | 1 |
| V.29 | 9600 | QAM | | | | | | | 0 | 1 | 0 | 0 | 1 | 0 |
| V.29 | 7200 | QAM | | | | | | | 0 | 1 | 0 | 0 | 1 | 1 |
| V.29 | 4800 | DPSK | | | | | | | 0 | 1 | 0 | 1 | 0 | 0 |
| V.27ter | 4800 | DPSK | | | | | | | 0 | 1 | 0 | 1 | 0 | 1 |
| V.27ter | 2400 | DPSK | | | | | | | 0 | 1 | 0 | 1 | 1 | 0 |
| V.17 | 14400 | QAM-TCM | | | | | | | 1 | 1 | 0 | 0 | 0 | 0 |
| V.17 | 12000 | QAM-TCM | | | | | | | 1 | 1 | 0 | 0 | 0 | 1 |
| V.17 | 9600 | QAM-TCM | | | | | | | 1 | 1 | 0 | 0 | 1 | 0 |
| V.17 | 7200 | QAM-TCM | | | | | | | 1 | 1 | 0 | 0 | 1 | 1 |
| V.21 Ch2 | 300 | FSK | | | | | | | 1 | 0 | 0 | 0 | 0 | 0 |
| Voice Mode | 14400 | ADPCM | | | | | | | 1 | 1 | 1 | 0 | 0 | 0 |

Bit 11:   Answer/Originate - selects the answer mode or call mode handshake sequence for the modem type selected. This should only be changed when the modem is off-line.

Bit 10:   Accept/Reject Remote Loop Request - this will allow or disallow response to remote digital loopback when requested by the far-end modem. This is valid for V.32terbo/V.32bis/ V.32, V.22bis, V.22 and Bell 212 modem types. This may be changed at any time.

Bits 9-8: Reserved - this bit is reserved for future use and should be set to 0.

Bit 7: Enable/Disable Call Waiting - this bit enables/disables Call Waiting. If an unsolicited call waiting is detected following enable, a response of B1FF will be returned. When call waiting is enabled, both the Auto-retrain/Rate Renegotiation and Adaptive MSE/RLSD Threshold bits in Configuration Word 2 (bits 6.0) must be set to 1 (disabled).

Bit 6: Reserved - this bit is reserved for future use and should be set to 0.

Bits 5-0: Communication Type - these 6 bits select the communications type desired.

Set Configuration Word 2                                              3NNN hex function: This command writes 12 bits to the modem Configuration Word 2. The meaning and function of these bits are described below.

response: The command is echoed back within 1.2 ms after it was written.

related commands:   Set Configuration Word 1 default:   3953 hex

| Bit: | 11 | 10 | 9 | 8 | 7 | 6 | 5 | 4 | 3 | 2 | 1 | 0 |
|---|---|---|---|---|---|---|---|---|---|---|---|---|
| Reserved | 0 | | | | | | | | | | | |
| No Tones | | 0 | 0 | | | | | | | | | |
| Echo Protection Tone ON | | 1 | 1 | | | | | | | | | |
| Enable/Disable Auto-mode | | | | 0/1 | | | | | | | | |
| Reserved | | | | | 0 | | | | | | | |
| Enable/Disable Auto-retrain/Rate Renegotiation | | | | | | 0/1 | | | | | | |
| Asynchronous Normal | | | | | | | 0 | 0 | | | | |
| Asynchronous Extended/HDLC | | | | | | | 0 | 1 | | | | |
| Reserved | | | | | | | 1 | 0 | | | | |
| Synchronous | | | | | | | 1 | 1 | | | | |
| Reserved | | | | | | | | | 0 | 0 | | |
| Reserved | | | | | | | | | | | 1 | |
| Reserved | | | | | | | | | | | | 0 |

Bit 11: Reserved.

Bits 10-9: Tones Selection - these two bits allow the generation of tones for echo protection tone for V.33, V.17, V.29 and V.27ter half-duplex modes. For other modem types, no tone (00) should be selected. These bits should only be changed when the modem is off line.

Bit 8: Enable/Disable Auto-mode - this feature supports Annex A of V.32terbo/V.32bis/V.32 ITU-T recommendations and EIA PN-2330 (draft proposal) for automode handshake which allows the PHY1412 to automatically determine the mode of the far-end modem during handshake and to reconfigure itself appropriately. This feature works if the far-end modem is a V.32terbo/V.32bis/V.32, V.22bis, V.22, V.21, V.23, Bell 212A or Bell 103.

Bit 7: Reserved.

 **PHY1412 *Safari***

Bit 6: <u>Enable/Disable Auto-retrain and Auto-rate Renegotiation</u> - if this feature is enabled, the PHY1412 will initiate a retrain or a rate renegotiation if the actual mean square error (MSE), which represents signal quality, is higher or lower than a dynamically set threshold.

Bits 5-4: <u>Async/Sync Select</u> - these bits are use to select asynchronous and synchronous operation as indicated in Table 6.

| Configuration Word 2 | | |
|---|---|---|
| Bit 5 | Bit 4 | Function |
| 0 | 0 | Parallel Async 10-bit Character |
| 0 | 1 | Parallel Sync w/HDLC |
| 1 | 0 | Reserved |
| 1 | 1 | Parallel Sync Bit Stream |

Table 6. Async/Sync Selection

Bits 3-0: <u>Reserved</u>.

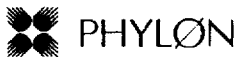 PHY1412 *Safari*

Set Audio Level                                                                                                   0N02 hex function: This command sets the audio output level on pin AUDO to OFF, LOW, MEDIUM and HIGH level. The output level is programmed by command variable N as follows:

N = 0 ; Level = off
        N = 1 ; Level = low
        N = 2 ; Level = medium
        N = 3 ; Level = high response: The command is echoed back within 1.2 ms after it was written.

related commands: none default: 0002 hex

Set Transmit Signal Attenuation                                                                                   0N01 hex function: This command allows the transmit signal level on pins AT+/AT- to be programmed over a range of 15 dB in 1 dB steps. The output is set to N dB below the maximum level (0.33 Vrms) where N is the second most significant hex digit of the command. For example, 0A01 hex will give a transmit level 10 dB below the maximum level. This command may be executed at any time. The specified attenuation remains unchanged until a new Set Transmitter Attenuation command is received or until the PHY1412 is reset.

response: The command is echoed back within 1.2 ms after it was written.

related commands: Set Voice Decoder Attenuation is an identical command.

default: 0001 hex

Set Lower/Upper Ring Detect Frequencies                                                                           ACNN/AFNN hex function: These two commands are used to program the ring frequency detection range. They set the lower and upper frequency limits. Default frequency values are 15 and 68 Hz. The command assumes the form:

1010 11wb bbbb bbb0 where:    w = 0 indicates the lower frequency limit
                    w = 1 indicates the upper frequency limit
                    b is an 8-bit Binary value representing low or high limit

- Set Lo*w Frequency Limit $f_L$:     $b = \dfrac{1800}{f_L}$

Example:    Set low frequency limit to 30 Hz
                       b = 60 decimal or 0011 1100 hex
                       Command = 1010 1100 0111 1000 or AC78 hex

- Set High Frequency Limit $f_H$:     $b = \dfrac{7200}{f_H}$

Example:    Set high frequency limit to 136 Hz
                       b = 53 decimal or 0011 0101
                       Command = 1010 1110 0110 1010 or AE6A hex

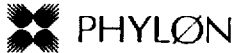 PHY1412 *Safari* response: The command is echoed back within 1.2 ms after it was written.

related commands: none default: ACF0 hex and AED4 hex (USA)

Set Off Hook Relay Control                                A040/A060 hex function: This command is used to set/unset the Off Hook Relay Control (OHRC):

1010    0000    01[OHRC]0    0000

The OHRC bit sets or clears the OHRC pin if set to a 1 or a 0 respectively.

response: The command is echoed back within 1.2 ms after it was written.

related commands: None default: A040 hex

Set V.24 Status Interrupt Mask                                        A3NN hex function: This command is used to mask unsolicited responses caused by transitions in the V.24 Status Register and is of the form:

1010    0011    1[V.21][RI\]1    11[CTS\][RLSD\]

where a binary one will mask transitions and a binary zero will unmask them. The default is that all transitions are masked. When any one or more bits are unmasked, the related transitions will cause an unsolicited Report of V.24/V.21 Ch. 2 Status in the form A4NN, where NN in binary form corresponds to the status of the V.24 and V.21 Ch. 2 in the same order shown above.

response: The command is echoed back within 1.2 ms after it was written.

related commands: Report V.24 / V.21 Ch. 2 Status default: A3FC hex

Send/Detect Tones Commands

Transmit Single Tone                                              7NNN hex function: This causes the transmitter to generate a tone. The tone is transmitted at the nominal transmit level of 0.33 Vrms. Tone transmission will commence 0.8 ms after the command was written. The tone will continue until a different transmit tone command, a transmit DTMF tone pair command, a silence transmitter command, a start handshake command is issued, or the PHY1412 is reset. The required decimal value of NNN is given by:

2048 x (tone freq. in Hz)/3600

Example:    2100 Hz Tone
                            2100 x 2048/3600 = 1194
                            Command is 74AA hex

PHY1412 *Safari* response: The command is echoed back within 1.2 ms after it was written.

related commands: Dial Number/Transmit DTMF Tone pair
Silence Transmitter
Initiate Handshake default: N/A

Silence Transmitter                                                A000 hex function: This command causes the PHY1412 to stop transmission. The transmitter will go silent 0.8 ms after this command is written to the PHY1412. It should only be used to end transmission of tones or DTMF tone pairs. The Abort Handshake/Cleardown or Disable Transmitter Commands must be used to terminate a handshake or end a data connection.

response: The command is echoed back within 1.2 ms after it was written.

related commands: Dial Number/Transmit DTMF Tone pair
Transmit Single Tone
Transmit Call Progress Tone
Abort Handshake/Cleardown
Disable Transmitter default: N/A

Configure Tone Detector                                            4NNN/5NNN hex function: Up to 16 tone detectors can be configured consecutively with 4NNN and 5NNN commands. The execution of this block of commands occurs simultaneously, and the results are valid 25 ms after issuing the command. A Configure Tone Detector 5NNN command acts as an end to the block of commands. The next 4NNN command would configure the first detector again.

The tone detectors are individually configurable as narrow or wide. The frequency response of the two types are shown in Table 9. Note that a maximum of 8 each are allowable. This tone detector is available for use when the modem is off-line and during the initial part of the handshake sequence. The required decimal value of NNN is given by:

$2048 \times$ (center freq. in Hz)/3600 for narrow bandwidth
$2048 + (2048 \times$ (center freq. in Hz)/3600) for wide bandwidth Example: 2100 Hz Center Frequency, wide bandwidth
$2048 + (2100 \times 2048/3600) = 3242$ decimal
Command is 4CAA hex Example: Configure 4 tone detectors block:

| | |
|---|---|
| 4NNN | Tone Detector 1 |
| XXXX | Other Commands |
| 4NNN | Tone Detector 2 |
| XXXX | Other Commands |
| 4NNN | Tone Detector 3 |
| XXXX | Other Commands |
| 5NNN | Tone Detector 4, End of Block | response: The command is echoed back within 1.2 ms after it was written.

PHY1412 *Safari* related commands: Configure Tone Detector
Report Tone Detector Status default: N/A

|  | -1 dB BW, Hz | -3 dB BW, Hz | -30 dB BW, Hz |
|---|---|---|---|
| Narrow Detector | 30 | 50 | 140 |
| Wide Detector | 100 | 180 | 500 |

Table 9. - Filter Characteristics

Report Tone Detector Status 6A0N hex function: This command causes the PHY1412 to return a 16-bit measurement of the energy in the frequency band selected with Tone Detector number N (N = 0 to 15). The detector will return a measure of energy in the form of NNNN hex. The maximum value returned is 7FFF hex which corresponds to the maximum receive signal present on the AR+ and AR- inputs. Each 3 dB drop in the signal level will cause the measured value to decrease by a factor of two. The measurement is valid 25 ms after configuring the tone detector. If the tone detector is not configured, or is unavailable, a value of FFFE hex will be returned.

response: A response is returned within 1.2 ms after it was written.

related commands: Configure Tone Detector default: N/A

Tone Detector Level Report (in dB)

| 7FFF | = | Full-scale signal level (0 dB) | 01FF | = | -18 |
|---|---|---|---|---|---|
| 3FFF | = | -3 | 00FF | = | -21 |
| 1FFF | = | -6 | 007F | = | -24 |
| 0FFF | = | -9 | 003F | = | -27 |
| 07FF | = | -12 | 001F | = | -30 |
| 03FF | = | -15 | 000F | = | -33 |

Configure TDD Tone Detector 5FFF hex function: This command configures the TDD (Telecommunications Device for the Deaf) tone detector. Results are valid 10ms after issuing the command. Table 5.3.2.-2 indicates frequency response.

response: The command is echoed back within 1.2 ms after it was written.

related commands: Report TDD Tone Detector Status default: N/A

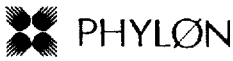
PHY1412 *Safari*

|  | -1 dB BW, Hz | -3 dB BW, Hz | -30 dB BW, Hz |
|---|---|---|---|
| TDD | 80 | 140 | 350 |

Table 10. - Filter Characteristics (TDD)

Report TDD Tone Detector Status                                                                6A1N hex function: This command causes the PHY1412 to return a 16-bit measurement of the energy in the frequency band of the TDD Tone Detector. The detector will return a measure of energy in the form of NNNN hex. The maximum value returned is 7FFF hex which corresponds to the maximum receive signal present on the AR+ and AR- inputs. Each 3 dB drop in the signal level will cause the measured value to decrease by a factor of two. The measurement is valid 10 ms after configuring the tone detector. If the tone detector is not configured, or is unavailable, a value of FFFE hex will be returned.

N = 0:      1400 Hz power
        N = 1:      1800 Hz power response: A response is returned within 1.2 ms after it was written.

related commands:   Configure TDD Tone Detector default: N/A

Tone Detector Level Report (in dB)

| 7FFF | = | Full-scale signal level (0 dB) | 01FF | = | -18 |
|---|---|---|---|---|---|
| 3FFF | = | -3  | 00FF | = | -21 |
| 1FFF | = | -6  | 007F | = | -24 |
| 0FFF | = | -9  | 003F | = | -27 |
| 07FF | = | -12 | 001F | = | -30 |
| 03FF | = | -15 | 000F | = | -33 |

Enable-Report DTMF Detector                                                                    6800 hex function: This command starts the DTMF tone detector and returns the status of the detector with a response of 000N hex. The least significant digit of the response reports the DTMF tone pair received as follows:

N = 0 1 2 3 4 5 6 7 8 9 A B C D E F

DTMF Tone Pair = 0 1 2 3 4 5 6 7 8 9 * # A B C D

If no digit is detected, a response of FFFE hex is returned. The digit detected is held until it is read by the controller or another digit is detected.

response: A response is returned within 1.2 ms after it was written.

related commands:   none default:   N/A

99

 PHY1412 *Safari*

Transmit DTMF Tone-pair                                                                      600N hex function: This command causes the transmitter to generate a DTMF tone-pair that corresponds to a selected digit. The DTMF tone pair is transmitted with a twist of 2.5 dB and at a level of 2 dB above the nominal transmit level of 0.33 Vrms. The high- frequency group signal is +2.5 dB above the low frequency group signal. DTMF transmission will commence 0.8 ms after the command was written to the PHY1412. Transmission will continue until the PHY1412 receives a different Transmit DTMF Tone-Pair command, a Transmit Single Tone command, a Silence Transmitter command, an Initiate Handshake command, or is reset. The least significant digit of the command selects the DTMF tone pair as follows:

N = 0 1 2 3 4 5 6 7 8 9 A B C D E F

DTMF Tone Pair = 0 1 2 3 4 5 6 7 8 9 * # A B C D

The digit detected is held until it is read by the controller or another digit is detected.

response: A response is returned within 1.2 ms after it was written.

related commands:  Dial Number Transmit DTMF Tone
Transmit Single Tone
Silence Transmitter
Initiate Handshake default:N/A

Dialing/Call Progress Commands

Transmit Call Progress Tone                                                                  8A0N hex function: This command is used to transmit call progress tones. The command is of the form 8A0N hex, where N denotes the respective tone. To stop transmitting calling tones, the Silence Transmitter command (A000) must be used.

N:  0   Calling tone (1100 Hz) (0.5s on, 3s off, repeat)
    1   Calling tone (1300 Hz) (0.5s on, 2s off, repeat)
    2   Answer tone (2100 Hz) (4s on, no repeat)
    3   Answer tone (2225 Hz) (4s on, no repeat)

response: The command is echoed back within 1.2 ms after it was written.

related commands:   Silence Transmitter default:   N/A

Set Dial Mode                                                                                8A1N hex function: This command is used to set up the dial mode to DTMF or pulse dialing. The command is of the form 8A1N hex, where N denotes the respective mode.

N:  0   DTMF 75 ms on, 75 ms interdigit delay
    1   Pulse dialing with Make/Break ratio 39%/61%, 10pps, IDD=700ms
    2   Pulse dialing with Make/Break ratio 33%/67%, 10pps, IDD=700ms
    3   Pulse dialing with Make/Break ratio 39%/61%, 20pps, IDD=500ms
    4   Pulse dialing with Make/Break ratio 33%/67%, 20pps, IDD=500ms

PHY1412 *Safar* response: The command is echoed back within 1.2 ms after it was written.

related commands: Dial Number default: 8A10 hex

Dial Number/Transmit DTMF Tone                                                        8A2N hex function: This command is used to dial a digit based on the mode selected using the Set Dial Mode. The command is of the form 8A2N hex, where N denotes the digit. The status of digit dialing can be determined through the use of the Report Call Progress Detector command. This command also selects the modem to be a call originating modem.

$$N = 0\ 1\ 2\ 3\ 4\ 5\ 6\ 7\ 8\ 9\ A\ B\ C\ D\ E\ F$$

$$\text{Number} = 0\ 1\ 2\ 3\ 4\ 5\ 6\ 7\ 8\ 9\ *\ \#\ A\ B\ C\ D$$

response: The command is echoed back within 1.2 ms after it was written.

related commands: Transmit DTMF Tone
Set Dial Mode
Enable-Report Call Progress Detector
Enable-Report Dial Tone Detector default: N/A

Enable-Report Call Progess Detector                                                   8C00 hex function: This command starts the call progress detector and returns the status of the detector with a response of $8CN_1N_2$ hex. The least significant two digits of the response reports the call progress status as follows:

$N_1$:  0   Digit dialed/idle                  $N_2$:  0   No tones detected
       1   Digit dialing in progress                 1   Dial tone detected
                                                    2   Busy detected
                                                    3   Ringback detected
                                                    4   Calling tone detected (1100 Hz)
                                                    5   Calling tone detected (1300 Hz)
                                                    6   Answer tone detected (2100 Hz)
                                                    7   Answer tone detected (2225 Hz)

The status $N_1N_2$ remains until read or until a status change.

response: The response is returned within 1.2 ms after the command was issued.

related commands: Enable-Report Dial Tone Detector
Transmit Call Progress Tone default: N/A

Enable-Report Dial Tone Detector                                                      8C01 hex function: This command is used to detect presence or absence of dial tone within a very short interval. The response format is the same as Enable-Report Call Progress Detector response.

response: The response is returned within 1.2 ms after the command was issued.

related commands: Enable-Report Call Progress Detector default: N/A

101

 PHY1412 *Safari*

Voice + Data Commands

Turn ON Voice + Data Mode                                                                                                                             B000 hex function:       This command turns on the line to headset prior to handshake. After handshake, this command turns on voice in Simultaneous Voice+Data mode.

response:       The command is echoed back within 1.2 ms after it was written.

related commands:   Turn OFF Voice+Data Mode
                     Set Voice Sampling Frequency
                     Set Voice Block Size
                     Set Data Block Size for Realtime Data
                     Set Select Realtime/non-realtime Data
                     Set Volume Control for Voice default:         B000 hex

Turn OFF Voice + Data Mode                                                                                                                           B0FF hex function:       This command turns off the line to headset prior to handshake. After handshake, this command turns off voice in Simultaneous Voice+Data mode.

response:       The command is echoed back within 1.2 ms after it was written.

related commands:   Turn ON Voice+Data Mode
                     Set Voice Sampling Frequency
                     Set Voice Block Size
                     Set Data Block Size for Realtime Data
                     Set Select Realtime/non-realtime Data
                     Set Volume Control for Voice default:         N/A

Set Voice Sampling Frequency                                                                                                                         B30N hex function:       This command sets the voice sampling frequency in to the value selected by N.

N:   0   Adaptive sampling (default)
                        1   3200 Hz
                        2   3600 Hz
                        3   4000 Hz
                        4   4400 Hz
                        5   4800 Hz
                        6   5200 Hz
                        7   5600 Hz
                        8   6000 Hz
                        9   6400 Hz
                        A   6800 Hz
                        B   7200 Hz

 PHYL∅N PHY1412 *Safari*

When adaptive sampling is used, the sampling rate is related to the connect speed as follows:

| Sampling Rate | Connect Speed |
|---|---|
| 7200 Hz | 19200 bit/s |
| 6800 Hz | 16800 bit/s |
| 5600 Hz | 14400 bit/s |
| 4400 Hz | 12000 bit/s |
| 3200 Hz | 9600 bit/s | response: The command is echoed back within 1.2 ms after it was written.

related commands: Turn ON Voice+Data Mode
Turn OFF Voice+Data Mode
Set Voice Block Size
Set Data Block Size for Realtime Data
Set Select Realtime/non-realtime Data
Set Volume Control for Voice default: B300 hex

Set Voice Block Size        B40N hex function: This command sets the size of the voice block in bytes according to the relationship:

Voice block size = 16 x N (default = 80)

response: The command is echoed back within 1.2 ms after it was written.

related commands: Turn ON Voice+Data Mode
Turn OFF Voice+Data Mode
Set Voice Sampling Frequency
Set Data Block Size for Realtime Data
Set Select Realtime/non-realtime Data
Set Volume Control for Voice default: B405 hex

Set Data Block Size for Realtime Data        B5NN hex function: This command sets the size of the realtime data block size in bytes according to the relationship:

Data block size = NN (default = 04 with forward error check.
                    default = 05 if user preselects no forward error check.)

response: The command is echoed back within 1.2 ms after it was written.

related commands: Turn ON Voice+Data Mode
Turn OFF Voice+Data Mode
Set Voice Sampling Frequency
Set Voice Block Size
Set Select Realtime/non-realtime Data
Set Volume Control for Voice default: B504 hex

103

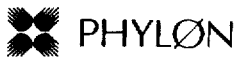 PHYLØN   PHY1412 *Safari*

Select Realtime/non-realtime Data            B60N hex function: This command selects the type of data to be transmitted/received with the value of N as follows:

N:  0  Non-realtime data only
         1  Realtime data, non-error corrected
         2  Realtime data, error corrected Note: This command also changes the data packet size to defaut values. It is recommended the data packet size be set after selectio of realtime data with or without error correction.

response: The command is echoed back within 1.2 ms after it was written.

related commands:
Turn ON Voice+Data Mode
Turn OFF Voice+Data Mode
Set Voice Sampling Frequency
Set Voice Block Size
Set Data Block Size for Realtime Data
Set Volume Control for Voice default: B602 hex

Set Volume Control for Voice            BA0N hex function: This command sets the volume level for voice according to the relationship:

$$\text{Volume} = -3 \times N \text{ dB}$$

Maximum volume is attained with N=0 (default), and full muted volume with N=F.

response: The command is echoed back within 1.2 ms after it was written.

related commands:
Turn ON Voice+Data Mode
Turn OFF Voice+Data Mode
Set Voice Sampling Frequency
Set Voice Block Size
Set Data Block Size for Realtime Data
Set Select Realtime/non-realtime Data default: BA00 hex

Flash Hook            A0A0 hex function: Upon detection of the call waiting tone, this command permits a game player to accept another waiting call. The command can also be used to permit the play to return to the first call to reestablish Voice+Data mode and resume game play.

response: The command is echoed back within 1.2 ms after it was written.

related commands: None default: NA

PHY1412 *Safar.*

Call Waiting (Unsolicited Response)                                B1FF hex function:    If call waiting is detected while in realtime Voice+Data interactive game mode, the PHY1412 notifie the controller, via this unsolicited response, that an incoming call is waiting; the PHY1412 then immediately switches to Voice-only mode, thereby permitting the players to pause game play and respond to the incoming call.

Line Interrupt (Unsolicited Response)                              A4NN hex function:    If a line interrupt occurs because of a call waiting at the remote end while in realtime Voice+Dat: interactive game mode, the PHY1412 notifies the controller via this unsolicited response. The PHY141: then immediately switches to Voice-only mode, thereby permitting the players to pause game play and respond to the incoming call. The response is A4NN, where NN takes the form xxxx xxx1.

Ready to Transmit  (Unsolicited Response)                          A4NN function:    After initiation of the handshake and after a handshake is complete, the game data transmission must begin after a Ready to Transmit unsolicited response, A4NN where NN = xxxx xx0x related commands:    Start Handshake
                     Handshake Status
                     Ready to Receive default:    NA

Ready to Receive  (Unsolicited Response)                           A4NN function:    After initiation of the handshake and after a handshake is complete, the game data reception must begin after a Ready to Receive unsolicited response, A4NN where NN = xxxx xxx0 related commands:    Start Handshake
                     Handshake Atatus
                     Ready to Transmit default:    NA

 PHY1412 *Safari*

Realtime Voice + Data Equations

The realtime data packet size in bytes, $P_d$, at any given data frequency rate can be determined from the equations below. In the equations the variables are defined as:

- $S$ : Line speed in bit/s
- $P_v$ : Voice packet size in bytes
- $f_v$ : Voice sampling frequency in Hertz
- $f_d$ : Data packet frequency in Hertz Then the realtime data packet size without error detection is:

$$P_D = ((( S - (( P_v + 1) / P_v ) \times f_v \times 2 )) / 8 - f_d ) / f_d$$

and with error detection is:

$$P_{DE} = ((( S - (( P_v + 1) / P_v ) \times f_v \times 2 )) / 8 - 2 \times f_d ) / f_d$$

e.g.: 1. $S = 16800$ bit/s, $f_v = 6000$ Hz, $P_v = 60$ bytes, $f_d = 80$ Hz then: $P_D = ((( 16800 - ((60 + 1)/60) \times 6000 \times 2 )) / 8 - 80) / 80 = 6$ bytes at 80 Hz and: $P_{DE} = ((( 16800 - ((60 + 1)/60) \times 6000 \times 2 )) / 8 - 160 ) / 80 = 5$ bytes at 80 Hz e.g.: 2. $S = 14400$ bit/s, $f_v = 4400$ Hz, $P_v = 100$ bytes, $f_d = 30$ Hz then: $P_D = ((( 14400 - ((100 + 1)/100) \times 4400 \times 2 )) / 8 - 30) / 30 = 21$ bytes at 30 Hz and: $P_{DE} = ((( 14400 - ((100 + 1)/100) \times 4400 \times 2 )) / 8 - 60 ) / 30 = 20$ bytes at 30 Hz

 PHYL∅N                                    PHY1412 *Safar*

Modem Handshake Commands

Initiate Handshake                                                                 8000 hex function: This command causes the PHY1412 to begin the originate or answer mode handshake for the selecte modem type. Configuration Word 1 Bit 5-10 determine the modem type. The progress of the handshak procedure may be monitored with the Report Handshake Status command. The handshake procedur may be aborted with the Abort Handshake/Cleardown command.

response: The command is echoed back within 1.2 ms after it was written.

related commands: Set Configuration Word 1
Set Configuration Word 2
Report Handshake Status
Abort Handshake/Cleardown default: N/A

Report Handshake Status                                                              8100 hex function: This command causes the PHY1412 to return a 12-bit response indicating the progress through th handshake, retrain or rate renegotiation.

response: The response is returned in the form of $8N_1N_2N_3$ hex, where $N_1$, $N_2$ and $N_3$ are shown in Tables 1( 11 and 12.

Example:  V.32bis handshake completed at 14.4k bit/s:     86B2 hex
V.32bis handshake before rate determination:    8002
Auto-moding, no mode or rate is determined:     8000

| State | $N_1$ |
|---|---|
| Auto-mode Handshake in Progress | 0 |
| Non-Automode Handshake in Progress | 1 |
| Abort/Idle | 4 |
| Retrain in Progress | 3 |
| Rate Renegotiation in Progress | 5 |
| Data Mode | 6 |

Table 11. - Handshake/Retrain State

PHYLØN  PHY1412 *Safari*

| Rate | $N_2$ |
|---|---|
| Undetermined | 0 |
| 1200/75 | 1 |
| 75/1200 | 2 |
| 0-300 | 3 |
| 1200 | 4 |
| 2400 | 5 |
| 4800 | 6 |
| 7200 | 7 |
| 9600 Non-trellis* | 8 |
| 9600* | 9 |
| 12000* | A |
| 14400* | B |
| 16800* | C |
| 19200* | D |

Table 12. - Data Rate Response

| Mode | $N_3$ |
|---|---|
| Undetermined | 0 |
| V.32* | 1 |
| V.32terbo/V.32bis* | 2 |
| V.22bis | 3 |
| V.22 | 4 |
| Bell 212 | 5 |
| V.21 | 7 |
| Bell 103 | 8 |
| V.23 | 9 |
| V.27 | A |
| V.29 | B |
| V.33 | C |
| V.17 | D |

Table 13. - Mode Response

\* Simultaneous Voice+Data is available.

The response is returned within 1.2 ms after the command is written.

related commands:   Initiate Handshake
                        Abort Handshake/Cleardown
                        Initiate Retrain
                        Initiate Rate Renegotiation default:   84B2 hex

PHY1412 *Safari*

Abort Handshake/Cleardown                                                9000 hex function:   If a handshake or retrain procedure is in progress this command causes the modem to immediately abort the handshake or retrain and enter the off-line state. If the modem is in a data mode of V.32terbo V.32bis/V.32, this command will cause PHY1412 to start a cleardown procedure as specified in the ITU-T recommendations. Progress through the cleardown could be monitored using the Report Handshake Command. This command has no effect when the modem is off-line. This command may be issued at any time. If the remote modem is a V.32 modem, the cleardown is initiated with a retrain sequence. If the remote modem is a V.32bis or V.32terbo modem, the cleardown is initiated with a rate renegotiation sequence.

response:   The command is echoed back within 1.2 ms after it was written.

related commands:   Initiate Handshake
                    Initiate Retrain
                    Report Handshake Status default:    N/A

Report V.24 / V.21 Ch. 2 Status                                          A0C0 hex function:   This command is used to monitor the state of the V.24 interface signals and V.21 Ch. 2 status.

response:   The response is returned within 1.2 ms after the command was written. The response has the bit form:

1010 0000 0[V21][RI\]X XX[CTS\][RLSD\]

For V.24 signals, a 1 indicates that a signal is off (false) and a 0 indicates that a signal is on (true). The V21 bit high (true) indicates that V.21 carrier is detected while receiving half duplex transmission of V.33, V.17, V.29, V.27ter. The V21 bit becomes operative when the V.27/V.29/V.17 receiver is enabled. Turning the receiver off automatically resets the V.21 status indication.

When Ring is detected, this also selects the modem to be an answering modem.

related commands:   Set V.24/V.21 Ch2 Status Interrupt Mask default:    A03F hex

 PHYL∅N                                                                                             PHY1412 *Safari*

Half-Duplex Commands

Enable Transmitter Long                                                                                                      9200 hex function: This command is used for half-duplex operation. It turns on the transmitter within 0.8 ms. CTS\ is set low (true) after the turn-on delay (see Table 14).

| Modem | Bit/s | ms |
|---|---|---|
| V.33 | 4400/12000 | 1393 |
| V.17 Long | 14400/12000/9600/7200 | 1393 |
| V.17 Short | 14400/12000/9600/7200 | 142 |
| V.29 | 9600/7200/4800 | 253 |
| V.27 Long | 4800 | 708 |
| V.27 Short | 4800 | 50 |
| V.27 Long | 2400 | 943 |
| V.27 Short | 2400 | 67 |

Table 14. - Half-Duplex Turn-on Delay response: The command is echoed back within 1.2 ms after it was written.

related commands: Disable Transmitter
Set Configuration Word 2 (Echo Protector Tone Enable)
Enable Transmitter Short default: N/A

Enable Transmitter Short                                                                                                    9210 hex function: This command is used for half-duplex operation in V.27 and V.17. It turns on the transmitter within 0.8 ms.

response: The command is echoed back within 1.2 ms after it was written.

related commands: Disable Transmitter
Set Configuration Word 2 (Echo Protector Tone Enable)

default: N/A

Disable Transmitter                                                                                                         9201 hex function: This command is used for half-duplex operation. It turns off the transmitter immediately.

response: The command is echoed back within 1.2 ms after it was written.

related commands: Enable Transmitter Long
Enable Transmitter Short default: N/A

 PHY1412 *Safar*

Enable Receiver      9202 hex function: This command is used for half-duplex operation. It enables on the receiver immediately to acquire carrie from the remote modem. Receiver starts only after detection of valid training sequence. RLSD\ become active following the completion of receiver training, short or long sequence.

response: The command is echoed back within 1.2 ms after it was written.

related commands: Disable Receiver default: N/A

Disable Receiver      9203 hex function: This command is used for half-duplex operation. It turns off the receiver within 0.8 ms and sets RLSD bit to high (off/false).

response: The command is echoed back within 1.2 ms after it was written.

related commands: Enable Receiver default: N/A

111

PHY1412 *Safari*

Fax Handshake Commands

Start Sending a Fax                                                                 9300 hex function: This command starts T30 SEND FAX. It will cause the PHY1412 to wait for remote station's CSI and DIS.

response: The command is echoed back within 1.2 ms after it was written. The T.30 response (0x93FA) is returned when DIS is received.

related commands:   Start Receiving a Fax default:   N/A

Start Receiving a Fax                                                              9301 hex function: This command starts T30 RECEIVE FAX. The PHY1412 will send both CSI and DIS and wait for TSI and DCS.

response: The command is echoed back within 1.2 ms after it was written. The T.30 response (0x93FA) is returned when DCS is received.

related commands:   Start Sending a Fax default:   N/A

Set Pointer to Remote Capabilities                                                 9410 hex function: This command sets the read pointer to REMOTE ID. It is used for reading the remote station's DIS or DCS. This command must be followed by reading 8 bytes of data in the order below from the REMOTE CAPABILITY buffer — refer to Class 2 (SP-2388) for the format:

Vertical Resolution, Bit Rate, Page Width, Page Length, Data Compression Format.
   Error Correction, Binary File Transfer, Scan Time/Line.

response: The command is echoed back within 1.2 ms after it was written.

related commands:   Set Pointer to Local Capabilities
                    Set Pointer to FRID
                    Set Pointer to FLID default:   N/A

Set Pointer to Local Capabilities                                                  9411 hex function: This command sets the read/write pointer to LOCAL ID. It is used for reading/writing the local station's DIS or DCS. This command must be followed by writing 8 bytes of data in the below order into the LOCAL CAPABILITIES buffer — refer to Class 2 (SP-2388) for the format:

Vertical Resolution, Bit Rate, Page Width, Page Length, Data Compression Format.
   Error Corvection, Binary File Transfer, Scan Time/Line.

response: The command is echoed back within 1.2 ms after it was written.

PHY1412 *Safari* related commands: Set Pointer to Remote Capabilities
Set Pointer to FRID
Set Pointer to FLID default: N/A

Set Pointer to FRID                                                      9412 hex function: This command sets the read pointer to FRID buffer. It is used for reading the remote station's CSI or TSI from their respective buffers (buffer length is 20 bytes).

response: The command is echoed back within 1.2 ms after it was written.

related commands: Set Pointer to Remote Capabilities
Set Pointer to Local Capabilites
Set Pointer to FLID default: N/A

Set Pointer to FLID                                                      9413 hex function: This command sets the write pointer to the LSB of the FLID buffer. It is used for writing the local station's CSI or TSI in their respective buffers (buffer length is 20 bytes).

response: The command is echoed back within 1.2 ms after it was written.

related commands: Set Pointer to Remote Capabilities
Set Pointer to Local Capabilities
Set Pointer to FRID default: N/A

Read Consecutive Capabilities/ID                                         9500 hex function: This command reads the data from the CSI, TSI, DIS, DCS buffers.

response: The response is returned in the form of 95NN hex, where NN is the data.

related commands: Write Consecutive Capabilities/ID
Transmit Flush and Send RTC
Receive Page Flush default: N/A

Write Consecutive Capabilities/ID                                        96NN hex function: This command write the data NN to the CSI, TSI, DIS, DCS buffers.

response: The command is echoed back within 1.2 ms after it was written.

related commands: Read Consecutive Capabilities/ID
Transmit Flush and Send RTC
Receive Page Flush default: N/A

113

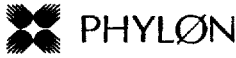 PHYLØN  PHY1412 *Safari*

Transmit Page Flush and Send RTC  9700 hex function: This command causes the PHY1412 to flush all the data in the TX buffer and send RTC (6 EOPs).

response: The command is echoed back within 1.2 ms after it was written.

related commands:  Read Consecutive Capabilities/ID
Write Consecutive Capabilities/ID
Receive Page Flush default: N/A

Receive Page Flush  9701 hex function: This command cause the PHY1412 to flush all the data in the RX buffer.

response: The command is echoed back within 1.2 ms after it was written.

related commands:  Read Consecutive Capabilities/ID
Write Consecutive Capabilities/ID
Transmit Flush and Send RTC default: N/A

Set Multiple Page  980N hex function: This command causes the PHY1412 to send out the MPS, EOM or EOP and wait for MCF.

N = 0: send MPS
     N = 1: send EOM
     N = 2: send EOP response: The command is echoed back within 1.2 ms after it was written.

related commands:  Report Multiple Page Status default: N/A

Report Multiple Page Status  9820 hex function: This command asks the PHY1412 to report that it received MPS, EOM or EOP.

response: The response is returned in the form 982N, where N is defined as:

N = 0: more pages (MPS)
     N = 1: end of message (EOM)
     N = 2: no more pages (EOP)

related commands: Set Multiple Page default: N/A

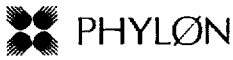 PHY1412 *Safari*

Start Page Transmission                                                                                                                                         9830 hex function: This command causes the PHY1412 to send out the carrier for the page data stream.

response: The command is echoed back within 1.2 ms after it was written.

related commands:   Retrain
Start Page Reception
Report T30 Status default:  N/A

Retrain                                                                                                                                                                      9831hex function: This command causes the PHY1412 to send out DCS and TCF.

response: The command is echoed back within 1.2 ms after it was written.

related commands:   Start Page Transmission
Start Page Reception
Report T30 Status default:  N/A

Start Page Reception                                                                                                                                              9840 hex function: This command causes the PHY1412 to send out the MCF and get ready to receive the next page data stream.

response: The command is echoed back within 1.2 ms after it was written.

related commands:   Start Page Transmission
Retrain
Report T30 Status default:  N/A

Report T30 Status                                                                                                                                                   9850 hex function: This command ask the PHY1412 to report the current T30 status.

response: The response is returned in the form 985N, where N is defined as:

N = 0: Page OK (PPR).
   N = 1: Page OK (MCF).
   N = 2: Page bad (RTN).
   N = 3: Page bad (RTP).
   N = 8: Communication error.

related commands:   Start Page Transmissison
Retrain
Start Page Reception default:  N/A

PHY1412 *Safari*

The operation of the Fax handshake is summarized in the following examples:

| Send 2 Pages FAX | | Send 2 Pages FAX (cont.) | |
|---|---|---|---|
| Contoller's Actions | PHY1412's Actions | Contoller's Actions | PHY1412's Actions |
| Write local ID<br>9413 →<br>96NN (20x) →<br><br>Write local capabilities<br>9411 →<br>96NN (8x) → | | Write page data<br>F0NN (x #bytes) →<br><br>Flush tx<br>9700 → | Send page data<br><br>Flush tx<br>send RTC<br>←93FA |
| Off hook<br>Dial<br><br>Start sending a Fax<br>9300→<br><br><br>Read [CSI]<br>9412→<br>9500 (20x)→<br><br>Read DIS<br>9410→<br>9500 (8x)→ | Send CNG<br>detect flags<br>[get CSI]<br>get DIS<br>←93FA | Send MPS = 0<br>9800→ | Send MPS<br>get MCF<br>←93FA |
| | | Start page<br>transmission<br>9380→<br><br>Write page data<br>F0NN (x #bytes)<br><br>Flush tx<br>9700→ | Send carrier<br>←93FA<br><br>Send page data<br><br><br>Flush tx<br>send RTC<br>←93FA |
| Start page<br>transmission<br>9830→<br><br><br><br>Read DCS<br>9411→<br>9500 (8x)→ | [Send TSI]<br>send DCS<br>send TCF<br>get CFR<br>send carrier<br>←93FA | Send MPS = 2<br>9802→<br><br><br>Hangup<br>A040→ | Send EOP<br>get MCF<br>Send DCN<br>←93FA<br><br>Hangup |

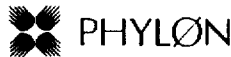

PHY1412 *Safar*

| Receive 2 Pages FAX | | Receive 2 Pages FAX (cont.) | |
|---|---|---|---|
| Contoller's Actions | PHY1412's Actions | Contoller's Actions | PHY1412's Actions |
| Enable Reception | | Read page data | Get page data ←F0NN (x #bytes) detect RTC RLSD drop get MPS ←93FA |
| Write local ID 9413 → 96NN (20x) → | | | |
| Write local capbilities 9411 → 96NN (8x) → | | | |
| | | Read MPS 9820→ | ←9820 |
| | Detect Ring | | |
| Off hook A060→ | | | |
| Start receiving a Fax 9301→ | Send CED send CSI send DIS detect flags [get TSI] get DCS ←93FA Begin TCF receive | Start page reception 9840 → | Send MCF get page carrier ←93FA |
| Read [TSI] 9412→ 9500 (20x)→ | | Read page data | Get page data ←F0NN (x #bytes) detect RTC RLSD drop get MPS (EOP) ←93FA |
| Read DCS 9410→ 9500 (8x)→ | | | |
| | | Read MPS 9820→ | ←9822 |
| | Accept TCF send CFR ←93FA | Start page reception 9840 → | Send MCF get DCN ←93FA |
| Read DCS 9411→ 9500 (8x)→ | | | |
| | | Hangup A040→ | Hangup |
| | Get page carrier | | |

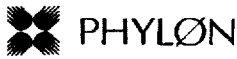 PHY1412 *Safari*

Voice Commands

Enable Voice Encoder                                                                                    6880 hex function:  This command starts the ADPCM voice encoding process if the input energy is higher than the level determined by the Set Voice Encoding Turn-on Threshold command. The output data is read from the controller port at a rate of 1.8k bytes/s. Six bytes of data synchronization flags (33 hex) are sent at the beginning of the encoding process. These flags are used to synchronize the decoding data at playback time; therefore, they must be saved as part of the encoded speech data file.

response:  The command is echoed back within 1.2 ms after it was written.

related commands:   Disable Voice Encoder
                    Set Silence Detection Period
                    Set Silence Detection Threshold
                    Set Voice Encoder Gain default:   N/A

Disable Voice Encoder                                                                                   6881 hex function:  This command stops the ADPCM voice encoding process.

response:  The command is echoed back within 1.2 ms after it was written.

related commands:   Enable Voice Encoder default:   N/A

Enable Voice Decoder                                                                                    6882 hex function:  This command starts the voice decoding process to replay an encoded speech file. Two synchronization flags (33 hex) must be detected before the decoder starts decompressing the file. The data to be decoded should be written to the controller port at a rate of 1.8k bytes/s.

response:  The command is echoed back within 1.2 ms after it was written.

related commands:   Disable Voice Decoder
                    Set Voice Decoder Attenuation default:   N/A

Disable Voice Decoder                                                                                   6883 hex function:  This command disables the ADPCM decoder and returns the transmitter to idle.

response:  The command is echoed back within 1.2 ms after it was written.

related commands:   none default:   N/A

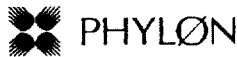 PHYL∅N  PHY1412 *Safari*

Set Voice Encoder Gain                                                          68AN hex function: This command sets the analog front-end gain for the voice encoder. The gain is programmed as N dB where N=0 to 15.

response: The command is echoed back within 1.2 ms after it was written.

related commands: Enable Voice Encoder
Disable Voice Encoder
Set Silence Detection Period
Set Silence Threshold default: 68A0 hex

Set Voice Decoder Attenuation                                                   0N01 hex function: This sets the decoder attenuation during speech playback. The command is identical to Set Transmit Level Command. The attenuation is programmed by the "N" digit of the command. "N" sets the attenuation from 0 to 15 dB, i.e., 0003 hex sets for maximum loudness and 0A01 hex for 10 dB attenuation.

response: The command is echoed back within 1.2 ms after it was written.

related commands: Enable Voice Decoder
Disable Voice Decoder
Set Transmit Level Attenuation default: 0001 hex

Parallel/HDLC Commands

Parallel Tx/Rx Data (Unsolicited Response)                                       F0NN hex function: When operating in parallel/HDLC mode, the controller passes the transmit data byte NN to the PHY1412 in the form F0NN hex. Similarly, the PHY1412 passes the received data byte NN to the controller in the form F0NN hex. In both cases, F0 hex is used to identify NN hex as data, and all data transfers are via the controller interface.

response: none related commands: Set Tx Data Control
Set Parallel Interrupt Mask
Report Parallel/HDLC Status default: N/A

Set Tx Data Control                                                             F10N hex function: This command sets the transmitter data control in the parallel data mode. If the transmitter underruns in HDLC mode, the frame will be terminated with the transmission of a CRC and and End of Frame, unless the user sends an Abort. In that case, the transmitter buffer will be flushed. The command parameter N has three values:

PHY1412 *Safari*

```
N = 0000   Transmit End of Frame in HDLC mode
N = 0001   Send Abort in HDLC or Send Break in Async mode
N = 0010   End Abort in HDLC or End Break in Async mode
```

Refer to topic Using Parallel Data Transfer for further details.

response: The command is echoed back within 1.2 ms after it was written.

related commands:  Parallel Tx/Rx Data
                   Set Parallel Interrupt Mask
                   Report Parallel/HDLC Status
default:  F100 hex

Set Parallel Unsolicited Message Mask                                          F20N hex functions:  This command sets a mask for unsolicited F3xx responses due to transitions of Parallel/HDLC status in parallel data modes. The command parameter N takes the following values:

```
N = 0000   Parallel/HDLC Messages Enabled
N = 0001   Disable Message due to End of Frame Received
N = 0010   Disable Message due to Abort/Break Received
N = 0100   Disable Message due to TX Underrun
N = 1000   Disable Message due to TX Data Buffer Ready Change
``` response: The command is echoed back in 1.2 ms after it was written.

related commands:  Parallel Tx/Rx Data
                   Set Tx Data Control
                   Report Parallel/HDLC Status
default: F200 hex

Report Parallel/HDLC Status   (Unsolicited Response)                           F300 hex function:  This command requests the Parallel/HDLC status. The response takes the form F3NN hex, where NN takes the following form:

```
        (if polled    (if unsolicited
        for status)    response)
NN:     xxxx xxxx     0000 0000     TX Data Buffer ready to accept data byte
        xxxx 1xxx     0000 1000     TX Data Buffer is not ready to accept data byte
        xxxx x1xx     0000 0100     TX Buffer underrun. No data byte to transmit
        xxxx xx1x     0000 0010     Abort/Break received
        xxxx xxx0     0000 0001     End of Frame received. CRC correct
        xxx1 xxx1     0001 0001     End of Frame received. CRC error
```

Note that within a response more than one condition can be indicated, if polled. If not polled. and this appears unsolicited, only one bit will be set at a time.

response: F3NN hex is returned within 1.2 ms after the command is written.

related commands:  Parallel Tx/Rx Data
                   Set Tx Data Control
                   Set Parallel Unsolicited Message Mask default: N/A

 PHYL∅N  PHY1412 *Safari*

Forward Error Check  (Unsolicited Response)  F301/F311 hex function: In realtime game data + voice mode, game data can be communicated synchronously as N-byte data packets; data can be transmitted at a frame (packet) rate of up to 60 Hz. Error check information is provided with each frame. If a packet's data is good, the response is F301; if it is bad, the response is F311. This response follows each data packet and is provided to the controller as an unsolicited response

Diagnostics Commands

Report Mean Square Error (MSE)  C000 hex function: This command requests the PHY1412 to return a 12-bit value which represents the MSE value. The MSE value reported is averaged in a first order filter with a time constant of 100 ms. This command may be used at any time, but the result is only valid when the modem is on-line. In FSK modes, the MSE values are not available.

response: The result is returned within 1.2 ms after the command was written, and is in the form CNNN hex where NNN is the MSE value.

related commands: none default: N/A

Report Receive Signal Level  C005 hex function: This command requests the PHY1412 to return the receive signal level measurement on AR+ and AR- inputs. The response takes the form C0NN hex, where NN is the receive signal level in dB below the maximum (0.66 Vrms). The receive signal value returned is averaged in a first order filter with a time constant of 30 ms. Thus, a signal 20 dB below full-scale would return a response of C014 hex. This command may be used at any time but the result is valid only when the modem is on-line.

response: C0NN hex is returned within 1.2 ms after the command was written.

related commands: none default: N/A

Test Commands

Initiate Local Analog Loop  E002 hex function: This command causes the PHY1412 to initiate a Local Analog Loop (LAL) test for the full-duplex mode and rate selected in Configuration Word 1 and Set Rate Sequence Command. The Transmit signal is looped back into the receiver input pins, AR+ and AR-. This command should only be used in the off-line state. The analog loop test may be terminated by using the Terminate Test command which returns the PHY1412 to idle state.

response: The command is echoed back within 1.2 ms after it was written.

related commands: Set Configuration Word 1
Set Rate Sequence
Terminate Test default: N/A

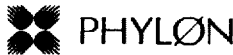 PHYLØN PHY1412 *Safari*

Initiate Remote Digital Loopback                                              E003 hex function: This command initiates the Remote Digital Loop (RDL) test as defined in V.22bis, V.22, Bell 212 or V.54 recommendations. The PHY1412 also responds to a remote modem's RDL request or terminate as defined in V.22bis, V.22, Bell 212 or V.54 recommendations while responding to a remote modem's test request. The test loop may be terminated by using the Terminate Test command which returns the modem to the on-line state both at the near and far end.

response: The command is echoed back within 1.2 ms after it was written.

related command:   Terminate Test default:   N/A

Initiate Local Digital Loopback                                                E004 hex function: This command initiates the Local Digital Loop (LDL) test. The test allows the remote modem to verify the line connection. The test loop may be terminated by using the Terminate Test command which returns the modem to on-line state.

response: The command is echoed back within 1.2 ms after it was written.

related command:   Terminate Test default:   N/A

Transmit Modulated Carrier                                                    E005 hex function: This command causes a modulated carrier signal to be transmitted for mode and rate selected by Configuration Word 1 and Set Rate Sequence Command. In addition, if guard tone is selected, it will cause the transmission of the V.22bis/V.22 answer mode carrier signal together with the guard tone. This would allow transmit spectrum measurement. V.32terbo/V.32bis/V.32 rates should be selected by setting the rate sequence to allow only the desired rate. Terminate Test command may be used to return the PHY1412 to the idle state.

response: The command is echoed back within 1.2 ms after it was written.

related commands:   Set Configuration Word 1
                    Set Rate Sequence
                    Terminate Test default:   N/A

Terminate Test                                                                 E000 hex function: This command terminates the current active test mode and returns the PHY1412 to either normal data mode if in LDL or RDL modes and to idle state if in LAL or Transmit modulated carrier mode.

response: The command is echoed back within 1.2 ms after it was written.

related commands:   Initiate Local Analog Loop
                    Initiate Remote Digital Loop
                    Initiate Local Digital Loop
                    Transmit Modulated Carrier default:   N/A

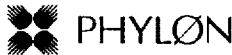 PHY1412 *Safar.*

Miscellaneous Commands

Enable/Disable Command Echo Back                                  ON0F hex function: This command enables or disables a command echo back.
Enable: 000F hex; Disable: 010F hex response: The enable command is echoed back within 1.2 ms after it was written. The disable command is no echoed.

related commands: Enable Receiver default: N/A

Initiate-Report Software Reset                                    D002 hex function: This command causes the PHY1412 to reset all parameters to the default conditions. After resetting, the PHY1412 will return the self-test result executed during the previous POR\. This command may be issued at any time. CAUTION: care should be taken because the command will clear all operating parameters to the default values.

response: The response is returned after the reset is completed and within 1.2 ms. It is in the form B80N where N has the bit form:

[DSP] [AFE] [ROM] [SRAM]

where 0 is a pass and 1 is a fail. Thus a successful self-test will give a response of B800 hex.

related commands: Enter Sleep Mode default: N/A

Enter Standby Mode                                                DD00 hex function: This command puts the PHY1412 in standby mode. In this mode the DSP is halted and the AFE analog section is powered down. The device can be awakened by a POR\ reset pulse, or Initiate-Report Software Reset command.

response: The command is echoed back within 1.2 ms after it was written.

related commands: Initiate-Report Software Reset default: N/A

Enter Sleep Mode                                                  DD01 hex function: This command puts the PHY1412 in sleep mode. In this mode the DSP is halted and the AFE analog section is powered down. The device can only be awakened by a POR\ reset pulse.

response: The command is echoed back within 1.2 ms after it was written.

related commands: Initiate-Report Software Reset default:      N/A

 PHY1412 *Safari*

Report Software Version                                                        DDD0 hex function: This command returns the Software version in the form of NNNN. This command may be issued at any time.

response: The response is available within 1.2 ms after the command was written.

related commands:   Report Product Code default:   N/A

Report Product Code                                                            DDD1 hex function: This command returns a product code in the form of NNNN. 1412 is returned for PHY1412. This command may be issued at any time.

response: The response is available within 1.2 ms after command was written.

related commands:   Report Software Version default:   N/A

Self Test (Unsolicited Response)                                               B80N hex function: A hardware reset causes the PHY1412 to reset all parameters to the default conditions and execute a self test. The result of the self test is returned at the completion of the test and within 1 second. The response is in the form B8NN, where NN has the bit form:

[DSP] [AFE] [ROM] [SRAM]

where 0 is a pass and 1 is a fail. Thus a successful self-test will issue a response of B800 hex.

Parallel Data Transfer

Data is transferred to and from the chipset over the byte-wide host controller interface port. The format of data passed across the host interface is F0xx, where xx is the data byte. Transmit data bytes are not echoed to the host as commands are. Hardware interrupt line HINT\ can be programmed to interrupt the host on changes to the host interface status bits CBE\ and RBF\. This is useful for implementing efficient interrupt-driven data byte input/output to and from the chipset.

Data byte buffering is provided internal to the chipset. The status of the internal transmit data buffer can be solicited using the Report Parallel/HDLC Status command. If enabled by the Set Parallel Interrupt Mask command, the status will be delivered automatically (that is, unsolicited) whenever the transmit buffer reaches the near-full, near-empty, or underrun (empty) condition.

When using parallel data mode, it is possible to gate the delivery of information from the chipset to the host port. This is called Host Acknowledge Mode, or HAM. Falling edges of the chipset HAS\ pin acknowledge the host's receipt of the previous word from the host port. Once a word to the host is acknowledged, then the chipset will send the next word when available. Data bytes and command responses are buffered within the chipset if required. Responses to commands and unsolicited responses are sent at higher priority than data. If the previous word to the host is not acknowledged for an extended time period, pending response words (solicited or unsolicited) are delivered to the host without an acknowledge. Data will NOT be delivered. This permits the controller to halt data flow at the chipset without halting status reporting. Consequently, no host controller receive data buffering is required. The Set Host Acknowledge Mode command (0xA031) must be used to enable HAM.

Data bytes passed across the host interface can be handled as either synchronous data bytes. asynchronous data bytes, or as information bytes of HDLC frames. Configuration Word 2, bits 5 and 4 control the mode of operation.

Synchronous Mode

Transmit data bytes are send directly to the modulator. If no data bytes are available, the last data byte from the host is repeated.

Receive data bits are gathered into bytes and sent to the host.

Asynchronous Mode

Transmit data bytes are framed with one start bit and one stop bit, then sent to the modulator. If no transmit data bytes are available, binary 1's are sent. The Set Tx Data Control command can be used to send a break in sequence with the transmitted data bytes.

The receive bit stream is scanned for start bits. Start and stop bits are stripped, and the data bytes delivered to the host. If break is detected, it is reported by a Report Parallel/HDLC Status response, sent in sequence with any received data bytes.

HDLC Mode

When no transmit data is available, flags without zero sharing are sent. When one or more data bytes become available, an HDLC frame is opened. Zero insertion is performed as per HDLC. A 16-bit FCS using the polynomial $X^{16}+X^{12}+X^5+1$ is computed on the data bytes. The FCS and a closing flag are sent when either no data bytes are available to send (underrun) or when a Set Tx Data Control command is issued to close the frame. If closed by the command, the command is handled in order with the transmit data bytes. The Set Tx Data Control command can be used to send an abort ( 7 consecutive "1" bits).

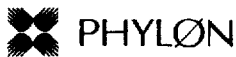

PHY1412 *Safari*

The receive data bit stream is monitored for HDLC frames. When a frame is detected, data bytes are delivered as received with inserted zeroes deleted. When a closing flag is detected the receive FCS is tested and a Report Parallel/HDLC Status response is sent to the host indicating FCS correct or FCS incorrect. The FCS is not sent to the host. If an abort pattern is detected at any time, a Report Parallel/HDLC Status response reports abort detected.

Realtime Voice+Data Mode:

In this mode, voice and data is communicated simultaneously, with realtime low-delay data. Data can be transmitted synchronous upto 60 Hz frame rate. Data is in the format of packets. Every packet is communicated at an end to end delay of 18ms (typical). Each packet of data has error check information. This is a Phylon proprietry protocol implemented for remote gaming (patents pending).

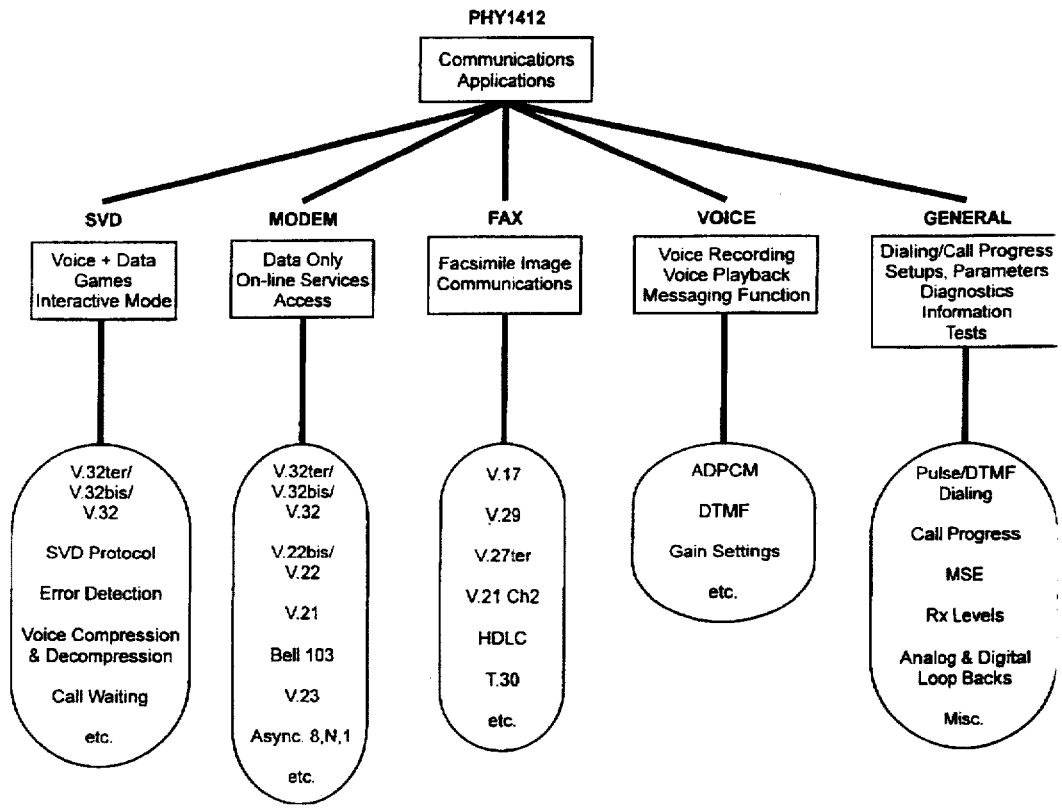

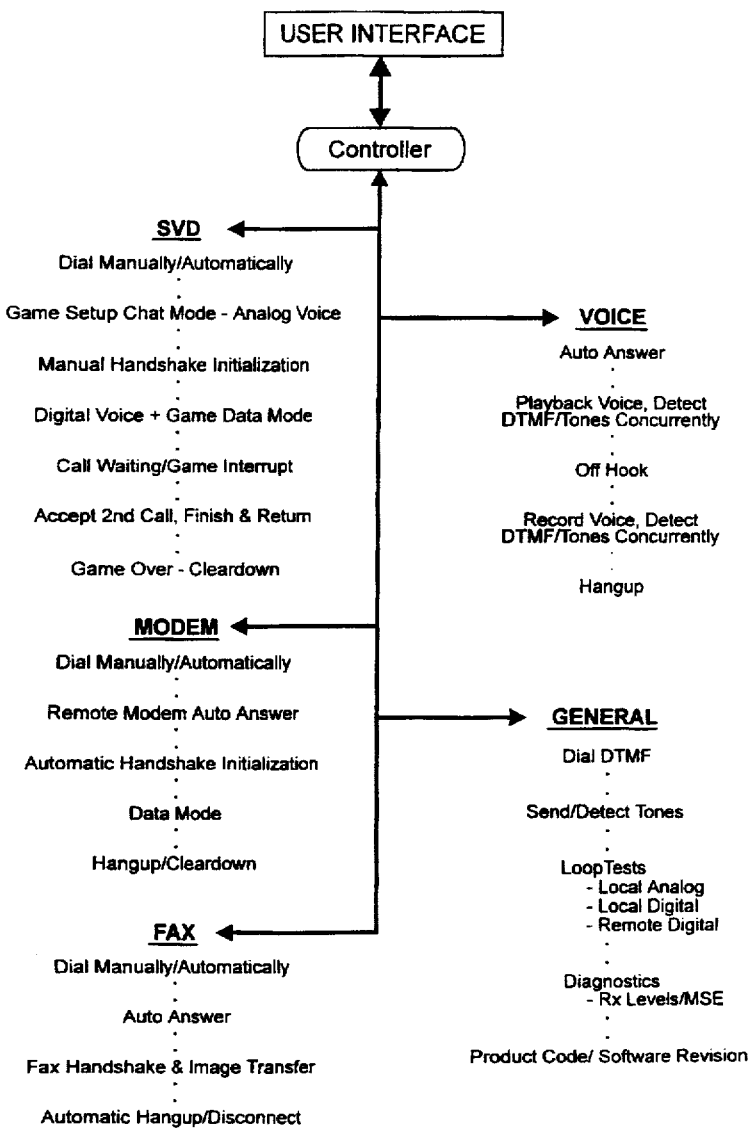

"C" DRIVERS

The following is a list of drivers written in "C" that the reader may find useful when developing application software These "C" drivers were developed for a PC-based development system called PHY2112.

| File Name | Description |
|---|---|
| COM.C | Main user interface |
| SCREEN.C | Welcome message |
| SYSTEM.C | Low level routines |
| HOST INT.C | Host interrupt parser |
| DIAL NUM.C | Dialing |
| GAMES.C | Games voice + data |
| MODEM.C | Modem online access |
| FAX.C | Facsimile Communications |
| VOICE.C | Voice recording and playback |
| PC.H | Low level constants for PC interface |
| VAR.H | Variables names |
| FUNCTION.H | Function names |
| STATE.H | State machine constants |
| DSP_CMDS.H | DSP commands/responses |

The routines that follow appear in the order listed above.

COM.C

```c
/*******************************************************************************
        COMMUNICATIONS
*******************************************************************************/ include <dos.h>
include <stdio.h> include "pc.h"
include "var.h"
#include "function.h"
#include "dsp_cmds.h"
#include "state.h"

#include "screen.c"

#include "system.c"
#include "host_interp.c"

#include "games.c"
#include "modem.c"
#include "fax.c"
#include "voice.c"
#include "dial_num.c"

void main(void)  { banner();

reset();

printf("\nGames Voice+Data (G) or Modem (M) or FAX (F) or Voice (V) or Debug (D) :");
    scanf("%c",&COM_MODE);

if(COM_MODE == 'G')
        games();
    if(COM_MODE == 'M')
        modem();
    if(COM_MODE == 'F')
        fax();
    if(COM_MODE == 'V')
        voice();
    if(COM_MODE == 'D')
        debug();

}
```

SCREEN.C

```c
/*******************************************************************************
        BANNER
*******************************************************************************/ void banner() {
        system("cls");
        printf("\n\n\n\n\n\n\n\n\n\n");
        printf("                        WELCOME TO THE NEW WORLD OF COMMUNICATIONS\n");
        delay(3000);
        system("cls");
        }
```

SYSTEM.C

```c
/*******************************************************************************
        USER INTERRUPT
*******************************************************************************/ void check_esc() {
        if(kbhit())
                if(getch() == 27)
                        user_abort();
        } void user_abort() {
        printf("\nUser Abort\n");
        abort_com();
        } void abort_com() {
        hang_up();
        reset_dsp();
        restore_interrupt();
        exit(0);
        }

/*******************************************************************************
        WAIT ROUTINE
*******************************************************************************/ int wait(word command, word response, word response_mask, int wait_sec) { int i;

for(i=0 ; i<wait_sec ; i++) {
           if( (HOST_RESPONSE & response_mask) == response)
                return(1);
           write_phy02_cmd(command);
           delay(1000);
           }
        return(0);
        }
```

PHYLØN                                                                PHY1412 *Safari*

```c
void wait_s(int k) {
      int i;
      for(i=1;i<=k;i++)
      delay(1000);
      }

/******************************************************************************
      PHY02 ROUTINES
******************************************************************************/ void write_phy02_data(byte k) {
      int i;

while(!TXRDY_STATUS) check_esc();
//    while(!CBE_STATUS) check_esc();
      CBE_STATUS=0;

for(i=0;i<1000;i++)i=i;

outp(WR_DAT_ADD,k);
      outp(WR_DAT_ADD,DATA_ADD);
      } void write_phy02_cmd(word k) {
//    while(!CBE_STATUS) check_esc();
      CBE_STATUS=0;
      outp(WR_DAT_ADD,(byte) (k & 0XFF) );
      outp(WR_DAT_ADD,(byte) (k>>8 & 0XFF) );
      delay(3);
      }

/******************************************************************************
      RESET DSP BOARD
******************************************************************************/
void load_dsp() {
      system("LD_P2100");
      } void write_phy02_int_mask(byte k) {
      outp(WR_MSK_ADD,k);
      } word read_phy02_resp() {
      byte k;
      k=inp(RD_DAT_ADD);
      return(k | inp(RD_DAT_ADD)<<8);
      } byte read_phy02_status_reg() {
      return(inp(RD_STS_ADD) | 0X81);
      } void has() {
      outp(HAS_ADD,0);
      }
```

PHY1412 *Safari*

```c
/*******************************************************************************
    DEBUG
*******************************************************************************/
void debug() {
      word k;
      int i;
        printf("\n Entering DSP Debug Mode \n");
      while(1) {
            while(!kbhit());
             if(getch() == 27) {
                  printf("\n\n Exiting DSP Debug Mode \n");
                  break;
                  }
            printf("\nDSP COMMAND   :");
            scanf("%04X",&k);
            HOST_RESPONSE=0;
            write_phy02_cmd(k);
               for(i=0;i<30;i++) {
                  delay(1);
                  if(HOST_RESPONSE) {
                  printf("DSP RESPONSE :");
                  printf("%04X",HOST_RESPONSE);
                  HOST_RESPONSE=0;
                  }
               }
      }

}

/*******************************************************************************
    RESET DSP BOARD
*******************************************************************************/
void reset() {
      reset_dsp();
      init_interrupt();
      init_dsp();
      }

/*******************************************************************************
    RESET DSP BOARD
*******************************************************************************/
void reset_dsp() {
//    outp(RESET_ADD,0);
//    outp(GO_ADD,0);
//    delay(1000);
      }

/*******************************************************************************
    DSP INITIALIZATION
*******************************************************************************/
void init_dsp() {
      write_phy02_cmd(HAM_MODE_ON);
      write_phy02_cmd(HOST_ECHO_OFF);
      }
```

PHYLØN          PHY1412 *Safari*

```c
/******************************************************************************
        INTERRUPT RELATED ROUTINES
******************************************************************************/ void init_interrupt() {
      old_int=getvect(INT3);
      setvect(INT3,phy02_isr);
      irq3_ena();
      write_phy02_int_mask(PHY02_INT_MASK);
      geninterrupt(INT3);
      HAS_STATUS=1;
      } void restore_interrupt() {
      setvect(INT3,old_int);
      } void interrupt phy02_isr() {
      byte k;
      k=read_phy02_status_reg();
      if(-k & CBE_MASK) {
            CBE_STATUS=1;
            }
      if(-k & RBF_MASK) {
            host_interp(read_phy02_resp());
            }
      eof_int();
      } void irq3_ena() {
      outp(PORT1_8259, inp(PORT1_8259) & IRQ3_ENA);
      } void eof_int() {
      outp(PORT0_8259,END_OF_INT);
      }
```

HOST_INT.C

```c
/*******************************************************************************
    HOST INTERPRETER
*******************************************************************************/ void host_interp(word k) { switch(k & HOST_RESP_MASK) {
        case PARALLEL_DATA:
                    DATA_RX=k & DATA_MASK;
                    rx_data_cnt=1;
                    HOST_RESPONSE=k;
                    if(HAS_STATUS) has();
                    break;

case PARALLEL_STATUS:
                    if(k == TXNOTRDY)
                        TXRDY_STATUS=0;
                    if(k == TXRDY)
                        TXRDY_STATUS=1;
                    if(k == GOOD_DATA)
                        GOOD_PKT=1;
                    if(k == BAD_DATA)
                        BAD_PKT=1;
                    HOST_RESPONSE=k;
                    has();
                    break;

case V24_RESPONSE:
                    RLSD_STATUS= ~k & RLSD_MASK;
                    CTS_STATUS= (~k & CTS_MASK)>>1;
                    RI_STATUS= (~k & RI_MASK)>>5;
                    V21_FLAG_STATUS= (k & V21_FLAG_MASK)>>6;
                    HOST_RESPONSE=k;
                    has();
                    break;

case CALL_WAITING_DETECT:
                    HOST_RESPONSE=k;
                    if( (k & 0xFF) == 0xFF)
                        CW_STATUS=1;
                    has();
                    break;

default:    HOST_RESPONSE=k;
                    has();
                    break;
    }
}
```

PHYLØN  PHY1412 *Safari*

DIAL_NUM.C

```c
/********************************************************************************
       DIAL TELEPHONE NUMBER
********************************************************************************/ char *get_num() {

FILE *fil;

char tel_num[30];

printf("\nEnter Telephone Number (* for previous number) :");
       scanf("%s",&tel_num);

if( strcmp(tel_num,"*")==0 ) {
            fil=fopen("tel_num.dat","rt");
            fscanf(fil,"%s",&tel_num);
            fclose(fil);
            }
       else {
            fil=fopen("tel_num.dat","wt");
            fprintf(fil,"%s",tel_num);
            fclose(fil);
            } return(tel_num);
       } void dial_telephone_number() { int i;
       int digit;
       char tel_num[30];
       int let_to_digit[26] = {2,2,2,3,3,3,4,4,4,5,5,5,6,6,6,7,7,7,7,8,8,8,9,9,9,9};

strcpy(tel_num,get_num());

go_off_hook();

if (check_dial_tone()==0) {
            abort_com();
            } i=0;
         while (tel_num[i] != '\0') { digit=toupper(tel_num[i]);

if( (digit >= '0' ) && (digit <= '9' ) ) {
                digit= digit-'0';
                dial_digit(digit);
                }
```

```
            if( (digit >= 'A' ) && (digit <= 'Z') ) {
                digit= digit-'A';
                digit= let_to_digit[digit];
                dial_digit(digit);
                }
            i++;
            }
        printf("\nDigits dialed : %s\n",tel_num);
    } int check_dial_tone() { write_phy02_cmd(ENABLE_DIAL_TONE_DETECTOR);
    HOST_RESPONSE=0;

if( wait(REPORT_DIAL_TONE_DETECTOR, DIAL_TONE_DETECTED, DIAL_TONE_DETECTED,
DIAL_TONE_TIMEOUT_s)== 0 ) {
            printf("\nNo Dial Tone Present\n");
            return(0);
            }
    else {    printf("\nDial Tone Detected\n");
            return(1);
            }
    } void dial_digit(int digit) {
    digit=DIAL_CMD | digit;
    write_phy02_cmd(digit);
    } void go_off_hook() {
    printf("\nOff-Hook\n");
    write_phy02_cmd(OFF_HOOK);
    } void hang_up() {
    printf("\nHang-up\n");
    write_phy02_cmd(ON_HOOK);
    }
```

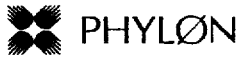  PHY1412 *Safari*

GAMES.C

```c
/*******************************************************************************
        GAMES
*******************************************************************************/ void init_games() {
      write_phy02_cmd(AUDIO_LOW);
      write_phy02_cmd(MASK_UNDERRUN);
      write_phy02_cmd(LINE_TO_HEADSET);
         RLSD_STATUS=0;
         CTS_STATUS=0;
      } void games() { printf("\nCall (C) or Answer (A) :");
      scanf("\n%c",&CALL_ANS);

GAMES_MODE='C';

if(CALL_ANS=='C') { init_games();

GAMES_STATE=IDLE;

while(1) {
                switch (GAMES_STATE) {
                   case IDLE:      dial_telephone_number();  start_call_progress_games();
GAMES_STATE=CP_STATE;    break;
                   case CP_STATE:      call_progress_games();   check_esc();
                   break;
                   case HS_STATE:      handshake_games();     check_esc();
                   break;
                   case DATA_STATE:  data_games();
      break;
                   case HANGUP_STATE:    abort_com();
                   }
                }
             } if(CALL_ANS=='A') { init_games();

go_off_hook();

system("cls");
             printf("\n\n\n\n\n\n\n\n\n\n");
             printf("\n      Press any key to handshake\n\n");
             while(!kbhit());
             check_esc();
             GAMES_STATE=HS_STATE;
             start_handshake_games();
```

PHY1412 *Safar*

```
            while(1) {
        switch (GAMES_STATE) {
            case HS_STATE:       handshake_games();    check_esc();
break;
            case DATA_STATE: data_games();                              break;
            case HANGUP_STATE:                          abort_com();

}
      }
    }
  }

/***************************************************************************
     CALL PROGRESS
***************************************************************************/ void start_call_progress_games() {
      delay(1000);
      } void call_progress_games() {
          system("cls");
          printf("\n\n\n\n\n\n\n\n\n\n");
          printf("\n     Press any key to handshake\n\n");
          while(!kbhit());
          check_esc();
          GAMES_STATE=HS_STATE;
          start_handshake_games();
          }

/***************************************************************************
     MODEM HANDSHAKE
***************************************************************************/ void start_handshake_games() {
      write_phy02_cmd(START_HANDSHAKE);
      HOST_RESPONSE=0;
      } void handshake_games() {
      write_phy02_cmd(HANDSHAKE_STATUS);
      if( ((HOST_RESPONSE & HS_STATUS_N1)>>8) == HS_SUCCESS ) {
         printf("\nHandshake successful\n");
         printf("\nConnect V.32terbo");
         printf("     ");
         switch( (HOST_RESPONSE & HS_STATUS_N2)>>4 ) {
            case  6:   printf("Speed 4800 bps\n");   break;
            case  7:   printf("Speed 7200 bps\n");   break;
            case  8:   printf("Speed 9600 bps\n");   break;
            case  9:   printf("Speed 9600 bps\n");   break;
            case 10:   printf("Speed 12000 bps\n");  break;
            case 11:   printf("Speed 14400 bps\n");  break;
            case 12:   printf("Speed 16800 bps\n");  break;
            case 13:   printf("Speed 19200 bps\n");  break;
            }
         GAMES_STATE=DATA_STATE;
         }
```

```c
        else printf("\nHandshake in progress\n");

HOST_RESPONSE=0;
    }

/*******************************************************************************
    DATA
*******************************************************************************/ void data_games() { write_phy02_cmd(AUDIO_OFF);

while(!RLSD_STATUS) check_esc();
    while(!CTS_STATUS) check_esc();

HAS_STATUS=0;
        has();
    TXRDY_STATUS=1;
    TXD_STATE=0;
    CW_STATUS=0;
    GOOD_PKT=0;
    BAD_PKT=0;
    rx_data_cnt=0;
    SVD_STATE=DATA;

printf("\nEntering Voice Plus Data Mode\n");

while(1) {
      switch (SVD_STATE) {
          case DATA:          games_data_mode();      check_esc(); break;
          case LINE_INTERRUPT:    line_int();         check_esc(); break;
          case HANGUP_STATE:      abort_com();        check_esc(); break;
          }
        }
} void games_data_mode() { int data_test;
    int esc_esc=0;
    long l;

while(CTS_STATUS && RLSD_STATUS && !CW_STATUS) { if(kbhit()) {
                DATA_TX=getch();

if(DATA_TX == 27) {
                        write_phy02_data(DATA_TX);
                        esc_esc++;
                        }
                else {
                        write_phy02_data(DATA_TX);
                        esc_esc=0;
                        }
                }
```

```c
            if(rx_data_cnt) {
                  rx_data_cnt=0;
                  printf("%c",DATA_RX);
                  has();
                  } if(esc_esc==3) user_abort();

if(GOOD_PKT) {
                  GOOD_PKT=0;
                  printf("\n GOOD PACKET  : %02x\n",HOST_RESPONSE);
                  has();
                  } if(BAD_PKT) {
                  BAD_PKT=0;
                  printf("\n BAD PACKET   : %02x\n",HOST_RESPONSE);
                  has();
                  }
            } if((CW_STATUS) || (!RLSD_STATUS)) {
            HAS_STATUS=1;
            has();
            SVD_STATE=LINE_INTERRUPT;
            system("cls");
            printf("\n\n\n\n\n\n\n\n\n\n");
            printf("\n      Line Interrupt\n");
            delay(1000);
            printf("\n      Press 'A' to accept other call: ");
            printf("\n");
            printf("\n      Press any key to reconnect or press 'H' to hang-up: ");
            }

} void line_int() { int opt;

opt=getche();

if(opt=='A') {
            write_phy02_cmd(FLASH_HOOK);
            system("cls");
            printf("\n\n\n\n\n\n\n\n\n\n");
            printf("\n      Second Call mode\n");
            printf("\n      Press 'R' to return to First Call: ");

if(getche()=='R') {
                  write_phy02_cmd(FLASH_HOOK);
                  system("cls");
                  printf("\n\n\n\n\n\n\n\n\n\n");
                  printf("\n      Back to First Call\n");
                  }
```

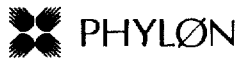

PHY1412 *Safari*

```
            printf("\n");
            printf("\n        Press any key to Reconnect or Press 'H' to Hang-up: ");
    if(getche()=='H') {
            SVD_STATE=HANGUP_STATE;
            return;
            } write_phy02_cmd(AUDIO_LOW);
    write_phy02_cmd(START_HANDSHAKE);
    RLSD_STATUS=0;
    while( (!RLSD_STATUS) && (!CTS_STATUS) ) {
            check_esc();
            printf("\n\n        Handshaking ... \n");
            }
    write_phy02_cmd(AUDIO_OFF);

HAS_STATUS=0;
    has();
    TXRDY_STATUS=1;
    TXD_STATE=0;
    CW_STATUS=0;
    GOOD_PKT=0;
    BAD_PKT=0;
    rx_data_cnt=0;
    SVD_STATE=DATA;

printf("\n        Reconnected\n\n");
    return;
    } if(opt=='H') {
    SVD_STATE=HANGUP_STATE;
    return;
    } write_phy02_cmd(AUDIO_LOW);
    write_phy02_cmd(START_HANDSHAKE);
    RLSD_STATUS=0;
    while((!RLSD_STATUS) && (!CTS_STATUS) ) {
    check_esc();
    printf("\n\n        Handshaking ... \n");
    }
    write_phy02_cmd(AUDIO_OFF);

HAS_STATUS=0;
    has();
    TXRDY_STATUS=1;
    TXD_STATE=0;
    CW_STATUS=0;
    GOOD_PKT=0;
    BAD_PKT=0;
    rx_data_cnt=0;
    SVD_STATE=DATA;

printf("\n        Reconnected\n\n");

}
```

MODEM.C

```c
/******************************************************************************
    MODEM
******************************************************************************/ void init_modem() {
        write_phy02_cmd(ANS_MODE | REJ_RDL | TXCLK_LOCAL | DIS_CALL_WAITING | V32_TERBO);
        write_phy02_cmd(ENA_ANS_TONE  |  NO_GUARD_TONES  |  ENA_AUTO_MODE  |  DIAL_LINE
ENA_AUTO_RETRAIN_RENEG | PAR_ASYNC_CONF | ENA_ADAPT_RLSD);
        write_phy02_cmd(AUDIO_LOW);
        write_phy02_cmd(NON_REAL_TIME_DATA_ONLY);
        write_phy02_cmd(MASK_UNDERRUN);
        write_phy02_cmd(V24_MASK_RLSD);
        } void modem() { printf("\nCall (C) or Answer (A) :");
        scanf("\n%c",&CALL_ANS);

printf("\nFile Transfer Mode (F) or Chat Mode (C) :");
        scanf("\n%c",&MODEM_MODE);

if(CALL_ANS=='C') { init_modem();

MODEM_STATE=IDLE;

while(1) {
                 switch (MODEM_STATE) {
                    case IDLE:       dial_telephone_number();  start_call_progress_modem();
MODEM_STATE=CP_STATE;    break;
                    case CP_STATE:          call_progress_modem();  check_esc();
                             break;
                    case HS_STATE:          handshake_modem();       check_esc();
                    break;
                    case DATA_STATE:  data_modem();
        break;
                    case HANGUP_STATE:    abort_com();
                    }
                 }
              } if(CALL_ANS=='A') {
              RI_STATUS=0;

write_phy02_cmd(V24_MASK_RI);

printf("\nWaiting for Ring\n");

while(!RI_STATUS) check_esc();

printf("\nRing Detected\n");
```

PHY1412 *Safari*

```
            go_off_hook();

init_modem();

MODEM_STATE=HS_STATE;

start_handshake_modem();

while(1) {
                switch (MODEM_STATE) {
                  case HS_STATE:        handshake_modem();      check_esc();
break;
                  case DATA_STATE: data_modem();                                 break;
                  case HANGUP_STATE:                                      abort_com();

}
              }
            }
      }

/************************************************************************
      CALL PROGRESS
*************************************************************************/ void start_call_progress_modem() {
      delay(1000);
      write_phy02_cmd(ENABLE_CALL_PROGRESS);
      HOST_RESPONSE=0;
      } void call_progress_modem() { write_phy02_cmd(REPORT_CALL_PROGRESS);

switch(HOST_RESPONSE & CP_RESPONSE_MASK) {
                  case 1:    printf("\nDial Tone Detected\n");   MODEM_STATE=HANGUP_STATE;
      break;
                  case 2:    printf("\nBusy Detected\n");
MODEM_STATE=HANGUP_STATE;    break;
                  case 3:    printf("\nRingback Detected\n");                       break;
                  case 6:    printf("\nAnswer Tone Detected\n");   MODEM_STATE=HS_STATE;
start_handshake_modem();
                                                                  break;
                  case 8:    printf("\nVoice Detected\n");   MODEM_STATE=HANGUP_STATE;
      break;
                  }
            HOST_RESPONSE=0;
            }

/************************************************************************
      MODEM HANDSHAKE
*************************************************************************/ void start_handshake_modem() {
      write_phy02_cmd(START_HANDSHAKE);
      HOST_RESPONSE=0;
      }
```

```c
void handshake_modem() {
    write_phy02_cmd(HANDSHAKE_STATUS);
    if( ((HOST_RESPONSE & HS_STATUS_N1)>>8) == HS_SUCCESS ) {
        printf("\nHandshake successful\n");
        switch( (HOST_RESPONSE & HS_STATUS_N3) ) {
            case 1:     printf("\nConnect V.32terbo");    break;
            case 2:     printf("\nConnect V.32terbo");    break;
            case 3:     printf("\nConnect V.22bis");      break;
            case 4:     printf("\nConnect V.22");         break;
            case 5:     printf("\nConnect Bell 212");     break;
            case 7:     printf("\nConnect V.21");         break;
            case 8:     printf("\nConnect Bell 103");     break;
        }
        printf("      ");
        switch( (HOST_RESPONSE & HS_STATUS_N2)>>4 ) {
            case  1:    printf("Speed 1200/75 bps\n");    break;
            case  2:    printf("Speed 75/1200 bps\n");    break;
            case  3:    printf("Speed 0-300 bps\n");      break;
            case  4:    printf("Speed 1200 bps\n");       break;
            case  5:    printf("Speed 2400 bps\n");       break;
            case  6:    printf("Speed 4800 bps\n");       break;
            case  7:    printf("Speed 7200 bps\n");       break;
            case  8:    printf("Speed 9600 bps\n");       break;
            case  9:    printf("Speed 9600 bps\n");       break;
            case 10:    printf("Speed 12000 bps\n");      break;
            case 11:    printf("Speed 14400 bps\n");      break;
            case 12:    printf("Speed 16800 bps\n");      break;
            case 13:    printf("Speed 19200 bps\n");      break;
        }
        MODEM_STATE=DATA_STATE;
    } else printf("\nHandshake in progress\n");

HOST_RESPONSE=0;
}

/********************************************************************************
        DATA
********************************************************************************/ void data_modem() { int esc_esc=0;
    long l;

while(!RLSD_STATUS) check_esc();

write_phy02_cmd(AUDIO_OFF);

HAS_STATUS=0;
    TXRDY_STATUS=1;
    TXD_STATE=0;

if(MODEM_MODE=='C') { while(RLSD_STATUS) {
```

```
        if(kbhit()) {
                DATA_TX=getch();

if(DATA_TX == 27) {
                        write_phy02_data(DATA_TX);
                        esc_esc++;
                        }
                else {
                        write_phy02_data(DATA_TX);
                        esc_esc=0;
                        }
                } if(rx_data_cnt) {
                rx_data_cnt=0;
                printf("%c",DATA_RX);
                        has();
                } if(esc_esc==3) user_abort();
        } printf("\nLost Line\n");
        abort_com();
        } if(MODEM_MODE=='F') {
        printf("\nEnter filename to transfer :");
        scanf("\n%s",&fil_name);

printf("\nTransmit (T) or Receive (R) file :");
        scanf("\n%c",&FTP_MODE);

if(FTP_MODE=='T') {
                ftp_file=fopen(fil_name,"rb");

fseek(ftp_file,0L,SEEK_END);
                fil_len=ftell(ftp_file);
                fseek(ftp_file,0L,SEEK_SET);
                fil_len-=ftell(ftp_file);

write_phy02_cmd(PARALLEL_STATUS);
                for(l=0;l<fil_len;l++) {
                        fread(&DATA_TX,1,1,ftp_file);
                        write_phy02_data(DATA_TX);
                        check_esc();
                        }
                printf("\nFile Transfer Complete\n");
                        fclose(ftp_file);

MODEM_STATE=HANGUP_STATE;
                } if(FTP_MODE=='R') {
                ftp_file=fopen(fil_name,"wb");
                HAS_STATUS=0; has();
                while(RLSD_STATUS) {
```

```
                if(rx_data_cnt) {
                        rx_data_cnt=0;
                        fwrite(&DATA_RX,1,1,ftp_file);
                        has();
                        }
                check_esc();
                } printf("\nFile Transfer Complete\n");
                fclose(ftp_file);

MODEM_STATE=HANGUP_STATE;
        }
    }

}
```

PHYLØN  PHY1412 *Safari*

FAX.C

```c
/*******************************************************************************
    FAX
*******************************************************************************/ void init_fax()  {
      write_phy02_cmd(AUDIO_LOW);
      write_phy02_cmd(UNMASK_TXRDY);
      write_phy02_cmd(V24_MASK_V21_RLSD_CTS);
      } void fax()   { printf("\nCall (C) or Answer (A) :");
      scanf("\n%c",&CALL_ANS);

if(CALL_ANS=='C')  { init_fax();

FAX_STATE=IDLE;

while(1)  {
                switch (FAX_STATE)  {
                      case IDLE:        dial_telephone_number();   start_call_progress_fax();
FAX_STATE=CP_STATE;      break;
                      case CP_STATE:        call_progress_fax();          check_esc();
                      break;
                      case HS_STATE:        handshake_fax_call();
FAX_STATE=HANGUP_STATE;                       break;
                      case HANGUP_STATE:    abort_com();
                      }
                  }
              } if(CALL_ANS=='A')  {

RI_STATUS=0;

write_phy02_cmd(V24_MASK_RI);

printf("\nWaiting for Ring\n");

while(!RI_STATUS) check_esc();

printf("\nRing Detected\n");

go_off_hook();

init_fax();

handshake_fax_ans();

abort_com();

}
      }
```

PHYLØN            PHY1412 *Safai*

```c
/******************************************************************************
        CALL PROGRESS
******************************************************************************/ void start_call_progress_fax() {
      delay(1000);
      write_phy02_cmd(ENABLE_CALL_PROGRESS);
      HOST_RESPONSE=0;
      } void call_progress_fax() { write_phy02_cmd(REPORT_CALL_PROGRESS);

switch(HOST_RESPONSE & CP_RESPONSE_MASK) {
                  case 1:    printf("\nDial Tone Detected\n");     MODEM_STATE=HANGUP_STATE
break;
                  case 2:    printf("\nBusy Detected\n");          FAX_STATE=HANGUP_STATE;
break;
                  case 3:    printf("\nRingback Detected\n");                      break;
                  case 6:    printf("\nAnswer Tone Detected\n");   FAX_STATE=HS_STATE;
break;
                  case 8:    printf("\nVoice Detected\n");         FAX_STATE=HANGUP_STATE;
break;
                  }
          HOST_RESPONSE=0;
          } void  handshake_fax_ans()    {}
void  handshake_fax_call()   {}
```

PHYLØN  PHY1412 *Safari*

VOICE.C

```c
/*******************************************************************************
    VOICE
*******************************************************************************/ void voice () { long l;

printf("\nEnter Voice filename :");
    scanf("\n%s",&fil_name);

printf("\nEncode (E) or Decode (D) voice :");
    scanf("\n%c",&VOICE_MODE);

if(VOICE_MODE=='E') {
        write_phy02_cmd(VOICE_CONF);
        write_phy02_cmd(PAR_SYNC_CONF);
        write_phy02_cmd(OFF_HOOK);
        delay(1000);

write_phy02_cmd(START_VOICE_ENCODE);
        delay(500);
        write_phy02_cmd(SILENCE_TX);

vce_file=fopen(fil_name,"wb");
        write_phy02_cmd(VOICE_ENCODE_ENABLE);
                HAS_STATUS=0; has();

while(1) {
            if(rx_data_cnt) {
                rx_data_cnt=0;
                fwrite(&DATA_RX,1,1,vce_file);
                has();
                }
          if(kbhit())
             if(getch() == 27) {
                  write_phy02_cmd(VOICE_ENCODE_DISABLE);
                  fclose(vce_file);
                  printf("\nRecoding complete\n");
                            abort_com();
                  }
        }

} if(VOICE_MODE=='D') {

RI_STATUS=0;

write_phy02_cmd(V24_MASK_RI);

printf("\nWaiting for Ring\n");

while(!RI_STATUS) check_esc();
```

```
    printf("\nRing Detected\n");

write_phy02_cmd(VOICE_CONF);
    write_phy02_cmd(PAR_SYNC_CONF);
    write_phy02_cmd(OFF_HOOK);
    delay(3000);
    write_phy02_cmd(VOICE_DECODE_ENABLE);

vce_file=fopen(fil_name,"rb");
    fseek(vce_file,0L,SEEK_END);
    fil_len=ftell(vce_file);
    fseek(vce_file,0L,SEEK_SET);
    fil_len-=ftell(vce_file);
    delay(1000);

TXRDY_STATUS=1;
    write_phy02_cmd(PARALLEL_STATUS);

for(l=0;l<fil_len;l++) {
          fread(&DATA_TX,1,1,vce_file);
          write_phy02_data(DATA_TX);
          check_esc();
          }
    write_phy02_cmd(VOICE_DECODE_DISABLE);
    fclose(vce_file);
    printf("\nPlayback complete\n");

delay(1000);

write_phy02_cmd(START_VOICE_ENCODE);
    delay(500);
    write_phy02_cmd(SILENCE_TX);

vce_file=fopen("message.vce","wb");
    write_phy02_cmd(VOICE_ENCODE_ENABLE);
          HAS_STATUS=0; has();

l=25000;
    while(l) {
         if(rx_data_cnt) {
                rx_data_cnt=0;
                fwrite(&DATA_RX,1,1,vce_file);
                l--;
                has();
                }
         }
    write_phy02_cmd(VOICE_ENCODE_DISABLE);
    fclose(vce_file);
    printf("\nRecording complete\n");
    abort_com();
    }
}
```

[51]

PHYLON  PHY1412 *Safari*

PC.H

```
define COM4 0X300 define RESET_ADD   COM4+0
define GO_ADD      COM4+1 define WR_DAT_ADD  COM4+6
define RD_DAT_ADD  COM4+6 define RD_STS_ADD  COM4+5
define WR_MSK_ADD  COM4+5 define HAS_ADD     COM4+3 define IRQ3_ENA    0XF7
define END_OF_INT  0X20
#define PORT0_8259  0X20
define PORT1_8259  0X21 define INT3        0XB
```

VAR.H

```
typedef unsigned char   byte;
typedef unsigned short  word;

void interrupt (*old_int)();

int     CBE_STATUS;
int     TXRDY_STATUS;
int     HAS_STATUS;

byte    DATA_TX;
byte    DATA_RX;

int     RLSD_STATUS;
int     CTS_STATUS;
int     RI_STATUS;
int     V21_FLAG_STATUS;
int     CW_STATUS;

int     GOOD_PKT,BAD_PKT;

int     TXD_STATE;

int     GAMES_STATE;
int     MODEM_STATE;
int     SVD_STATE;
int     FAX_STATE;

int     HOST_RESPONSE;
int     rx_data_cnt=0;

char    COM_MODE;
char    GAMES_MODE;
char    MODEM_MODE;
char    FTP_MODE;
char    VOICE_MODE;
char    CALL_ANS;

long    fax_len,fil_len;

char    fil_name[20];

FILE    *fax_file, *ftp_file, *vce_file;
```

FUNCTION.H

```c
void irq3_ena();
void eof_int();
void reset_dsp();
void write_phy02_cmd(word);
void write_phy02_data(byte);
void write_phy02_int_mask(byte);
word read_phy02_resp(void);
byte read_phy02_status_reg(void);
void has();
void interrupt phy02_isr();
void restore_interrupt();
void init_interrupt();
void load_dsp();
void init_dsp();
void banner ();
void reset();
int  wait();
void int_s();
char *get_num();
void dial_telephone_number();
int  check_dial_tone();
void start_call_progress_modem();
void start_call_progress_games();
void start_call_progress_fax();
void call_progress_games();
void call_progress_modem();
void call_progress_fax();
void dial_digit();
void go_off_hook();
void hang_up();
void init_modem();
void modem();
void fax();
void start_handshake_modem();
void start_handshake_games();
void handshake_modem();
void handshake_games();
void handshake_fax_call();
void handshake_fax_ans();
void user_abort();
void abort_com();
void check_esc();
void host_interp();
void tx_silence();
void voice();
void line_int();
void data_modem();
void games_data_mode();
void data_games();
void debug();
```

STATE.H

```c
#define IDLE            0
#define DIAL_STATE      1
#define CP_STATE        2
#define HS_STATE        3
#define DATA_STATE      4
#define HANGUP_STATE    5
#define DATA            6
#define LINE_INTERRUPT  7
```

**PHY1412 *Safari***

DSP_CMDS.H

```c
#define PHY02_INT_MASK  0x9F
#define CBE_MASK  0x40
define RBF_MASK  0x20 define DIAL_TONE_TIMEOUT_s          10
define CALL_PROGRESS_DURATION_s     30
#define HANDSHAKE_DURATION_s         45
define WAIT_10_s                    10 define SW_RESET                     0xD002 define HAM_MODE_ON                  0xA031
define HOST_ECHO_OFF                0x010F define AUDIO_HIGH                   0x0302
define AUDIO_MEDIUM                 0x0202
#define AUDIO_LOW                    0x0102
define AUDIO_OFF                    0x0002 define OFF_HOOK                     0xA060
define ON_HOOK                      0xA040
define FLASH_HOOK                   0xA0A0 define DIAL_CMD                     0x8A20 define ENABLE_DIAL_TONE_DETECTOR    0x8C01
define REPORT_DIAL_TONE_DETECTOR    0x8C01
#define DIAL_TONE_DETECTED           0x8C01
#define ENABLE_CALL_PROGRESS         0x8C00
#define REPORT_CALL_PROGRESS         0x8C00
#define CP_RESPONSE_MASK             0x000F
#define TX_FAX_CALL_TONE             0x8A00
#define TX_FAX_ANS_TONE              0x8A02
define SILENCE_TX                   0xA000 define CALL_MODE                    0x2800
define ANS_MODE                     0x2000
#define REJ_RDL                      0x2400
#define TXCLK_LOCAL                  0x2000
#define ENA_CALL_WAITING             0x2080
#define DIS_CALL_WAITING             0x2080
define V32_TERBO                    0x2000 define ENA_ANS_TONE                 0x3000
define DIS_ANS_TONE                 0x3800
#define NO_GUARD_TONES               0x3000
#define ENA_AUTO_MODE                0x3000
#define DIS_AUTO_MODE                0x3100
#define DIAL_LINE                    0x3080
define ENA_AUTO_RETRAIN_RENEG       0x3000 define DIS_AUTO_RETRAIN_RENEG       0x3040
define PAR_ASYNC_CONF               0x3002
#define PAR_HDLC_CONF                0x3012
#define PAR_SYNC_CONF                0x3032
#define ENA_ADAPT_RLSD               0x3000
define DIS_ADAPT_RLSD               0x3001 define VOICE_PLUS_DATA_MODE         0xB000
define LINE_TO_HEADSET              0xB000
#define NON_REAL_TIME_DATA_ONLY      0xB600
#define REAL_TIME_VPD_NO_ERROR_DETECT 0xB601
#define REAL_TIME_VPD_ERROR_DETECT   0xB602
#define VOICE_PLUS_DATA_MODE         0xB000
#define CALL_WAITING_DETECT          0xB100
define CALL_WAITING_RESPONSE        0xB1FF define PARALLEL_DATA                0xF000
define PARALLEL_STATUS              0xF300
#define UNMASK_TXRDY                 0xF207
define MASK_UNDERRUN                0xF204 define START_HANDSHAKE              0x8000
define HANDSHAKE_STATUS             0x8100
#define HS_STATUS_N1                 0x0F00
#define HS_STATUS_N2                 0x00F0
#define HS_STATUS_N3                 0x000F
define HS_SUCCESS                   0x0006 define         VOICE_CONF           0x2038
define VOICE_ENCODE_ENABLE          0x6880
#define VOICE_ENCODE_DISABLE         0x6881
#define VOICE_DECODE_ENABLE          0x6882
#define VOICE_DECODE_DISABLE         0x6883
define START_VOICE_ENCODE           0x6000 define V24_RESPONSE                 0xA400
define V24_MASK_RI                  0xA3DF
#define V24_MASK_RLSD                0xA3FE
#define V24_MASK_CTS                 0xA3FD
#define V24_MASK_RLSD_CTS            0xA3FC
#define V24_MASK_V21_RLSD_CTS        0xA3BC
#define CTS_MASK                     0x0002
#define RLSD_MASK                    0x0001
#define RI_MASK                      0x0020
define V21_FLAG_MASK                0x0040 define TXRDY                        0xF300
define TXNOTRDY                     0xF308
#define GOOD_DATA                    0xF301
#define BAD_DATA                     0xF311
#define DATA_MASK                    0x00FF
#define DATA_ADD                     0xF0
#define HOST_RESP_MASK               0xFF00
```

NOTES

155

4027 Clipper Court
Fremont, California 94538-6540
Phone: (510) 656-2606
FAX: (510)656-0902
BBS: (510) 656-0916

Information furnished by Phylon is believed to be accurate and reliable. However, no responsibility is assumed by Phylon for its use; nor for any infringements of patents or other rights of third parties which may result from its use. No license is granted by implication or otherwise under any patent or patent rights of Phylon other than circuitry embodied in Phylon products. Phylon reserves the right to change circuitry at any time without notice. This document is subject to change without notice.

Printed in USA
Doc.# M10051, Rev.1.0 092794

©Phylon 1994

APPENDIX D

157
PHY2000 PC
Hardware & Software Installation Manual
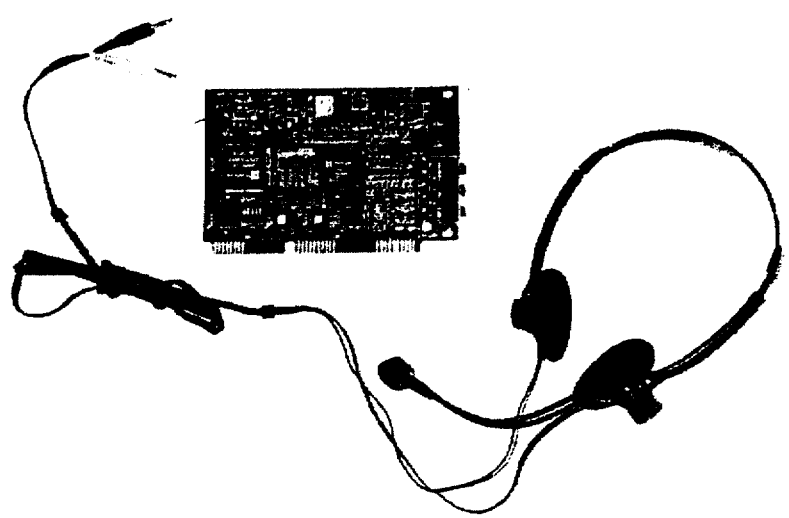

158

For Technical Assistance or further information, please contact:

>  Phylon
> 4027 Clipper Court
> Fremont, CA 94538-6540
> Telephone: (510) 656-2606
> Facsimile: (510) 656-0902
> BBS: (510) 656-0916
> Email: phylon@ix.netcom.com
> Website: http://www.phylon.com/

The hardware/software design of the PHY2000 PC is protected by domestic and international copyright laws and can be used only in the manner described in this manual.

Phylon makes no warranties with respect to this documentation and disclaims any implied warranties of merchant ability or fitness for a particular purpose. The information in this document is subject to change without any notice. Phylon assumes no responsibility for any errors that may appear in the document.

From time to time updates are made to the hardware and software that are not reflected in the manual. If such changes are known to affect the product significantly, a README.DOC file is located on the disk that lists such change or variations. The user should be sure to read this file before using the product.

Phylon shall not be liable for any loss of profit or damages that may arise from the use of this product.

PlayLink, PhyLink, and SoftCom are trademarks of Phylon, Inc. Windows is a trademark of Microsoft. Pentium is a trademark of Intel.

© Phylon 1995    First Printing

All Rights Reserved    Printed in USA

INTRODUCTION

Phylon's PHY2000 PC Adapter Card is a high performance, digital simultaneous voice and data, and high speed fax and data internal modem that utilizes Phylon's PHY2000 communications chip-set. The card supports IBM compatible PC/AT, 386, 486 and Pentium™ computers and offers easy installation and configuration.

The PHY2000 PC features a true SoftCom™ architecture optimized for the PC environment. Communications DSP code is booted from system disk to the PHY2000 for execution upon system power-up. Modem configuration, function, and operation can be changed dynamically. This permits the PHY2000 PC to instantly respond to any application program's performance demands.

In support of this architecture, the PHY2000 PC is accompanied and supported by:

> BizLink, a Windows graphical user interface (GUI) that enables and supports digital simultaneous voice and data (DSVD) operation on a single telephone line for collaborative computing applications. DSVD operation is enhanced with adaptive channel bandwidth allocation which optimizes voice and data rates and permits full modem speed for data during voice silences.
>
> PlayLink™, both DOS and Windows GUI implementations of DSVD optimized to offer maximum real-time performance in interactive remote gaming applications and greatly reduce and simplify modem setup, dial-up and connection, and game initialization procedures.
>
> PhoneLink, both DOS and Windows GUIs that provides hands-free full duplex speakerphone and on-screen dialer for your computer. It permits dialing from keyboard or mouse entry, from an on-screen, user edited phonebook.

The PHY2000 PC also operates as a general fax/modem and supports a complete, usable AT command set. Additional software modules add voice telephony features to your computer such as answering machine capabilities with recording and playback of voice, concurrent detection of DTMF answer tones, and automatic switching to fax mode. Many important features of the PHY2000 PC include:

- DSVD for collaborative computing (to be software upgraded to V.62 upon approval of standards)

- ITU-T V.34, V.32bis, V.32, V.23, V.22bis, V.22, V.21, Bell 212 and 103 at data rates of 28800, 26400, 24000, 21600, 19200, 16800, 14400, 12000, 9600, 7200, 4800, 2400, 1200 and 300 bit/s

- Group 3 FAX: V.17, V.29, V.27ter and V.21 Channel 2 with V.21 carrier detection concurrent with high-speed image data reception

- Modem AT Commands

- Fax Class 1 AT Commands

- Compatibility with popular DOS and Windows-based data/fax/voice modem software.

- Software upgrades available via diskette, bulletin board and Internet.

- Interface:
  - Parallel UART with 1K byte internal buffers at 1 Mbit/s transfer rate and 3 seconds of buffering under Windows™

The PHY2000 PC is totally software upgradeable. Since all communications code is booted from system disk-resident files, upgrading is as easy as obtaining an upgrade diskette from Phylon, or downloading the latest version software from Phylon's Internet Webpage or BBS, then overwriting the superseded files with the upgraded files. Phylon's street, e-mail and Webpage addresses, along with all pertinent phone numbers, are listed on the back page of this publication.

PHY2000 PC HW/SW Installation

161

HARDWARE INSTALLATION

Preparing the PHY2000 PC for installation

1. Remove the PHY2000 PC card from the antistatic wrapper and place it on a static-free flat surface so that it appears as shown below.

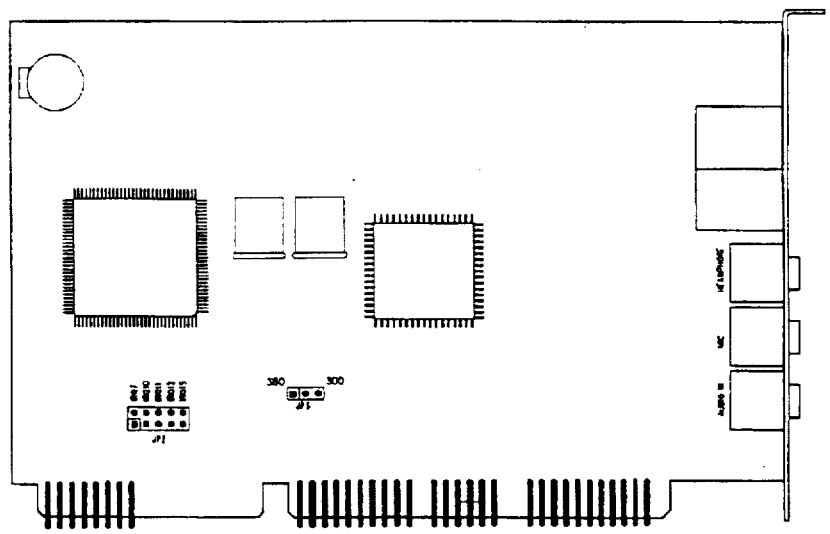

2. Inspect jumper block JP2 to insure a slip-on jumper is installed across the vertical pin-pair labeled IRQ10. This assigns the PHY2000's DSP interrupt to the ISA Bus interrupt IRQ10.

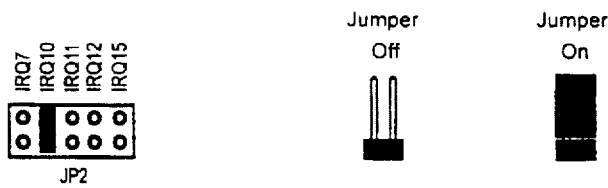

PHY2000 PC HW/SW Installation

3. Inspect jumper block JP3 to insure a slip-on jumper has been installed on the left pair of the three pins. This selects the DSP I/O address as 380H.

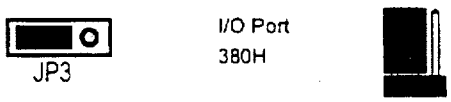

I/O Port
380H

4. The PHY2000 PC card is now ready for installation.

Installing the PHY2000 PC

To install the PHY2000 PC adapter card into the computer:

1. Turn off the computer's power.

2. Remove the screws that fasten the cover of the computer to the chassis. These are usually located on the back (or side) of the computer.

3. Slide the cover off. Put the cover aside.

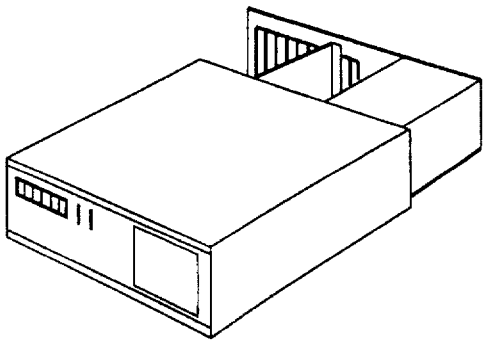

Removing the computer cover.

PHY2000 PC HW/SW Installation

163

4. Locate a spare 16-bit (long) open expansion slot for the PHY2000 PC card.

5. Plug the PHY2000 PC card carefully into the open expansion slot mentioned earlier. If present, remove the empty slot's filler bracket first.

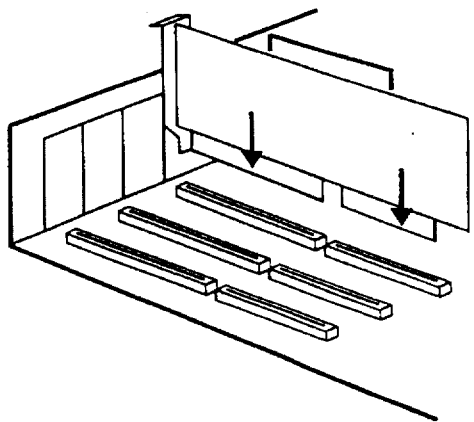

Plugging in the PHY2000 PC adapter card.

6. Use the bracket screw to affix the card to the computer chassis.

7. Slide the computer's cover back on the chassis and reinstall the chassis screws.

8. Connect the computer to the telephone line by inserting one end of a standard line cord into the appropriate wall outlet and the other end into the one of the two phone jacks labeled "LINE" located on the PHY2000 PC card bracket.

9. Plug the telephone cord from the telephone set into the other phone jack labeled "LINE" located on the PHY2000 PC card bracket.

10. Plug the headset mini-plug into the mini-jack labeled "HEADPHONE" and the microphone mini-plug into the mini-jack labeled "MICROPHONE".

PHY2000 PC HW/SW Installation 164
11. Plug one end of the sound cord into the sound board's "SPEAKER OUT" mini-jack and the other end into the PHY2000 PC's "AUDIO IN" mini-jack.
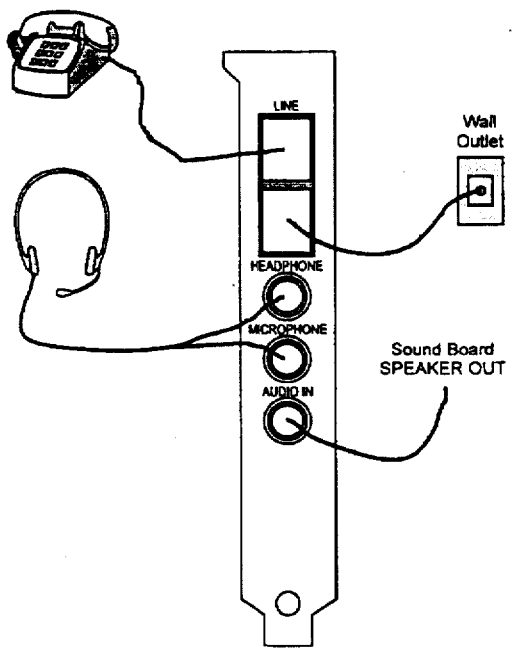
12. Turn on the power to your computer. The PHY2000PC is now ready for software installation and operation.
PHY2000 PC HW/SW Installation

SOFTWARE INSTALLATION

The PHY2000 PC supporting software is contained on the included 3.5" floppy diskettes. After the software is installed in accordance with the instructions contained below, the PHY2000 PC can be operated as a standard data/fax modem card.

First, install PHY2000 Software from DOS:

1. Put the DOS Software Installation Diskette #1 into an available disk drive.

2. Go to that disk drive, and enter INSTALL.

EXAMPLE: A:\>INSTALL   (or B:\>INSTALL)

The installation software:

1. Creates a directory named C:\PHYLON

2. Copies all of the files from the installation diskette to C:\PHYLON.

3. Adds the following statement to the AUTOEXEC.BAT file:

PATH %PATH%;C:\PHYLON

4. Adds the following command to the end of the AUTOEXEC.BAT file to insure MODEM/FAX software is loaded each time the computer is powered-on:

BOOTDSP.EXE

Note: if the last statement of the original AUTOEXEC.BAT contained a call to another executable program from which it doesn't return (i.e., WIN.COM), you will have to edit the modified AUTOEXEC.BAT file to move the new statements ahead of the program call.

5. Detects the available COM ports and IRQ interrupt vectors and automatically select an appropriate combination.

6. Tests for validity of the above setup.

7. Displays the message "PHY2000 DOS software installation completed. Please reboot your computer for settings to take effect."

PHY2000 PC HW/SW Installation

166

Next, install the Windows GUIs

To complete installation of the Windows graphic user interfaces (GUIs), start Windows, then put the Windows GUI Installation Diskette #1 in your disk drive and run A:\SETUP (or B:\SETUP) from the Program Manger's File menu. Follow any displayed instructions. The setup software:

1. Creates a new program group titled "PhyLink Applications."

2. Installs the PlayLink, BizLink, PhoneLink and Hardware Setup icons in the group. When the Windows installation is complete, the resultant program group will be displayed as shown below:

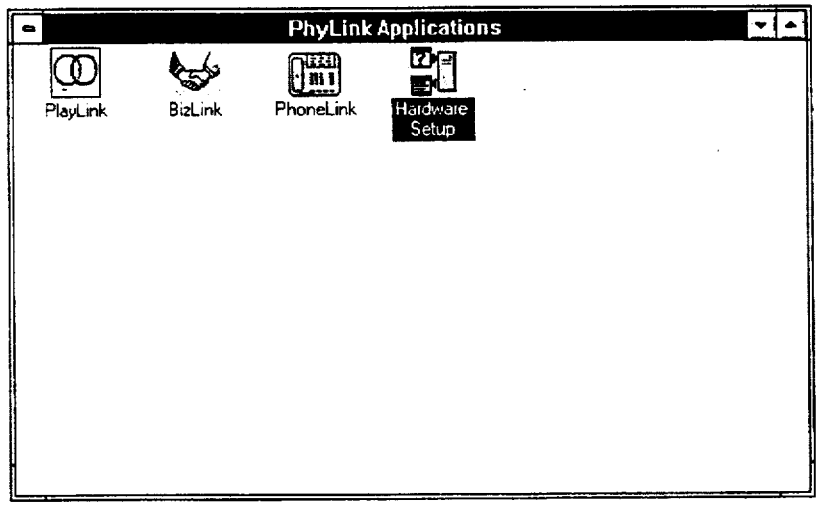

Complete the installation by rebooting your system.

During reboot, the data/fax modem code is downloaded to the PHY2000 PC and operation initialized. The PHY2000 PC card is now available for use as a standard data/fax modem.

Refer to the <u>PHY2000 PC PhyLink™ Software User's Manual</u> for instructions on how to use PlayLink, BizLink, PhoneLink and Hardware Setup.

Refer to the <u>PHY2000 PC MessageLink Software User's Manual</u> for instructions on how to use the standard modem, fax, AT commands, and telephony features.

PHY2000 PC HW/SW Installation

Troubleshooting Installation Problems

The following hints are offered to help you troubleshoot any problems you may encounter during installation.

If the screen is blank (dark) during system power-on

This occurs when the slip-on jumper on jumper JP3 is not installed or improperly installed (making contact with only one pin). Install the jumper across the left or right pair of pins.

If the messages "Do not detect PHY2000." and "PHY2000 installation failed." are displayed, then

1. The board is not installed. Install the board, then rerun the installation; or 2. There is an I/O address conflict. Move the slip-on jumper JP3 to the alternate pair of pins, then rerun the installation; or 3. The board is installed but may have experienced a hardware failure. Return the board for repair or replacement.

If the message "Cannot configure COM and IRQ" is displayed

There are already four COM ports present in your system. Disable or remove one unused or unneeded serial port, then rerun the installation. The installation software assigns the highest available COM port and its associated IRQ to the PHY2000 PC (usually COM4 and IRQ3).

If either of the messages "Cannot write to DSP" or "Cannot write to UART" are displayed

The board may have experienced a hardware failure during software installation. Return the board for repair or replacement.

PHY2000 PC HW/SW Installation

If you encounter erratic system behavior during operation (i.e., intermittent invalid call waiting messages, unrequested downloads to the modem, etc.) There may be an interrupt conflict in the system between the PHY2000 PC DSP and some other hardware. Change the jumper on JP2 to another position to select and alternate IRQ — your choices include IRQ7, IRQ10, IRQ11, IRQ12, and IRQ15. CAUTION: sound cards may use IRQ7. You must also edit the PHY2000.CFG file to reflect the new IRQ choice.

Changing your COM port and IRQ settings.

The COM port and IRQ assignments are contained in the PHY2000.CFG file located in the C:\PHYLON directory. You may normally those assignment from the PlayLink menu screen (select SETUP). You may also be change them by editing the PHY2000.CFG file with a standard text editor. PHY2000.CFG contains the following statements:

```
COM4         (COM port)
IRQ3         (COM port IRQ)
IO=380       (DSP I/O address; matches JP3 setting)
INT=10       (DSP interrupt IRQ; matches JP2 setting)
```

The first three lines are updated each time INSTALL is run. The last line must be edited to Insure that it matches any changes to jumper JP2 settings. If you change the jumper settings, you must also change the entries in this file to match the new settings.

PHY2000 PC HW/SW Installation

169

CONSUMER INFORMATION AND FCC REQUIREMENTS

1. The Federal Communications Commission (FCC) has established Rules Which permits this device to be directly connected to the telephone network. Standardized jacks are used for these connections. This equipment should not be used on party lines or coin lines.

2. If this device is malfunctioning, it may also be causing harm to the telephone network; this device should be disconnected until the source of the problem can be determined and until repair has been made. If this is not done, the telephone company may temporarily disconnect service.

3. The telephone company may make changes in its technical operations and procedures; if such changes affect the compatibility or use of this device, the telephone company is required to give adequate notice of the changes.

4. If the telephone company requests information on what equipment is connected to their lines, inform them of:

(a) The telephone number that this units is connected to,
    (b) The ringer equivalence number [ ]
    (c) The USOC jack required [ ]
    (d) The FCC Registration Number Item (b) and (c) are indicated on the label. The ringer equivalence number (REN) is used to determine how many devices can be connected to your telephone line. In most areas, the sum of the RENs of all devices on any one line should not exceed five (5.0). If too many devices are attached, they may not ring properly.

Service Requirements

5. In the event of equipment malfunction, all repairs should be performed by our Company or an authorized agent. It is the responsibility of users requiring services to report the need for service to our Company or to one of our authorized agents.

Service can be obtained at:

Phylon Communications, Inc.
    4027 Clipper Court
    Fremont, CA 94538-6540
    Telephone: (510) 656-2606

PHY2000 PC HW/SW Installation

170

- LIMITED WARRANTY -

Phylon warrants this product to be free from defects in workmanship and material under normal and proper use for one year after the original date of consumer purchase.

In the event of a warranty claim for defects which appear within the warranty period, consumer shall deliver the product along with proof of purchase to the original place of purchase, shipping prepaid. Phylon shall repair or replace the defective product, at the sole option of Phylon. All transportation risks and costs in connection with warranty service are the responsibility of consumer.

THIS WARRANTY IS IN LIEU OF ALL OTHER WARRANTIES, EXPRESS OR IMPLIED, INCLUDING WITHOUT LIMITATION, IMPLIED WARRANTIES OF MERCHANTABILITY AND FITNESS FOR A PARTICULAR PURPOSE, TO ANY CONSUMER, END USER, PURCHASER, OR OTHERWISE. IN NO EVENT SHALL PHYLON BE LIABLE FOR LOSS OF PROFITS, INDIRECT, SPECIAL, INCIDENTAL, OR CONSEQUENTIAL DAMAGES ARISING OUT OF ANY BREACH OF CONTRACT OR WARRANTY, NEGLIGENCE, STRICT LIABILITY OR OTHERWISE.

The remedies for defects in this product are limited to those set forth above. If this limitation of remedies is held by any court to be void or unenforceable, or if no warranty is made, Phylon's liability shall in no event exceed the purchase price of the product giving rise to the claim, regardless of whether such claim is brought in breach of contract of warranty, negligence, strict liability or otherwise.

PHY2000 PC HW/SW Installation

171

*FCC WARNING STATEMENT*

NOTE:

This equipment has been tested and found to comply with the limits for a Class B digital device, pursuant to Part 15 of the FCC Rules. These limits are designed to provide reasonable protection against harmful interference in a residential installation. This equipment generates, uses and can radiate radio frequency energy and, if not installed and used in accordance with the instructions, may cause harmful interference to radio communications. However, there is no guarantee that interference will not occur in a particular installation. If this equipment does cause harmful interference to radio or television reception, which can be determined by turning the equipment off and on, the user is encouraged to try to correct the interference by one or more of the following measures:

* Reorient or relocate the receiving antenna.

* Increase the separation between the equipment and receiver.

* Connect the equipment into an outlet on a circuit different from that to which the receiver is connected.

* *Consult the dealer or an experienced radio/TV technician for help.*

CAUTION:

CHANGES OR MODIFICATIONS NOT EXPRESSLY APPROVED BY THE PARTY RESPONSIBLE FOR COMPLIANCE COULD VOID THE USER'S AUTHORITY TO OPERATE THE EQUIPMENT.

"This device complies with Part 15 of the FCC Rules. Operation is subject to the following two conditions :

(1) this device may not cause harmful interference, and (2) this device must accept any interference received, including interference that may cause undesired operation."

PHY2000 PC HW/SW Installation

172
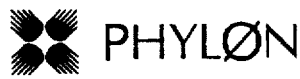 PHYLØN
4027 Clipper Court
Fremont, CA 94538-6540
Telephone: (510) 656-2606
Facsimile: (510) 656-0902
BBS: (510) 656-0916
Email: phylon@ix.netcom.com
Website: http://www.phylon.com/
P/N 99-0002-0

APPENDIX E

174
PHYLØN
PHY2000 PC
MessageLink
Software User's Manual

For Technical Assistance or further information, please contact:

>Phylon
>4027 Clipper Court
>Fremont, CA 94538-6540
>Telephone: (510) 656-2606
>Facsimile: (510) 656-0902
>BBS: (510) 656-0916
>Email: phylon@ix.netcom.com
>Website: http://www.phylon.com/

The hardware/software design of the PHY2000 PC is protected by domestic and international copyright laws and can be used only in the manner described in this manual.

Phylon makes no warranties with respect to this documentation and disclaims any implied warranties of merchant ability or fitness for a particular purpose. The information in this document is subject to change without any notice. Phylon assumes no responsibility for any errors that may appear in the document.

From time to time updates are made to the hardware and software that are not reflected in the manual. If such changes are known to affect the product significantly, a README.DOC file is located on the disk that lists such change or variations. The user should be sure to read this file before using the product.

Phylon shall not be liable for any loss of profit or damages that may arise from the use of this product.

© Phylon 1995                                           First Printing

All Rights Reserved                                     Printed in USA

INTRODUCTION

Phylon's PHY2000 PC design is supported by a suite of software modules specifically designed to make your use of the computer in messaging a friendly and supportive experience. These SoftCom™ modules are included with the PHY2000 PC card and are referred to as the MessageLink Applications.

The MessageLink applications suite consists of:

Standard data/fax modem, the default software module that permits the PHY2000 PC to operate as a standard modem in data-only or fax-only mode (no DSVD operation)

Telephony, (to be offered later) a software module that permits the PHY2000 PC to operate as a message center with answering machine, record/playback, and automatic fax machine switching. This module also provides hands-free, full duplex speakerphone support with both acoustic and electric echo cancellation.

Software Scheme of Operation

Upon power-up, bootloader software downloads standard data/fax modem communications code from system disk and initializes the PHY2000 PC for standard modem operation. The PHY2000 PC is in MODEM mode and can be used with standard commercial and shareware modem and fax applications for DOS and Windows.

If the use of a MessageLink application is required, it can be downloaded to the PHY2000 PC for execution, where it replaces previously loaded code.

When an application other than the standard data/fax modem is terminated, or the system is reset, the standard data/fax modem code is reloaded. However, if the modem is off-hook (connected to a remote user) during reset, reloading of the standard data/fax modem code will be bypassed, and the connection maintained.

This is especially useful if an application crashes or hangs up. Without hanging up the phone, you may recover immediately and restart the application.

MessageLink User's Manual

This dynamic downloading scheme assures you that your applications are run in communication environments specifically tailored to optimize their operation. It also makes the upgrading of software and addition of new applications very easy. Use your PHY2000 PC board to cruise to Phylon's Internet Webpage and download the latest released software, then unzip it into your C:\PHYLON directory. Or obtain the software on diskette from your dealer.

MessageLink User's Manual

178

Standard Data/Fax Modem

Using the PHY2000 PC as a Data Modem

The standard data/fax modem code is boot-loaded from your system disk upon power-up, during warm reboot (using the Ctrl-Alt-Del key combination, or when the bootloader software (BOOTDSP.EXE) is run.

One this code is loaded, you can immediately use the PHY2000 PC as a standard data modem. Merely start your favorite modem application (e.g., Procomm, Bitcom, etc.) or any DOS or Windows application that utilizes a data modem. The PHY2000 PC will respond appropriately when called by the application. A limited but useful AT command set is provided to support your applications.

Your application may require some setup information prior to use. This may include a modem initialization string, DTE speed, line speed, COM port and IRQ assignment, etc.

If asked, enter the COM port and IRQ assignment made during software installation. (See the Hardware & Software Installation Manual.)

Each time the standard data/fax modem code is booted, the modem is reset to pre-programmed default values. These defaults are indicated in the AT command set explanations contained in this manual. If your application requires an initialization string, enter ATZ^M. This resets the modem to the defaults. Otherwise, enter an initialization string that implement the specific operating parameters you wish to use.

Enter any DTE speed you wish. The PHY2000 PC implements a virtual parallel UART with a 1K byte buffer. This means that you may select any DTE serial speed, but all actual data transfers to the modem are parallel transfers at ISA bus speed (~1 Mbit/second). Up to 3 seconds of data can be buffered; this insures against a data overrun that may result in some time consuming Windows applications.

The AT command set does not contain support for error correction or data compression (EC/DC). Most PC-based data transfers utilize transfer protocols that already support EC/DC. Alternatively, a V.42bis/V.42 EC/DC virtual device driver can be run on the system host to offer this capability, MessageLink User's Manual

Using the PHY2000 PC for Faxing

Once the standard data/fax modem code is loaded, you may use the PHY2000 PC to send and receive faxes The board operates as a Fax Class 1 device and supports the appropriate AT+F Class 1 AT fax commands. These are described in the AT command set explanations contained in this manual.

Refer to the previous section for information regarding specific setup requirements of your application. In addition to those mentioned, your application may require the fax class to be used, and any header and cover page information.

The PHY2000 PC is compatible with all popular DOS and Windows fax applications. Consult your dealer or manufacturer for a current applications' compatibility list for both data and fax operation.

MessageLink User's Manual

180

Using AT Commands

Issuing AT Commands

When the modem is in the command mode, it is ready to accept commands from the terminal or computer. These "AT" commands are in the form of typed command lines, and are compliant with the EIA 602 Industry Standard AT Command Set.

*The Command Line*

A command line is a string of characters starting with the command prefix (attention code) AT and ending with a special end of line character, <CR>. Only one AT is permitted for each command line. Characters typed before the AT are ignored. Command lines contain at most 40 characters after the AT, not counting spaces.

Multiple commands can be entered on one command line; spaces used to separate commands for clarity are optional and permissible.

Commands can be in upper or lower case, but upper and lower case should not be mixed.

Typing mistakes can be corrected by using the BackSpace character, <BS>, after the initial A and T characters have been entered. The command will not be executed until the Carriage Return character <CR> (enter or return key on the terminal keyboard is pressed.

To echo command line characters, use the E1 command.

Command lines may contain several commands, one after another. The Answer (A), Dial (D) and Go On-Line (O) commands usually cause any following commands in the command line to be ignored.

*Command Line Execution*

The characters in a command line are executed one at a time. Any unexpected characters (except control characters) stop command line execution and return an ERROR result code. Unexpected characters include numbers outside the range of values accepted by MessageLink User's Manual the command. All control characters in a command line except special characters such as <CR> and <BS> are ignored.

The numerical argument of a command is assumed to be 0 if it was not provided. For example, the commands ATH<CR> and ATH0<CR> both hang up the telephone line.

When the modem has executed a command line the result code of the last command executed is returned to the terminal.

If the value to be written to a modem register is outside the range of values accepted by the register then its value is not changed and the ERROR result code is returned.

Leading zeros in numeric arguments, including register numbers, are ignored. For example, ATS6=2 and ATS06=2 both set register 6 to a value of 2.

All numeric arguments, including register numbers, are decimal (base 10).

AT Command Prefix

Each modem command line begins with the letters A and T. The modem uses these characters to determine the speed and parity of data from the terminal.

A/ Repeat Last Command

To repeat the commands in the last command line type the letters A and / instead of A and T.

<CR> End of Line Character (ASCII 13)

This character is typed to end a command line. The modem executes the commands in the command line.

<BS> BackSpace Character (ASCII 8)

This character is typed to erase the last character in a command line.

MessageLink User's Manual

182

---

Result Codes

A result code is a short line of text or a number the modem sends to the terminal to indicate the result of a command's execution.

Some CONNECT result codes indicate the speed of the terminal to modem connection, the speed of the modem line connection, and whether or not error control is in use.

| No. | Text | Result Code Description |
|-----|------|-------------------------|
| 0 | OK | All commands in a command line executed successfully. |
| 1 | CONNECT | The modem is in the On-Line state, ready to transfer data. (Linespeed is 300, or linespeed not indicated if ATX0.) |
| 2 | RING | The modem has detected a ring signal on the telephone line. |
| 3 | NO CARRIER | No carrier signal was detected when answering or placing a telephone call, or carrier was lost during a call. The modem also returns this result code when the telephone line connection is broken for any reason. |
| 4 | ERROR | An invalid command was issued, or there was an error at any place in the command line. |
| 5 | CONNECT 1200 | The modem is in the On-Line state, ready to transfer data at linespeed of 1200 bit/s. |
| 6 | NO DIALTONE | No dial tone was detected when the modem took the telephone line off hook. |

MessageLink User's Manual

| | | | | |
|---|---|---|---|---|
| 7 | BUSY | | \multicolumn{2}{l}{The modem detected a busy signal on the telephone line.} |

$n_1 n_2$    CONNECT p     The modem is in the On-Line state, ready to transfer data at linespeed of p bit/s.

| $n_1 n_2$ | p | $n_1 n_2$ | p |
|---|---|---|---|
| 10 | 2400 | 14 | 12000 |
| 11 | 4800 | 15 | 14400 |
| 12 | 7200 | 16 | 19200 |
| 13 | 9600 | | |

Escaping from the On-Line State to the Command State (+++)

Sometimes you need to issue AT commands when the modem is in the On-Line state (when two modems are exchanging data). To do this, you escape from the On-Line state to the Command state by sending the escape sequence from the terminal to the modem. The escape sequence changes the modem from the On-line state to the Command state without breaking the telephone line connection.

When you finish issuing AT commands you can either use the Return On-Line command (O) to return to the On-Line state to continue exchanging data between modems, or you can us the Hang-Up command (H) to disconnect from the telephone line and return the modem to the Idle state.

The PHY2001 Modem supports switching from the On-Line state to the Command state in the following way:

- The modem switches from the On-Line to the Command state when the modem receives the Time Independent Escape Sequence (TIES) from the terminal.

TIES Sequence: [184]

TIES is a sequence of 3 escape characters (+ characters by default). Once these characters have been recognized, the modem enters the Command state without sending a confirming result code to the terminal and the modem starts a prompt delay timer. Then:

- If one of the recognized AT commands is received before the timer expires the timer is stopped, the command is executed, and its result code is sent to the terminal.

- If any other data is received while the timer is running the timer is stopped, the modem returns to the On-Line state, and the received data is sent to the other modem.

- If the timer expires a confirming result code is sent to the terminal to indicate that the modem is in the Command state.

MessageLink User's Manual

AT Command Explanations

The Phylon AT Command set can be divided into three categories — Standard commands, FAX commands and Telephony commands. Full command explanations follow; default settings for specific commands are indicated with bold face.

Standard AT Commands

A  Answer

The A command makes the modem go off hook and enter answer mode.

If the modems successfully complete the answering process they each return a CONNECT result code and enter the On-Line state.

If no transmit carrier signal is received from the calling modem within the time specified in register S7, the modem hangs up, returns the NO CARRIER result code, and enters the Idle state.

Any commands following the answer command on the command line are ignored.

This command is aborted if a key is pressed before the answer process is completed.

D  Dial

The D command makes the modem dial a telephone call according to the digits and dial modifiers in the dial string that follows the command. Any commands following the dial string on a command line are ignored unless the semicolon dial modifier is the last character in the dial string. In a dial string characters other than digits and dial modifiers are ignored, but are counted as characters in the command line buffer.

MessageLink User's Manual

| Result Codes | Description |
| --- | --- |
| BUSY | If the other telephone is busy. |
| NO DIALTONE | If 1 second of dial tone is not detected within 5 seconds. |
| ERROR | If the dial modifier is invalid. |
| OK | If the ; dial modifier is processed in the dial string. Also, if dialing is aborted by a character from the terminal during dialing. |

*Dial Modifiers*

Dial modifiers perform special functions within a dial command. For example, ATDT9W1552368!#71234;<CR> instructs the modem to use tone dialing (T), to access a number outside a PBX (9), to wait for dial tone (W), to dial the number 1552368, to enter a timed break recall (!), and to issue the PBX transfer code #7 before dialing extension number 1234, then to return to the Command state before initiating the handshake.

0-9 A B C D # *    *Dialing digits and characters*

The digits and characters 0-9 A B C D # * specify what numbers the modem dials. The characters A B C D # * work only when tone dialing is used. These characters are ignored when pulse dialing is used.

P    *Pulse dialing*

P selects the pulse method of dialing. P can be issued within a dial command or as a separate command. The default method of dialing is Pulse.

R    *Originate a Call in Answer Mode*

R makes the modem handshake in answer mode so it can originate a call to an originate-only modem. R may only be used at the end of a dial string. R makes the modem to act as if it had been sent an Answer command at that point in the dial string.

T  Tone dialing

T selects the tone method of dialing. T can be issued within a dial command or as a separate command. The default method of dialing is Pulse.

W  Wait for dial tone

W makes the modem wait for a dial tone before proceeding. If no dial tone is detected the modem hangs up the telephone line and returns the NO DIAL TONE result code.

,  Delay Processing of Next Character

Comma (,) makes the modem pause for the length of time in register S8 before processing the next character in a dial string.

!  Timed Break Recall (Hookflash)

! makes the modem hang up the telephone line for 500 milliseconds, then take the telephone line off hook again. This is frequently used to access a PBX's call transfer function.

;  Return to Command State

The semicolon (;) makes the modem return to Command state after dialing without breaking the telephone line connection. The semicolon may only be used at the end of a dial string. The semicolon is useful when calling a voice mail system that permits you to use tones to transmit numbers once a connection has been established.

---

E  Command State Character Echo Options

E tells the modem whether or not to echo characters sent from the terminal when the modem is accepting AT commands.

- E0   Does not echo characters sent from the terminal.

- E1   Echo characters sent from the terminal. This is the default value.

MessageLink User's Manual

H  Hook

- H0  Hang up the telephone line.
- H1  Go off hook without answering a telephone call.
- H2  Clear data buffers an disconnect.

I  Identification

The I command asks the modem for information about itself. This information can be used to determine the modem's compatibility with other software and to ensure the modem is operating properly.

- I0  Display product code.
- I1  Display software revision number.

M  Speaker On/Off Options

- M0  Speaker always off.
- M1  Speaker on until carrier detected. This is the default value.
- M2  Speaker always on; stays on after carrier is detected.
- M3  Speaker off as digits are dialed, but on during ringback and on until carrier signal is detected.

N  Negotiation of Handshake Options

Select whether or not the modem will handshake with another modem when the communications speeds of the two modems are different. This command can limit the handshake to a particular speed or allow the modems to fall back to a lower speed. If the modems cannot agree on a common speed no telephone line connection will be established.

MessageLink User's Manual

189

N0  Handshake only at the communication standard specified.

N1  Automode. Begin handshaking at the communication standard specified by automatically determining speed. This is the default value.

O  On-Line

O0  Return the modem to the On-Line state from the Command state during a telephone line connection. The modem starts handshaking if there was no telephone line connection but the modem was off hook.

O1  Return the modem to the On-Line state and retrain its adaptive equalizer during a telephone line connection. The modem starts handshaking if there was no telephone line connection but the modem was off hook.

O3  Return the modem to the On-Line state and initiate CCITT V.32bis rate renegotiation sequence during a telephone line connection. The modem starts handshaking if there was no telephone line connection but the modem was off hook.

If handshaking is started, the modem uses Originate or Answer mode handshaking depending upon whether the modem originated or answered the telephone call.

P  Pulse Dial

Selects the pulse method of dialing.

Q  Result Code Display Options

Q0  Result codes will be displayed. This is the default value.

Q1  Result codes will not be displayed.

MessageLink User's Manual

Sr  Address Register "r"

Sr addresses a particular register number so subsequent ? will read the specified register and a subsequent =n will write the value n into the specified register. Modem reset, the &F, and Z commands select S0 as the default register.

T  Tone Dialing Method Options

Selects the tone method of dialing.

V  Result Code Format Options

- V0    All result codes will be displayed as numbers.
- V1    All result codes will be displayed as words (verbose form). This is the default value.

X  Call Progress Options

The X command controls whether or not a busy signal or dial tone should be detected when dialing. The X command also limits the result codes the modem may return when dialing, making it useful when using a communication program that can only accept the CONNECT result code without terminal speed, line speed or error control usage reporting.

- X0    Neither busy signal nor dial tone are detected. When a telephone line connection is made the result code does not indicate either the speed of the connection.

- X1    Neither busy signal nor dial tone are detected. When a telephone line connection is made the result code indicates the speed of the connection.

- X2    Busy signal is not detected. Dial tone is detected. When a telephone line connection is made the result code indicates the speed of the connection.

MessageLink User's Manual

X3  Busy signal is detected. Dial tone is not detected. When a telephone line connection is made the result code indicates the speed of the connection.

X4  Both busy signal and dial tone are detected. When a telephone line connection is made the result code indicates the speed of the connection. (This is the default value.)

The W dial modifier is not affected by the X command! The W dial modifier may return the result codes 6 (NO DIALTONE) or 7 (BUSY) each time it appears in the dial string.

Z  Soft Reset

This hangs up the telephone line and the modem.

,  Pause

The comma (,) makes the modem pause for the length of time in register S8 before processing the next character in the command line.

&D Data Terminal Ready Options

&D determines how the modem responds to the DTR signal from the terminal. The response to changes in DTR also depends on the &Q and &D commands. The &T command test modes are only affected by DTR changes when &D3 is in effect. This table defines what happens when DTR goes off for all possible combinations of the &D and &Q commands. To see what happens when DTR goes on, refer to the &Q command. The default value is &D0:

MessageLink User's Manual

192

|  | D0 | &D1 | &D2 | &D3 |
|---|---|---|---|---|
| &Q0 | None | A | B | C |

A    If in the On-line state, the modem goes into the Command state and issues an OK result code.

B    The modem hangs up the telephone line and issues an OK result code. Auto-Answer is disabled as long as DTR stays off.

C    The modem does a soft reset.

&K Flow Control Options

Flow control prevents data from being lost by stopping the terminal from sending data to the modem too quickly. The modem issues flow control to the terminal by signalling the terminal to stop sending data. The modem releases flow control when it is able to receive more data by "telling" the terminal to resume sending data.

Similarly, the terminal can use flow control to prevent data loss caused by the modem sending data too quickly to the terminal.

Flow control does not work unless both the terminal and the modem agree on the type of flow control to be used.

Flow control is crucial whenever error control is used and whenever the modem communicates at different speeds with its terminal and another modem. Otherwise, differences in rates of transmission can cause data loss even if error control is used.

&K0    Disable flow control.

&K3    Enable hardware (RTS/CTS) flow control.

&K4    Enable XON/XOFF flow control.

&K6    Enable both RTS/CTS and XON/XOFF flow control. This is the default.

MessageLink User's Manual

&P Make/Break Ratio Options

&P0  39%/61% make/break ratio when pulse dialing. This is the default value at 10 pulses/second.

&P1  33%/67% make/break ratio when pulse dialing, 10 pps.

&P2  39%/61% make/break ratio when pulse dialing, 20 pps.

&P3  33%/67% make/break ratio when pulse dialing, 20 pps.

&Q Communications Mode Options

The &Q command selects the terminal communication mode and when telephone calls will be started and stopped.

&Q0  Asynchronous. This is the default value.

&T Test Options

&T controls a number of different modem tests. These tests are performed with modem speeds of 1200 bps or higher. The tests can be ended manually using the &T0.

&T0  Terminate The Test In Process.

&T1  Start Local Analog Loopback. This command is issued when the modem is in the Idle state. The modem goes on hook, returns <CR> and <LF> characters and starts an analog loopback test. If &S1 is in effect DSR is turned off at the start of the test. The test can only be terminated by the &T0, H0, or Z commands, after an escape sequence.

&T3  Start Local Digital Loopback. &T3 is issued when the modem is in the Command state with a telephone line connection established. The modem goes on hook, returns <CR> and <LF> characters and starts the digital loopback test. The test can only be terminated by a &T0, H0, or Z commands.

MessageLink User's Manual

%E Automatic Retrain / Rate-Renegotiate Options

%E0   Automatically retrain or rate-renegotiate if the modem determines the quality of the connection has changed since the original handshake. This is the default.

%E1   Do not automatically retrain or rate-renegotiate during the line connection.

MessageLink User's Manual

FAX AT Commands

The Reference Design Modem supports FAX Class 1 operation under the control of a suitable communication program. The communication program issues special AT commands to the modem to complete a FAX transmission or reception.

After the modem executes a FAX command it returns a result code. The result code is OK if the command executed properly and ERROR if the command did not execute properly. The special +FCERROR result code is returned if the modem receives an unexpected FAX carrier from the other modem. For example if the modem is issued a +FRM=96 command telling it to expect a 9600 bps carrier and then the modem actually receives a 4800 bps carrier.

FAX Class 1 AT+F Commands

---

+FCLASS=   Set Modem in Data, FAX or Voice Mode

+FCLASS=0      Data mode. This is the default mode.

+FCLASS=1      FAX Class 1 mode.

---

+FCLASS=?   Query Modem Capability

The execution of this command returns one or more numbers that describe the capabilities of the modem.

0  =  Data mode.

1  =  FAX Class 1 mode.

---

**+FTS=<n> Transmit Silence for n*10 milliseconds**

This causes the modem to stop transmission for n times 10 milliseconds, then return to the command mode with message "OK".

MessageLink User's Manual

196

---

**+FRS=<n>     Receive Silence for n*10 milliseconds**

---

This causes the modem to wait until a silence period of n times 10 milliseconds occurs on the line, then return to the command mode with message "OK".

---

+FTM=<MOD>   Transmit Page Data Using <MOD> Carrier

---

This command switches the carrier ON and sends page data with the modem in normal mode. Mode options are returned when a ? is used. Use Table 1 to determine the appropriate value for <MOD>.

---

+FRM=<MOD>   Receive Page Data Using <MOD> Carrier

---

This command activates the receiver and receives data with the modem in normal mode. The return message is CONNECT or +FCERROR. Mode options are returned when a ? is used. Use Table 1 to determine other appropriate value for <MOD>.

---

+FTH=<MOD>   Transmit HDLC Data Using <MOD> Carrier

---

This command switches the carrier ON and sends data with the modem in HDLC mode. The return message is CONNECT or +FCERROR. Mode options are returned when a ? is used. Use Table 1 to determine other appropriate value for <MOD>.

---

+FRH=<MOD>Receive HDLC Data Using <MOD>Carrier

---

This command activates the receiver and receives data with the modem in HDLC mode. The return message is CONNECT or +FCERROR. Mode options are returned when a ? is used. Use Table 1 to determine other appropriate value for <MOD>. Note that for receive purposes, there is no difference between log train V.17 modes and resynchronization or short train.

MessageLink User's Manual

197

| <MOD> | Modem Mode | Data Rate |
|---|---|---|
| 3 | V.21 ch.2 | 300 bit/s |
| 24 | V.27 ter | 2400 bit/s |
| 48 | V.27 ter | 4800 bit/s |
| 72 | V.29 | 7200 bit/s |
| 73 | V.17 | 7200 bit/s |
| 74 | V.17 w/st | 7200 bit/s |
| 96 | V.29 | 9600 bit/s |
| 97 | V.17 | 9600 bit/s |
| 98 | V.17 s/st | 9600 bit/s |
| 121 | V.17 | 12000 bit/s |
| 122 | V.17 w/st | 12000 bit/s |
| 145 | V.17 | 14400 bit/s |
| 146 | V.17 w/st | 14400 bit/s |

Table 1. <MOD> Mode Selection Values

Notes:

(1) "st" means V.17 short training or resynchronization. All these commands return an ERROR result code if issued when the modem is on-hook.

(2) All commands using the <MOD> value can be queried for range of values supported by the modem. This is accomplished by setting <MOD> to "?". The modem will respond with all the possible values. For example:

+FTM=? would invoke the following response:

"3,24,48,72,73,74,96,97,98,121,122,145,146"

MessageLink User's Manual

198

Speakerphone

The PHY2000 PC provides support for a hands-free, full duplex speakerphone. In this case, a speakerphone is defined as the combination of a pair of external speakers and a microphone, and is used in place of the stereo headphones/microphone that accompany your board.

You may use a set of popular stereo multimedia PC speakers, or even cable the PHY2000 PC output to a stereo amplifier and speaker system.

The speakerphone is supported with both acoustic and electric echo cancellation. This means you can face the microphone towards the speakers and not cause any feedback noise or squealing.

To implement the speakerphone, connect your speakers to the PHY2000 PC stereo Headphones jack, then plug your microphone into the Microphone jack. If you want to mix the stereo sound from your sound board, connect the audio out from your sound board to the Audio In jack on the PHY2000 PC. (See illustration on page 6 in your PHY2000 PC Hardware & Software Installation Manual). You can now begin hands-free speakerphone operation.

200
 PHYLØN
4027 Clipper Court
Fremont, CA 94538-6540
Telephone: (510) 656-2606
Facsimile: (510) 656-0902
BBS: (510) 656-0916
Email: phylon@ix.netcom.com
Website: http://www.phylon.com/
P/N 99-0004-0

201

APPENDIX F

PHY2000 PC
PhyLink Software
User's Manual
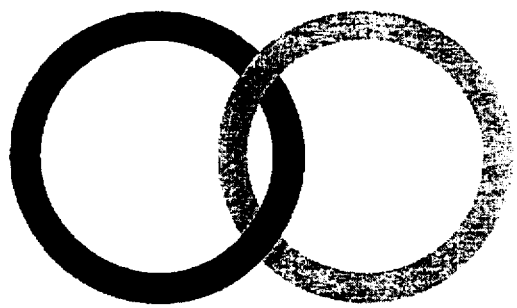

203

For Technical Assistance or further information, please contact:

> Phylon
> 4027 Clipper Court
> Fremont, CA 94538-6540
>
> Telephone: (510) 656-2606
> Facsimile: (510) 656-0902
> BBS: (510) 656-0916
> Email: phylon@ix.netcom.com
> Website: http://www.phylon.com/

The hardware/software design of the PHY2000 PC is protected by domestic and international copyright laws and can be used only in the manner described in this manual.

Phylon makes no warranties with respect to this documentation and disclaims any implied warranties of merchant ability or fitness for a particular purpose. The information in this document is subject to change without any notice. Phylon assumes no responsibility for any errors that may appear in the document.

From time to time updates are made to the hardware and software that are not reflected in the manual. If such changes are known to affect the product significantly, a README.DOC file is located on the disk that lists such change or variations. The user should be sure to read this file before using the product.

Phylon shall not be liable for any loss of profit or damages that may arise from the use of this product.

PlayLink, SoftCom, and PhyLink are trademarks of Phylon. REACHOUT is a trademark of Stac Electronics, pcANYWHERE is a trademark of Symantec, ProShare is a trademark of Intel. Games mentioned herein are trademarks of their respective manufacturers.

© Phylon 1995                                                First Printing

All Rights Reserved                                          Printed in USA

204

PhyLink™ Software User's Manual

Contents

INTRODUCTION .................................................................. 1
Software Scheme of Operation ....................................... 1

PlayLink Talk'N'Play Interactive Gaming ..................... 3
    Overview ............................................................. 3
  PlayLink for DOS ........................................................ 4
    Starting PlayLink ................................................ 4
    PlayLink Command Menus ................................ 4
    Startup Menu Explanations ............................... 5
    Setup Menu Explanations ................................. 6
    Dial Menu Explanations .................................... 7
    Starting a Game Session .................................. 8
    The Online Main Menu ..................................... 11
    Online Main Menu Explanations ..................... 12
    Ending a Game Session .................................. 13
    Adding Games to the Game List .................... 13
    Call Waiting Capability .................................... 14
    Servicing a Call Waiting During Game Play .... 14

PlayLink for Windows ................................................ 15
    Starting PlayLink ............................................. 15
    Dialing ............................................................. 15
    Hangup ............................................................ 15
    Answering ....................................................... 16
    Linking ............................................................. 16
    Selecting and Playing a Game ....................... 18
    Maintaining the Game List .............................. 20
    Setting Alarms ................................................ 21
    Ending a Game Session .................................. 12
    Adding Games to the Game List .................... 12
    Call Waiting Capability .................................... 13
    Servicing a Call Waiting During Game Play .... 13

BizLink Collaborative Computing ............................... 22
    Overview ........................................................... 22

PhyLink User's Manual

| | |
|---|---|
| BizLink for Windows | 23 |
| Starting BizLink | 23 |
| Dialing, Answering, Hangup and Phonebook Maintenance | 23 |
| Linking | 24 |
| PhoneLink Phone Dialer | 26 |
| Overview | 26 |
| PhoneLink for DOS | 27 |
| Starting PhoneLink | 27 |
| PhoneLink Command Menus | 27 |
| Startup Menu Explanations | 28 |
| Setup Menu Explanations | 29 |
| Dial Menu Explanations | 30 |
| Starting a Phone Session | 31 |
| Online Menu Explanations | 32 |
| Call Waiting Capability | 32 |
| Servicing a Call Waiting While Running a DOS Application | 32 |
| PhoneLink for Windows | 33 |
| Starting PhoneLink | 33 |
| Dialing | 33 |
| Redialing | 34 |
| Hangup | 34 |
| Answering | 34 |
| Speed Dialing | 35 |
| Phonebook Dialing | 36 |
| Maintaining Phonebooks | 36 |
| Call Waiting | 38 |
| Speakerphone/Headphone Volume Control | 38 |
| Hardware Setup for Windows | 39 |
| Overview | 39 |
| Starting Hardware Setup | 39 |

PhyLink User's Manual

208

INTRODUCTION

Phylon's PHY2000 PC design is supported by a suite of software modules specifically designed to make your use of the computer in personal communications a friendly and supportive experience. These SoftCom™ modules are included with the PHY2000 PC card and are referred to as the PhyLink™ Applications.

The PhyLink applications suite consists of:

BizLink, a Windows graphical user interface (GUI) that enables and supports digital simultaneous voice and data (DSVD) operation on a single telephone line for collaborative computing applications.

PlayLink, both DOS and Windows GUI implementations of DSVD optimized to offer maximum real-time performance in interactive remote gaming applications.

PhoneLink, both DOS and Windows GUIs that provide hands-free, full duplex speakerphone and on-screen dialer for your computer.

Software Scheme of Operation

Upon power-up, bootloader software downloads standard data/fax modem communications code from system disk and initializes the PHY2000 PC for standard modem operation. The PHY2000 PC is in MODEM mode and can be used with standard commercial and shareware modem and fax applications for DOS and Windows.

If the use of a PhyLink application (PlayLink, BizLink, PhoneLink) is required, it can be downloaded to the PHY2000 PC for execution, where it replaces previously loaded PhyLink or standard modem code.

Within the PhyLink application, a voice-only mode connection is made, then a voice+data link is established. If the data link is lost, the application falls back to voice-only mode to allow relinking.

When the application is terminated, or the system is reset, the standard data/fax modem code is reloaded. However, if the modem is off-hook (connected to a remote user) during reset, reloading of the standard data/fax modem code will be bypassed, and the connection maintained. The application can then be restarted without relinking.

PhyLink User's Manual

This is especially useful if an appication crashes or hangs up. Without hanging up the phone, you may recover immediately, reestablish your voice+data link and restart the application. All this is made easier because you have maintained voice interaction and coordination.

This dynamic downloading scheme assures you that your applications are run in communication environments specifically tailored to optimize their operation. It also makes the upgrading of software and addition of new applications very easy. Use your PHY2000 PC board to cruise to Phylon's Internet Webpage and download the latest released software, then unzip it into your C:\PHYLON directory. Or obtain the software on diskette from your dealer.

PhyLink User's Manual

210

PlayLink Talk'N'Play Interactive Gaming

Overview

PlayLink is a graphical user interface (GUI) that, when downloaded to the PHY2000 PC, adds the element of voice to online remote game play in PC compatible computers. PlayLink supports and is compatible with all games that support remote play via null modem or serial port connections. These include flight simulations, role-playing games, racing simulations, sports games and many newer games that feature 3D and virtual reality simulation. PlayLink GUI's are available for both DOS and Windows-based games.

PlayLink features realistic and responsive play because voice is transmitted simultaneously with real-time game data. An extremely short response delay permits games to be played as if both computers were directly connected together in the same room, instead of separated by long distances and intermediate telephone equipment. And forward error detection and game synchronization modes (e.g., State Vector, I/O State, Temporal, Hybrid Synch., etc.) insure the accurate correlation of game data between opposing players' computers.

PlayLink also supports Call Waiting interruptions for most games. If you receive a call waiting signal during game play — in cooperation with the remote player — you can pause the game, accept and complete the other call, then resume the game.

You may choose games to play from a proven list of compatible and popular games. Operational parameters required to optimize the games performance in a voice+data mode are automatically provided to the PHY2000 PC. When you start the game, the modem operation will already be operating with peak performance. If you obtain and install new games not included in the list, you may add them to the PlayLink game menu by editing the list contained in the GAMES.CFG file.

Phylon's World Wide Web site is dedicated to supporting PlayLink and provides a forum for remote game players anywhere. Use the PHY2000 PC to access this site on the Internet! You can find other PlayLink equipped opponents in a user list, Website game newsgroups, e-mail support, and new game information not yet added to the GAMES.CFG file. You can download and update your PHY2000 PC with the latest version of software, the latest GAMES.CFG list, or shareware games. Cruise to the PlayLink Website at "http://www.phylon.com/".

PhyLink User's Manual

211

PlayLink for DOS

Starting PlayLink

To start PlayLink, enter the following command at the DOS prompt:

C:\>PLAYLINK<enter>

You will briefly see a sequence of commands executed as the PlayLink code is downloaded to the modem. Then the Offline Startup menu screen will appear:

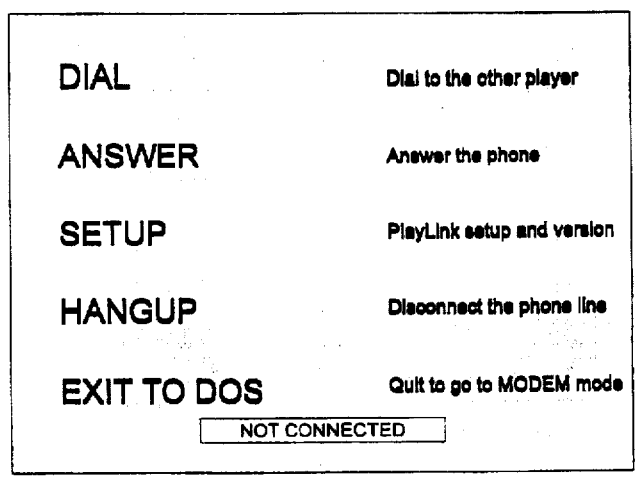

*Note: This opening Offline Startup menu only appears if you are not connected to another remote player. Otherwise, the Online Main menu appears (see page 11.)*

PlayLink Command Menus

PlayLink command menus display the commands on the left in dark blue lettering against a cyan background. Commands are selected by depressing the up arrow <↑> and down arrow <↓> keys. Each command is highlighted in red lettering as it is selected. When highlighted, the command explanation appears on the right in yellow lettering. The command is executed by depressing the <Enter> key. The DIAL command is initially highlighted in this opening menu.

PhyLink User's Manual

Startup Menu Explanations

DIAL

The DIAL command permits you to dial the phone number of the other player directly from your computer. Selecting *DIAL* causes the Dial menu to appear. (See page 7.)

ANSWER

The ANSWER command permits you to answer an incoming call. The ringing will be heard on the phone set connected to your computer. Selecting *ANSWER* will result in a TALK (voice-only) mode connection and the following message displayed:

> Please hangup all other phones
>
> You are in TALK mode
> When both you and the other player
> are ready to LINK, press a key You may also answer by picking up the telephone receiver, then select *ANSWER* to transfer to your headphones/microphone, then hangup the receiver and remain connected.

SETUP

The SETUP command permits you to view the COM port and IRQ configuration for your computer and to change that configuration. Selecting *SETUP* causes the Setup menu to appear. (See page 6.)

HANGUP

The *HANGUP* command permits you to hangup the phone from the Startup menu.

EXIT TO DOS

The *EXIT TO DOS* command causes you to exit the PlayLink program and to reload the standard data/fax modem code. Code will not be reloaded, nor this menu displayed, if you are connected (online).

PhyLink User's Manual

213

Setup Menu Explanations

If you wish to reassign the COM port and IRQ interrupt, you may do so from the Setup menu. The changes you make will be entered and take effect immediately. The PHY2000.CFG file is automatically modified.

The Setup Menu lists the possible COM port and IRQ assignments in the left column. The COM port and IRQ combination that was assigned at the time of software installation is enclosed within the flashing red/white box.

The message in the right column indicates that this combination is "Currently in use" (by your modem). As you move the box to other combinations, messages will appear that indicate that combination's status. "*Not Available*" means the combination is already assigned to another device such as your serial mouse. "*Available*" means you can reassign your PHY2000 PC to this COM port and IRQ. "*IRQ is not available*" means the COM port is available, but the IRQ is already in use by another COM port.

To change the settings, move the box to the desired combination, then depress <Enter>. The changes are now effective.

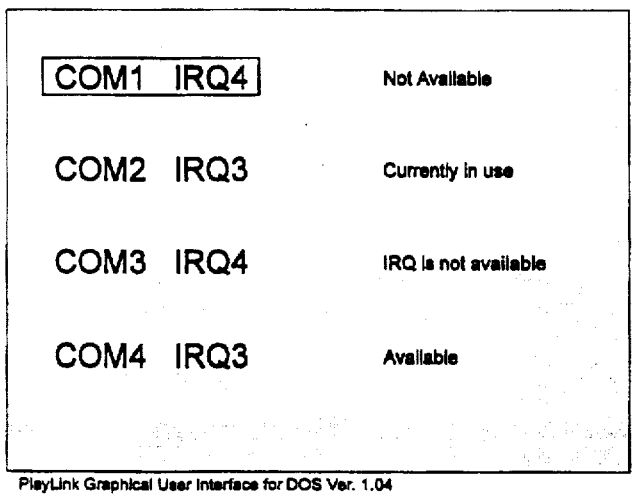

PlayLink Graphical User Interface for DOS Ver. 1.04
Phylon Communications, Inc. © 1995

The PlayLink software version is also displayed at the bottom of this screen; you may use this to determine if you have the latest software. If not, you may download an upgraded version from Phylon's Internet Website.

PhyLink User's Manual

214

Dial Menu Explanations

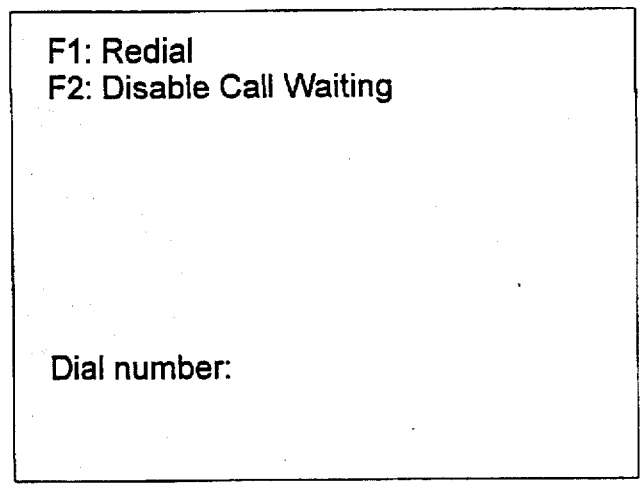

F1: Redial

The last number dialed during any PlayLink session can be redialed from the DIAL menu by depressing the *<F1>* key.

F2: Disable Call Waiting

If you don't want to be disturbed by a Call Waiting signal during game play, you may disable call waiting by depressing the *<F2>*. Turn to page 14 to learn about Call Waiting.

Dial number:

Enter the party to be called's phone number here.

PhyLink User's Manual

215

Starting a Game Session

1. To begin a game session with a remote player, start PlayLink, and select *DIAL* from the startup menu (the Dial menu is then displayed) and go to (2), or select *ANSWER* to answer your ringing phone and go to (3).

2. Enter your opponent's phone number from your keyboard — the digits will be displayed as you enter them. Depress <Enter>. PlayLink will now dial the number and display:

| Calling, Please wait... |

If the called party fails to answer, or you hear a busy signal, you may abort the dialing and return to the opening menu by depressing the <Esc> key.

If the called party answers, then you are both connected in TALK (voice-only) mode, and the following message is displayed:

| Please hangup all other phones |
   | You are in TALK mode |
   | When both you and the other player |
   | are ready to LINK, press a key |

3. While coordinating by voice, both players depress any key. The modem will now begin negotiating a data connection to link both players in GAME mode (simultaneous voice and data). Voice communication will be temporarily interrupted and the following message will appear while this is in progress:

| Handshaking... |

*NOTE: If a link is not established within twenty seconds, then this message will be displayed:*

*** error *** : Hand shake time out

*Both players should then depress <Esc>, then repeat (3).*

PhyLink User's Manual

216
If a successful link is made, this screen will briefly appear:
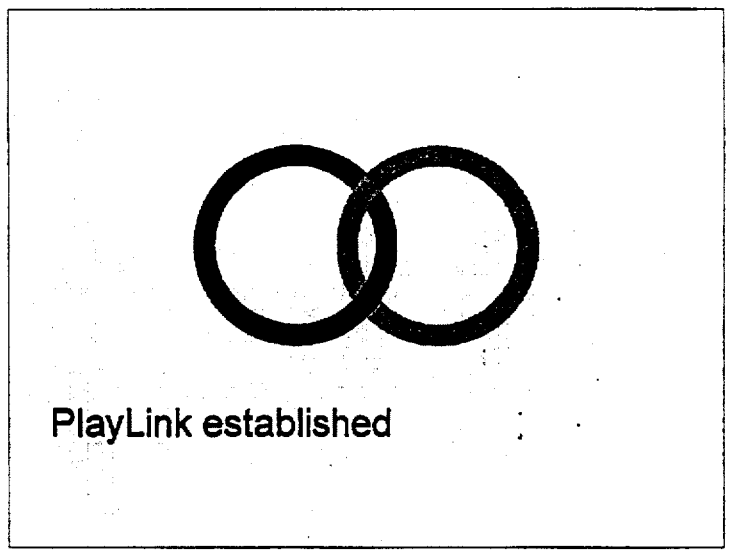
This will be followed by the Games menu:
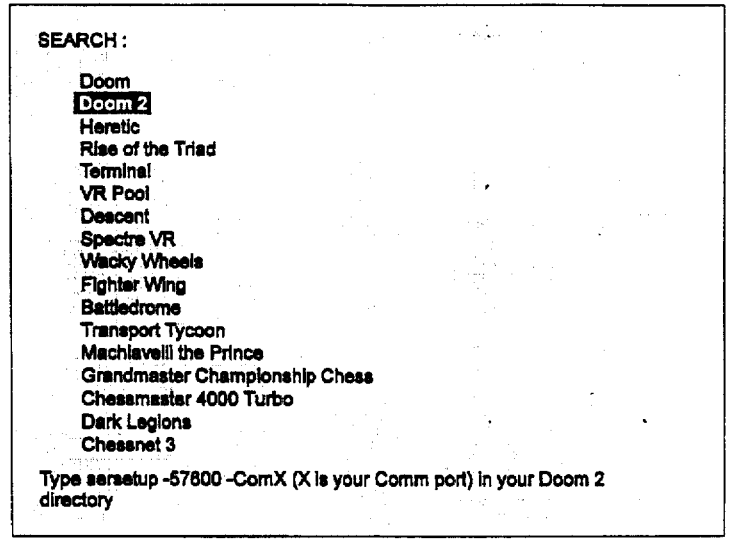
PhyLink User's Manual NOTE: *If instead of this menu, you see the flashing message:* waiting for the other player to choose games menu

*Either or both players depress <Esc>, then when the Online menu appears (see page 11), select GAMES. The Games menu will then appear.*

The games listed are compatible with PlayLink's operation. As you depress the <↑> and <↓> keys, each game is highlighted. You may also scroll more rapidly through the list with the <Page Up>, <Page Dn>, <Home>, and <End> keys.

You may search the list for a game by entering the game name to the right of the colon at the "SEARCH:" label at the top of your screen. If the game is in the list, the list will be scrolled to display the entry and the game will be highlighted.

Either player may select the game. When one player moves his highlight cursor, the cursor on the other player's screen will move along with it. Players should coordinate the game selection vocally so as to prevent "fighting for control" of the cursor.

Instructions on how to setup each game for remote play are shown at the bottom of the screen as each game is highlighted. Games are NOT started from this menu. Instead, this menu is used to precondition the PHY2000 PC to optimize simultaneous voice and data operation for the selected game. The players then exit PlayLink to return to the DOS prompt and start the game.

4. Either player can select a game by highlighting the desired game and depressing the <Enter> key. This action presets each modem with the optimization and synchronizes the two modems.

This following message is then displayed:

> Sync. Mode selected
   > Press any key

PhyLink User's Manual

5. Both players must now depress a key to exit to DOS. Following this, the screen is cleared and the game startup instructions and DOS prompt are displayed. For example:

Type sersetup -5700 -ComX (X is your Comm port) in your Doom2 directory
   C:\PHYLON>

6. Start the game by changing to the your games resident directory and performing the suggested startup procedure. Both players should coordinate game startup and play vocally.

The Online Main Menu

If either a TALK mode or GAME mode connection is in progress, entering PlayLink from DOS results in the display of the Online Main menu. This menu is also displayed anytime you depress <Esc> while in the Game menu or when other message screens are displayed (e.g.,"*** error *** : Hand shake time out", "waiting for other player to choose GAMES menu", etc.).

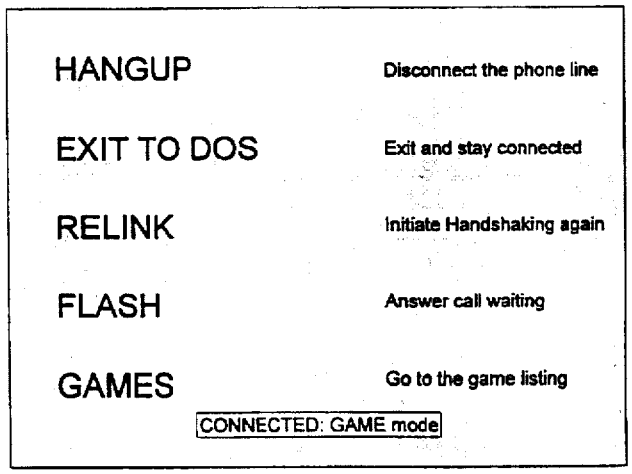

If the current connection is voice-only, the message at the bottom of the screen will indicate:

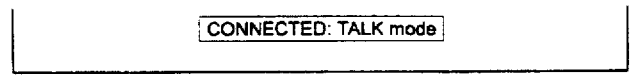

PhyLink User's Manual

219

Online Main Menu Explanations

HANGUP

This command disconnects the line from the other player and hangs up the phone.

EXIT TO DOS

This command permits you to return to the DOS prompt without affecting the connection. You may then execute any DOS command, including and especially those commands that start your game play.

RELINK

If the GAME mode link is lost and you fall back to TALK mode, you may reestablish the GAME mode with this command. When the <Enter> key is depressed, the "Handshaking" and "PlayLink established" messages will appear as the link is made. This is the same connection procedure as described in Step 3 on pages 8 and 9.

FLASH

This command permits you to answer a Call Waiting signal. Call Waiting is enabled automatically upon first entering PlayLink (see page 14). Select *FLASH* and depress <Enter> to talk to the second caller, then depress <Enter> again to return to the original connection.

GAMES

Executing this command causes the Games menu screen to be displayed, from which a new game can be selected. Both players must have this screen displayed before a game can be selected (see page 9).

PhyLink User's Manual

220

Ending a Game Session

1. To end a game session, end the active game and return to DOS.

2. Reenter PlayLink from the command prompt, as before.

3. When the Online Main menu appears, select *HANGUP*. The connection will be terminated and the Startup menu screen will be displayed.

4. Select *EXIT TO DOS* and depress <Enter>. PlayLink will be terminated, a return to DOS executed, and the standard data/fax modem code reloaded. The PHY2000 PC will now operate as a standard data/fax modem until PlayLink or another Phylon application is started.

Adding Games to the Game List

The list of games displayed in the Games menu, is maintained in the GAMES.CFG text file located in the C:\PHYLON directory. Updates to the GAMES.CFG file may be downloaded from Phylon's Internet Webpage, or directly from Phylon. However, if a game is not on the list, you may add it to the list by editing this file. The format for a game entry must be:

[game_name];[setup_parameter];[game startup instructions];

e.g.,

Doom 2;SVS;Type sersetup -57000 -ComX (X is your Comm port) in your Doom2 directory;

Choose a setup_parameter from "SVS", "SIO", or "SHS". If the parameter is not suitable, degraded voice and graphics performance will be apparent. Try each; if performance is not improved, contact Phylon at our Internet Website (http://www.phylon.com/). CAUTION: the game entry, including setup_parameter, must be identically the same in each player's GAMES.CFG file.

PhyLink User's Manual

Call Waiting Capability

Call Waiting is enabled by default when PlayLink is initially entered. This permits the Call Waiting monitoring to run in the background while you are running the PlayLink program. When a call is waiting, you will detect the Call Waiting tone in the headphones. If the Online Main menu is displayed at the time, you may answer the waiting call by selecting *FLASH*. To return to the original call, select *FLASH* again. You may disable Call Waiting from the Dial Menu prior to game play.

Servicing a Call Waiting During Game Play

When you detect or hear the Call Waiting tone, notify the other player that you intend to answer another call. Depress the *<Ctrl><F1>* key combination. Both players game and display will freeze. You may now talk to the calling party.

When you have completed the call, depress the *<Ctrl><F1>* keys again. This will reconnect your original call. While coordinating by voice, both players depress their *<Ctrl><F5>* keys simultaneously. Handshaking will reoccur for several seconds then the display will be unfrozen and game play permitted to resume. Resume your game play.

Note: An emergency, immediate hangup can be executed at any time by depressing *<Ctrl><F9>*.

PhyLink User's Manual

222

PlayLink for Windows

Starting PlayLink

PlayLink

To start PhoneLink, double click on the *PlayLink* icon in the PhyLink Applications group The PlayLink application window will then appear:

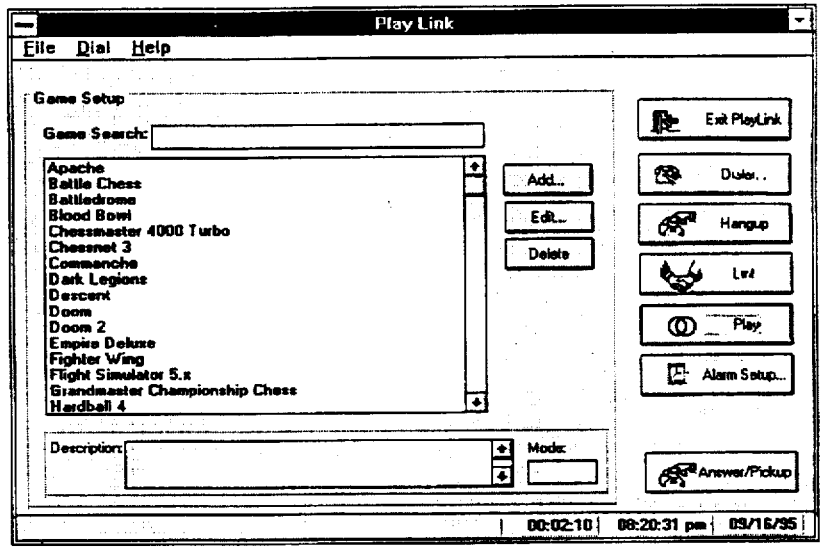

This window permits you to establish and manage a voice+data game session with a remote player, select games to play from a game list you can modify or expand, manage dialing/answering functions, and maintain a list of phone numbers of other players. The dialing/answering functions and phone number management can be entirely conducted through the use of a mouse and/or keyboard, and does not require physically handling a telephone set. (However, a telephone set must be plugged into the PHY2000 card to hear an incoming ring). All conversations and game sounds can be conducted using headphones and microphone, or speakerphone.

PhyLink User's Manual

Dialing

All dialing operations are managed by selecting a dial function from the *Dial* drop-down menu, or by clicking the *Dialer..* button.

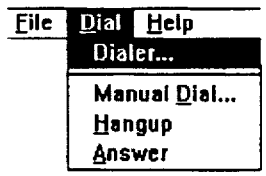

When you select the Dialer.., the Dialer window will open. This window permits you to dial a number from the dialer keypad, speed dial by clicking a speed dial icon, or select a number to dial from one of your personally maintained phone books. For a full explanation of the use of the dialer, refer to the PhoneLink for Windows section of this manual.

To manually dial a number, select *Manual Dial* from the menu. The Manual Dial dialog box will appear:

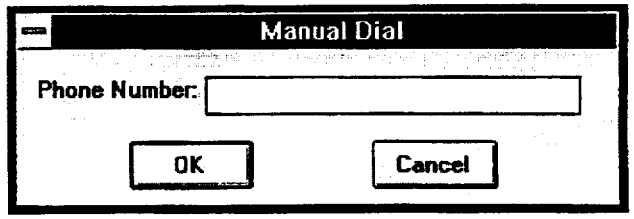

To dial the desired number, type the number in the *Phone Number:* text box and click the *OK* button. The following pop-up message will be displayed until the call is answered, or you hangup:

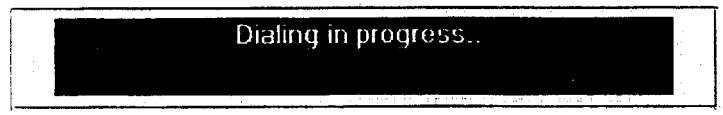

Hangup

To hangup the phone, click the *Hangup* button located at the center right side of the window, or select *Hangup* from the menu. The following pop-up message will be displayed in the center of the window until the hangup is complete. (You may also Hangup from the Dialer window.)

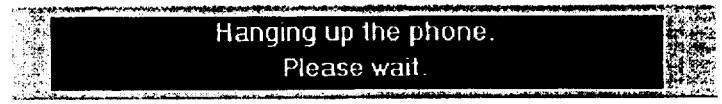

PhyLink User's Manual

Answering

To answer an incoming phone call, click the **Answer/*Pickup*** button located at the bottom right side of the window, or select *Answer* from the menu. The following message will be briefly displayed as the phone is hung up. (You may also answer from the Dialer window, or pickup the telephone receiver first, then transfer to your headphones/microphone with the Answer button.)

> Answering the phone.
> Please wait.

Linking

Once you have started a voice conversation with a remote player, you must establish a data link between the two computers before a game can be played. Click the Link button to initiate the voice+data link. The following dialog box will appear:

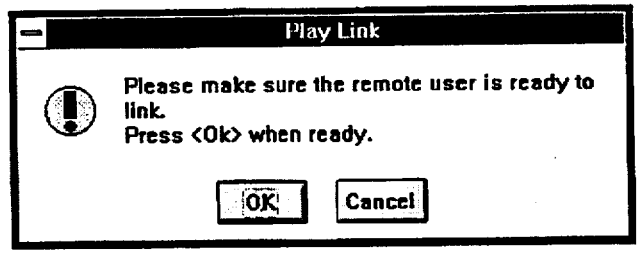

Click the *OK* button to start the linking process. The following popup message will appear while linking is attempted.

> Link in progress.
> Please wait.

When linking is successful, the following dialog box is displayed:

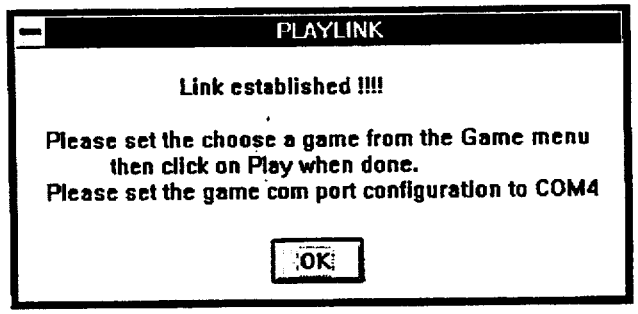

PhyLink User's Manual

Selecting and Playing a Game

You may now choose a game to play from the Game Setup scrollable list box. The games listed are compatible with PlayLink's operation. As you depress the <↑> and <↓> keys or click each entry, each game is highlighted. You may scroll more rapidly through the list with the <Page Up>, <Page Dn>, <Home>, and <End> keys.

You may also search the list for a game by entering the game name in the *Game:* text box. If the game is in the list, the list will be scrolled to display the entry and the game will be highlighted:

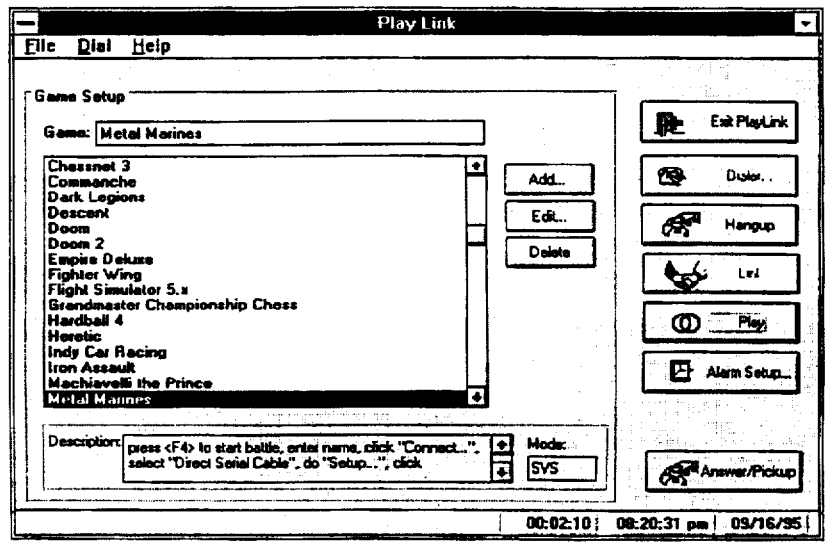

As each game is highlighted, instructions on how to setup each game for remote play are shown in the scrollable *Description:* box. Games are NOT started from this menu. Instead, this menu is used to precondition the PHY2000 PC to optimize the simultaneous voice and data operation and synchronization for the selected game.

Each player selects a vocally agreed upon game by clicking on the game's name in the list. The PlayLink dialog box will be displayed:

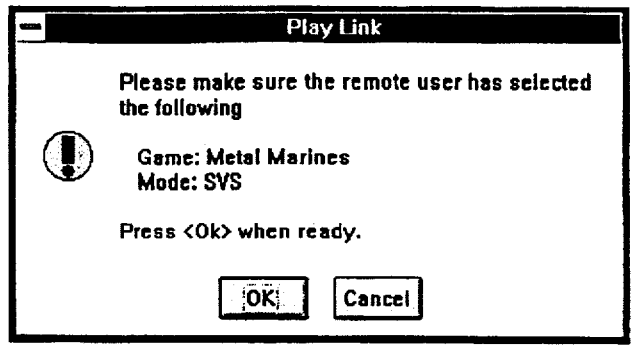

After clicking the *OK* button, the Play Game dialog box will be displayed:

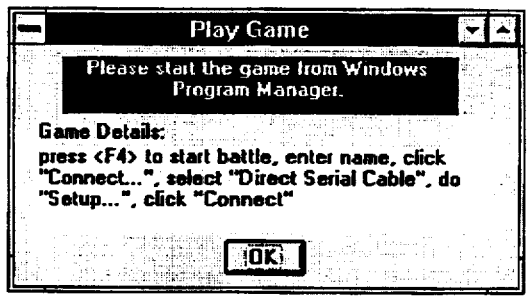

Start the game from the Program Manager while following the instructions contained in the dialog box. The PlayLink window can be minimized for convenience during game play, or even exited without affecting the connection or game play. If you exit while still connected, the message below will appear:

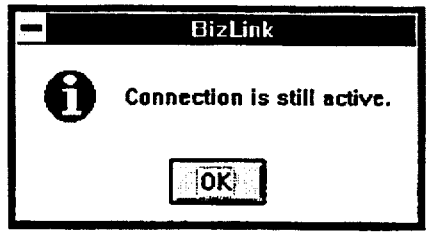

Upon completion of game play, another game can be selected and played by repeating the above procedures. When you no longer wish to play games, click *Hangup*, then click *Exit PlayLink*.

PhyLink User's Manual

Maintaining the Game List

The list of games displayed in the game list, is maintained in the GAMES.CFG text file located in the C:\PLAYLINK directory. Updates to the GAMES.CFG file may be downloaded from Phylon's Internet Webpage, or directly from Phylon. However, if a game is not on the list, you may add it to the list. To add to or modify the game list, click the *Add..* or *Edit..* buttons to the right of the game list. The Game Setup Details dialog box will be displayed:

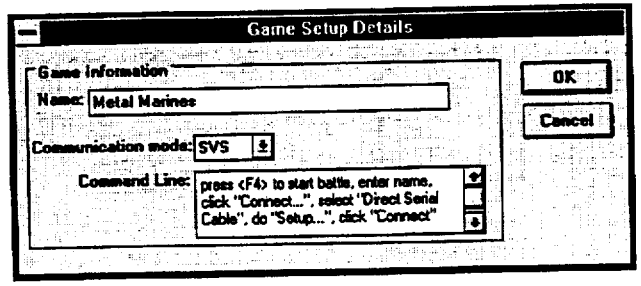

Enter the game name in the *Name:* text box. Then enter any special instructions on how to start the game in the *Command Line:* text box. These instructions will appear in the *Description:* box of the PlayLink window and in the Play Game dialog box with the game is selected for play.

Finally, choose a mode ("SVS", "SIO", or "SHS") from the *Communication mode:* list box. If the mode selected is not suitable, degraded voice and graphics performance will be apparent. Try each; if performance is not improved, contact Phylon at our Internet Website (http://www.phylon.com/). *CAUTION: the game entry, including communications mode, must be identically the same in each player's GAMES.CFG file.* Click *OK* to save the addition or modification.

Keeping Time

At the bottom of the PlayLink window, the cumulative time PlayLink has been running is displayed (left), along with the current time of day (center) and the current date (right):

| 00:02:19 | 08:20:31 pm | 09/16/95 |

PhyLink User's Manual

Setting Alarms

If you wish to set a time limit on your game play, PlayLink provides a setable alarm to notify you when a designated time period has elapsed. To set and activate and alarm, click the Alarm Setup.. button. The Alarm Settings dialog box will appear:

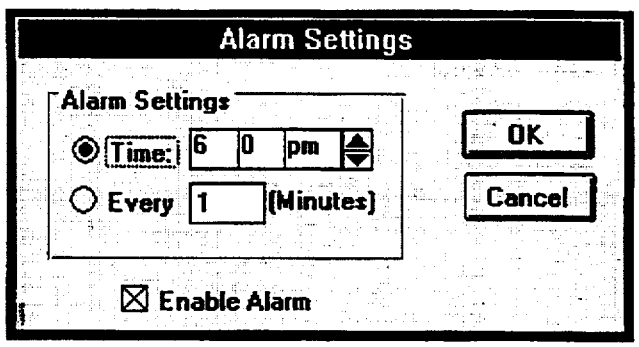

To alarm at a designated time, click the *Time:* option button, and scroll the time up or down until the desired alarm time shows in the *Time* box.

If you wish the alarm to be repeated periodically, click the *Every* option button and enter the interval in minutes in the *Minutes* text box. Enable or disable the alarm by clicking the *Enable Alarm* check box.

When the alarm time or interval is reached, a chime will sound and an alarm time-out message will pop-up:

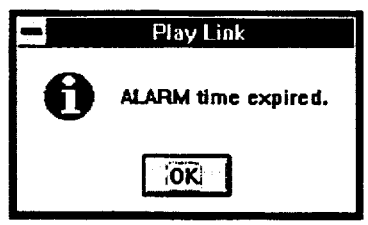

Click OK to acknowledge the message and make it disappear.

PhyLink User's Manual

229

BizLink Collaborative Computing

Overview

BizLink is a Windows-based graphical user interface (GUI) that, when downloaded to the PHY2000 PC, provides DSVD operation for collaborative computing applications. These can include dynamic sharing of spreadsheets, drawings, and text documents as well as whiteboard applications.

BizLink permits you to dial or answer a call from the computer keyboard, and while conversing, establish a simultaneous voice and data link, start a remote access utility (e.g., Reachout, pcANYWHERE, ProShare, etc.), then initiate applications sharing. Frequently used phone numbers can be also be recalled from a user-edited and maintained phonebook for automatic dialing.

BizLink also supports Call Waiting interruptions. If you receive a call waiting signal during a collaborative computing session, you can put the original call on hold, accept and complete the other call, then resume the original call without losing the remote access link.

PhyLink User's Manual

230

BizLink for Windows

Starting BizLink

To start BizLink, double click on the *BizLink* icon in the PhyLink Applications group

BizLink

The BizLink application window will then appear:

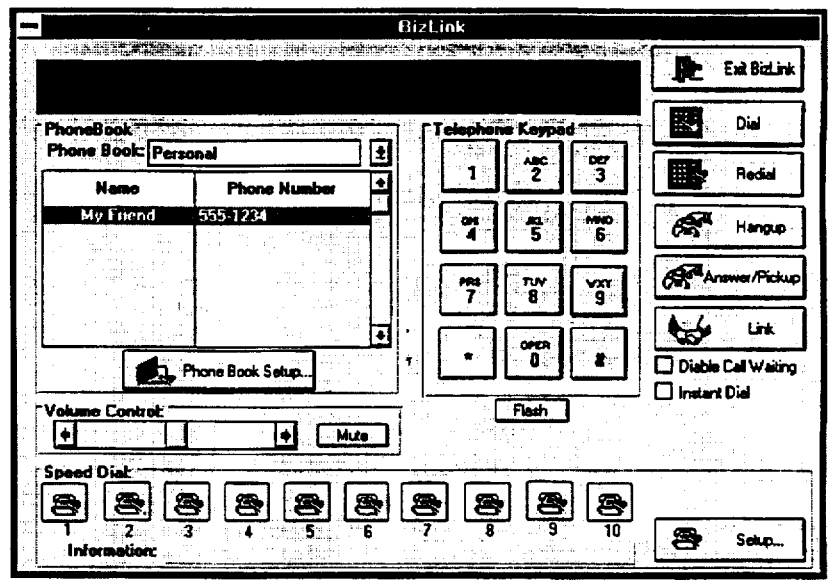

This window permits you to conduct phone conversations manage dialing functions, maintain lists of phone numbers, and establish a DSVD link with a remote party. The dialing/answering functions and phone number management can be entirely conducted through the use of a mouse and/or keyboard, and does not require physically handling a telephone set. (However, a telephone set must be plugged into the PHY2000 card to hear an incoming ring). All conversations can be conducted via headphones and microphone or speakerphone.

Dialing, Answering, Hangup and Phonebook Maintenance

All dialing, answering, hangup and phonebook features are the same as those of the PhoneLink dialer. Refer to the PhoneLink for Windows section of this manual for a complete explanation of how to use the dialer to establish a voice connection with the remote party.

PhyLink User's Manual

231

Linking

After establishing a voice connection (conversation) with your remote party, coordinate by voice to start the linking process. Initiate linking by clicking the Link button. The following pop-up message will appear:

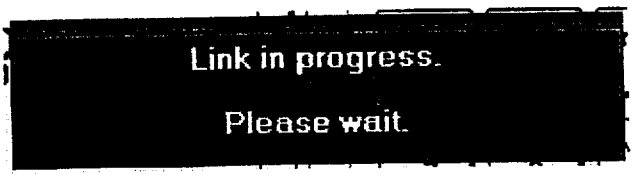

When linking is complete, the Link dialog box will pop-up.

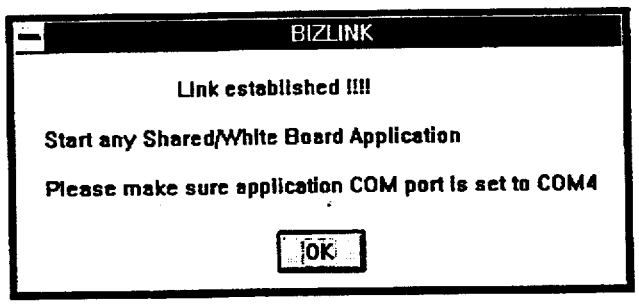

You may now minimize or exit the BizLink window. If you have enabled Call Waiting, you should not exit. Instead minimize the window so that you may quickly access the Flash button. You may answer a call waiting without losing your data link.

While coordinating by voice, start your remote access utility from the Program Manager. When your remote access link has been established you will be ready to remotely share applications while talking with your remote party.

If you fail to link, this pop-up message will be displayed in the dialer window:

Unable to link to remote PC.

Retry the linkup by clicking on Link once again.

PhyLink User's Manual

232

When you have completed your applications sharing, click *Hangup* then click *Exit BizLink*. The BizLink window will be closed and the standard modem code will be reloaded.

CAUTION: *When BizLink is running, you may transfer files and share applications. However, it is not possible to send a fax from within an application without first terminating the BizLink connection and reloading the fax modem code.*

PhoneLink Phone Dialer

Overview

PhoneLink is a graphical user interface (GUI) that, when downloaded to the PHY2000 PC, adds a convenient, hands-free dialer for voice communications in PC compatible computers. PhoneLink GUI's are available for both DOS and Windows.

PhoneLink permits you to dial or answer a call from the computer keyboard, then during the conversation exit PhoneLink and run other applications while you continue to talk. Phone numbers can be also be recalled from a user-edited phonebook (Windows GUI only). When you are ready to hangup, you can run PhoneLink again and hangup the call.

PhoneLink also supports Call Waiting interruptions. If you receive a call waiting signal during a phone conversation you can put the first call on hold, accept and complete the other call, then resume the original call.

PhyLink User's Manual

234

PhoneLink for DOS

Starting PhoneLink

To start PhoneLink, enter the following command at the DOS prompt:

C:\>PHONE<enter>

You will briefly see a sequence of commands executed as the PhoneLink code is downloaded to the modem. Then the Offline Startup menu screen will appear:

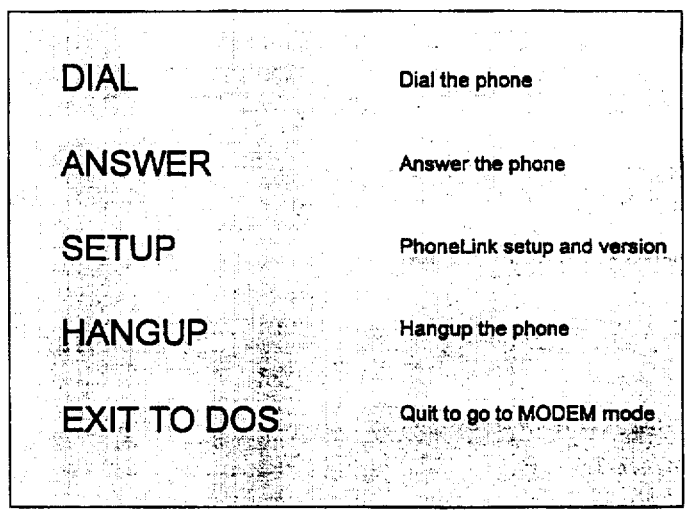

*Note: This opening Offline Startup menu only appears if you are not connected to another caller. Otherwise, the Online menu appears (see page 31.)*

PhoneLink Command Menus

PhoneLink command menus display the commands on the left in dark blue lettering against a cyan background. Commands are selected by depressing the up arrow <↑> and down arrow <↓> keys. Each command is highlighted in red lettering as it is selected. When highlighted, the command explanation appears on the right in yellow lettering. The command is executed by depressing the <Enter> key. The DIAL command is initially highlighted in this opening menu.

PhyLink User's Manual

Startup Menu Explanations

DIAL

The DIAL command permits you to dial the phone number of another party directly from your computer. Selecting *DIAL* causes the Dial menu to appear. (See page 20.)

ANSWER

The ANSWER command permits you to answer an incoming call. The ringing will be heard on the phone set connected to your computer. Selecting *ANSWER* will immediately connect you with the originating caller. You may also pickup the telephone receiver, then transfer to your headphones/microphone by selecting *ANSWER*.

SETUP

The SETUP command permits you to view the COM port and IRQ configuration for your computer and to change that configuration. Selecting *SETUP* causes the Setup menu to appear. (See page 18.)

HANGUP

The *HANGUP* command permits you to hangup the phone from the Startup menu.

EXIT TO DOS

The *EXIT TO DOS* command causes you to exit the PhoneLink program and to reload the standard data/fax modem code. Code will not be reloaded, nor this menu displayed, if you are connected (online).

PhyLink User's Manual

Setup Menu Explanations

If you wish to reassign the COM port and IRQ interrupts, you may do so from the Setup menu. The changes you make will be entered and take effect immediately. The PHY2000.CFG file is automatically modified.

The Setup Menu lists the possible COM port and IRQ assignments in the left column. The COM port and IRQ combination that was assigned at the time of software installation is enclosed within the flashing red/white box.

The message in the right column indicates that this combination is "*Currently in use*" (by your modem). As you move the box to other combinations, messages will appear that indicate that combination's status. "*Not Available*" means the combination is already assigned to another device such as your serial mouse. "*Available*" means you can reassign your PHY2000 PC to this COM port and IRQ. "*IRQ is not available*" means the COM port is available, but the IRQ is already in use by another COM port.

To change the settings, move the box to the desired combination, the depress <Enter>. The changes are now effective.

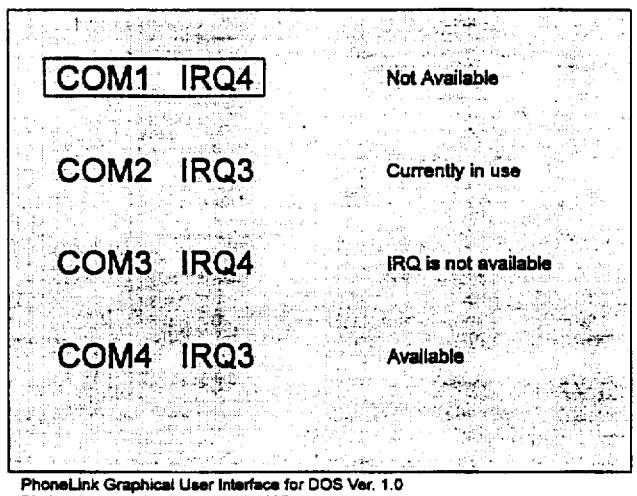

PhoneLink Graphical User Interface for DOS Ver. 1.0
Phylon Communications, Inc. © 1995

The PhoneLink software version is also displayed at the bottom of this screen; you may use this to determine if you have the latest software. If not, you may download an upgraded version from Phylon's Internet Website.

PhyLink User's Manual

Dial Menu Explanations

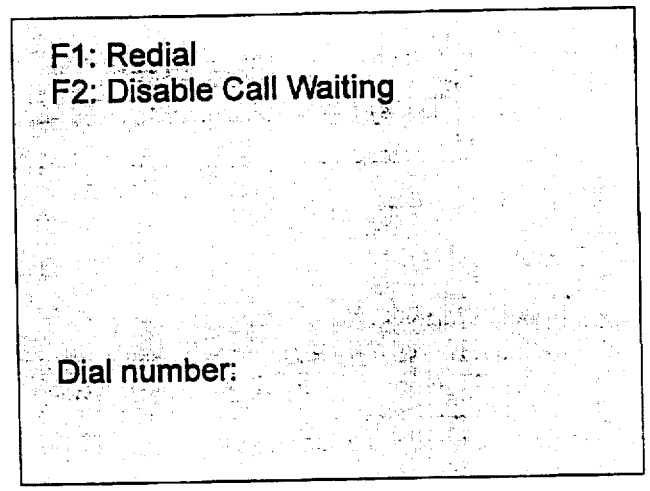

F1: Redial

The last number dialed during any PhoneLink session can be redialed from the DIAL menu by depressing the <F1> key.

F2: Disable Call Waiting

If you don't want to be disturbed by a Call Waiting signal during game play, you may disable call waiting by depressing the <F2>. Turn to page 32 to learn about Call Waiting.

Dial number:

Enter the party to be called's phone number here.

PhyLink User's Manual

Starting a Phone Session

1. To place a voice phone call a another party or answer and incoming call, start PhoneLink, and select *DIAL* from the startup menu (the Dial menu is then displayed) and go to (2), or select *ANSWER* to answer your ringing phone and go to (3).

2. Enter your party's phone number from your keyboard — the digits will be displayed as you enter them. Depress <Enter>. PhoneLink will now dial the number and display:

| Calling, Please wait... |

If the called party fails to answer, or you hear a busy signal, abort the dialing and return to the opening Startup menu by depressing the <Esc> key.

If the called party answers, then you are connected and the Online Menu is displayed:

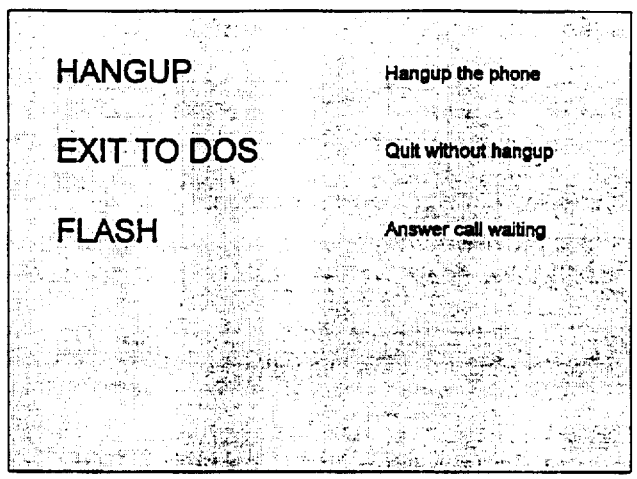

3. While conversing, you may exit to DOS to run other applications, then return to PhoneLink to hangup when the conversation is completed. Selecting *HANGUP* returns you to the Startup menu, where you may quit PhoneLink and restore the PHY2000 PC to standard data/fax modem operational.

PhyLink User's Manual

239

Online Menu Explanations

HANGUP

This command disconnects the line from the other player and hangs up the phone.

EXIT TO DOS

This command permits you to return to the DOS prompt without affecting the connection. You may then execute any DOS command or application while continuing your conversation.

FLASH

This command permits you to answer a Call Waiting signal. Call Waiting is enabled automatically upon first entering PhoneLink. Select *FLASH* and depress <Enter> to talk to the second caller, then depress <Enter> again to return to the original call.

Call Waiting Capability

Call Waiting is enabled by default when PhoneLink is initially entered. This permits the Call Waiting monitoring to run in the background while you are running the PhoneLink program. When a call is waiting, you will detect the Call Waiting tone in the headphones. If the Online Main menu is displayed at the time, you may answer the waiting call by selecting *FLASH*. To return to the original call, select *FLASH* again. You may disable Call Waiting from the Dial Menu.

Servicing a Call Waiting While Running a DOS Application

When you detect or hear the Call Waiting tone, notify the other party that you intend to answer another call. Depress the <Ctrl><F1> key combination. You may continue to work on your application.

When you have completed the call, depress the <Ctrl><F1> keys again. This will reconnect your original call.

PhyLink User's Manual

240

PhoneLink for Windows

Starting PhoneLink

PhoneLink

To start PhoneLink, double click on the *PhoneLink* icon in the PhyLink Applications group The PhoneLink application window will then appear:

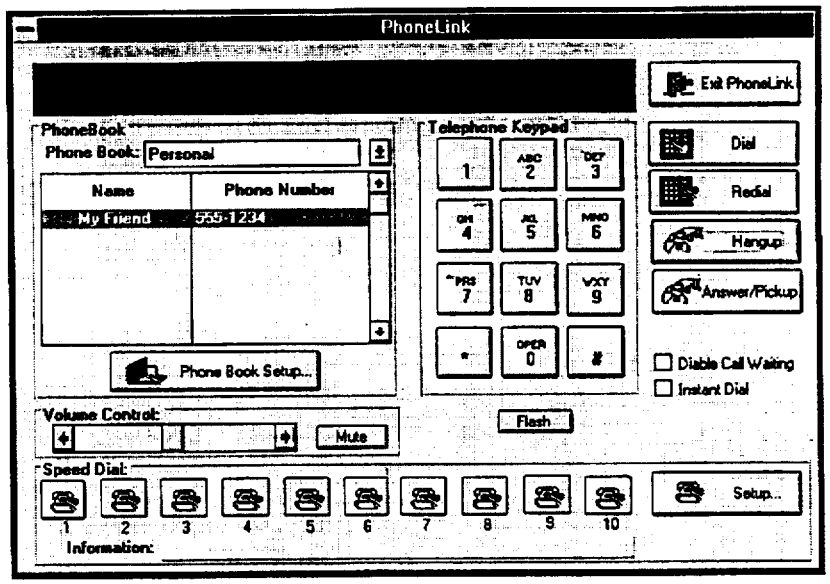

This window permits you to conduct phone conversations manage dialing functions, and maintain lists of phone numbers. The dialing/answering functions and phone number management can be entirely conducted through the use of a mouse and/or keyboard, and does not require physically handling a telephone set. (However, a telephone set must be plugged into the PHY2000 card to hear an incoming ring). All conversations can be conducted via headphones and microphone.

Dialing

To dial a phone number:

1. Enter the telephone number by clicking each digit of the number on the Telephone Keypad with your mouse, or by depressing the number keys on your keyboard. When entered, the numbers are displayed in green in the black area above the keypad.

PhyLink User's Manual

241

Include any long distance, area code or PBX prefixes in the number.

If you wish each number to be dialed as it is entered, click the *Instant Dial* check box. An X will be displayed in the box to indicate that instant dialing has been enabled; otherwise 2. After the last digit has been entered, click the *Dial* button located at the upper right side of the window, . The number will be dialed and you will hear the called party's line ringing in your headphones until it is answered or until you hangup. Once answered, you may conduct your conversation normally.

Redialing

To redial the last phone number entered, click the *Redial* button located at the upper right side of the window. The number will be displayed again, and redialed.

Hangup

To hangup the phone, click the *Hangup* button located at the center right side of the window. The following pop-up message will be displayed in the center of the window until the hangup is complete.

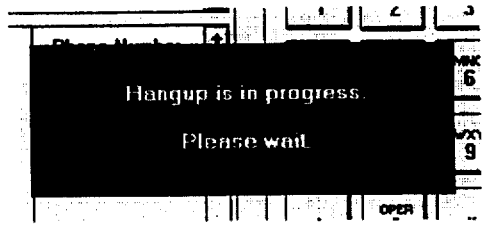

Answering

To answer an incoming phone call, click the *Answer* button located below the Telephone Keypad. The following message will be briefly displayed as a reminder to hangup any off-hook telephones first. (You may pickup the telephone receiver first, then transfer the phone call to your headphones/microphone by clicking *Answer.*)

PhyLink User's Manual

Speed Dialing

The ten speed dialing icons (shown as small telephones) that appear at the bottom of the PhoneLink window permit the rapid selection and dialing of your most commonly dialed phone numbers. To speed dial a phone number, click on the speed dial icon to which the desired number is assigned. The number will then be displayed and automatically dialed.

An example is shown below of the window display that results when speed dial icon #4 is selected:

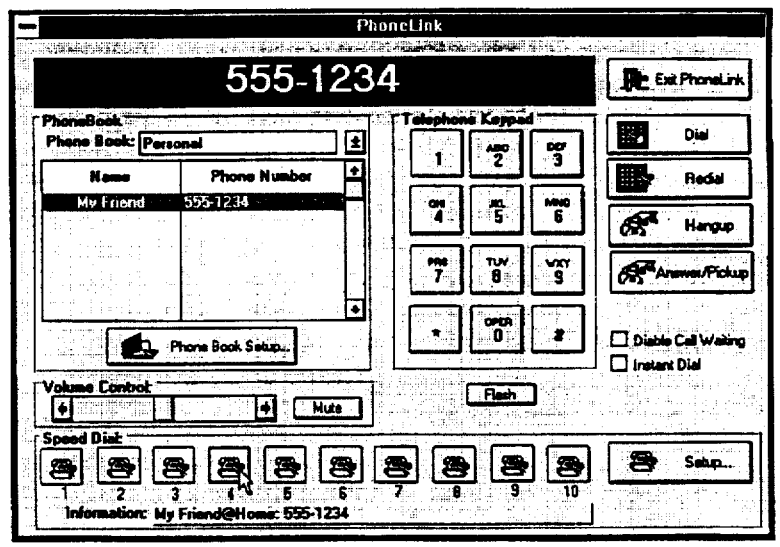

Explanatory information about the dialed number is shown in the *Information* section at the bottom of the window, while the dialed number itself is displayed above the keypad.

To assign a phone number to a speed dial icon:

1. Click the speed dial *Setup* button at the bottom right side of the window. The Speed Dial Setup dialog box then appears:

PhyLink User's Manual

243

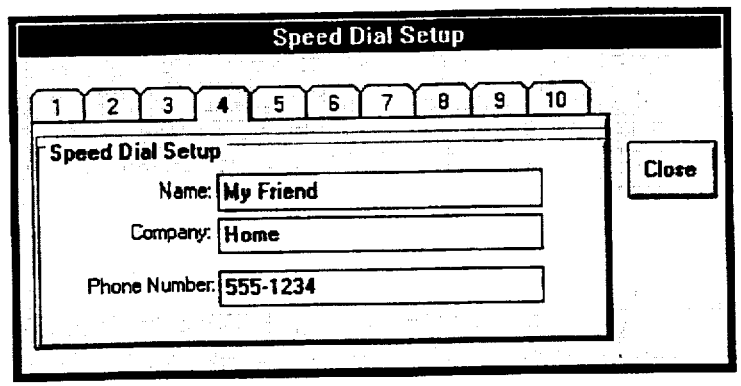

2. Click on the tab number that corresponds to the speed dial icon number.

3. Enter the name of the party to be called in the *Name* text box, the company name in the *Company* text box, and the phone number in the *Phone Number* text box; also Include area code and any PBX prefix in the number.

4. Click the *Close* button. Your number is now ready to be speed dialed.

Phonebook Dialing

The *Phonebook* section that appears at the center left-side of the PhoneLink window permits the rapid selection and dialing of phone numbers contained in your personally edited phone number lists. These lists are organized into phone books. The currently selected phone book name is shown in the *Phone Book:* drop-down list box. Immediately beneath the name of the selected phone book is the scrollable phone number list box. To dial a number from the displayed list, double click on the desired number. The number will then be displayed and automatically dialed.

Maintaining Phonebooks

Phonebooks can be created, deleted and edited by clicking on the Phone Book Setup button located immediately below the phone number list box. The Phone Book Setup dialog box will appear:

PhyLink User's Manual

244

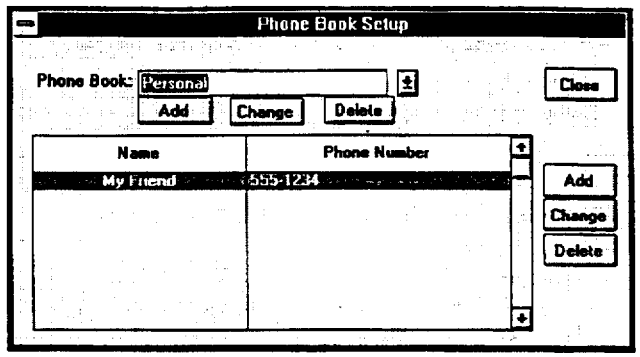

A new phone book can be created by entering the desired name into the *Phone Book:* drop-down list box, and clicking on the *Add* button beneath the box. Similarly, a phone book can be renamed by selecting the name from the list box, editing it, and clicking the *Change* button. Lastly, a book can be deleted by selecting the name from the list box and clicking the *Delete* button.

A new number can be added to the selected phone book by clicking the *Add* button to the right of the Phone Number list scroll bars. The Phone Entry Setup dialog box appears.

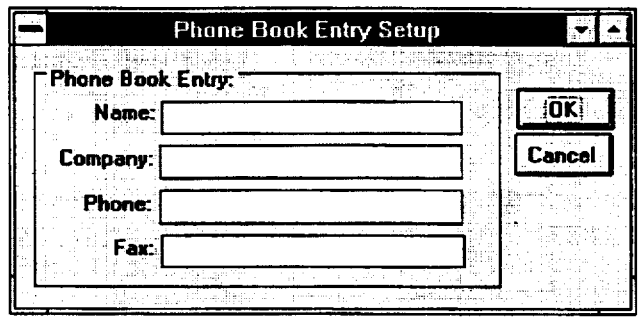

Complete the new phone number entry by filling in the *Name:*, *Company:*, *Phone:* and *Fax:* text boxes and clicking the *OK* button.

A phone book entry can be modified by clicking the Change button. The Phone Book Entry Setup dialog box will appear with the current information displayed in the text boxes. Enter the desired changes, then click the *OK* button.

PhyLink User's Manual

Call Waiting

Call Waiting is enabled by default when the PhoneLink window is initially opened. This permits the Call Waiting monitoring to run in the background while the PhoneLink window is open. If you do not wish to receive or service waiting calls, click the *Disable Call Waiting* check box located at the lower right side of the window.

When a call is waiting, you will detect the Call Waiting tone in the headphones. You may answer the waiting call by clicking the *FLASH* button. The following message will be briefly displayed:

Call waiting answered.

To return to the original call, click *FLASH* again.

Speakerphone/Headphone Volume Control

The speakerphone/headphone volume can be controlled with the *Volume Control:* located near the left-bottom of the window.

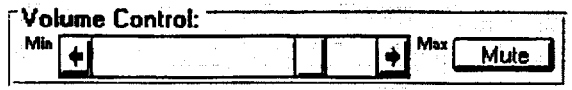

The volume is decreased by moving the scroll box towards the left or by clicking the left scroll arrow. Similarly, the volume can be increased by moving the scroll box to the right, or by clicking the right scroll arrow. The volume can be muted by clicking the *Mute* button. The letters on the button will switch from black to red when muting is active.

PhyLink User's Manual

246

Hardware Setup for Windows

Overview

If you wish to reassign the COM port and IRQ interrupt, you may do so with the Hardware Setup GUI. The changes you make will be entered and take effect immediately. The PHY2000.CFG file is automatically modified.

Starting Hardware Setup

To start Hardware Setup, double click on the *Hardware Setup* icon in the PhyLink Applications group Hardware Setup The PHY2000 Hardware Setup dialog box will then appear:

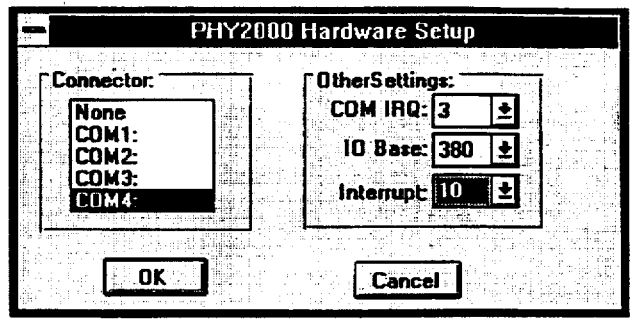

The current setup will be shown in the various list boxes. Following this, the Setup dialog box will appear to show the status of the highlighted COM port:

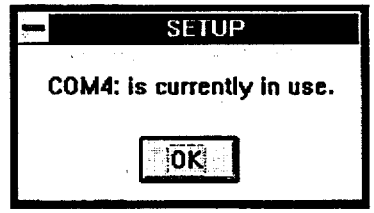

You may change the settings by scrolling and clicking on the desired COM port, IRQ, Interrupt and I/O Base address settings. As you do, the Setup box for that COM port will appear and indicate whether the COM port status.

PhyLink User's Manual

"*Not Available*" means the combination is already assigned to another device such as your serial mouse. "*Available*" means you can reassign your PHY2000 PC to this COM port and IRQ. "*IRQ is not available*" means the COM port is available, but the IRQ is already in use by another COM port. "*Currently in use*" means this is the active COM port in use by your modem.

To save the settings, click the desired combination, then click the OK button in the PHY2000 Hardware Setup box. Your modem card will now respond to the new settings.

PhyLink User's Manual

248

Software License Agreement

BY USING THIS SOFTWARE, YOU ARE AGREEING TO BE BOUND BY THE TERMS OF THIS AGREEMENT. DO NOT USE THIS SOFTWARE UNTIL YOU HAVE CAREFULLY READ AND AGREED TO THE FOLLOWING TERMS AND CONDITIONS. IF YOU DO NOT AGREE TO THE TERMS OF THIS AGREEMENT, PROMPTLY RETURN THE SOFTWARE PACKAGE AND ANY ACCOMPANYING ITEMS.

LICENSE: Phylon Communications, Inc. ("Phylon") grants you the non-exclusive right to use the enclosed software program (the "Software"). You will not use, copy, modify, rent, sell or transfer the Software or any portion thereof except as provided in this Agreement.

You may:
1. Install/use the Software on a single computer or on a single local area network ("LAN") server;
2. Copy the Software solely for backup or archival purposes, including copying the Software into memory.

RESTRICTIONS:

You Will Not:
1. Sublicense the Software;
2. Reverse engineer, decompile, or disassemble the Software;
3. Copy the Software, in whole or in part, except as provided in this Agreement.

TRANSFER: You may transfer the Software to another party if the receiving party agrees to the terms of this Agreement and you retain no copies of the Software and accompanying documentation. Transfer of the Software terminates your right to use the Software.

OWNERSHIP AND COPYRIGHT OF SOFTWARE: Title to the Software and all copies thereof remain with Phylon or its vendors. The Software is copyrighted and is protected by United States and international copyright laws. You will not remove the copyright notice from the Software. You agree to prevent any unauthorized copying of the Software.

DUAL MEDIA SOFTWARE: If the Software package contains multiple media, you may only use the disks appropriate for your single-user computer or LAN.

WARRANTY: Phylon warrants that it has the right to license you to use the Software. The Software is provided "AS IS." Phylon warrants that the media on which the Software is furnished will be free from defects in material and workmanship for a period of one (1) year from the date of purchase. Upon return of such defective media, Phylon 's entire liability and your exclusive remedy shall be the replacement of the Software.

THE ABOVE WARRANTIES ARE THE ONLY WARRANTIES OF ANY KIND EITHER EXPRESS OR IMPLIED INCLUDING WARRANTIES OF MERCHANTABILITY OR FITNESS FOR ANY PARTICULAR PURPOSE.

LIMITATION OF LIABILITY: NEITHER PHYLON NOR ITS VENDORS SHALL BE LIABLE FOR ANY LOSS OF PROFITS, LOSS OF USE, LOSS OF DATA, INTERRUPTIONS OF BUSINESS, NOR FOR INDIRECT, SPECIAL, INCIDENTAL OR CONSEQUENTIAL DAMAGES OF ANY KIND WHETHER UNDER THIS AGREEMENT OR OTHERWISE, EVEN IF ADVISED OF THE POSSIBILITY OF SUCH DAMAGES.

AUDIT: Phylon reserves the right ro have audits conducted to verify your compliance with this Agreement.

TERMINATION OF THIS LICENSE: Phylon may terminate this license at any time if you are in breach of any of its terms and conditions. Upon termination, you will immediately destroy the Software or return all copies of the Software and documentation to Phylon.

U.S. GOVERNMENT RESTRICTED RIGHTS: The Software and documentation were developed at private expense and are provided with "RESTRICTED RIGHTS." Use, duplication, or disclosure by the Government is subject to restrictions as set forth in FAR 52.227-14 and DFAR 252.227-7013 et seq. or its successor.

EXPORT LAWS: You agree that the distribution and export/re-export of the Software is in compliance with the laws, regulations, orders or other restricrions of the U.S. Export Administration Regulations.

APPLICABLE LAW: This Agreement is governed by the laws of the State of California and the United States, including patent and copyright laws Any claim arising out of this Agreement will be brought in Alameda County, California.

249
4027 Clipper Court
Fremont, CA 94538-6540
Telephone: (510) 656-2606
Facsimile: (510) 656-0902
BBS: (510) 656-0916
Email: phylon@ix.netcom.com
Website: http://www.phylon.com/
P/N 99-0003-0

What is claimed is:

1. A data transfer system for transferring game data and voice data over a single telephone line, the game data being data with a low tolerance for delay and the voice data being digitized voice to be transmitted in substantially real time, comprising:

a frame generator, which outputs a frame symbol followed by frame data for each frame, thus framing a stream of frames wherein each frame is delimited at a beginning and an end by a frame symbol;

a voice signal digitizer, which converts a voice signal into a digital voice data stream;

a data mixer, coupled to receive the digital voice data stream from the voice signal digitizer and having an input for the game data, the data mixer comprising means for inserting the digital voice data into a frame as frame data without using an escape symbol sequence and means for inserting game data in the frame using the escape symbol sequence as a delimiter of game data; and transmission means, coupled to the frame generator and the data mixer, for transmitting the stream of frames over the telephone line.

2. The data transfer system of claim 1, wherein the escape symbol sequence is a single eight-bit symbol.

3. The data transfer system of claim 1, wherein the means for inserting game data only inserts game data when game data is presented at the input for game data.

4. The data transfer system of claim 1, wherein the amount of game data inserted into a frame is variable depending on the amount of game data presented at the input for game data and the amount is limited by a frame size.

5. The data transfer system of claim 1, further comprising a layer of error detection.

6. The data transfer system of claim 1, further comprising a layer of error correction.

7. The data transfer system of claim 1, further comprising a layer of error correction and detection.

8. The data transfer system of claim 1, further comprising a layer of data compression.

9. The data transfer system of claim 1, wherein the data mixer is configured to insert game data into a frame of digital voice data if game data is presented while the frame of digital voice data has been partially transmitted.

10. The data transfer system of claim 1, further comprising means for bypassing the data mixer when a waiting call is detected.

11. The data transfer system of claim 1, further comprising means for mixing game sound with a received voice signal.

* * * * *